(12) United States Patent
Creachbaum et al.

(10) Patent No.: US 10,663,274 B2
(45) Date of Patent: May 26, 2020

(54) ARTICULATED ARM COORDINATE MEASURING MACHINE

(71) Applicant: FARO Technologies, Inc., Lake Mary, FL (US)

(72) Inventors: John Lucas Creachbaum, Deltona, FL (US); Brent Bailey, Winter Springs, FL (US); Matthew Mogensen, Longwood, FL (US); William E. Schoenfeldt, Oviedo, FL (US); Keith G. MacFarlane, Lake Mary, FL (US)

(73) Assignee: FARO TECHNOLOGIES, INC, Lake Mary, FL (US)

(*) Notice: Subject to any disclaimer, the term of this patent is extended or adjusted under 35 U.S.C. 154(b) by 221 days.

(21) Appl. No.: 15/873,474

(22) Filed: Jan. 17, 2018

(65) Prior Publication Data

US 2018/0216923 A1 Aug. 2, 2018

Related U.S. Application Data

(60) Provisional application No. 62/451,307, filed on Jan. 27, 2017, provisional application No. 62/512,326, filed on May 30, 2017.

(51) Int. Cl.
*G01B 5/008* (2006.01)
*G01B 5/012* (2006.01)

(52) U.S. Cl.
CPC .............. *G01B 5/008* (2013.01); *G01B 5/012* (2013.01)

(58) Field of Classification Search
CPC ......... G01B 5/008; G01B 5/012; G01B 5/016
USPC ......... 33/502, 503, 556, 557, 558, 559, 560, 33/561
See application file for complete search history.

(56) References Cited

U.S. PATENT DOCUMENTS

| | | | |
|---|---|---|---|
| 4,451,987 A * | 6/1984 | Cusack | G01B 7/002 33/561 |
| 4,513,507 A | 4/1985 | Laskowski | |
| 4,637,119 A * | 1/1987 | Schneider | G01B 7/008 483/69 |
| 4,752,166 A * | 6/1988 | Lehmkuhl | G01B 5/012 33/504 |
| 5,040,931 A * | 8/1991 | Spivey | B23B 31/1077 279/6 |
| 5,251,156 A * | 10/1993 | Heier | G01B 11/005 33/503 |
| 5,323,540 A | 6/1994 | McMurtry et al. | |
| 5,402,582 A * | 4/1995 | Raab | G01B 21/04 33/503 |
| 5,446,970 A | 9/1995 | McMurtry et al. | |
| 5,634,280 A | 6/1997 | Hellier et al. | |
| 6,012,230 A | 1/2000 | McMurtry et al. | |
| 6,170,358 B1 | 1/2001 | Hunter et al. | |
| 6,957,496 B2 * | 10/2005 | Raab | B25J 18/002 33/1 N |

(Continued)

FOREIGN PATENT DOCUMENTS

DE 19502840 A1 8/1996

OTHER PUBLICATIONS

Great Britain Search Report for Application No. 1801290.6 dated Jul. 27, 2018; 5 pgs.

*Primary Examiner* — Christopher W Fulton
(74) *Attorney, Agent, or Firm* — Cantor Colburn LLP

(57) ABSTRACT

An articulated arm coordinate measuring machine includes a first end that clamps to a first extension element of a first measurement probe.

13 Claims, 82 Drawing Sheets

(56) References Cited

U.S. PATENT DOCUMENTS

| | | |
|---|---|---|
| 7,055,258 B2 | 6/2006 | Hajdukiewicz et al. |
| 7,281,336 B2 | 10/2007 | Lummes et al. |
| 8,006,399 B2 | 8/2011 | Wallace et al. |
| 8,028,432 B2 | 10/2011 | Bailey et al. |
| 8,144,340 B2 | 3/2012 | McFarland et al. |
| 10,444,009 B2 * | 10/2019 | Tohme ............... G01B 11/005 |
| 2002/0146276 A1 | 10/2002 | Guin |
| 2005/0016008 A1 * | 1/2005 | Raab ..................... B23Q 35/04 |
| | | 33/503 |
| 2006/0253206 A1 | 11/2006 | Price et al. |
| 2008/0163507 A1 | 7/2008 | Heller et al. |
| 2008/0289204 A1 | 11/2008 | Crampton |
| 2009/0025243 A1 | 1/2009 | Prestidge et al. |
| 2009/0165318 A1 | 7/2009 | Weston et al. |
| 2010/0325863 A1 | 12/2010 | Wallace |
| 2011/0016995 A1 | 1/2011 | McMurtry et al. |
| 2011/0198790 A1 | 8/2011 | Ronald et al. |
| 2012/0260512 A1 * | 10/2012 | Kretschmer .......... G01B 5/008 |
| | | 33/503 |
| 2013/0047452 A1 | 2/2013 | McMurtry et al. |
| 2013/0055832 A1 * | 3/2013 | Brenner ................ G01B 5/012 |
| | | 73/866.5 |
| 2015/0330761 A1 | 11/2015 | Gong |
| 2015/0330762 A1 | 11/2015 | Gong |
| 2015/0330763 A1 | 11/2015 | Gong |
| 2015/0330764 A1 | 11/2015 | Gong |
| 2015/0330765 A1 | 11/2015 | Gong |
| 2015/0330766 A1 | 11/2015 | Gong |
| 2015/0355310 A1 | 12/2015 | Gong |
| 2016/0084633 A1 * | 3/2016 | Ferrari ................... G01B 21/04 |
| | | 33/503 |
| 2016/0097629 A1 | 4/2016 | York et al. |
| 2016/0116276 A1 | 4/2016 | Featherstone et al. |

\* cited by examiner

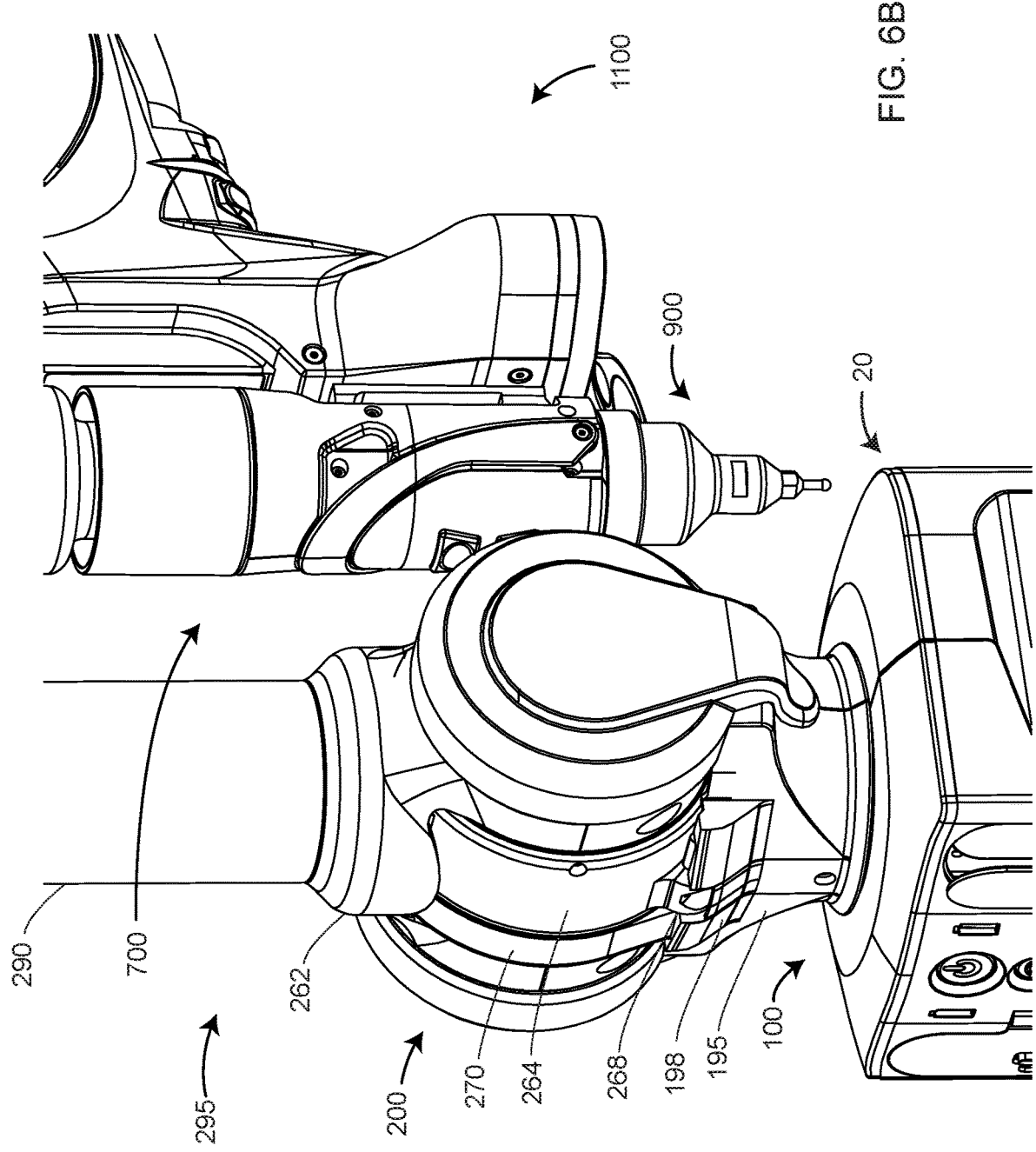

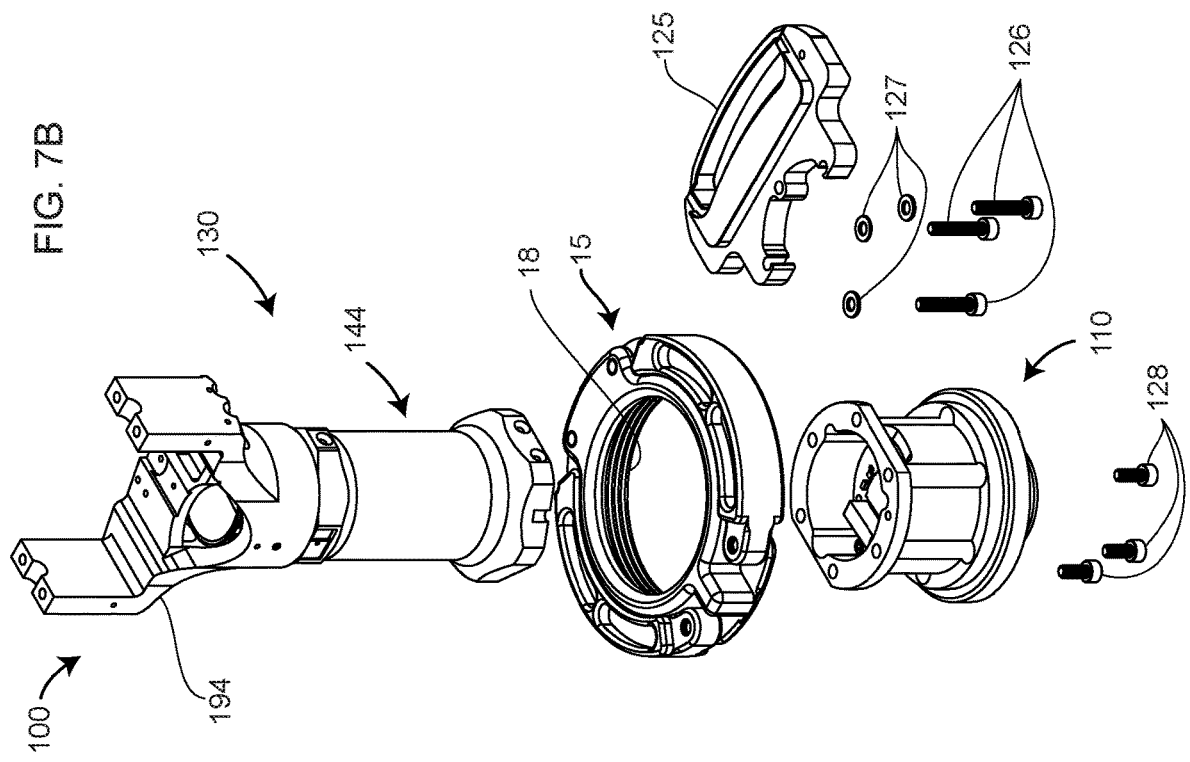
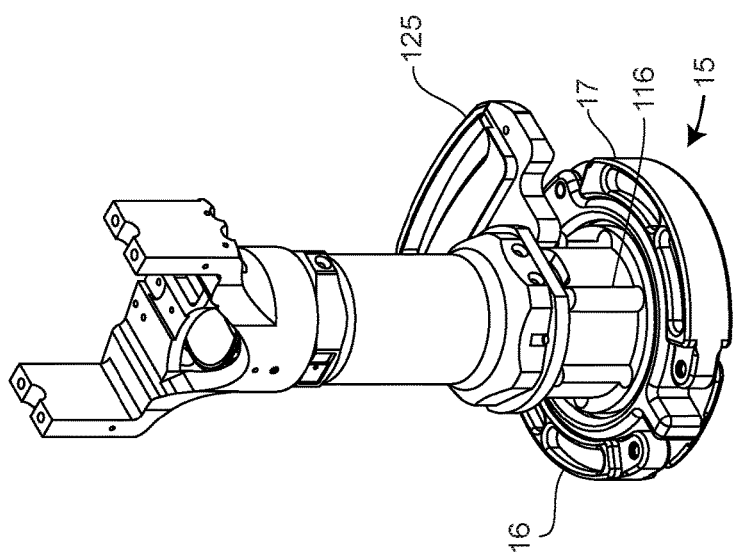

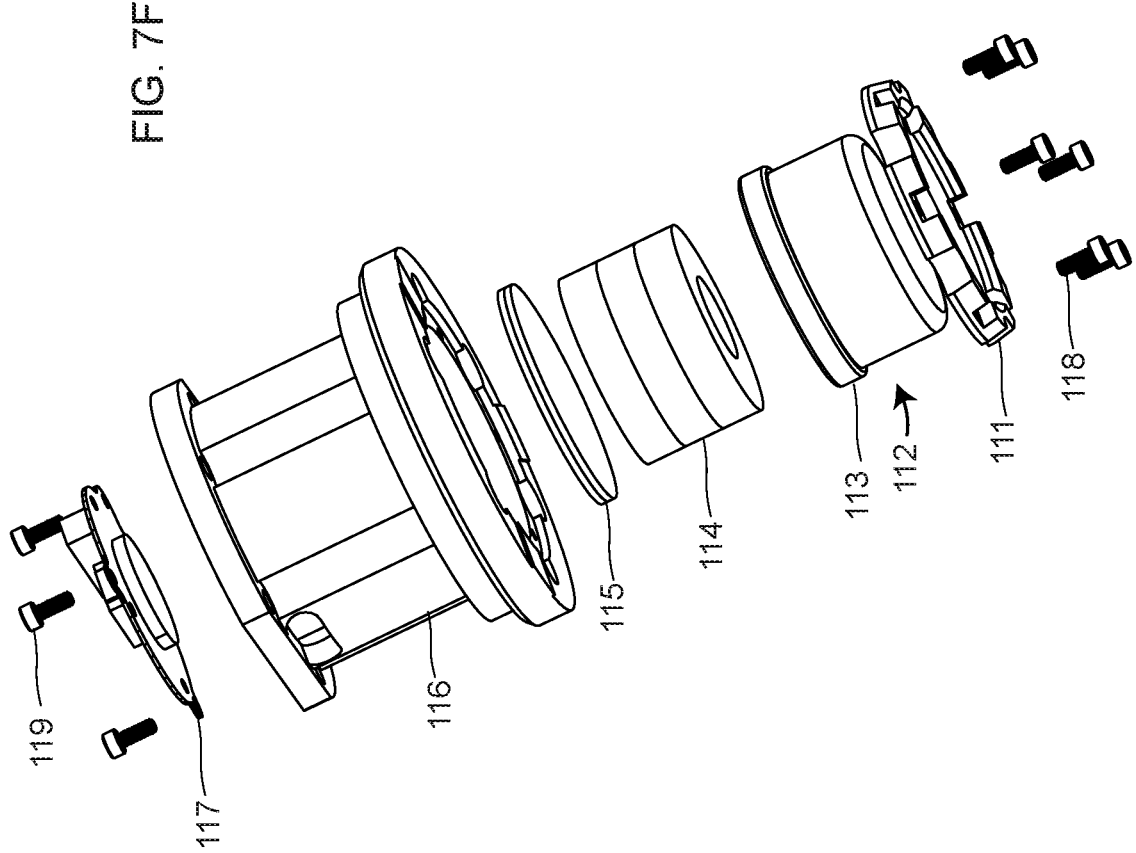
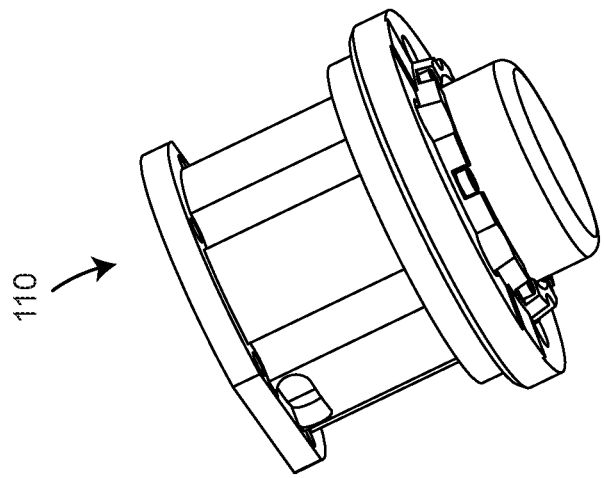

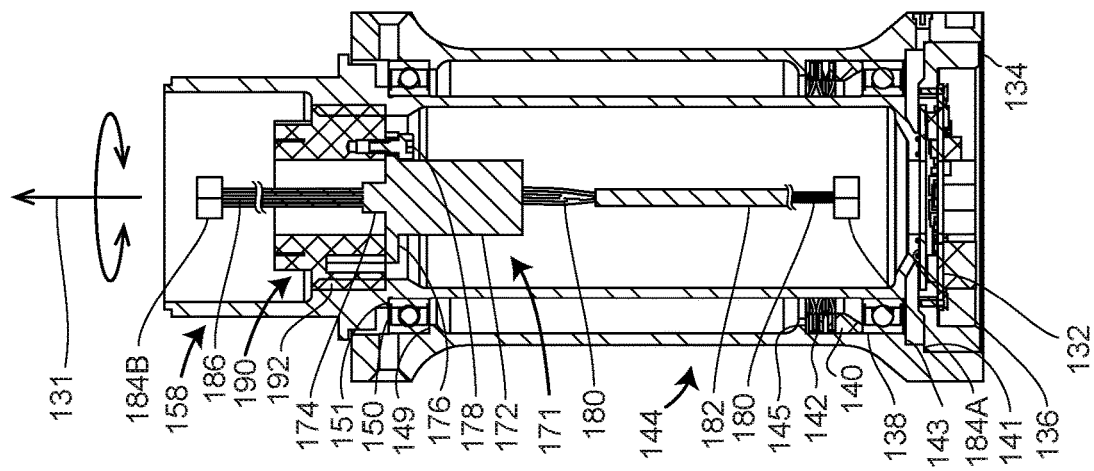
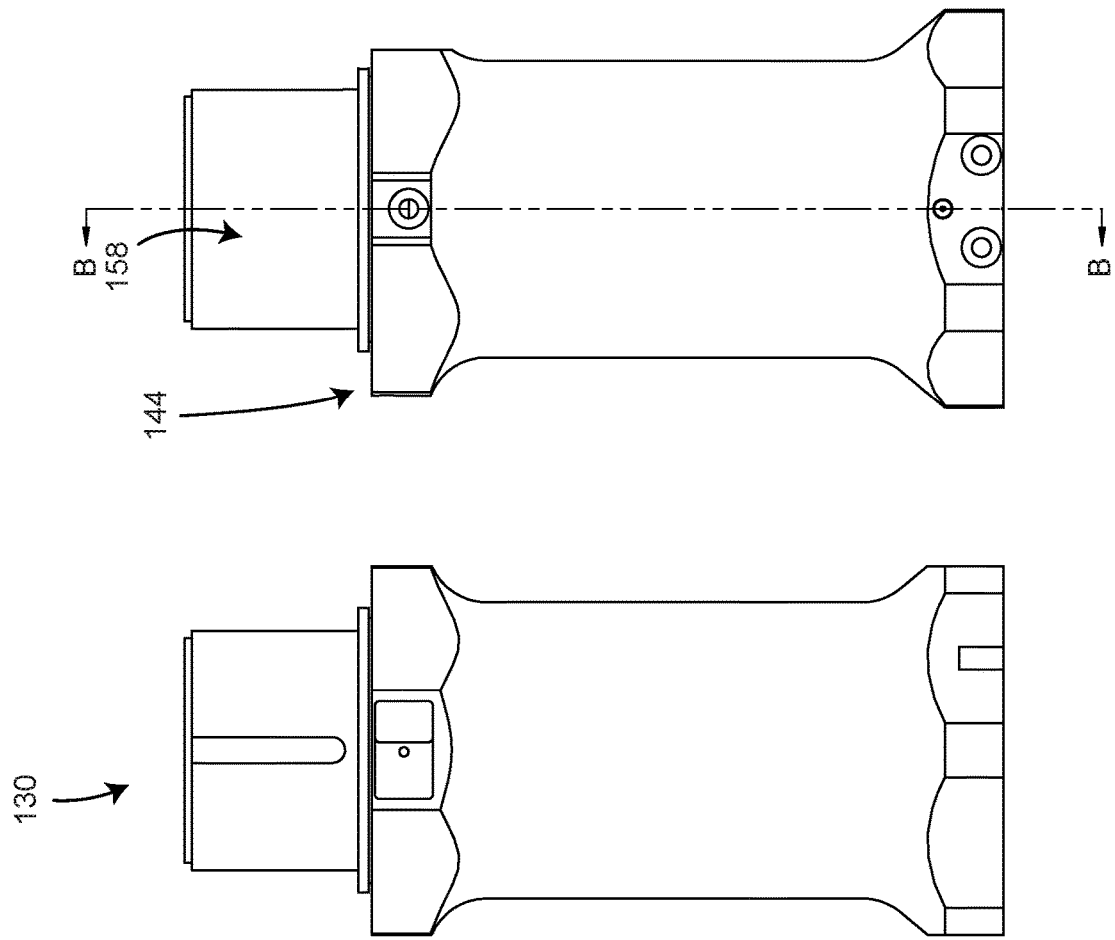

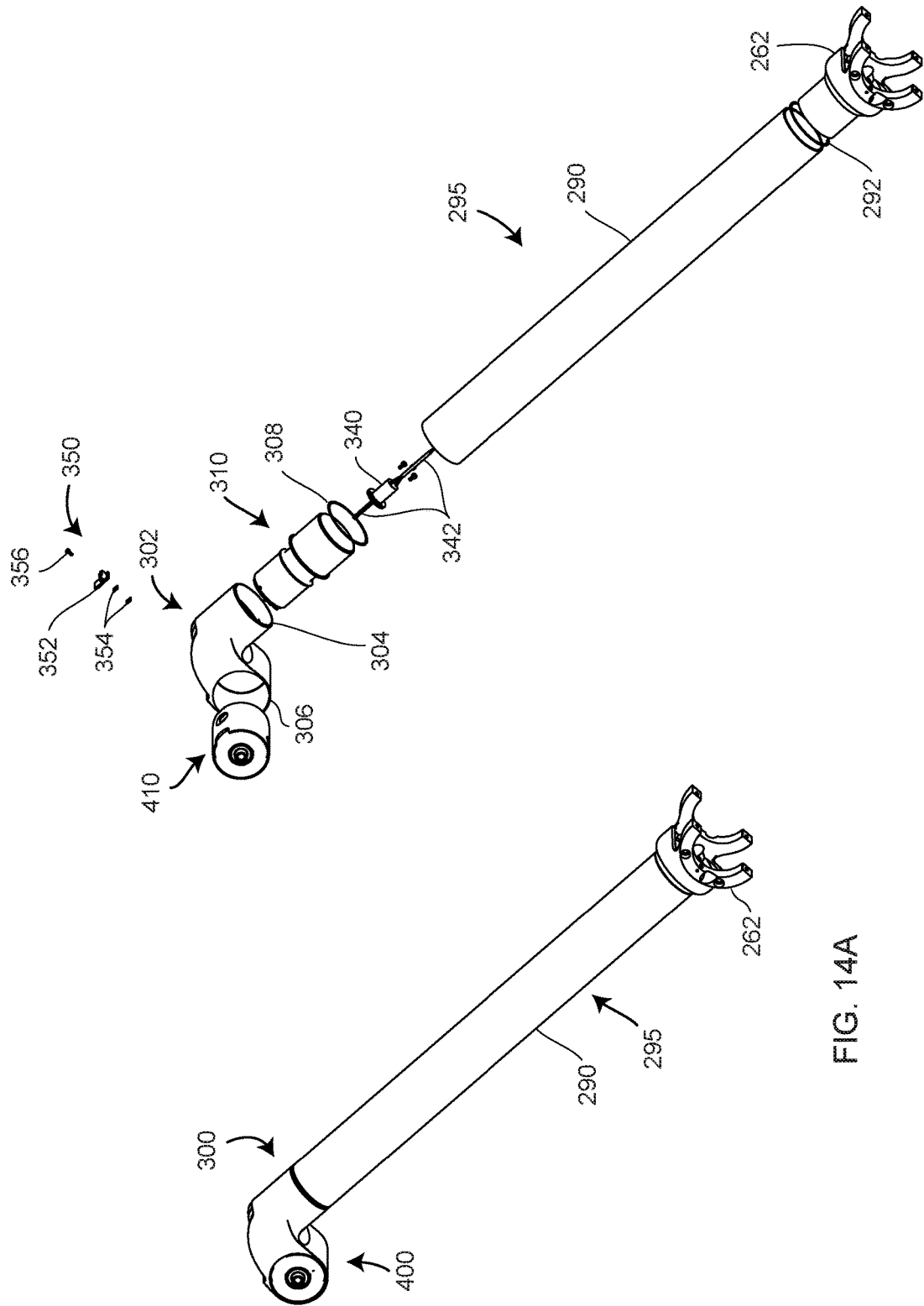

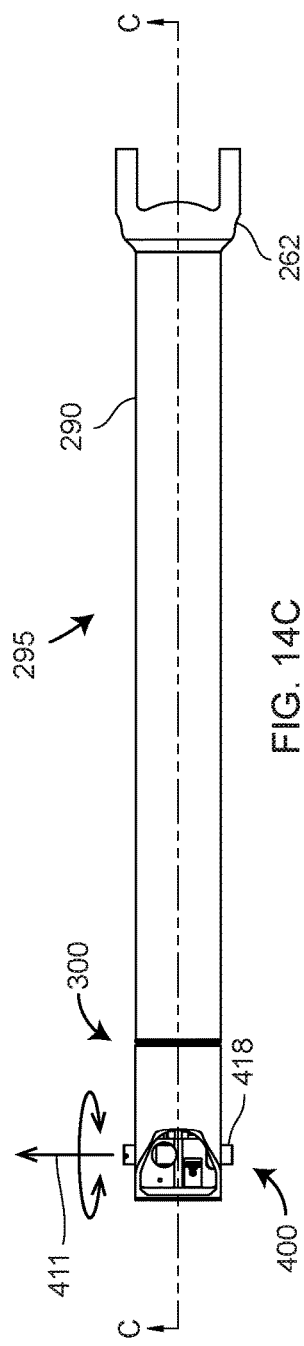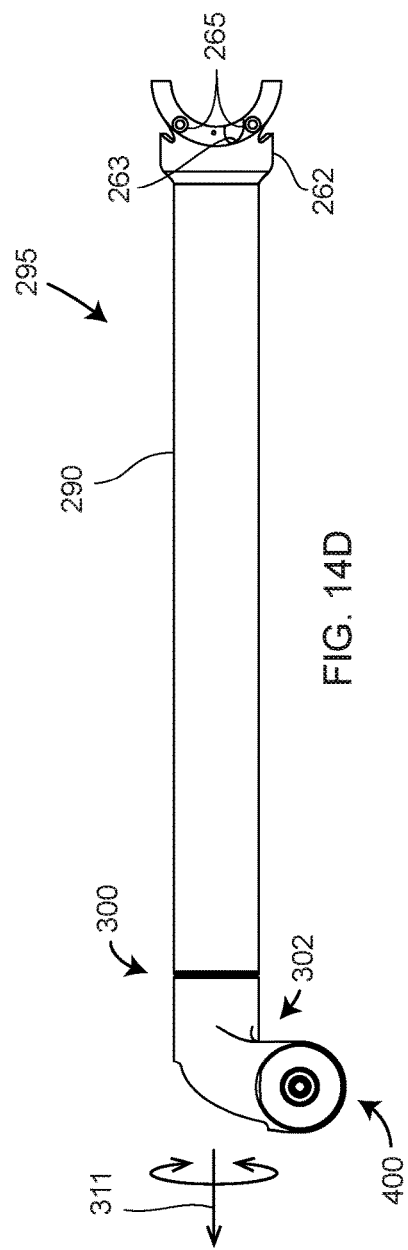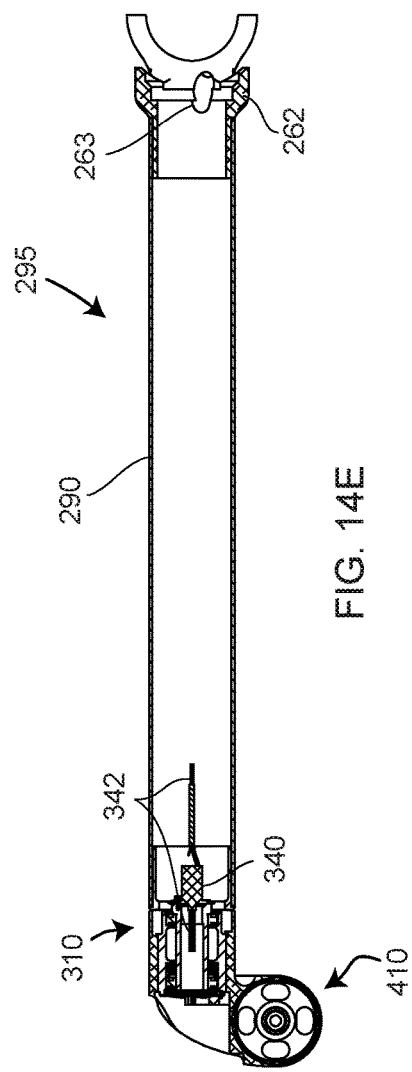

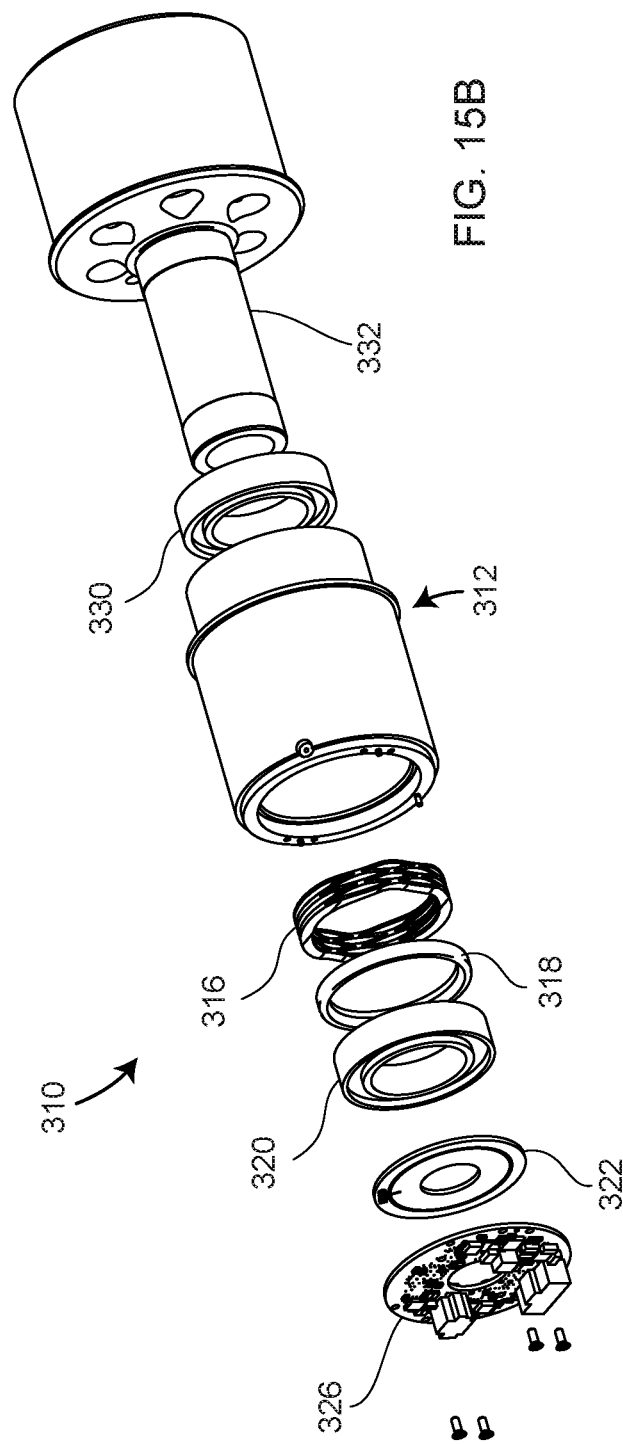

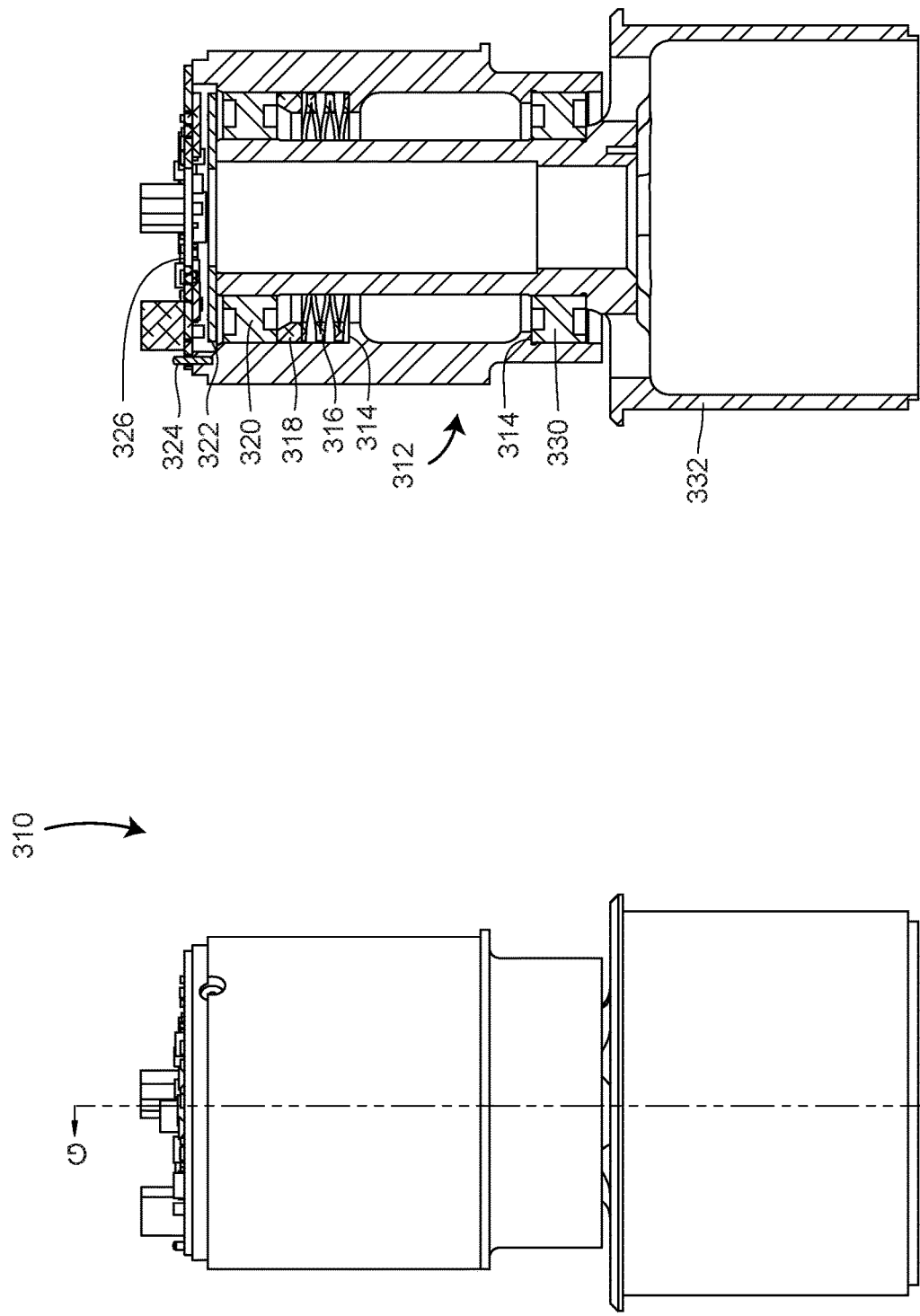

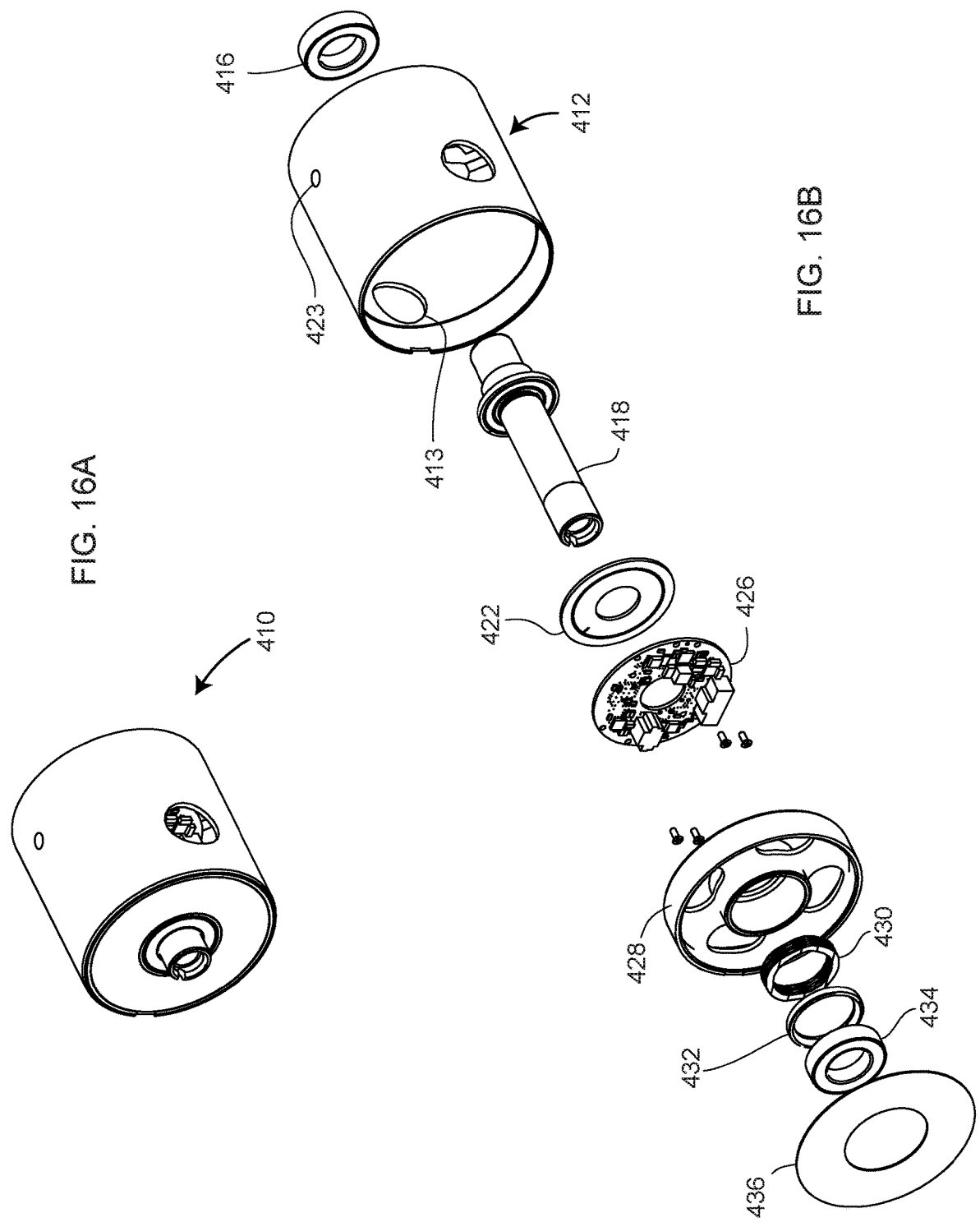

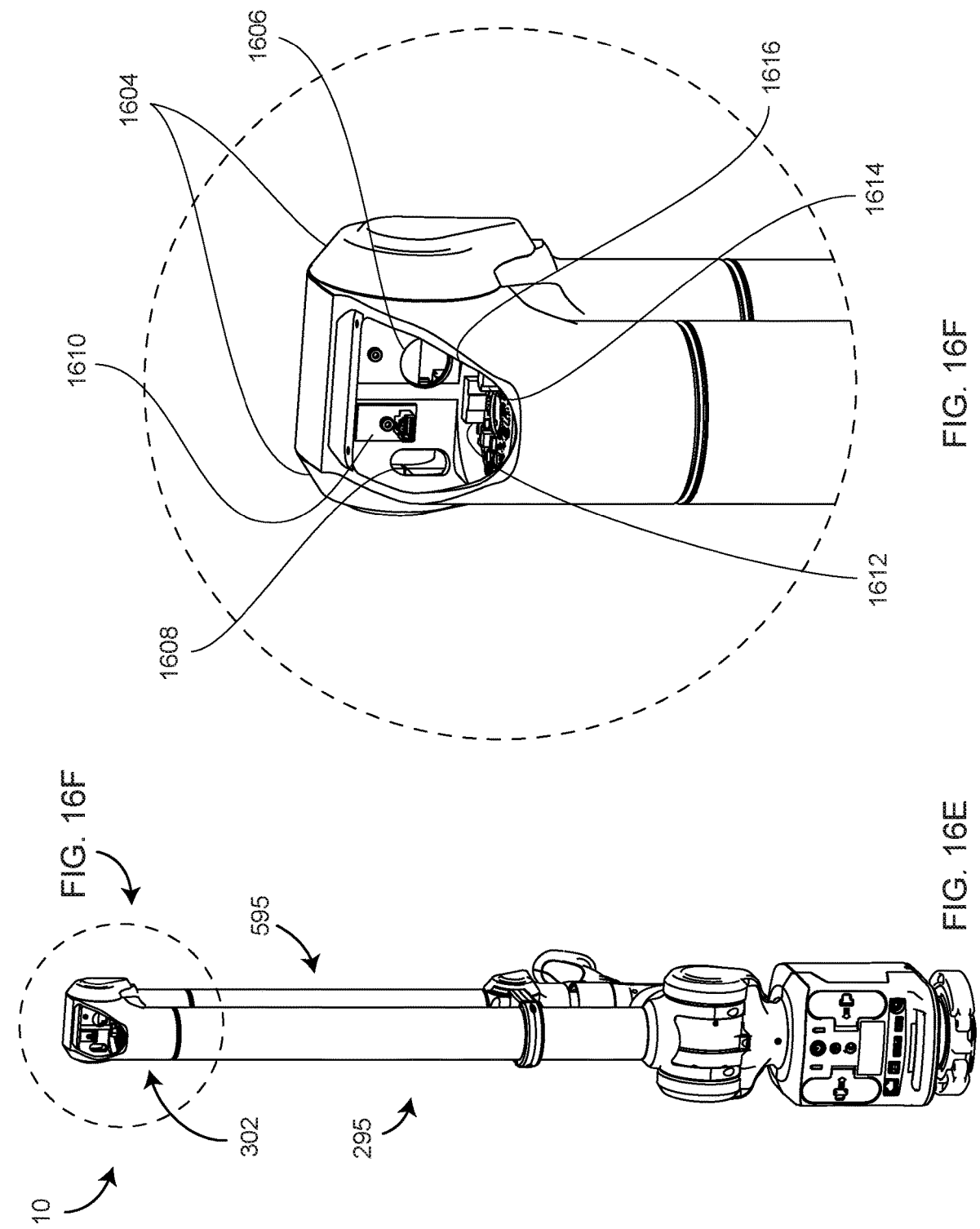

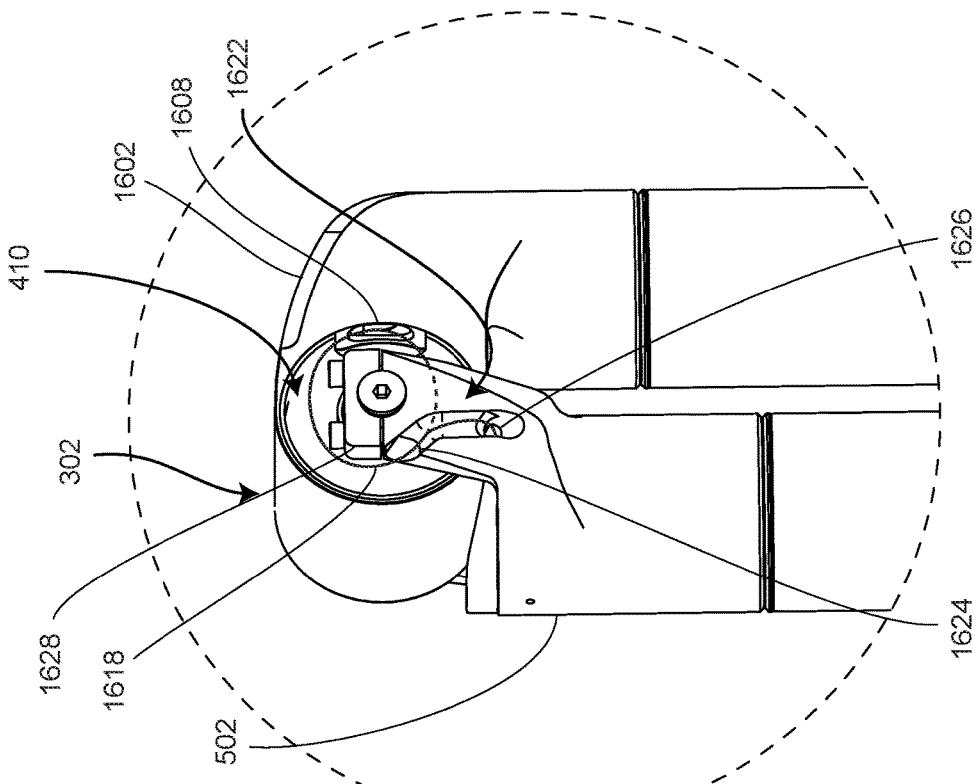
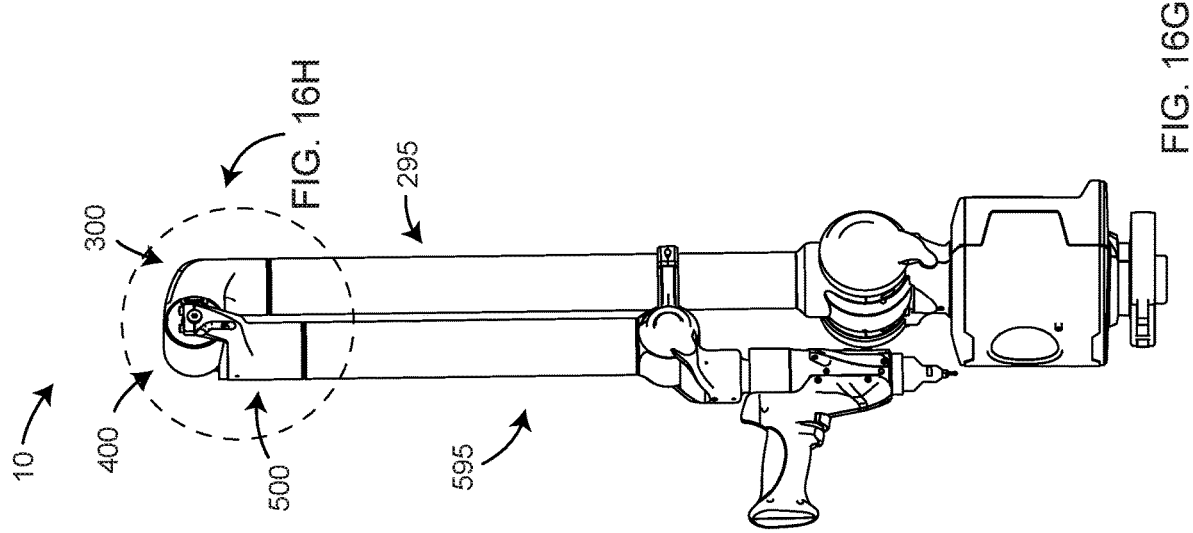
FIG. 16H
FIG. 16G

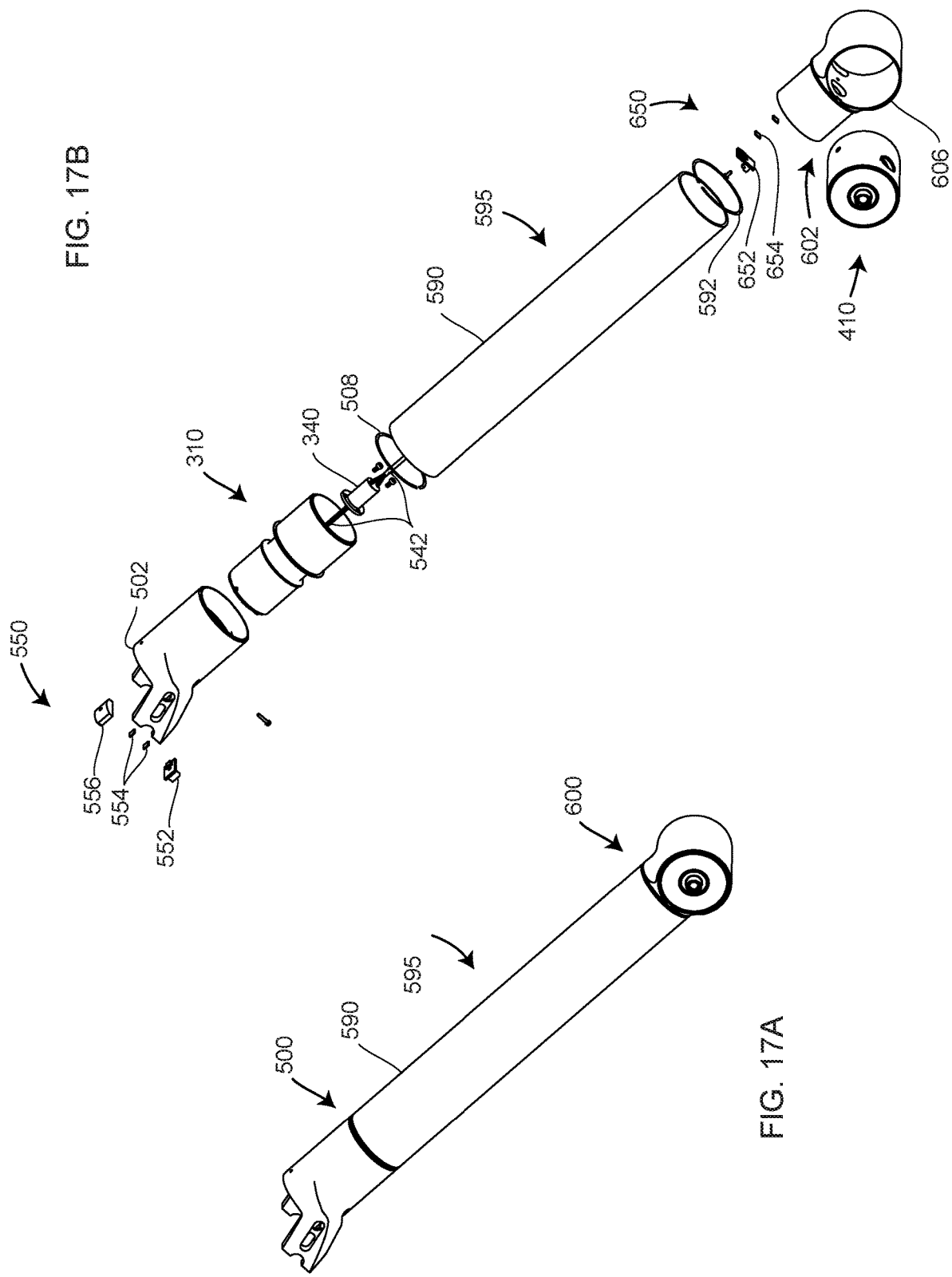

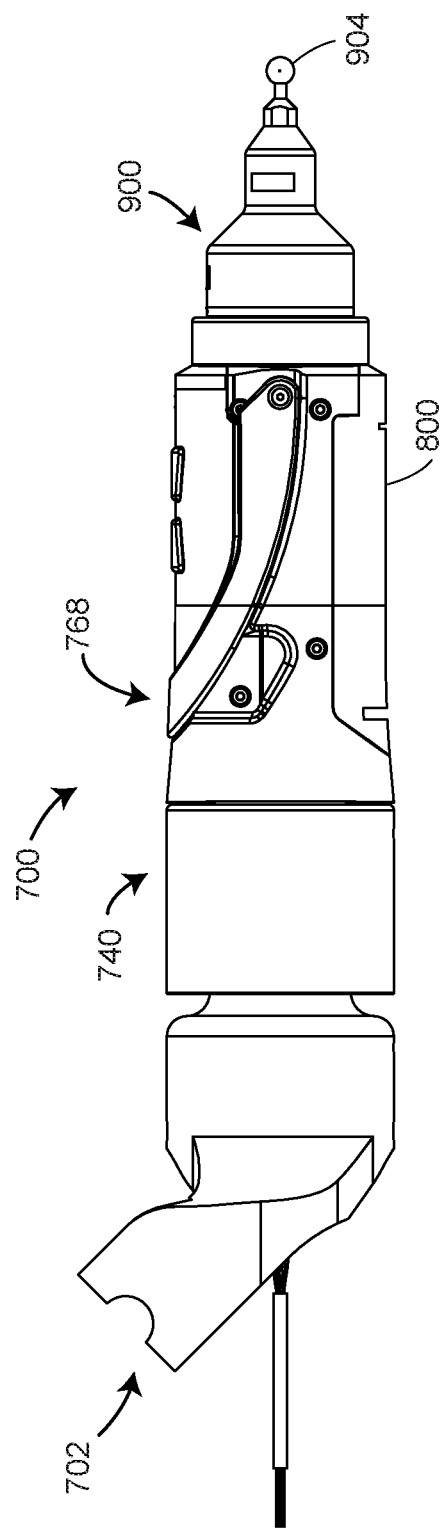
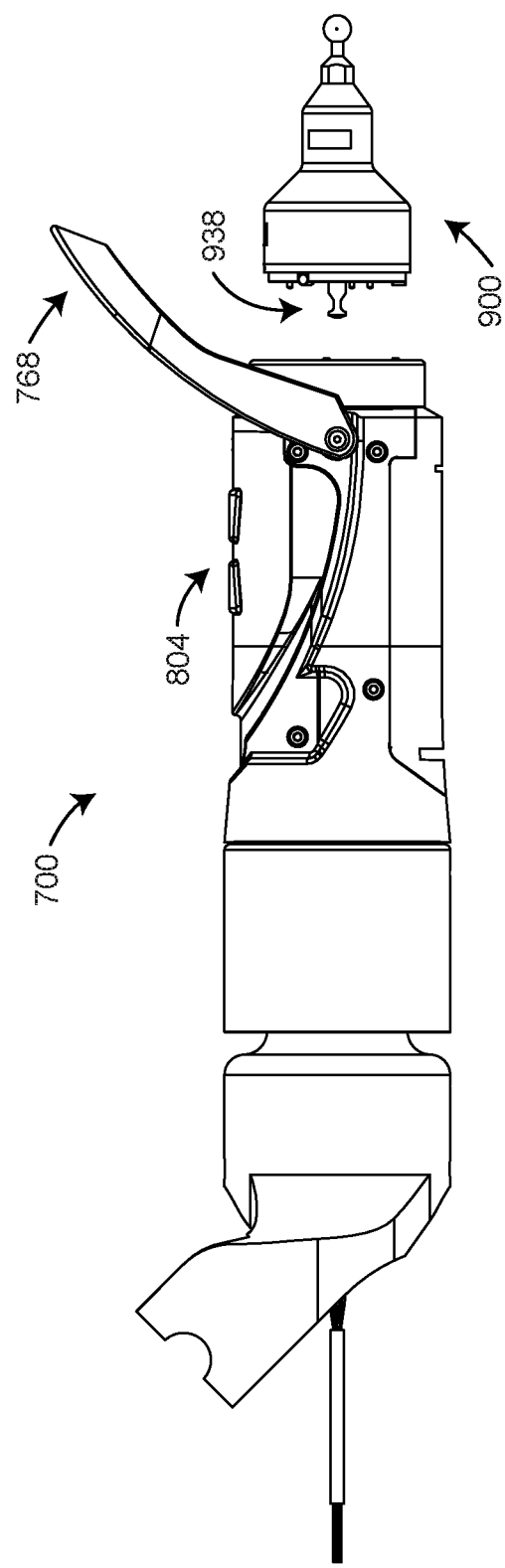
FIG. 19A
FIG. 19B

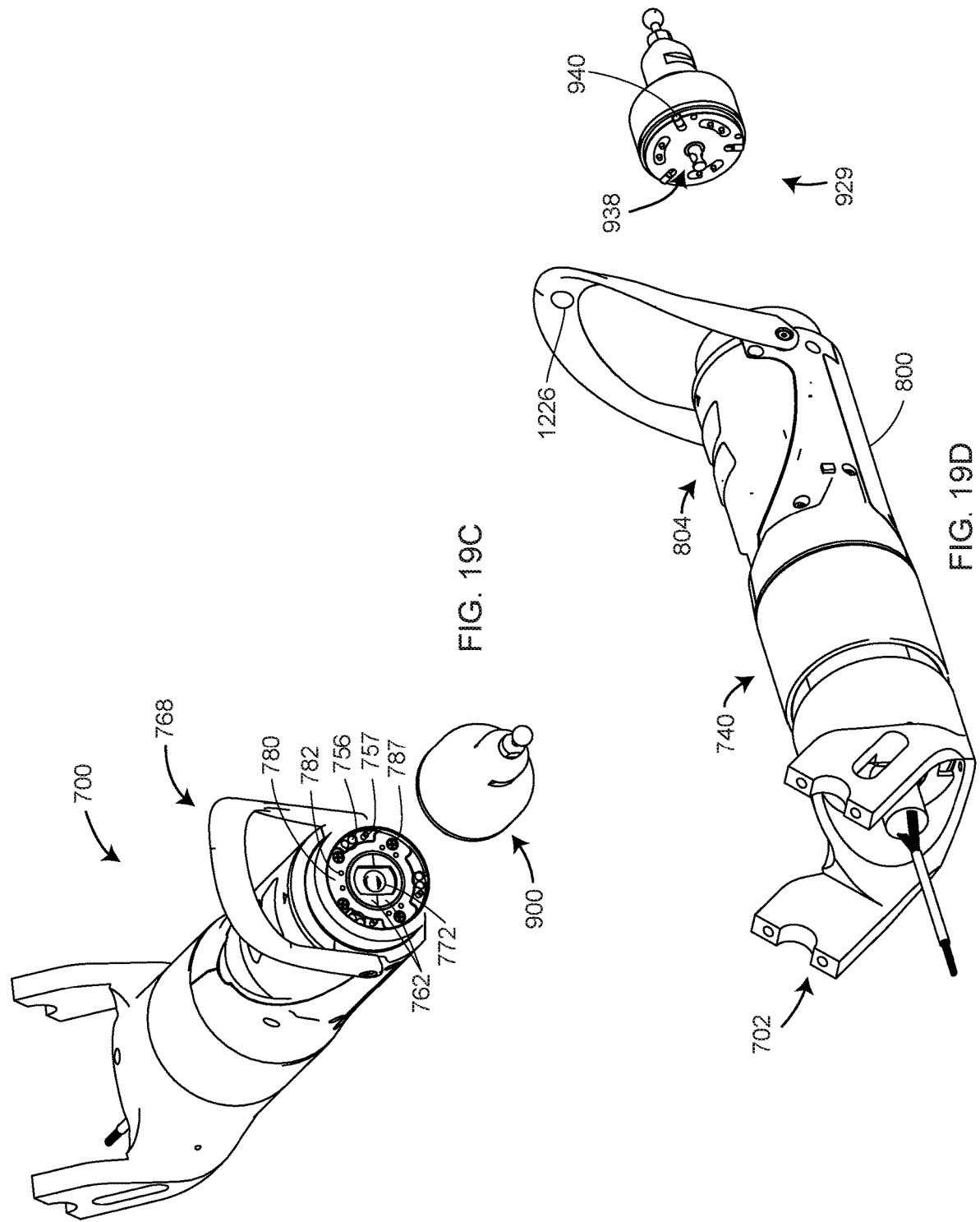

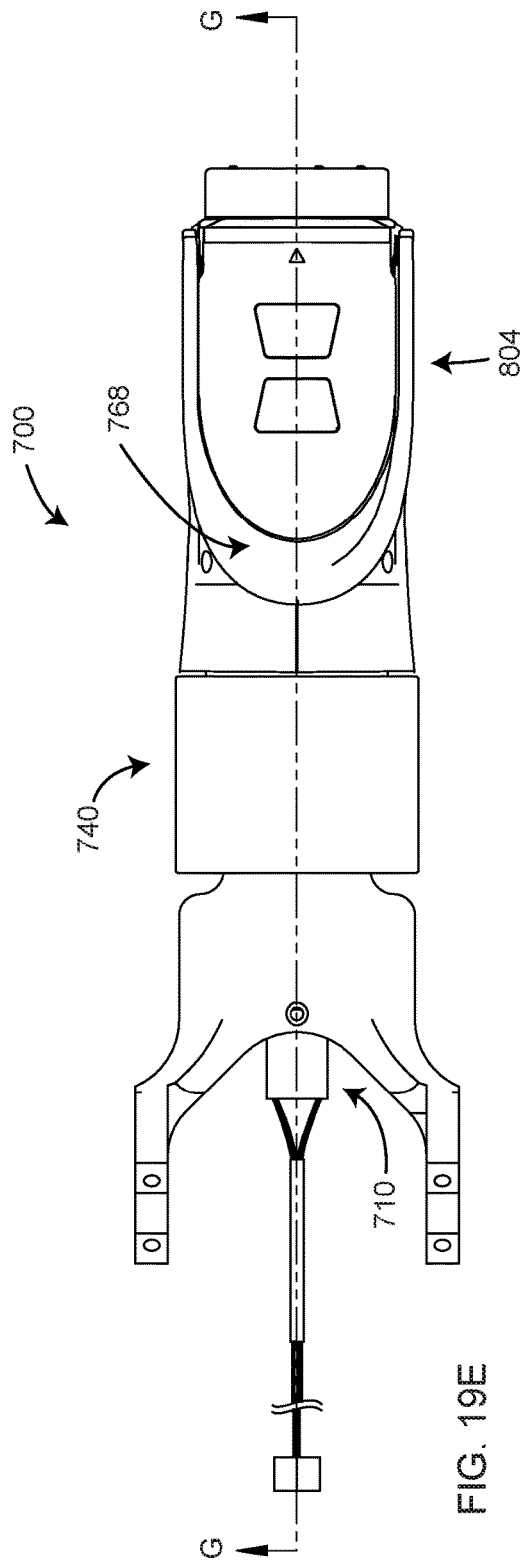
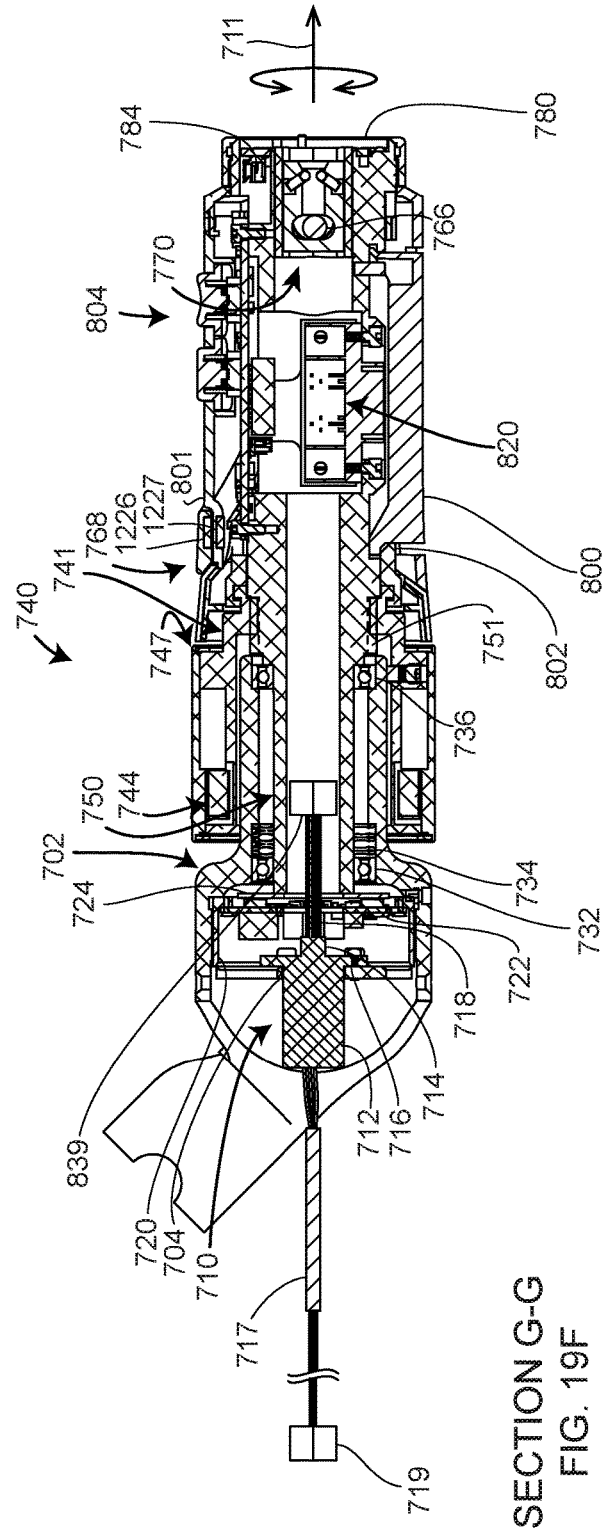
FIG. 19E
SECTION G-G
FIG. 19F

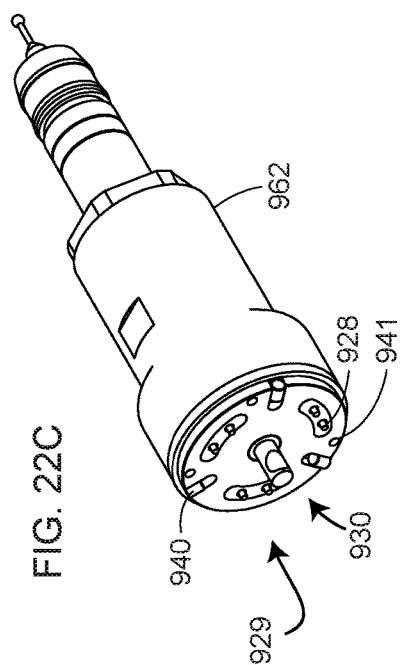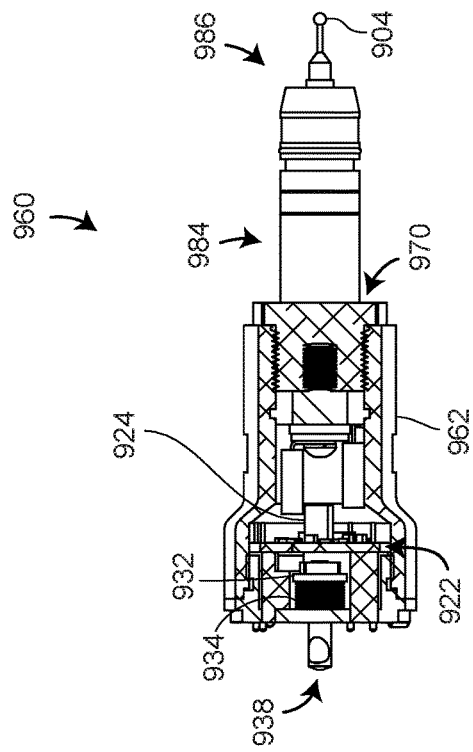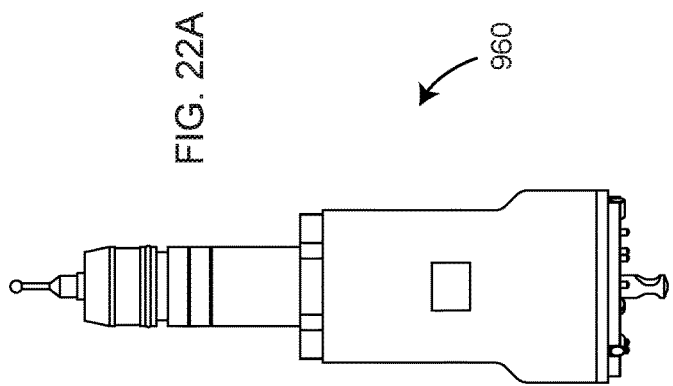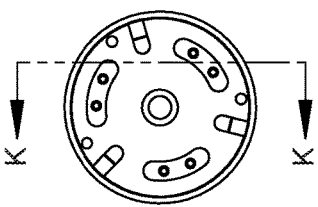

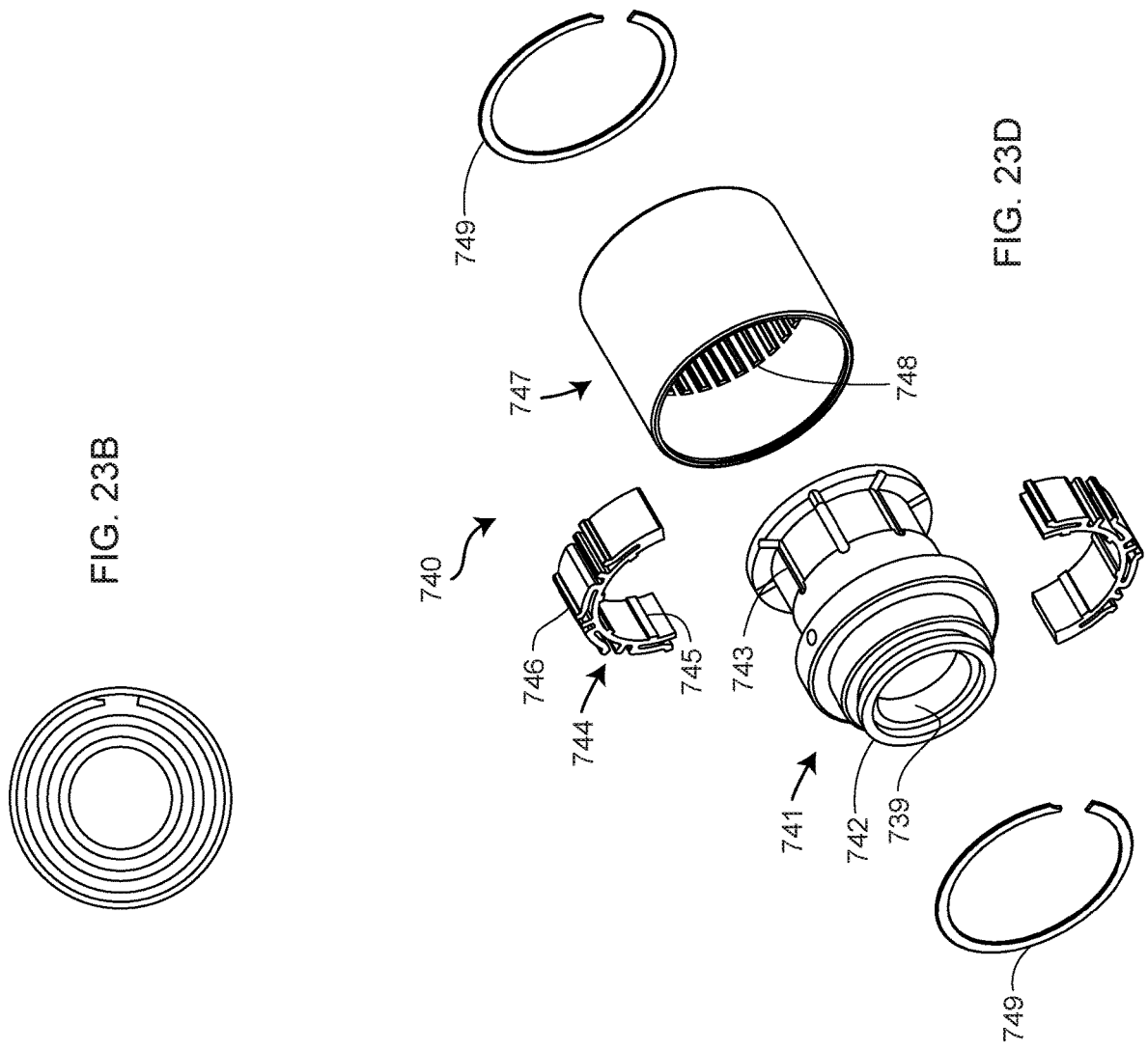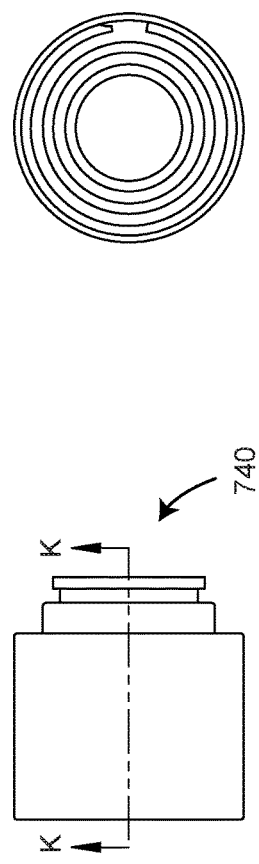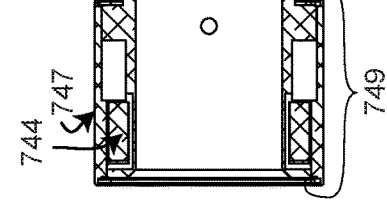

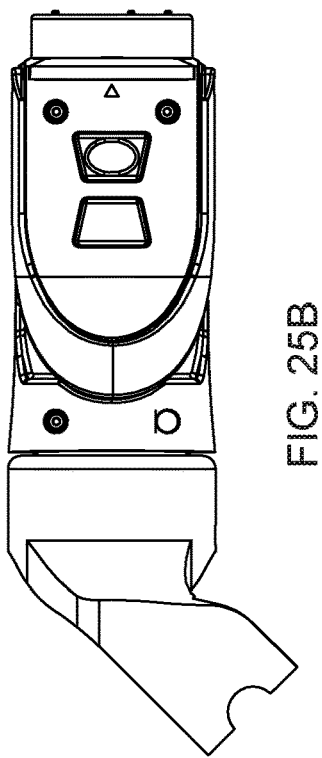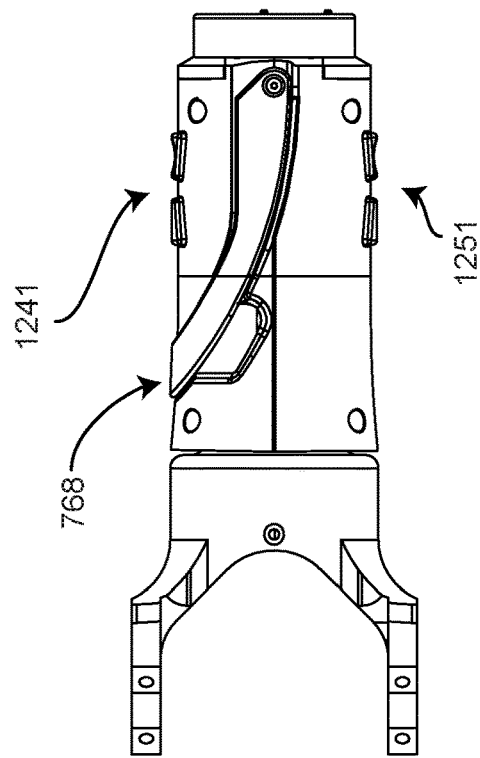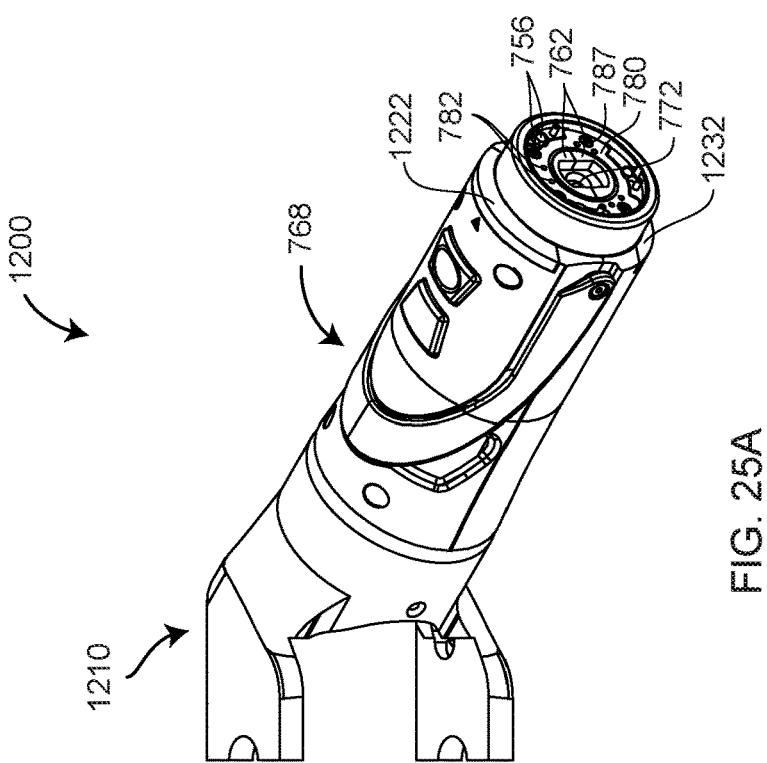

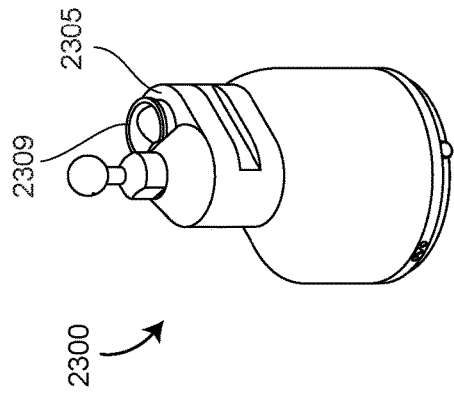
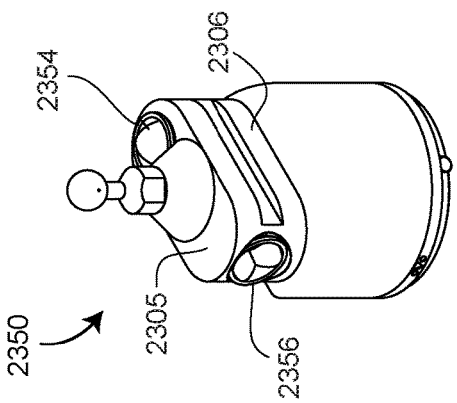
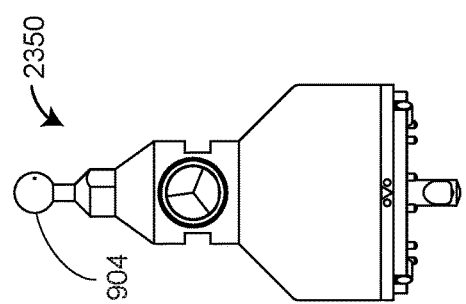
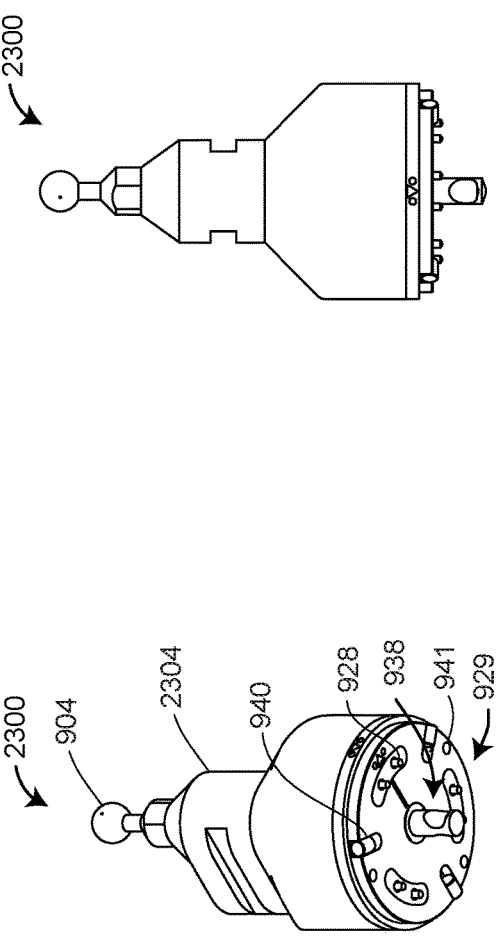
FIG. 26C
FIG. 27C
FIG. 26B
FIG. 27B
FIG. 26A
FIG. 27A

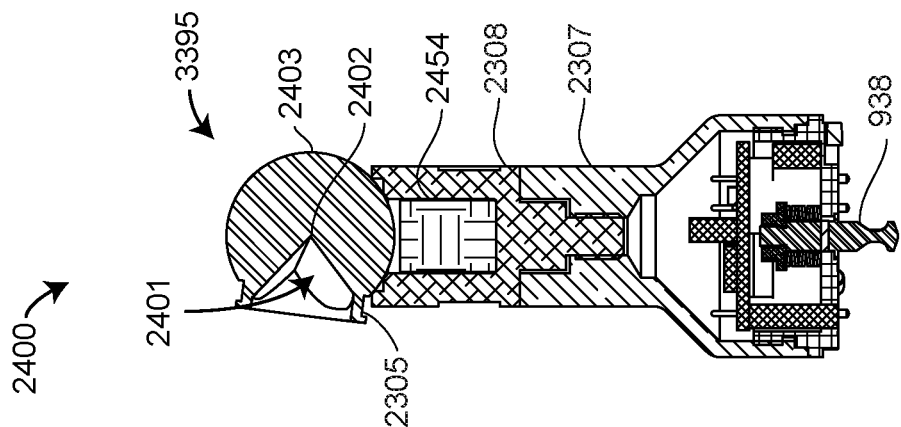
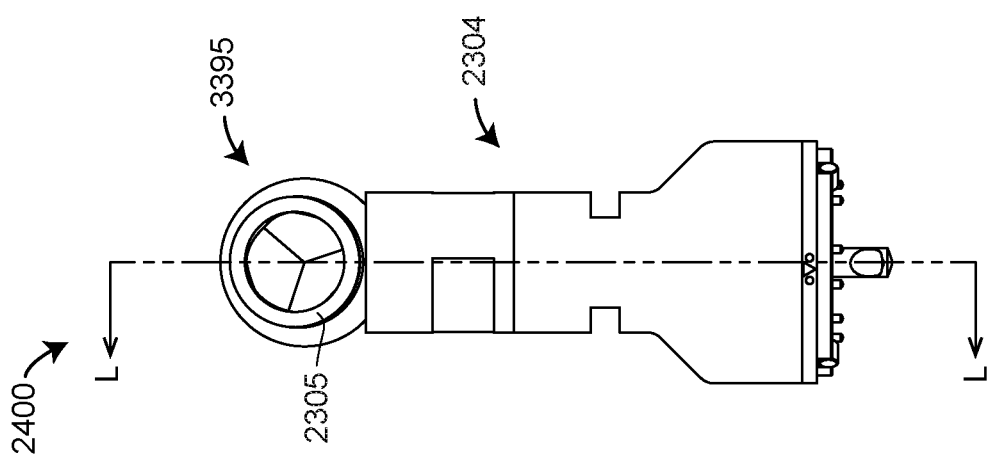

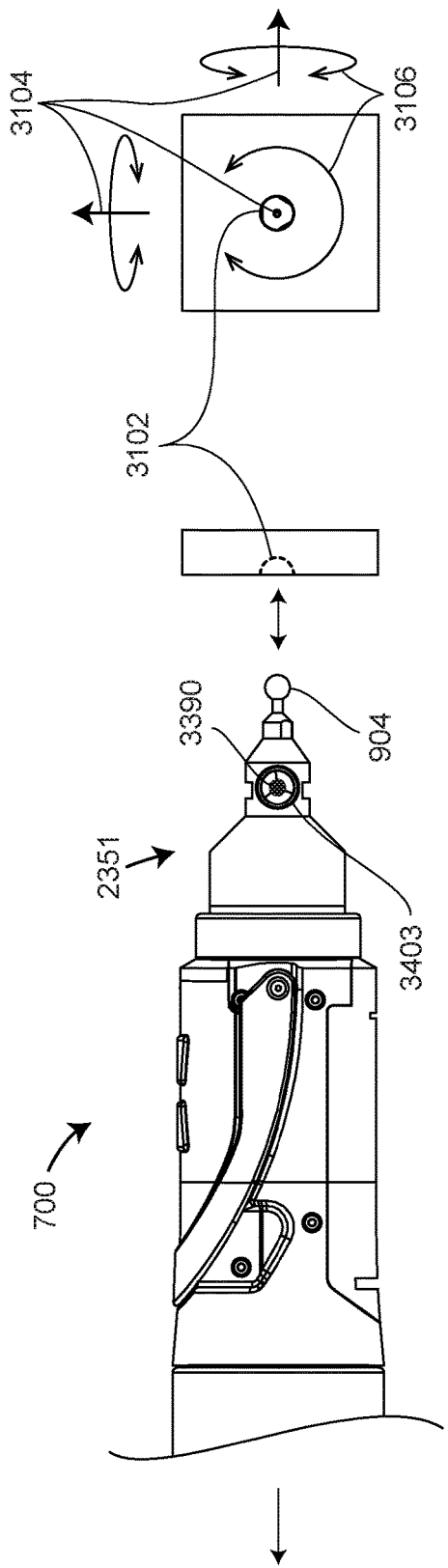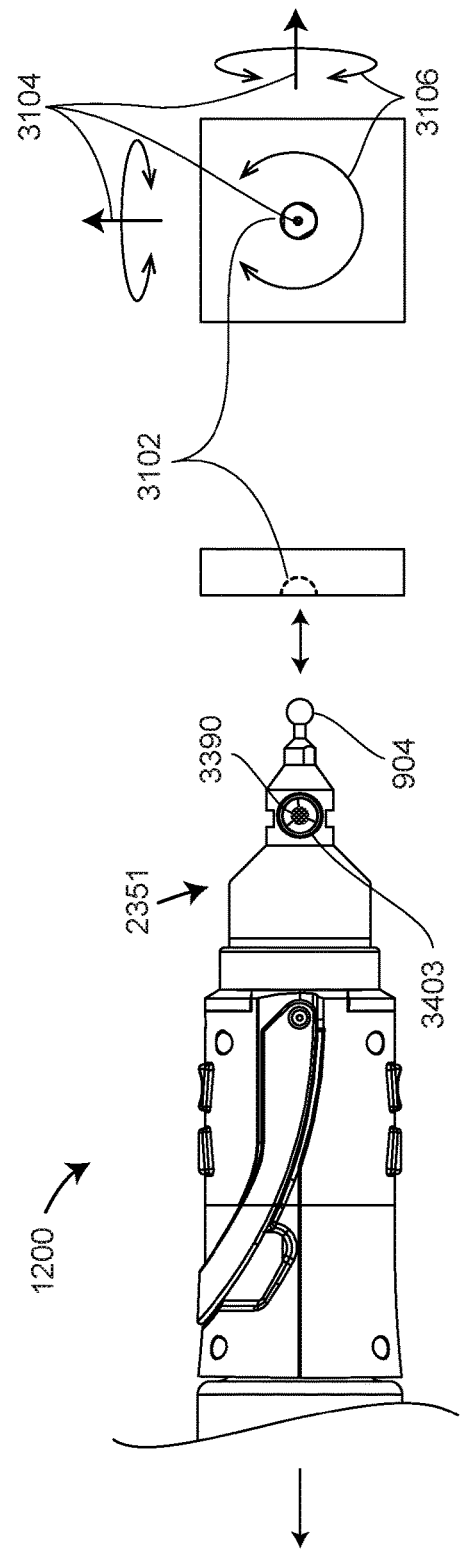

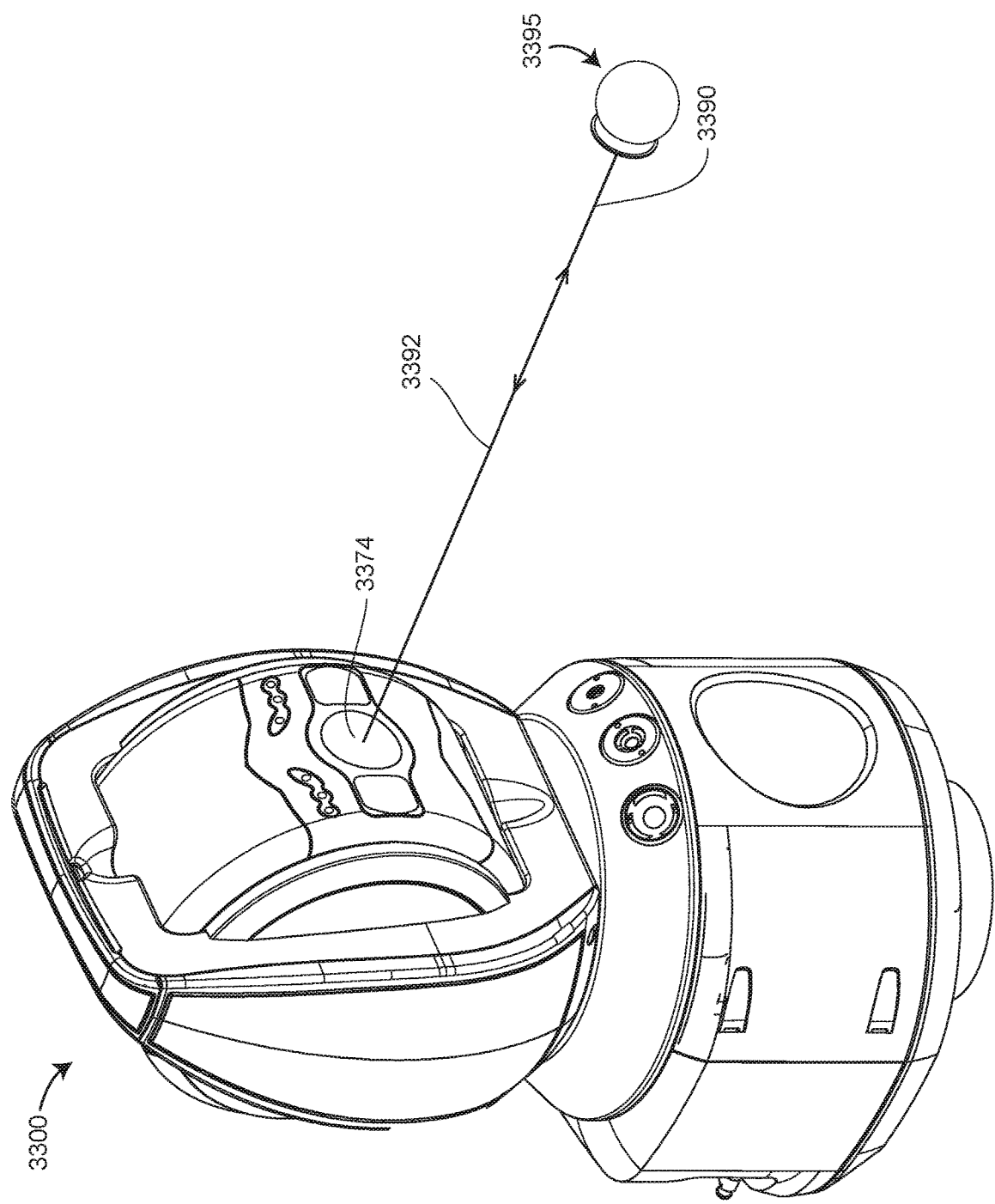

ARTICULATED ARM COORDINATE MEASURING MACHINE

CROSS-REFERENCE TO RELATED APPLICATIONS

The present application is a nonprovisional application claiming the benefit of U.S. Provisional Application Ser. No. 62/451,307 filed on Jan. 27, 2017 and U.S. Provisional Application Ser. No. 62/512,326 filed on May 30, 2017, the contents of both of which are incorporated by reference herein in their entirety.

BACKGROUND

The present disclosure relates to a coordinate measuring system, and in particular to coordinate measuring system including or cooperating with a portable articulated arm coordinate measuring machine (AACMM).

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3D) form on a computer screen. In other cases, the data are provided to the user in numeric form, for example when measuring the diameter of a hole, the text "Diameter=1.0034" is displayed on a computer screen.

Today, probes and accessories of AACMM tend to drift when replaced with other probes or accessories. They are subject to shocks when mounted on stands or tables. They tend to lose accuracy when moved from place to place. They may be difficult to use with other 3D measuring devices such as laser trackers.

Accordingly, while existing AACMM's are suitable for their intended purposes there remains a need for improvements when AACMM probes or accessories are changed. Further improvements are needed when AACMMs are mounted on structures, moved from place to place, or used cooperatively with other 3D measuring devices.

BRIEF DESCRIPTION

According to one aspect of the invention, a portable articulated arm coordinate measuring machine (AACMM) for measuring the coordinates of an object in space comprises: a base; a manually positionable arm portion having an opposed first end and second end, the arm portion being rotationally coupled to the base, the arm portion including a plurality of connected arm segments, each arm segment including at least one position transducer for producing a position signal; a first measurement probe coupled to the first end, the first measurement probe having a first extension element; an electronic circuit that receives the position signal from the at least one position transducer and provides data corresponding to a position of the first measurement probe; and a probe end disposed between the first measurement probe and the first end, the probe end having a clamping mechanism operable to clamp the first extension element onto the probe end at a fixed position.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6B is an isometric view showing relative positions of some elements of the AACMM when connected arm segments are held in a vertical orientation according to an embodiment of the present invention;

FIGS. 7A, 7B are isometric and exploded views, respectively, of a first-axis assembly and a mounting device according to an embodiment of the present invention;

FIGS. 7E, 7F, 7G, 7H are isometric, exploded, front, and cross-sectional views, respectively, of a shock-absorber bumper according to an embodiment of the present invention;

FIGS. 8A, 8B, 8C, 8D are front, side, cross-sectional, and exploded views, respectively, of a first-axis cartridge according to an embodiment of the present invention;

FIGS. 14A, 14B, 14C, 14D, 14E are isometric, exploded, front, side, and section views, respectively, of a third-axis assembly, a fourth-axis assembly, and a first segment according to an embodiment of the present invention;

FIGS. 15A, 15B, 15C, 15D are isometric, exploded, front, and section views of a third/fifth axis cartridge according to an embodiment of the present invention;

FIGS. 16A, 16B, 16C, 16D are isometric, exploded, front, and section views of a fourth/sixth axis cartridge according to an embodiment of the present invention;

FIGS. 16E, 16F, 16G, 16H are isometric, partially exposed views of elements of third-, fourth-, and fifth-axis assemblies according to an embodiment;

FIGS. 17A, 17B, 17C, 17D, 17E are isometric, exploded, front, side, and section views, respectively, of a fifth-axis assembly, a sixth-axis assembly, and a second segment according to an embodiment of the present invention;

FIGS. 19A, 19B are side views of a seventh-axis assembly having a tactile probe assembly latched in placed and detached, respectively, according to an embodiment of the present invention;

FIGS. 19C, 19D are a first isometric view and a second isometric view, respectively, of a seventh-axis assembly and a detached tactile probe assembly according to an embodiment of the present invention;

FIGS. 19E, 19F are top and section views of a seventh-axis assembly according to an embodiment of the present invention;

FIGS. 22A, 22B, 22C, 22D, 22E are front, bottom, isometric, section, and exploded views, respectively, of a touch-trigger probe assembly according to an embodiment of the present invention;

FIGS. 23A, 23B, 23C, 23D are top, right, section, and exploded views, respectively, of a nut assembly according to an embodiment of the present invention;

FIGS. 25A, 25B, 25C, 25D are isometric, top, side, and exploded views, respectively, of an end-effector assembly according to an embodiment of the present invention;

FIGS. 26A, 26B, 26C are first isometric, front, and second isometric views, respectively, of a reflector probe according to an embodiment of the present invention;

FIGS. 27A, 27B, 27C are first isometric, front, and second isometric views, respectively, of a double-reflector probe according to an embodiment of the present invention;

FIGS. 29A, 29B are front and section views, respectively, of an SMR probe according to an embodiment of the present invention;

FIGS. 31A, 31B are seventh-axis assembly and kinematic seat, respectively, according to an embodiment of the present invention;

FIGS. 31C, 31D are end-effector assembly and kinematic seat, respectively, according to an embodiment of the present invention;

FIG. 33 is an isometric view of a laser tracker and an SMR according to an embodiment of the present invention;

The detailed description explains embodiments of the invention, together with advantages and features, by way of example with reference to the drawings.

DETAILED DESCRIPTION

A probe assembly such as a tactile probe assembly or laser line probe may require calibration or compensation of the probe assembly when probe assemblies added to or exchanged on an AACMM. Part of the reason such procedures are needed is a potential inconsistency in the mechanical attachment of the probe assemblies to the AACMM. Embodiments of the present invention include an AACMM having a first end that clamps to a first extension element of a first measurement probe, thereby improving clamping stability. Further embodiments of the present invention include a clutch mechanism that advantageously provides consistent forces to probe assemblies, thereby reducing required frequency of calibration or compensation.

Figure 1A:
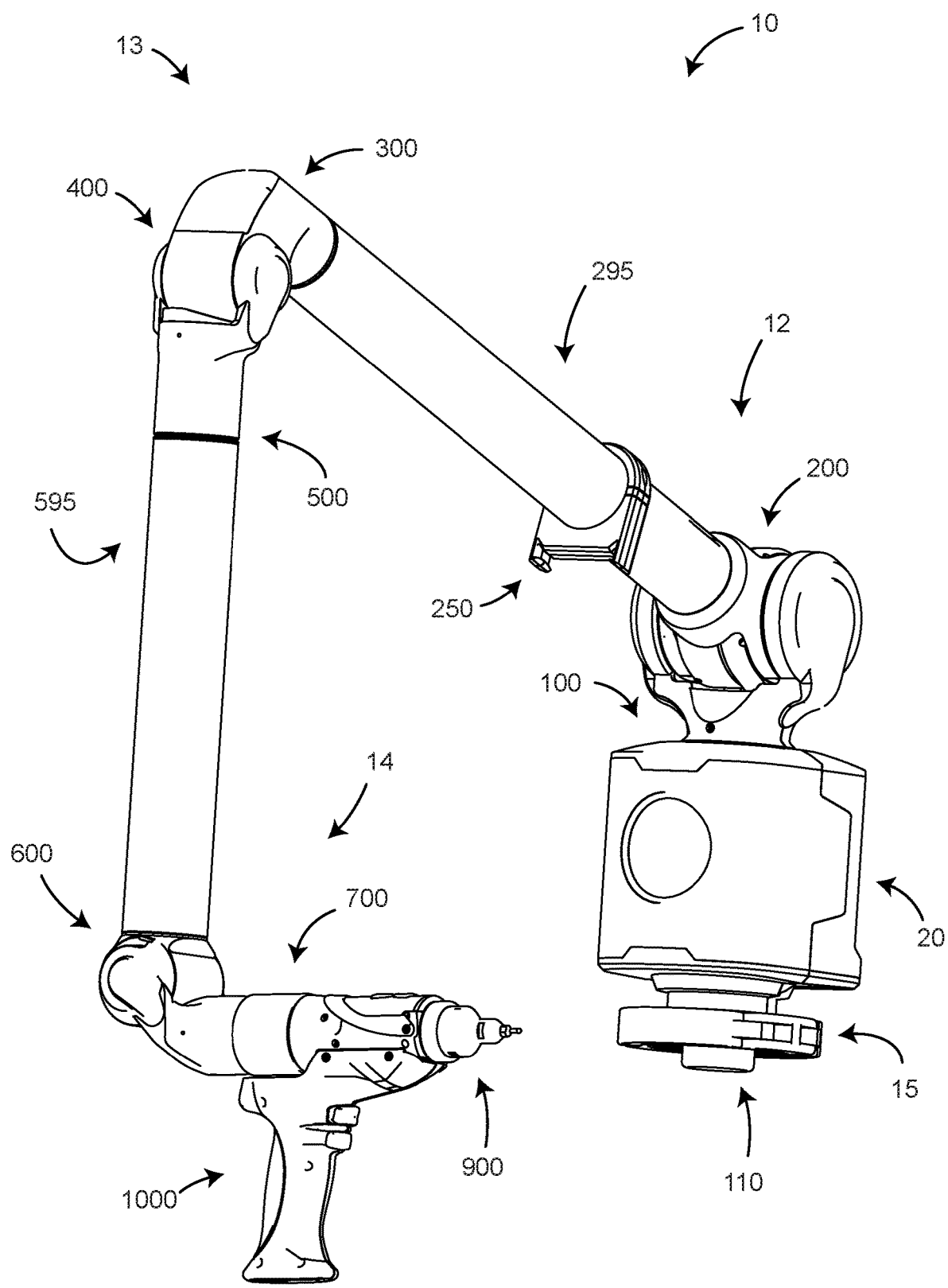
FIGS. 1A, 1B are two isometric views of a portable articulated AACMM according to an embodiment of the present invention.
Figure 1B:
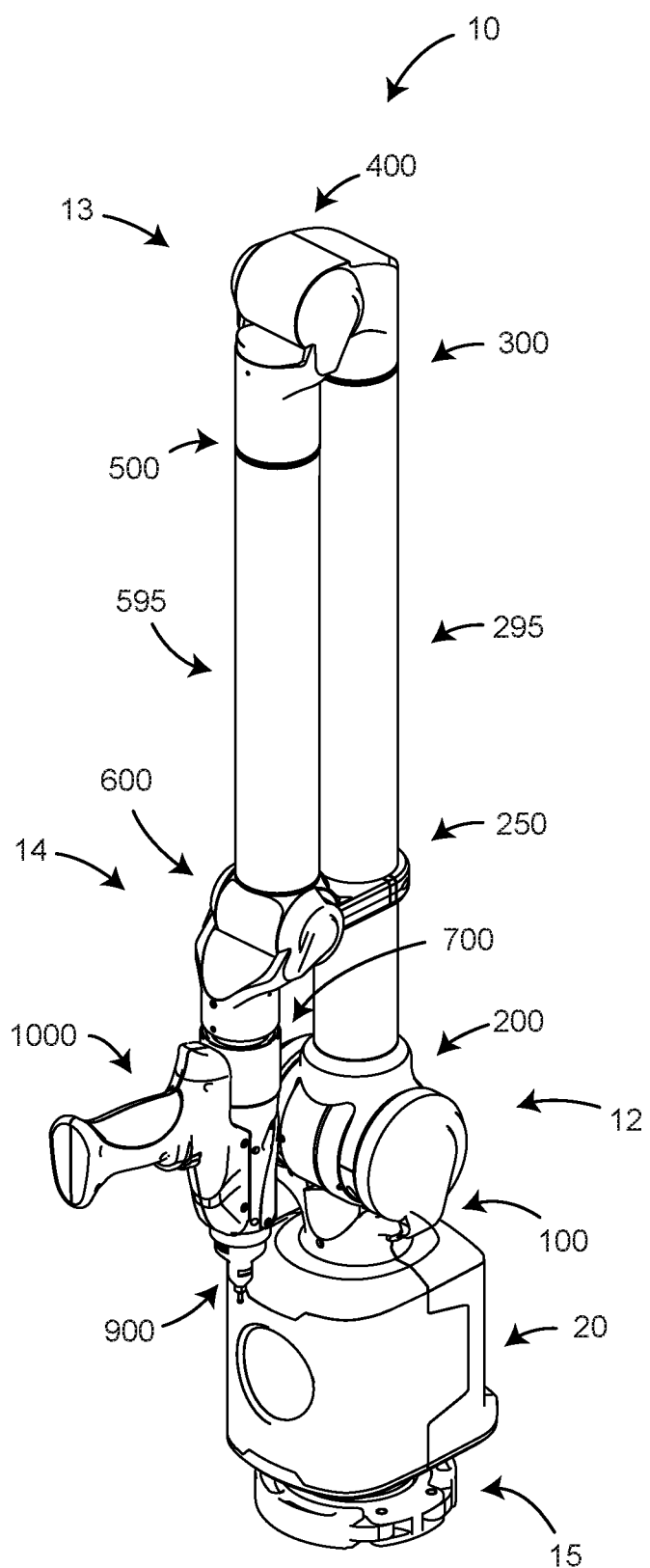
Figure 1C:
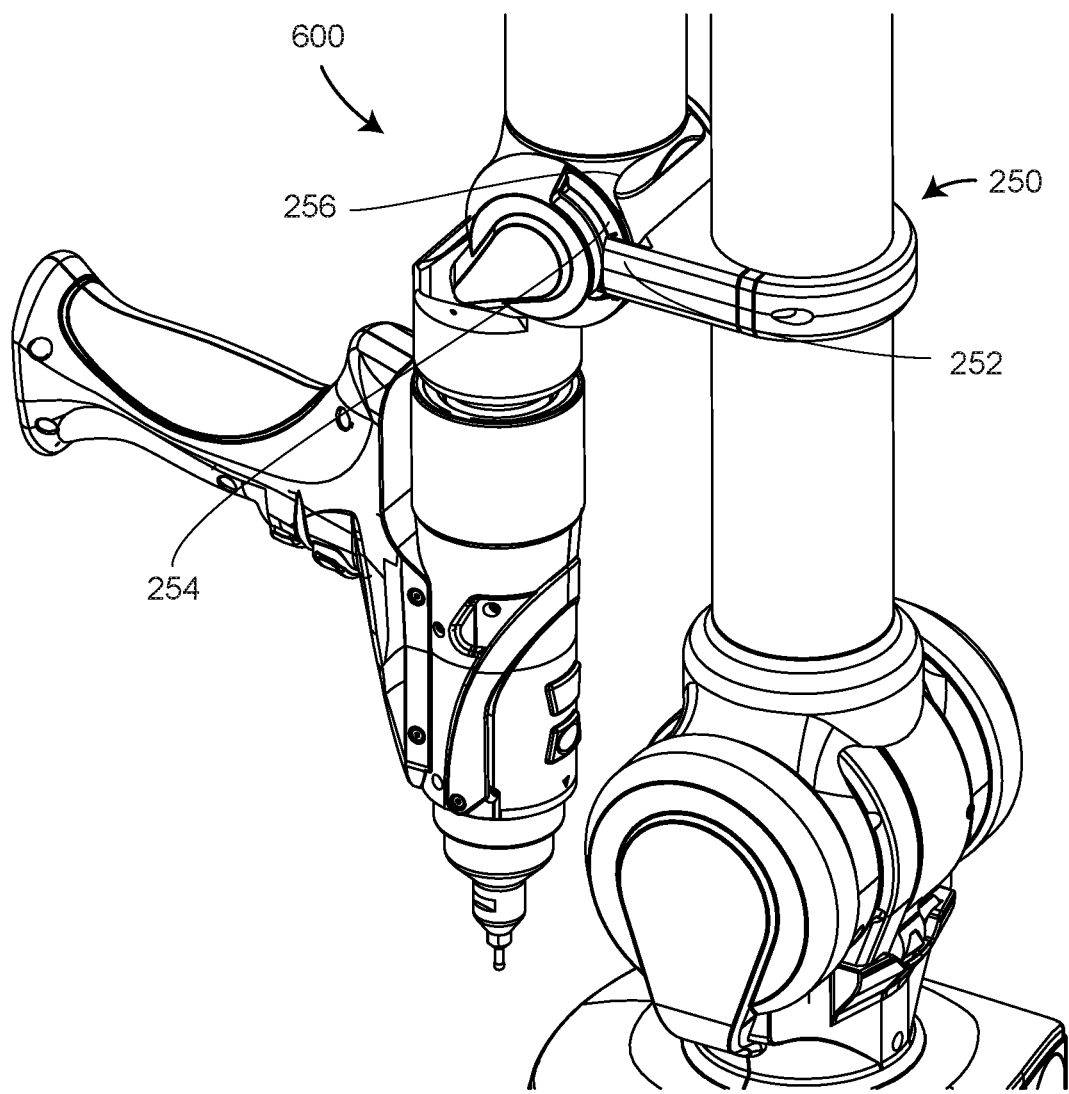
FIG. 1C is a partial isometric view of an AACMM according to an embodiment of the present invention.

FIGS. 1A, 1B, 1C illustrate, in isometric view, an AACMM 10 according to various embodiments of the present invention, the AACMM being one type of coordinate measuring machine. In an embodiment, a first segment 295 and a second segment 595 are connected to a base 20 on one end and a measurement device on the other end. In an embodiment, the measurement device is a tactile-probe assembly 900.

In an embodiment illustrated in FIGS. 1A, 1B, 1C, the AACMM 10 comprises includes seven rotational elements; hence the AACMM 10 is referred to as a seven-axis AACMM. In other embodiments discussed herein below, the AACMM 10 is a six-axis AACMM. The seven-axis AACMM 10 of FIGS. 1A, 1B, 1C includes first-axis assembly 100, second-axis assembly 200, third-axis assembly 300, fourth-axis assembly 400, fifth-axis assembly 500, sixth-axis assembly 600, and seventh-axis assembly 700. In an embodiment, a tactile probe assembly 900 and a handle 1000 are attached to the seventh-axis assembly. Each of the axis assemblies may provide either a swivel rotation or a hinge rotation. In the embodiment illustrated in FIGS. 1A, 1B, 1C, the first-axis assembly 100 provides a swivel rotation about an axis aligned to a mounting direction of the base 20. In an embodiment, the second axis assembly 200 provides a hinge rotation about an axis perpendicular to the first segment 295. The combination of the first-axis assembly 100 and the second-axis assembly 200 is sometimes colloquially referred to as a shoulder 12 since in some embodiments the possible motions of the shoulder 12 of the AACMM 10 resemble the motions possible with a human shoulder.

In the embodiment illustrated in FIGS. 1A, 1B, 1C, the third-axis assembly 300 provides a swivel rotation about an axis aligned to the first segment 295. The fourth-axis assembly 400 provides a hinge rotation about an axis perpendicular to second segment 595. The fifth-axis assembly 500 provides a swivel rotation about an axis aligned to the second segment 595. The combination of the third-axis assembly 300, the fourth-axis assembly 400, and the fifth-axis assembly 500 is sometimes colloquially referred to as an elbow 13 since in some embodiments the possible motions of the elbow 13 of the AACMM 10 resemble the motions possible with a human elbow.

In the embodiment illustrated in FIGS. 1A, 1B, 1C, the sixth-axis assembly provides a hinge rotation about an axis perpendicular to the second segment 595. In an embodiment, the AACMM 10 further comprises a seventh-axis assembly, which provides a swivel rotation of probe assemblies (e.g. probe 900) attached to the seventh axis. The sixth-axis assembly 600, or the combination of the sixth-axis assembly 600 and the seventh-axis assembly 700, is sometimes colloquially referred to as a wrist 14 of the AACMM 10. The wrist 14 is so named because in some embodiments it provides motions similar to those possible with a human wrist. The combination of the shoulder 12, first segment 295, elbow 13, second segment 595, and wrist 14 resembles in many ways a human arm from human shoulder to human wrist. In some embodiments, the number of axis assemblies associated with each of the shoulder, elbow, and wrist differ from the number shown in FIGS. 1A, 1B, 1C. It is possible, for example, to move the third-axis assembly 300 from the elbow 13 to the shoulder 12, thereby increasing the number of axis assemblies in the shoulder to three and reducing the number of axis assemblies in the wrist to two. Other axis combinations are also possible.

In an embodiment, a parking clamp 250 on the first segment 295 includes parking-clamp fingers 252 (FIG. 1C) that tie together the first segment 295 to the second segment 595 while holding both segments in a vertical orientation. In an embodiment, the parking-clamp fingers 252 grip a parking clamp recess 254 while a sixth-axis yoke bumper 256 cushions the parking clamp 250 against the sixth-axis assembly 600, thereby reducing or preventing potential mechanical shock as the first segment 295 and the second segment 595 are brought together. In an embodiment, the parking clamp 250 holds the first segment 295 and the second segment 595 fixed vertical orientation, thereby reducing or minimizing the space taken by the arm segments 295, 595 when the AACMM 10 is not in use performing a measurement. In an embodiment, an operator may release the parking clamp fingers 252, thereby permitting free movement of the arm segments 295, 595 as illustrated in FIG. 1A. In another embodiment, the parking clamp is attached to the second segment 595 rather than the first segment 295. In another embodiment, the parking clamp fingers attach to a different element than the parking-clamp recess of FIG. 1C. In another embodiment, clamping is provided by a different mechanism than the parking-clamp fingers 252.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; a parking clamp affixed to one of the plurality of connected arm segments, the parking clamp having a plurality of fingers disposed lock in place two of the plurality of the connected arm segments when the plurality of fingers are pressed into a parking clamp recess of the AACMM, the parking clamp further disposed to release the two of the plurality of the connected arm segments when the fingers of the parking clamp are pulled away from the parking clamp recess; an electronic circuit that receives the position signal from the at least one position transducer and provides data corresponding to a position of the measurement device; and a processor operable to determine three-dimensional (3D) coordinates of a point measured by the measurement device based at least in part on the provided data corresponding to the position of the measurement device.

In an embodiment, the AACMM further includes a bumper, the bumper coupled to the AACMM and arranged to make contact with the parking clamp when the plurality of fingers are pressed into place in the parking clamp recess.

Figure 2:
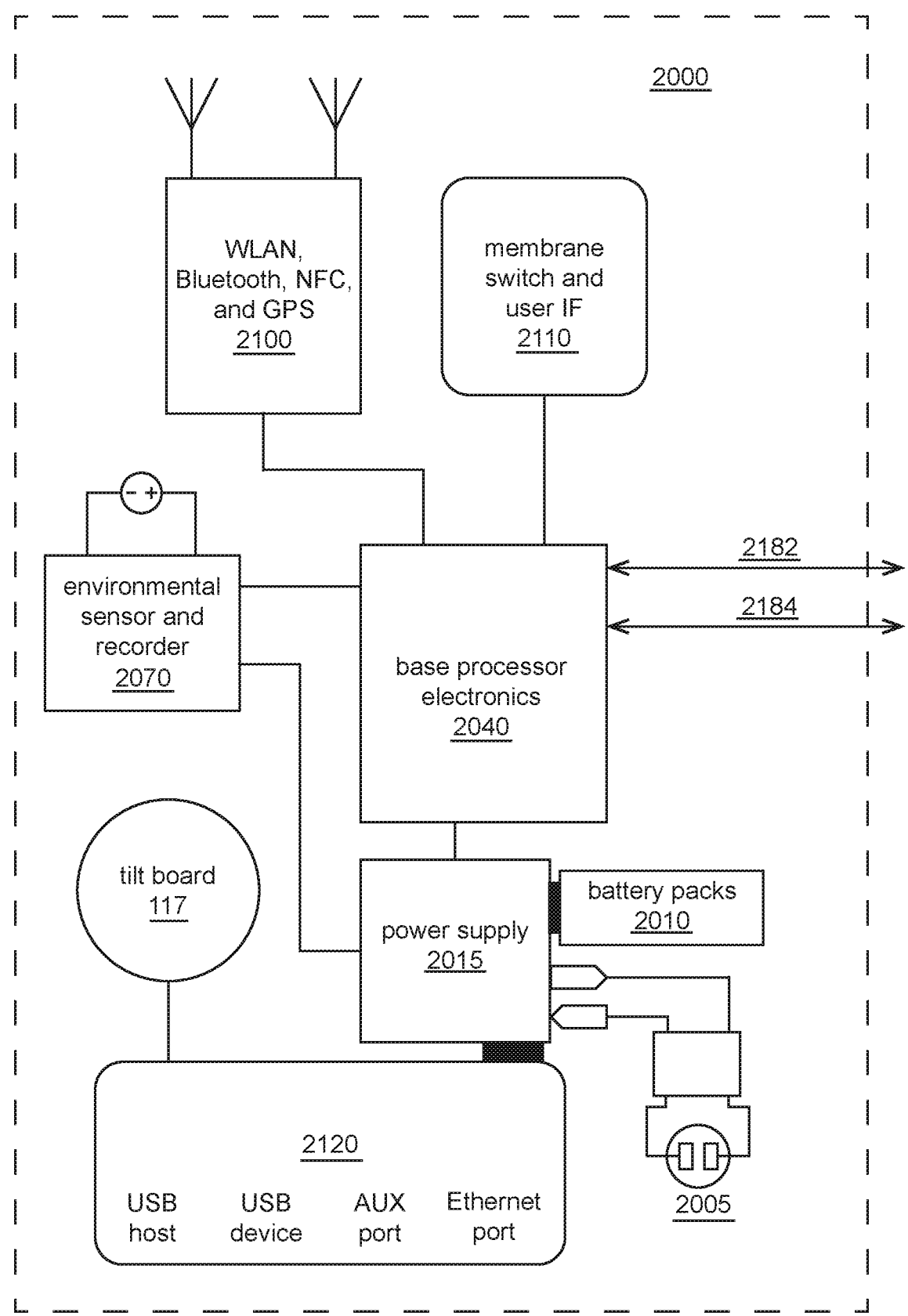
FIG. 2 is a block diagram of base electronics of an AACMM of FIG. 1 according to an embodiment of the present invention.
Figure 2A:
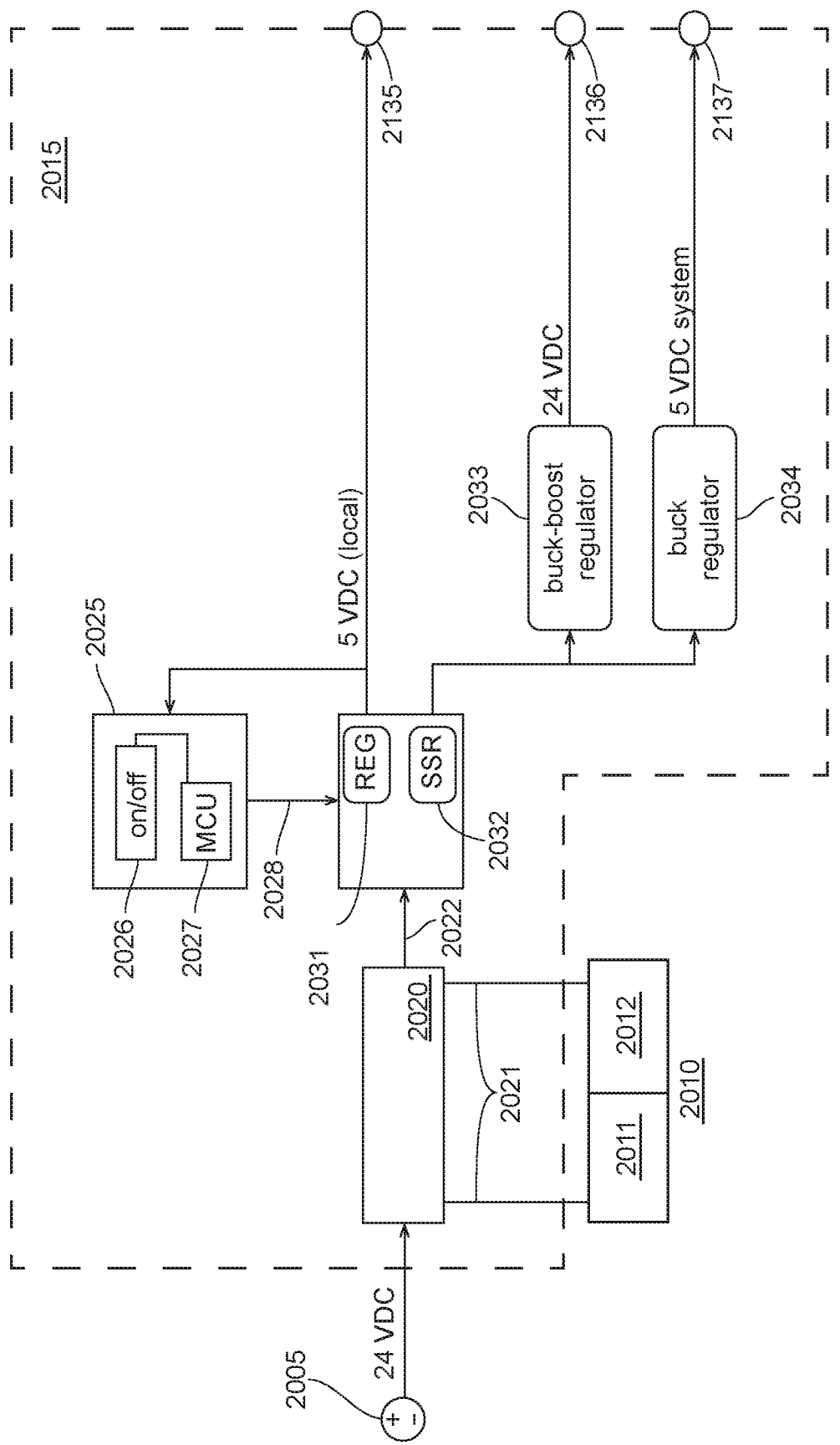
FIGS. 2A, 2B, 2C are block diagrams providing further detail of elements within the block diagram of FIG. 2 according to an embodiment of the present invention.

FIG. 2 is a block diagram of base electronics 2000. FIG. 2 includes modular power supply 2005, battery packs 2010, and a power supply 2015. These elements are shown in greater detail in a block diagram of FIG. 2A. In an embodiment, the modular power supply 2005 is located external to the power supply 2015 and is plugged into AC power mains to provide a dual battery smart charger 2020 with a voltage of 24 VDC. In an embodiment, the dual battery smart charger 2020 provides a portion of the voltage from the modular power supply 2005 to charge one or both of smart battery packs. In an embodiment, a System Management Bus (SMBUS) 2021, which is a single-ended simple two-wire bus for the purpose of lightweight communication, provides communication among the dual battery smart charger 2020 and smart battery packs 2010. In an embodiment, the smart battery packs 2010 include a first battery pack 2011 and a second battery pack 2012. In an embodiment, one battery pack provides electrical power to the AACMM 10 while the other battery pack is being charged. In an embodiment, either or both battery packs 2011, 2012 may be removed while power from the modular power supply 2005 is being applied. In other words, the battery packs may be "hot swapped."

Figure 6A:
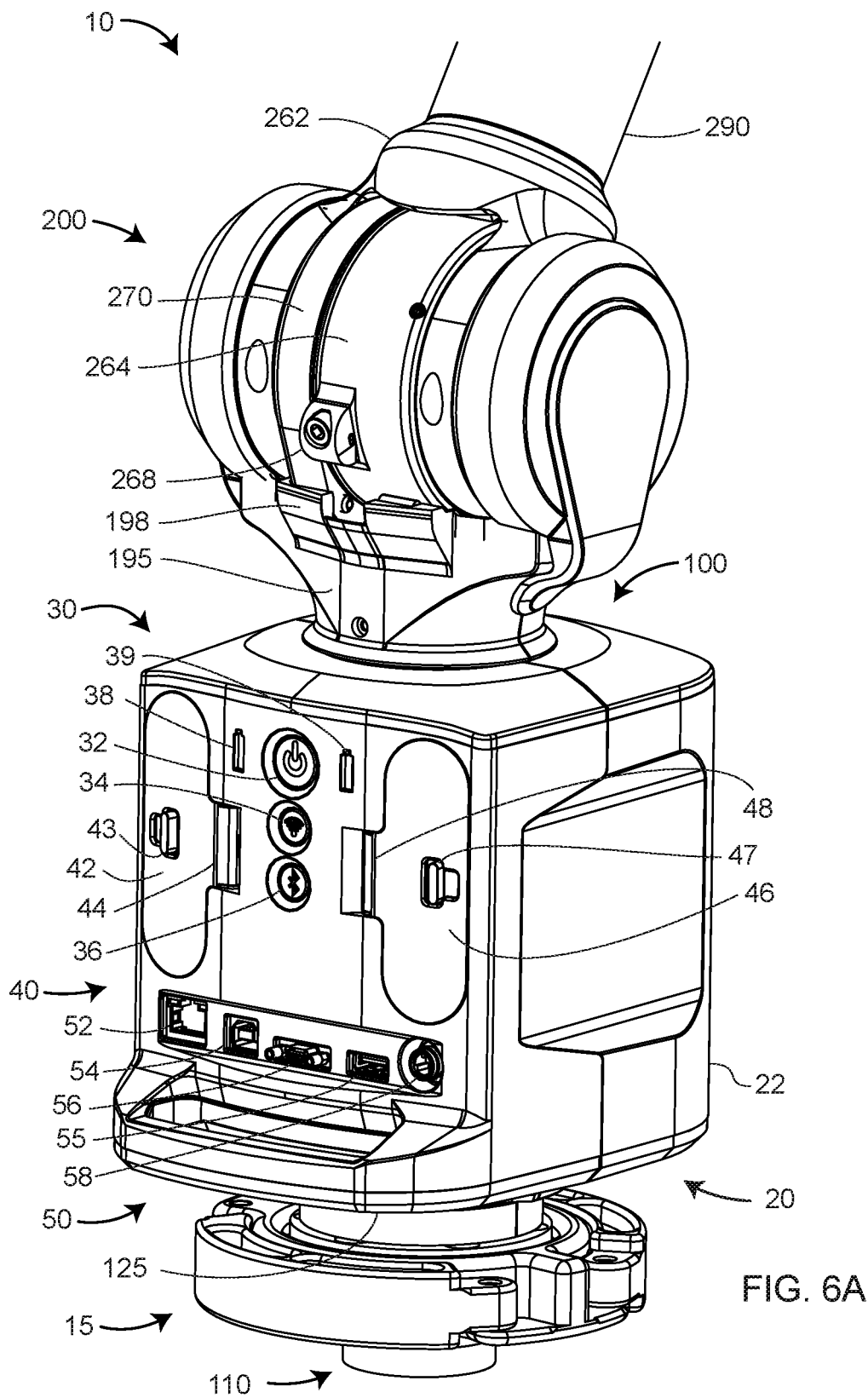
FIG. 6A is an isometric view describing some elements in a lower portion of the AACMM according to an embodiment of the present invention.

In an embodiment, each battery pack 2011, 2012 includes a 14.4 VDC lithium-ion battery. In an embodiment, the battery packs 2011, 2012 are disposed in the base 20 behind a first battery door 42 and a second battery door 46, respectively, as shown in FIG. 6A. In an embodiment, the first battery door 42 and the second battery door 46 cooperate with a first battery-door hinge 44 and a second battery-door hinge 48, respectively, as well as a first battery-door latch 43 and a second battery-door latch 47, respectively. In an embodiment, a first-battery indicator light 38 and a second-battery indicator light 39 indicate an extent to which the first battery pack 2011 and the second battery pack 2012, respectively, are charged. In an embodiment, the external 24 VDC power supply attaches with a locking connector to a power supply port 58 shown in FIG. 6A.

Part of the electrical power passing through the line 2022 arrives at the regulator 2031, which provides a 5 VDC local voltage through a point 2135 to the environmental sensor and recorder 2070 (FIG. 2C) and to a user interface (IF) 2025, which includes an electrical on/off switch 2026 and a microcontroller (MCU) 2027. The electrical on/off switch 2026 is activated in response to pressing of a mechanical on-off button 32 shown in FIG. 6A. When the on/off switch 2026 is in the on state, the MCU 2027 produces a signal 2028 that causes a solid-state relay (SSR) 2032 to close, passing the voltage on the line 2022 to a buck-boost regular 2033 and a buck regulator 2034. The buck regulator 2034 provides a 5 VDC system voltage, which from a point 2137 is stepped down to secondary voltages 3.3 VDC, 1.8 VDC, 1.5 VDC, and 1.2 VDC for use by processors and memory. The buck-boost regulator 2033 provides a 24 VDC signal from a point 2136 to electronics in the arm segments, the arm end, and accessories attached to the arm end.

Figure 2B:
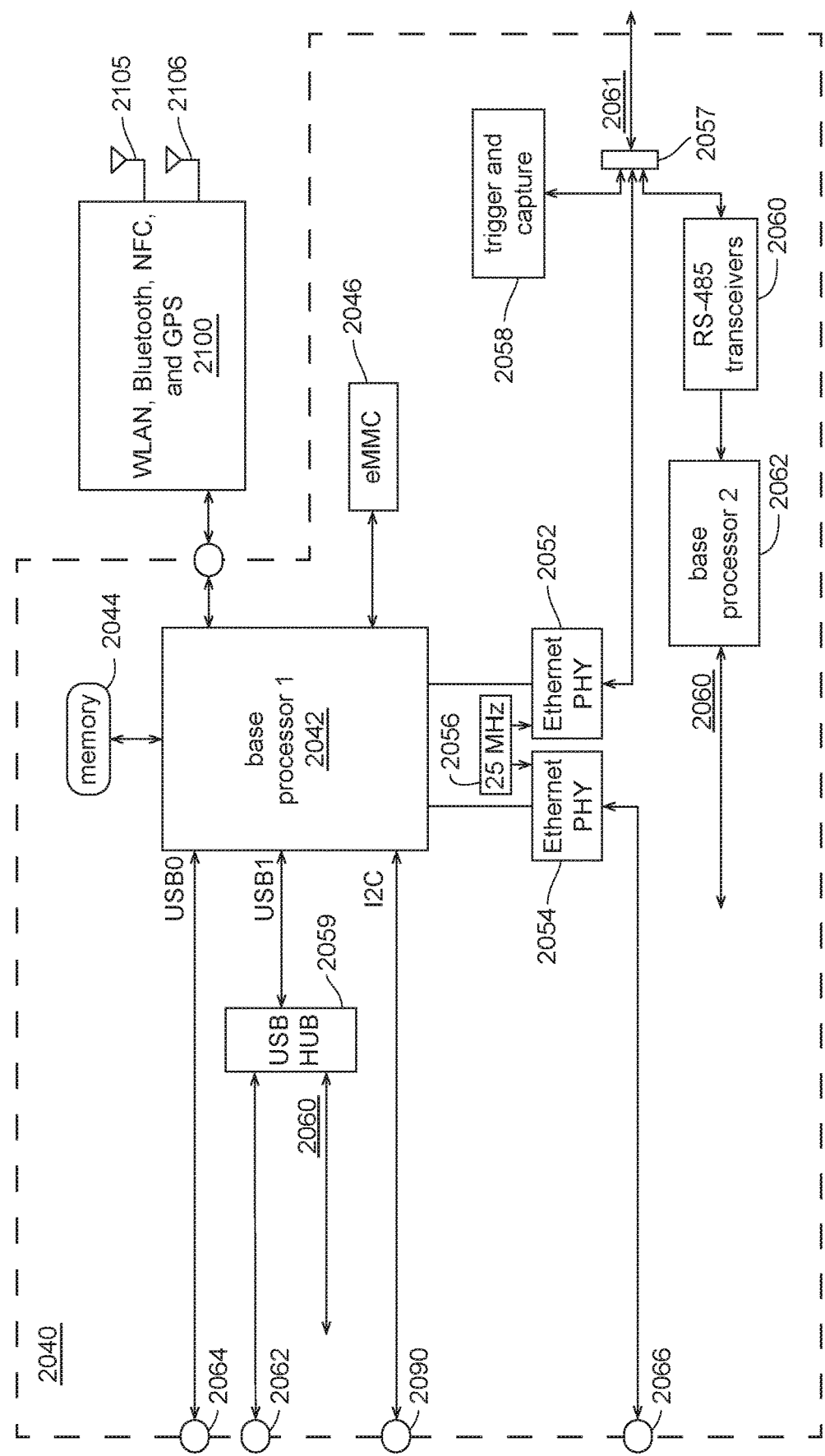
Figure 2C:
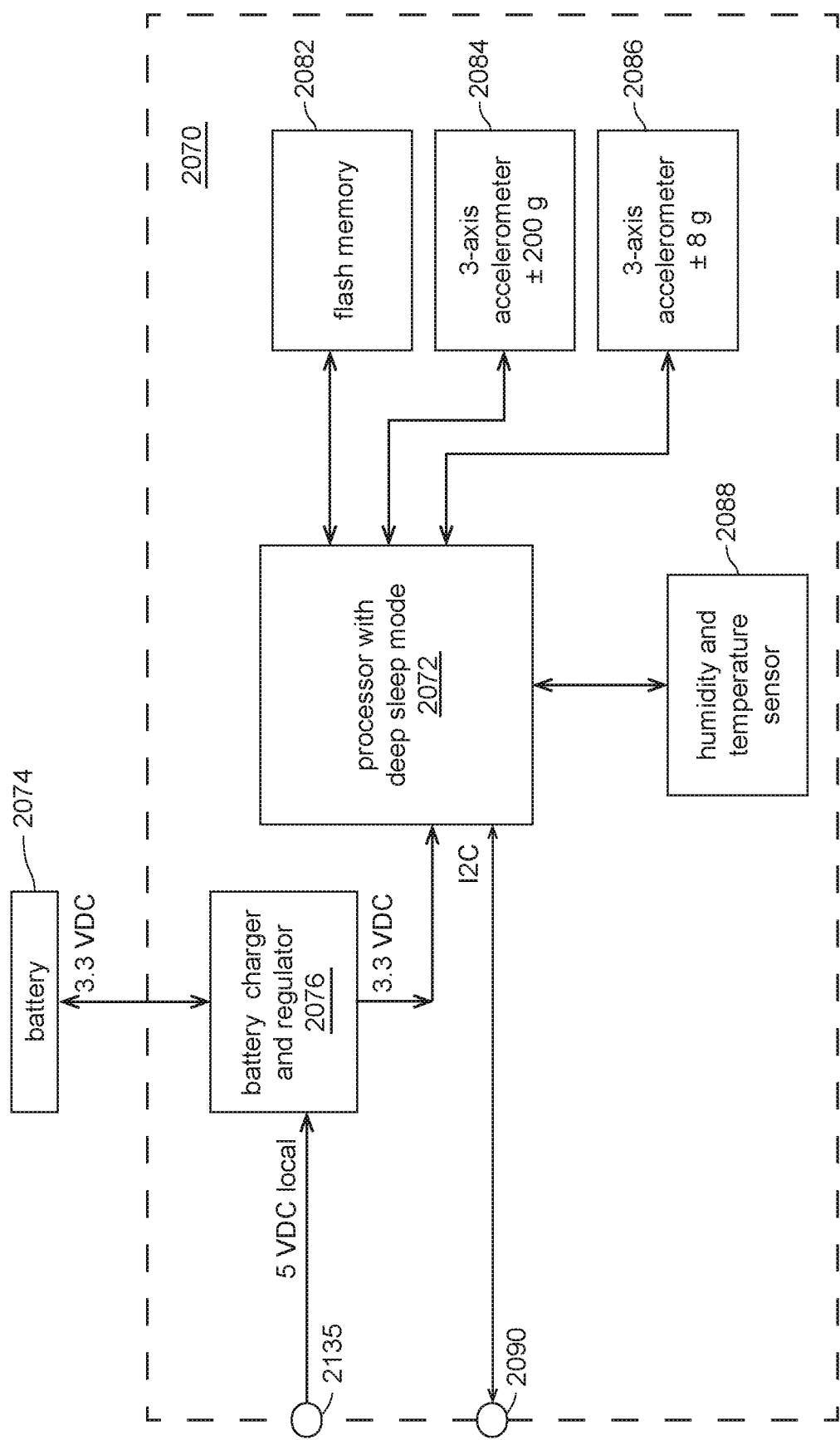

A block diagram of the environmental sensor and recorder 2070 is shown in FIG. 2C. If the voltage on the line 2022 is zero, then the 5 VDC local voltage is not present at the point 2135 in the environmental sensor and recorder 2070. In this case, a battery 2074 provides a 3.3 VDC signal to the components of the environmental sensor and recorder 2070. The 3.3 VDC signal passes through a battery charger and regulator 2076 to provide the 3.3 VDC signal to a processor with deep-sleep mode 2072. The processor 2072 receives readings from a humidity-and-temperature sensor 2088, a three-axis accelerometer 2084 that measures to ±200 g, and a three-axis accelerometer 2086 that measures to ±8 g. In operation, the processor stores readings every 15 minutes on a flash memory 2082. In an embodiment, the processor also saves on the flash memory 2082 large acceleration events observed by the three-axis accelerometers 2084, 2086. If the 5 VDC local voltage is present at the point 2135, then the battery charger 2076 uses the 5 VDC local voltage to charge the battery 2074.

FIG. 2B is a block diagram of the base processor electronics 2040, which includes a first base processor 2042 and a second base processor 2062. In an embodiment, the second base processor 2062 is a real-time processor. In an embodiment, the processor with deep sleep mode 2072 (FIG. 2C) communicates with the first base processor 2042 over an Inter-Integrated Circuit (I2C) bus through the point 2090. In an embodiment, whenever electrical power is being provided to the AACMM 10 by the modular power supply 2005 rather than a battery pack, the first base processor 2042 provides a 5 VDC, 2.5 Amp signal through a Universal Serial Bus (USB) external device port 2064 for use by any external device. This voltage is provided to a USB charging port 55 shown in FIG. 6A. A user may attach any compatible device to obtain power from the USB charging port 55. Currently USB standards are ratified by a USB Implementers Forum (USB-IF).

In an embodiment, the first base processor 2042 exchanges data through a point with external USB host devices, such as external computing devices, over a USB data transfer port 54 shown in FIG. 6A. In an embodiment, electrical signals pass to and from the USB host device through a point 2062 to a USB hub 2059 and on to the first base processor 2042.

In an embodiment, an Ethernet signal may be provided over an Ethernet port 52 as shown in FIG. 6A. Ethernet is a computer networking technology based on IEEE 802.3 standards. The Ethernet signal arrives at a point 2066 in FIG. 2B, travels to an Ethernet PHY 2054, which is clocked at 25 MHz, before arriving at the first base processor 2042. The Ethernet PHY 2054 provides analog signals physical access to a link layer.

A second Ethernet path enables bidirectional communication with electrical components internal to the AACMM 10. The second Ethernet path, which includes an Ethernet PHY 2052, passes through a connector 2057 to join a collection of busses 2061. In an embodiment, the Ethernet is gigabit Ethernet, which means that data may be transferred at a rate of one gigabit per second. In an embodiment, the second Ethernet path mainly transfers data obtained by AACMM accessory devices such as laser line probes (LLPs).

In an embodiment, electrical signals obtained from a tactile-probe assembly (e.g. probe 900) pass through an RS-485 transceiver 2060 before arriving at the second base processor 2062. Examples of a tactile-probe assembly are a hard-probe assembly 900 shown in FIGS. 1A, 1B and a touch-trigger probe assembly 960 in FIG. 22A. When directed by an operator, a hard-probe assembly 900 returns encoder readings to the base processor electronics 2040 at regular intervals set by a capture signal sent from the base processor electronics 2040. At each capture interval, angular readings are returned to the base processor electronics 2040, thereby enabling calculation of a position of a probe tip 904 (FIG. 22D) on the hard-probe assembly 900. In contrast, a touch-trigger probe assembly 960 (FIG. 22A) triggers a reading when a designated force is applied to the probe tip 904. Hence angular readings are taken in response to the trigger signal sent from the touch-trigger probe assembly 960. A signaling unit 2058 broadcasts capture signals and receives trigger signals. In an embodiment, the capture signals and trigger signals travel along a first bus 2182, shown in FIGS. 2, 4A, 4B. The second base processor 2062 communicates with the first base processor 2042 through a USB slave line 2060 that passes through the USB hub 2058 coupled to the first base processor 2042.

In an embodiment, the first base processor 2042 further connects to an embedded Multi-Media Controller (eMMC) 2046, which includes both flash memory and a flash memory controller integrated on the same silicon die. In an embodiment, the first base processor 2042 further connects to a memory 2044, which in an embodiment is a double data rate type-three synchronous dynamic random-access memory (DDR3 SDRAM).

In an embodiment, the base processor electronics 2040 further interfaces with a board 2100 having accessory communication and sensor devices. In an embodiment, the board 2100 includes a wireless local area network (WLAN) 2101. In an embodiment, the WLAN 2101 is an IEEE 802.11 Wi-Fi network enabled by pressing a Wi-Fi button 34 shown in FIG. 6A. Wi-Fi enables wireless communication between the AACMM 10 and an external device such as a stationary or mobile computing device.

In an embodiment, the board 2100 further includes a Bluetooth™ Low Energy (BLE) device 2102 capable of wirelessly exchanging data with external devices such as computing devices. BLE is a wireless personal area network technology designed and marketed by the Bluetooth Special Interest Group. The BLE device 2102 is enabled by pressing a Bluetooth™ button 36 shown in FIG. 6A. The on-off button 32, the Wi-Fi button 34, and the Bluetooth™ button 36 are all part of a larger membrane switch and user interface (IF) 2110 shown in FIG. 2.

In an embodiment, the board 2100 further includes near-field communication (NFC) hardware 2103. In an embodiment, the NFC hardware 2103 includes a dual-interface memory/tag device that communicates with an external NFC reader and a wired port that communicates with the first base processor 2042. In another embodiment, the NFC hardware includes a single-port NFC tag that communicates with an external NFC reader but may does not include a wired port for communicating with the first base processor 2042. The single-port NFC tag may store and transmit device data such as serial number, configuration, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 2100 further includes a global positioning system (GPS) receiver 2104. In an embodiment, the GPS receiver 2104 is used to track the location of the AACMM 10, for example, to determine the location of the AACMM 10 when leased. In another embodiment, the GPS receiver 2104 is used to synchronize multiple instruments, which may include AACMMs, laser trackers, scanners, or other devices. Descriptions of GPS used with AACMMs are given in United States Published Patent Application 2015/0355310, the contents of which is incorporated by reference herein. In an embodiment, WLAN 2101, Bluetooth™ 2102, NFC 2103, and GPS 2104 are used in conjunction with antennas, which may include antennas 2105, 2106.

Figure 3:
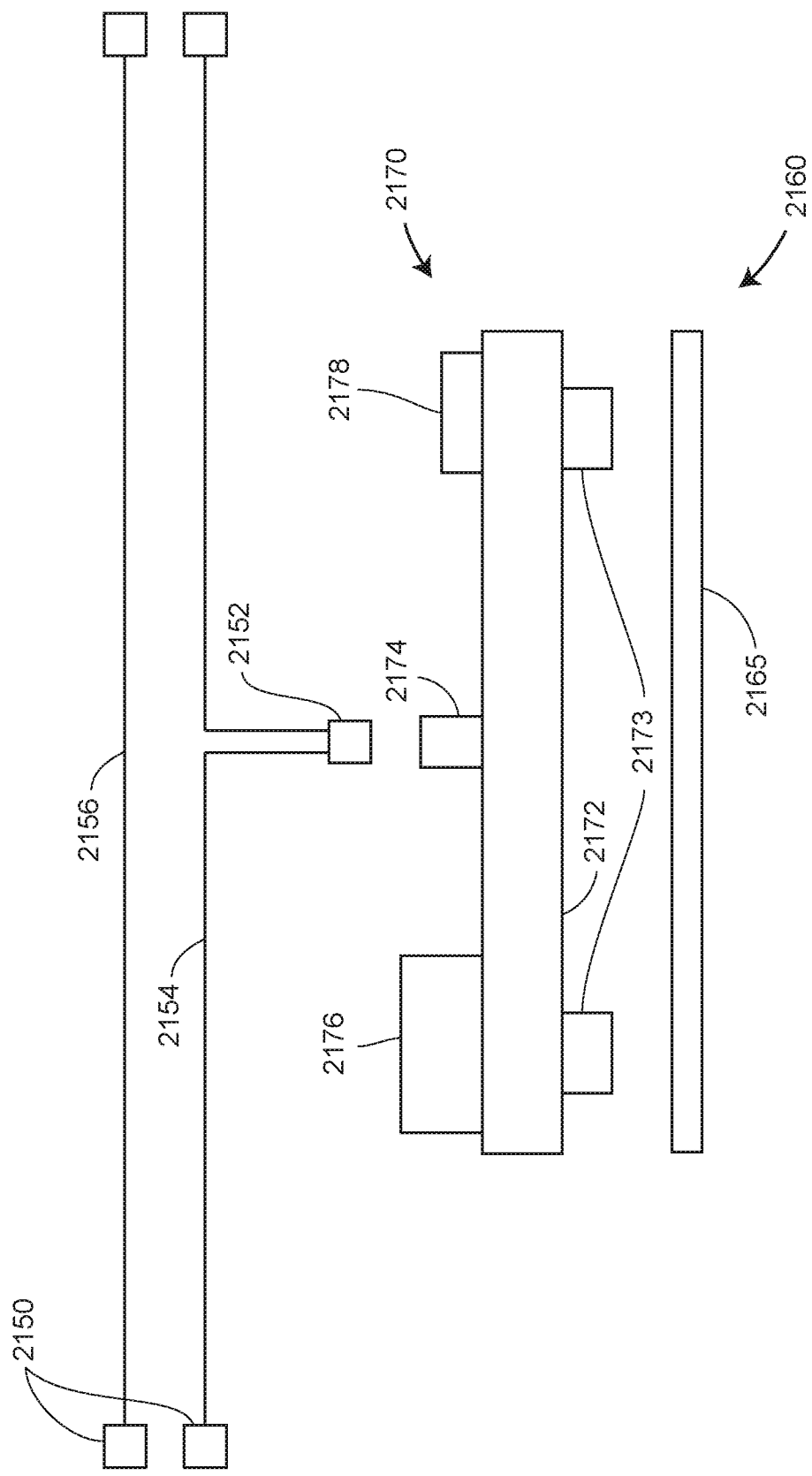
FIG. 3 is a block diagram of bus cables and their relation to encoder components according to an embodiment of the present invention.

In an embodiment illustrated in FIG. 3, angles of rotation of the axis assemblies 100, 200, 300, 400, 500, 600, 700 of the AACMM 10 are measured with angular transducers. In an embodiment, the angular transducers are angular encoders 2160, elements of which are illustrated schematically in FIG. 3. In an embodiment, an angular encoder 2160 includes an encoder disk 2165 and encoder electronics 2170. In an embodiment, encoder electronics 2170 includes an encoder printed circuit board (PCB) 2172, one or more read heads 2173, processor and support electronics 2176, temperature sensor connector 2178, and board connector 2174. In an embodiment, the encoder disk 2165 includes a collection of radially directed lines, the positions of which are sensed by the one or more read heads 2173 and the sensed positions processed with processor and support electronics 2176, to determine an angle of rotation of the encoder disk 2165 in relation to the read heads 2173. In an embodiment, each board connector 2174 is attached to a T-connector 2152 of a T-cable 2154 within the first bus 2182 (FIG. 2). Each encoder PCB 2172 connects to a corresponding T-cable 2154 of the first bus 2182. Cable connectors 2150 on each end of the T-cable 2154 attach to cable connectors 2154 on adjacent T-cables 2154 in the AACMM 10. In this way, angle information may be transferred from each angular encoder 2160 through the first bus 2182 to the main processor electronics 2040 for further processing. The transmitted angles are synchronized to the capture signal, which in an embodiment has a rate of around one kilohertz. By connecting a single T-connector 2152 to a corresponding single board connector 2174, the angular encoders 2160 continue to send their angle readings to the base processor electronics 2040 even if one or more of the encoder electronics 2170 are disconnected from the first bus 2182. In an embodiment, cable connectors 2150 are provided on each end of an interconnect cable 2156 of the second bus 2184 (FIG. 2). Cable connectors 2150 of adjacent interconnect cables 2156 are connected together to provide a continuous electrical path for the second bus 2184.

Figure 4A:
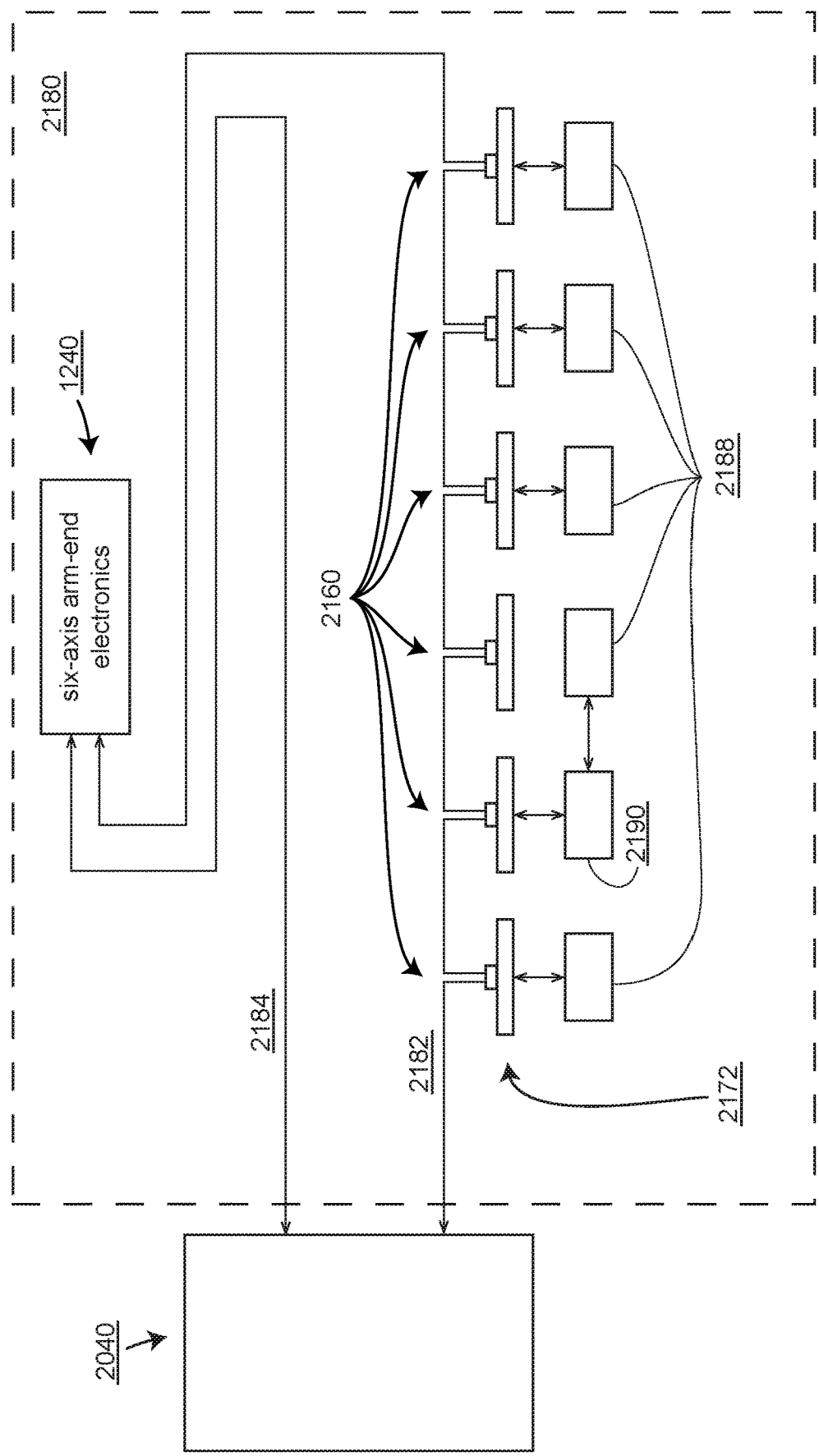
FIGS. 4A, 4B are block diagrams of interconnecting elements in six-axis electronics and seven-axis electronics according to an embodiment of the present invention.

FIG. 4A shows electrical elements 2180 in a six-axis AACMM. The electrical elements 2180 include six angular encoders 2160 attached by the first bus 2182 to the base processor electronics 2040 on one end, and to six-axis arm-end electronics 1240 on the other end. In an embodiment, one or more of the encoder PCBs 2172 are attached to an expandable temperature sensor 2190. When an expandable temperature sensor 2190 is attached to the temperature sensor connector 2178 (FIG. 3), a further temperature sensor 2188 may be attached to the expandable temperature sensor 2190. In an embodiment, some temperature sensors 2188 are not expandable. In an embodiment, at least one temperature sensor, either 2188 or 2190, is placed in the vicinity of each angular encoder to provide the possibility of compensating angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to six-axis arm-end electronics 1240.

Figure 4B:
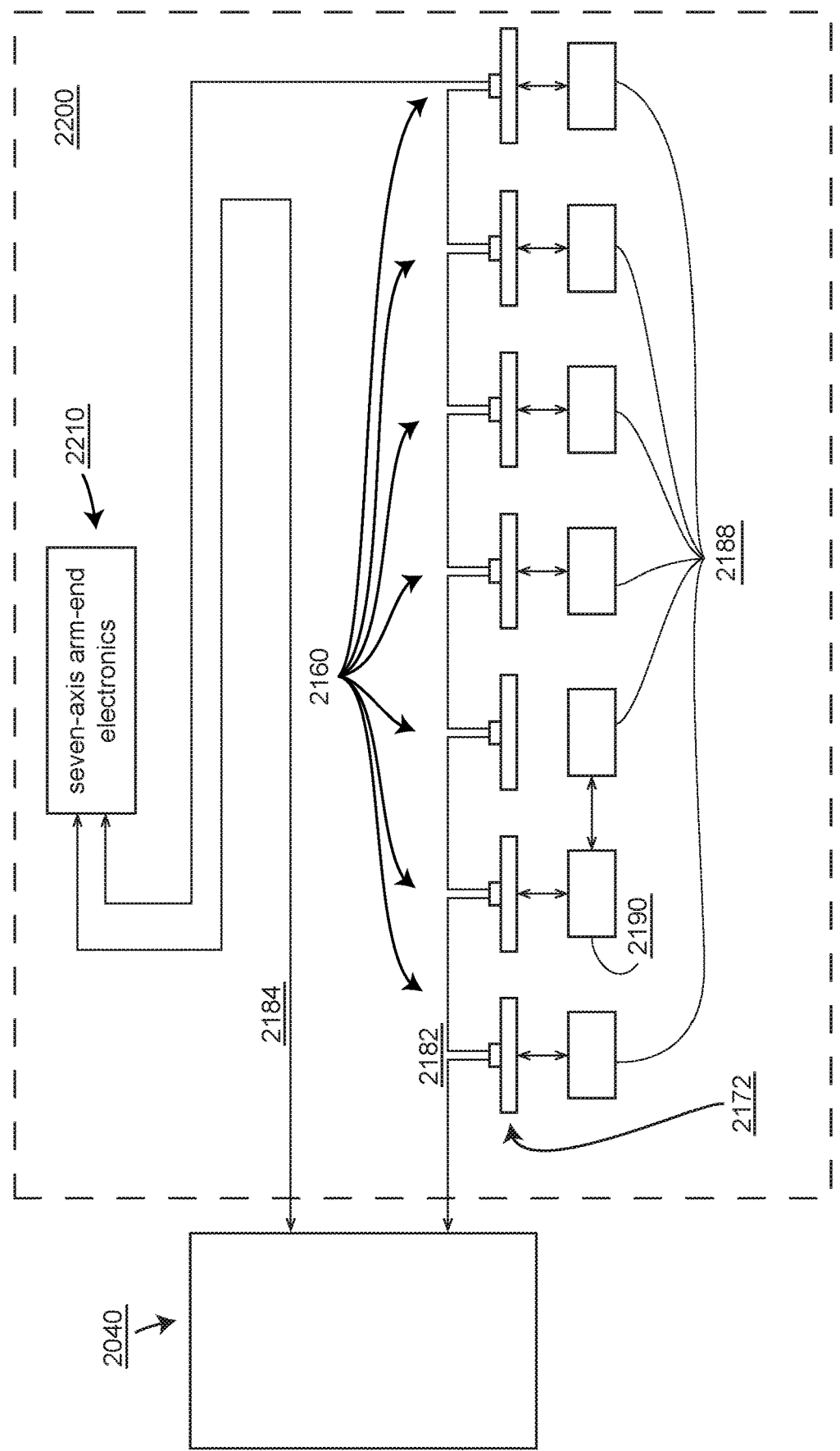

FIG. 4B shows electrical elements 2200 in a seven-axis AACMM. The electrical elements 2200 include seven angular encoders 2160 attached by the first bus 2182 to the base processor electronics 2040 on one end and to seven-axis arm-end electronics 2210 on the other end. In an embodiment, one or more of the encoder PCBs 2172 are attached to an expandable temperature sensor 2190. When an expandable temperature sensor 2190 is attached to the temperature sensor connector 2178, a further temperature sensor 2188 may be attached to the expandable temperature sensor 2190. In an embodiment, some temperature sensors 2188 are not expandable. In an embodiment, at least one temperature sensor, either 2188 or 2190, is placed in a vicinity of the angular encoders to allow for the compensation of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to seven-axis arm-end electronics 2210.

Figure 5:
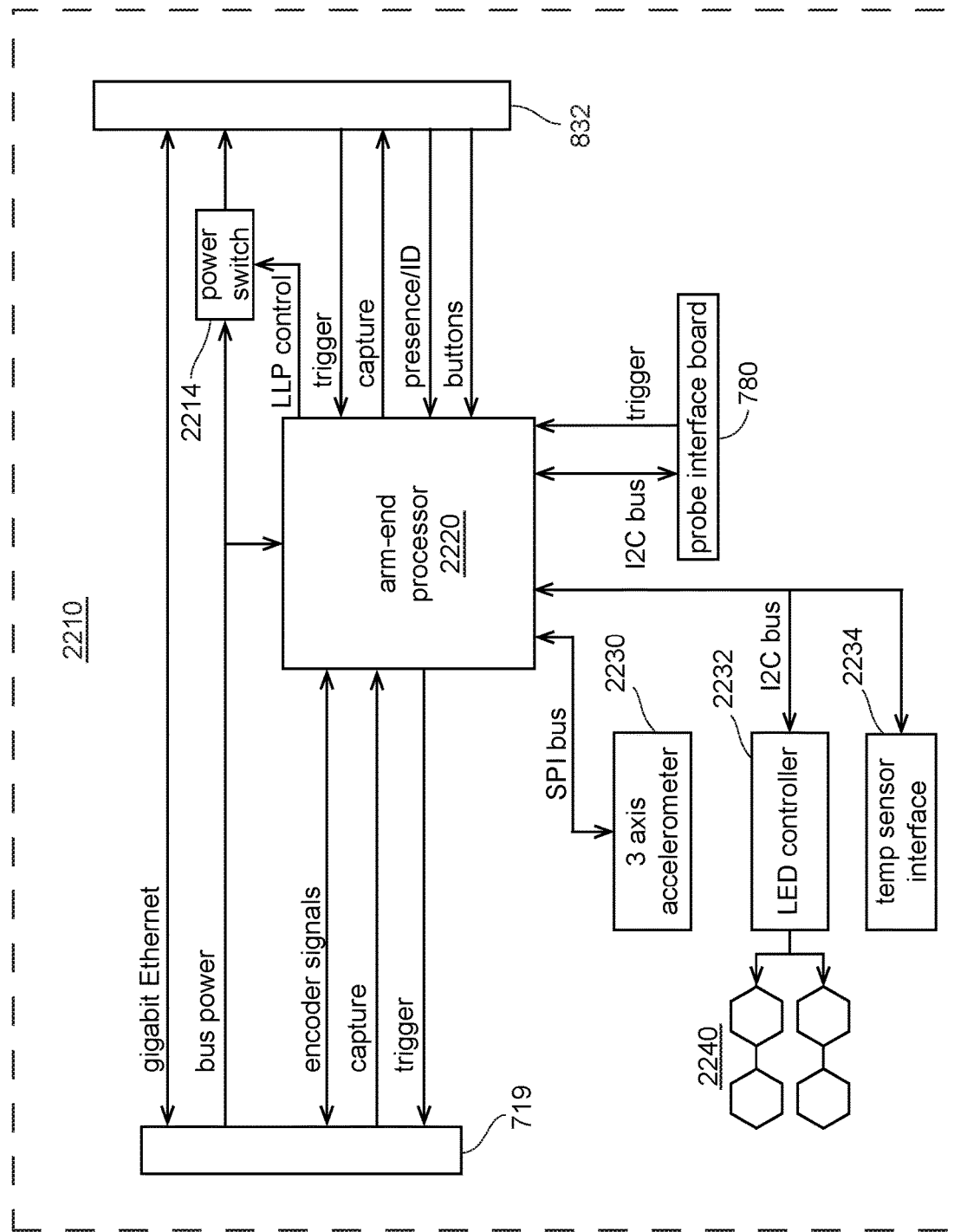
FIG. 5 is a block diagram of seven-axis arm-end electronics according to an embodiment of the present invention.
Figure 24A:
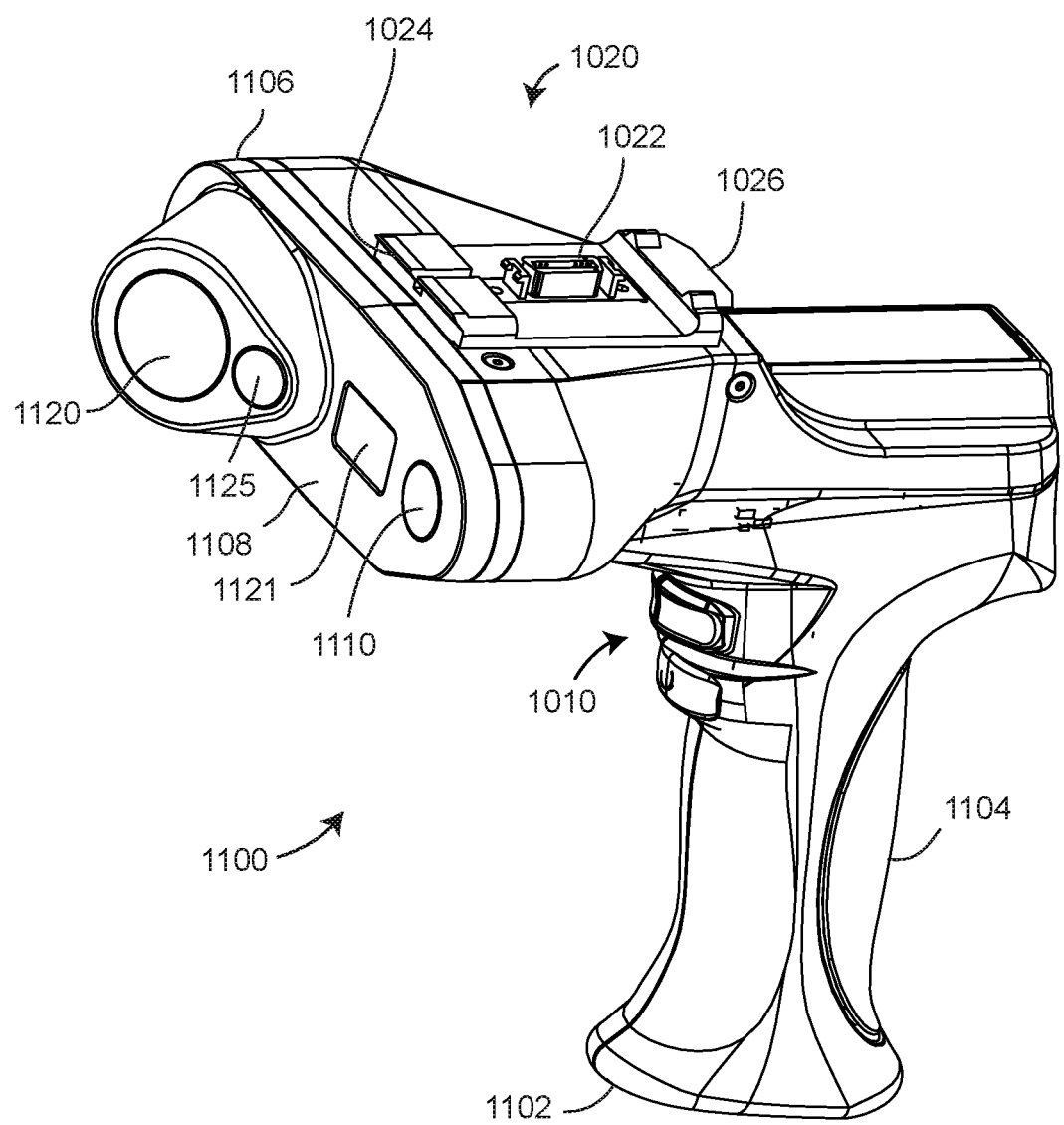
FIGS. 24A, 24B are isometric and partial section views, respectively, of a laser line probe according to an embodiment of the present invention.
Figure 24B:
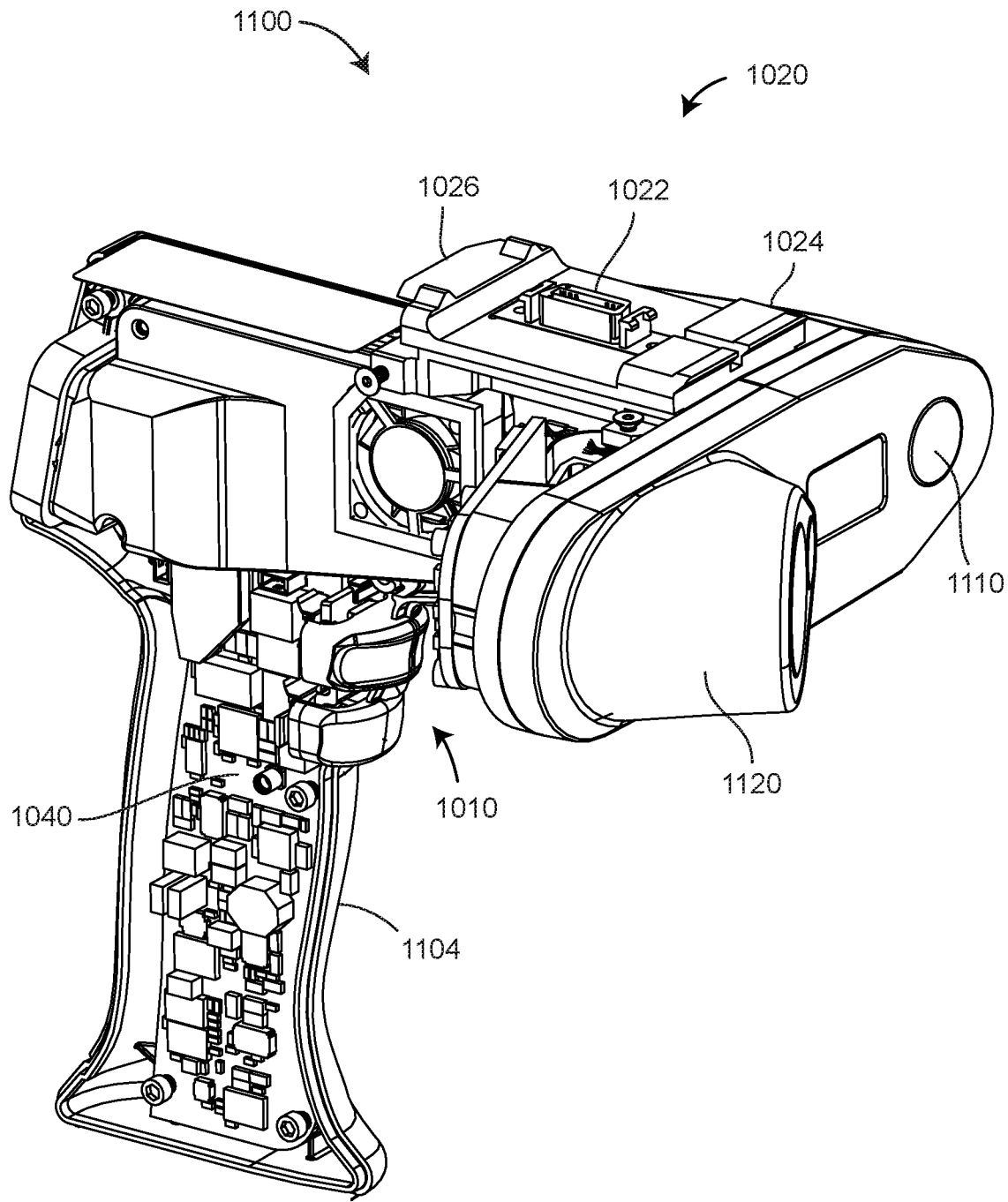

FIG. 5 is a block diagram of elements of the seven-axis arm-end electronics 2210. Bus connectors 719, also shown in FIG. 19F, include two electrical connectors that attach to cable connectors 2150 (FIG. 3) of the first bus 2182 (FIG. 2) and the second bus 2184 of the sixth-axis assembly 600. An arm-to-handle connector 832 in FIG. 5, and further shown in FIGS. 18B, 19H, connects to a handle-to-arm connector 1022 (FIG. 18D) of an accessory such as a laser line probe (LLP) 1100 as shown in FIGS. 24A, 24B or to a handle 1000 as shown in FIGS. 18A, 18C, 18D, 18E. FIG. 5 includes a probe interface board 780, further illustrated in FIGS. 19C, 19F, 20A, 21A, 21B, 25A, 25D. The probe interface board 780 is configured to make electrical contact with removable tactile probes, as discussed further herein below. The probe interface board 780 communicates bidirectionally with the arm-end processor 2220 through an I2C bus. When a touch-trigger probe assembly 960 (FIG. 22D) is attached, the probe interface board 780 further sends trigger signals from the probe interface board 780 to the arm-end processor 2220.

Figure 19G:
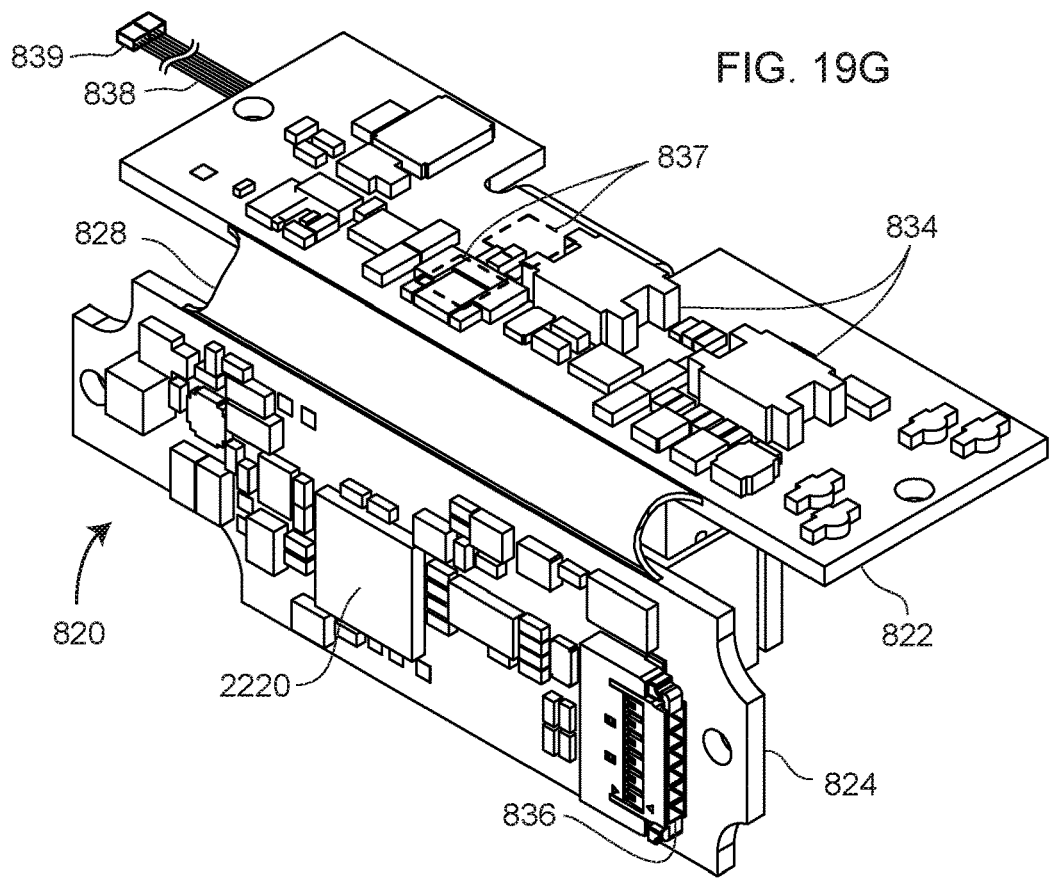
FIGS. 19G, 19H are first and second isometric views of a seventh-axis circuit board according to an embodiment of the present invention.

In an embodiment, the seven-axis arm-end electronics 2210 includes an arm-end processor 2220 as shown in FIGS. 5 and 19G. In an embodiment, the arm-end processor 2220 is electrically connected to a three-axis accelerometer 2230 through a serial peripheral interface (SPI) bus. The three-axis accelerometer 2230 provides a record of severe impacts to the arm end. A record of such impacts may provide a clue to an origin of problems observed in service. In an embodiment, the three-axis accelerometer 2230 is included on a seven-axis arm-end board similar to the six-axis arm-end board 1260 shown in FIG. 25D.

In an embodiment, the arm-end processor 2220 is further connected to a light-emitting diode (LED) controller 2232 through an I2C bus. In an embodiment, the LEDs 2240 are red-blue-green (RGB) LEDs that provide any of a plurality of colors within the visible spectrum. The LED controller 2232 provides control signals to the LEDs 2240 to control aspects such as emitted colors and light levels from the LEDs 2240. In an embodiment, the light emitted from the LEDs 2240 is controlled separately for each LED 2240 so that light emitted by the LEDs 2240 may be one color from an upper light diffuser 1222 and another color from a lower light diffuser of an end-effector assembly 1200, as shown in FIG. 25A.

In an embodiment, the arm-end processor 2220 also communicates with a temperature sensor interface 2234 over an I2C bus. The temperature sensor interface provides a measured temperature that may be used to compensate for thermal expansion of elements attached to the end of the arm.

The arm-end processor 2220 receives a variety of electrical signals from the bus connectors 719 including bus power signals, encoder signals, capture signals, and trigger signals. The bus connector further provides bus power to the arm-to-handle connector 832 if a power switch 2214 is activated by an LLP 1100 control signal from the arm-end processor 2220. The LLP 1100 control signal is a signal provided by the LLP 1100 or other accessory indicating that it is connected to the AACMM 10 and should receive electrical power from the bus. Besides sending bus power to the LLP 1100 or other accessory device, the arm-to-handle connector 832 also transfers high-speed data from accessories such as the LLP 1100 over the second bus 2184 (FIG. 4A, 4B) to the first base processor 2042. In an embodiment, actuator or button presses may result in signals being transmitted the arm-to-handle connector 832 to the arm-end processor 2220 in response to pressing of a handle button 1010 shown in FIGS. 18A, 18E, 24A, 24B. The capture signals are sent from the arm-end processor 2220 to the arm-to-handle connector 832 to synchronize measured values obtained from accessories such as the LLP 1100 with the angular readings obtained by the angular encoders in the arm-axis assemblies 100, 200, 300, 400, 500, 600, 700. In some cases an accessory may send a trigger signal to the arm-end processor 2220. An accessory device may also send a presence/ID signal indicating its presence and identity in the system.

FIGS. 6A, 6B show some elements of the lower arm. The mounting device 15 provides a way of a attaching the AACMM 10 to a mounting ring as discussed further herein below in relation to FIG. 7J. The shock-absorber bumper 110 provides a way to cushion a potential drop of the AACMM 10 when affixing the arm to a mounting ring, as discussed herein below in relation to FIGS. 7E, 7F, 7G, 7H. The base 20 includes elements shown in FIGS. 6A, 6B such as a base cover 22, a control panel 30, a battery access 40, and a port panel 50, as well as mechanical elements shown in later figures, as discussed herein below. The control panel 30 includes the on-off button 32, the Wi-Fi button 34, the Bluetooth™ button 36, the first-battery indicator light 38, and the second-battery indicator light 39. The battery access 40 includes the first battery door 42, the first battery-door latch 43, the first battery-door hinge 44, the second battery door 46, the second battery-door latch 47, and the second battery-door hinge 48. The port panel 50 includes an Ethernet jack 52, a USB data-transfer port 54, a USB charging port 55, an auxiliary port 56, and a power supply port 58.

The first-axis assembly 100 is shown in FIGS. 6A, 6B, 7A, 7B, 7C, 7D. The first-axis assembly 100 includes a first-axis cartridge 130 and a first-axis yoke structure 194. The handle 125 and the shock-absorber bumper 110 are coupled to the first axis assembly 100. As shown in FIGS. 8A, 8B, 8C, in the first-axis cartridge 130, a first-axis shaft 158 rotates about a first axis 131 relative to a first axis housing 144. As shown in FIGS. 9A, 9B, with continuing reference to FIG. 8C, the first-axis cartridge 130 includes an encoder board with read heads 132, a read-head plate 134, an encoder disk 136, a lower bearing 138, a preload bearing spacer 140, a wave washer 142, a first-axis housing 144, an upper bearing 150, and a first-axis shaft 158. The first-axis housing 144 includes a lower lip 145 against which the wave washer 142 is placed.

In an embodiment, in a first manufacturing step the upper bearing 150 is held in place between a fifth lip 151 of the first-axis shaft 158 and a fourth lip 149 of the first-axis housing 144. The wave washer 142 is benched against the third lip 145 and brought into contact with the preload bearing spacer 140, which is brought into contact with an outer race of the lower bearing 138. In an embodiment, in a second manufacturing step, the first-axis shaft 158 is press fit against the lower bearing 138 until a bottom of the lower bearing lies on a plane of the second lip 143. A press fit, also known as an interference fit or a friction fit, is a fastening between two parts obtained by pressing the parts together under conditions in which there is a slight interference between the parts, resulting in friction that holds the parts tightly in place. The wave washer 142 and preload bearing spacer 140 press downward on the outer race of the lower bearing 138, which in turn presses down on the ball in the lower bearing. In response, the inner race presses upward on the ball in the lower bearing 138. The lower bearing 138 when subjected to such forces is said to be preloaded, a condition that improves the performance of the bearing. Advantages obtained by preloading a bearing include increased bearing rigidity and better consistency in angular movements.

In an embodiment, the spring force from the wave washer 142 further presses the third lip 145 upward, causing the fourth lip 149 to press upward on an outer race of the upper bearing 150 and, in reaction, causing the fifth lip 151 to press downward on the inner race of the upper bearing 150. Hence preload is also applied to the upper bearing 150. In an embodiment, the lower bearing 138 and the upper bearing 150 are deep groove ball bearings. In another embodiment, the lower bearing 138 and the upper bearing 150 are angular contact ball bearings. In other embodiments, other types of bearings are used.

In an embodiment, with the first-axis shaft 158 press fit in place, glue is applied to the glue grooves 159 of the first-axis shaft 158 and the encoder disk 136 is adjusted in place and allowed to cure. Screws 133 attach the encoder board with read heads 132 to the read-head plate 134, which is benched against the first lip 141 of the first-axis housing 144.

In an embodiment, a brush assembly 152 includes a carbon brush 153, a brush spring 154, and a set screw 155. The brush assembly is inserted through the first-axis housing 144, enabling the carbon brush to electrically ground the upper bearing, which can otherwise generate static electricity during rotation. Hence, use of the brush assembly 152 improves electrical reliability.

Figure 8D:
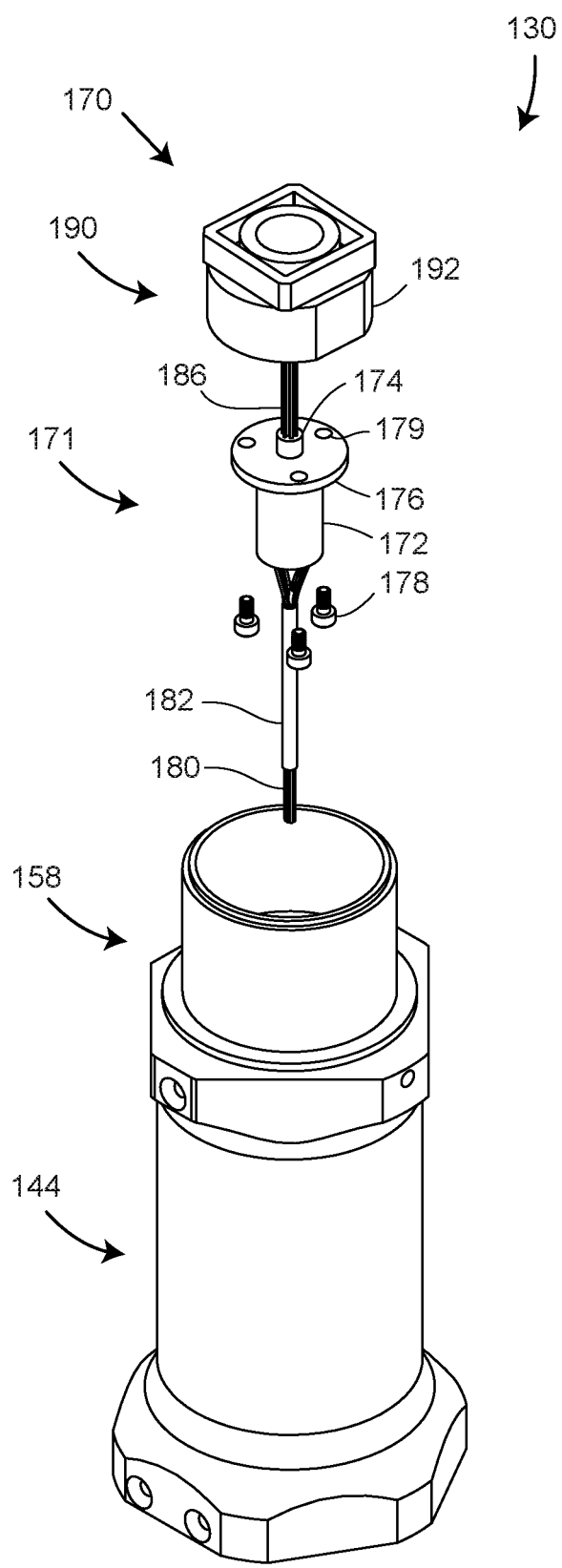
Figure 9A:
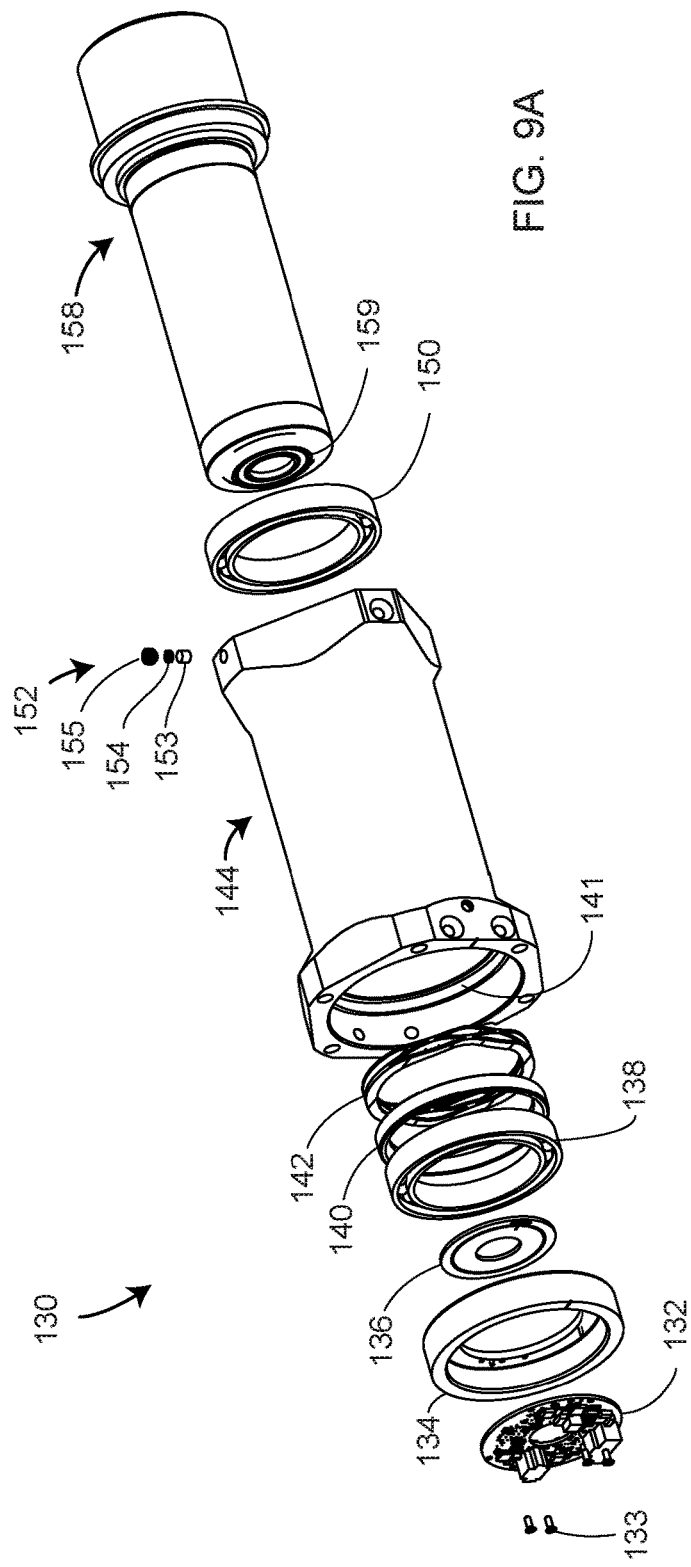
FIGS. 9A, 9B are exploded and isometric views of the first-axis cartridge according to an embodiment of the present invention.
Figure 9B:
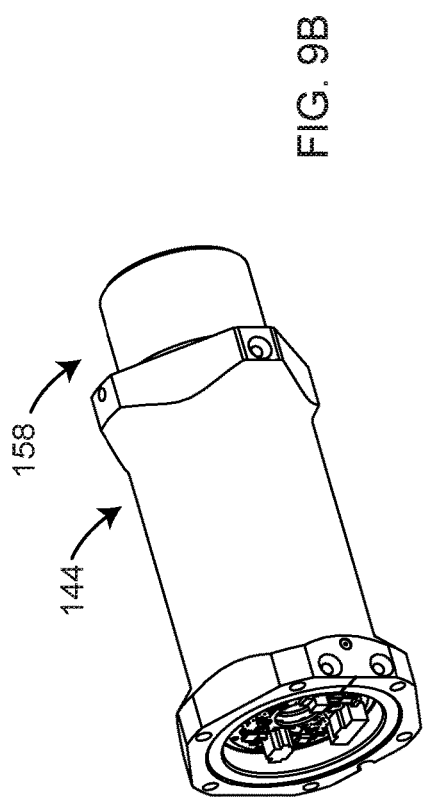

In an embodiment illustrated in FIGS. 8C, 8D, the first-axis cartridge 130 further includes an electrical transfer assembly 170. The electrical transfer assembly 170 includes a first-axis slip ring 171, a slip-ring adapter 190, and cable elements. Cable elements include bus connectors 184A, 184B, first cable wires 180, and a cable jacket 182. The first-axis slip ring 171 includes a slip-ring housing 172, a slip-ring flange 176, slip-ring holes 179, and slip-ring screws 178. In an embodiment, the slip-ring adapter 190 screws onto the first-axis shaft 158 in a threaded portion 192. First-axis slip-ring screws 178 extend through slip-ring holes 179 of the slip-ring flange 176 to attach the first-axis slip ring 171 to the slip-ring adapter 190. The slip-ring flange 176 and the slip-ring housing 172 turn together, but the slip-ring shaft 174 turns independently of the slip-ring housing. Furthermore, first cable wires 180, which enter the slip-ring housing 172, turn with the slip-ring housing 172, while the second cable wires 186, which enter the slip-ring shaft 174, turn with the slip-ring shaft 174. In an embodiment, electrically contacting brushes keep electrical continuity among first cable wires 180 and second cable wires 186 even as the slip-ring shaft 174 rotates relative to the slip-ring housing 172. In an embodiment, the slip-ring shaft 174 does not rotate relative to the slip-ring housing 172 until the second cable wires 186 become twisted enough to apply a restoring torque to the slip-ring shaft 174.

In an embodiment illustrated in FIGS. 7A, 7B, the first-axis assembly 100 includes the first-axis cartridge 130, the first-axis yoke structure 194, the shock-absorber bumper 110, the handle 125, screws 126, 128, and washers 127. Optionally, the first-axis assembly 100 may be used in conjunction with the mounting device 15. In an embodiment, the three short base screws 128 attach one side of the shock-absorber bumper 110 to a bottom of the first-axis housing 144, while the three long base screws 126 and corresponding washers 127 attach the handle 125 and the shock-absorber bumper 110 to the bottom of the first-axis housing 144. In an embodiment, the mounting device 15 sits loosely on the shock-absorber bumper 110 until it is tightened onto a mounting ring as described further herein below.

FIGS. 7E, 7F, 7G, 7H illustrate the shock-absorber bumper 110, which includes lower screws 118, a guiding retainer ring 111, a bell 112, a damper 114, a preload spacer 115, a base-nut retainer 116, a tilt board 117, and upper screws 119. The bell further includes a bell lip 113. The damper 114 sits in the bell 112, which rests on the guiding retaining ring 111, which is screwed onto a bottom of the base nut retainer 116. The preload spacer 115 sits atop the damper 114 and makes contact with the base nut retainer 116, as shown in the section view of FIG. 7H. Upper screws 119 attach the tilt board 117 to the base nut retainer 116. The damper 114 is made of compressible material so that the bell 112 deflects or compresses upward when a force is applied to a bottom of the bell 112. The purpose of the shock-absorber bumper 110 is to reduce mechanical shock to the AACMM 10 that may occur if the AACMM 10 suddenly drops when being mounted to a table, stand, or similar structure.

Figure 7D:
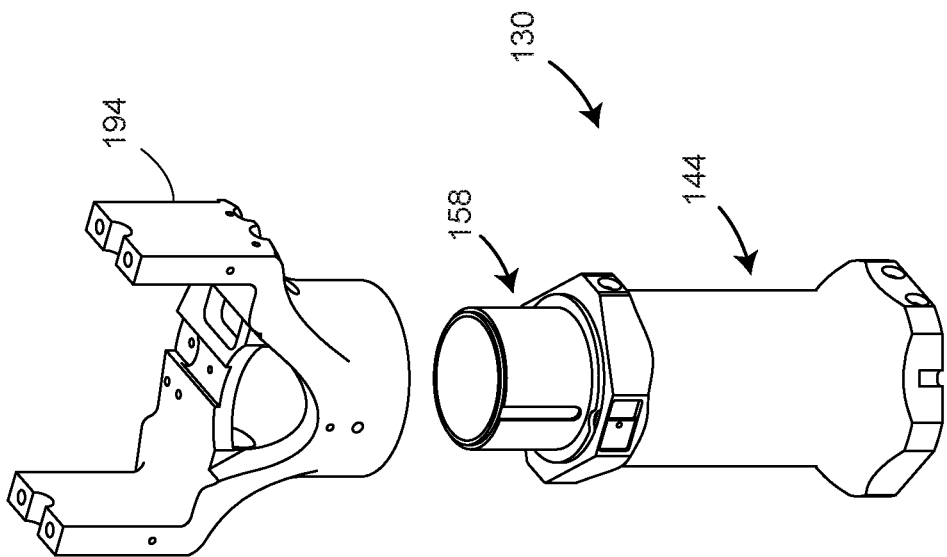
FIGS. 7C, 7D are isometric and exploded views, respectively, of a first-axis cartridge and a first-axis yoke structure according to an embodiment of the present invention.
Figure 7C:
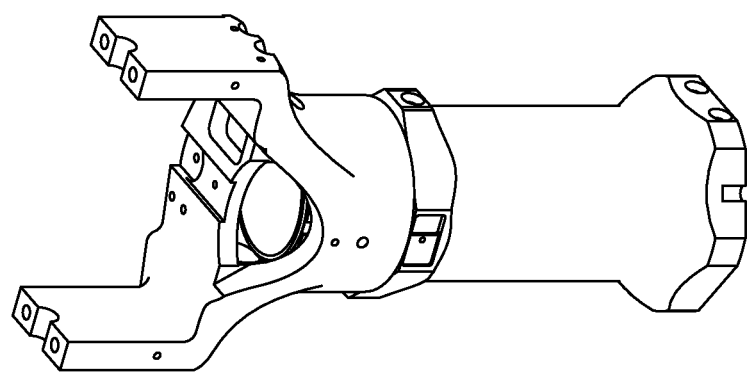
Figure 7H:
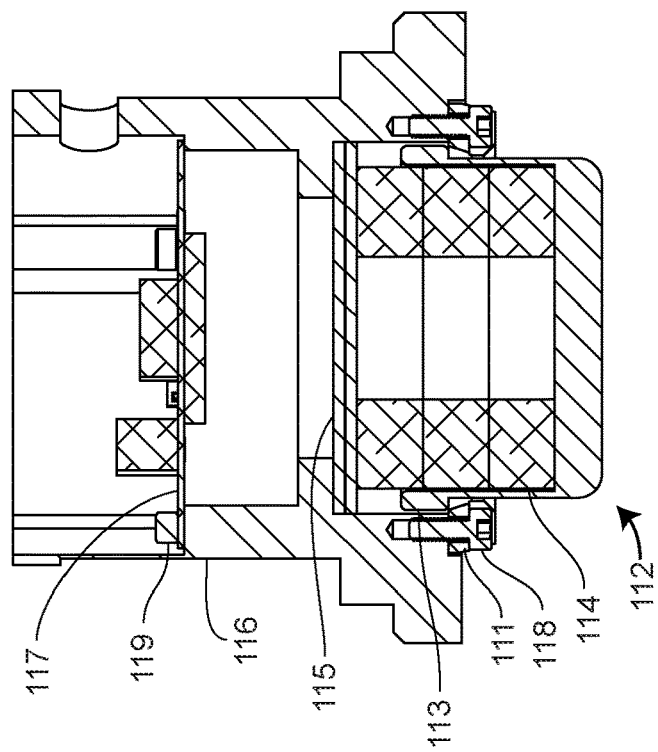
Figure 7G:
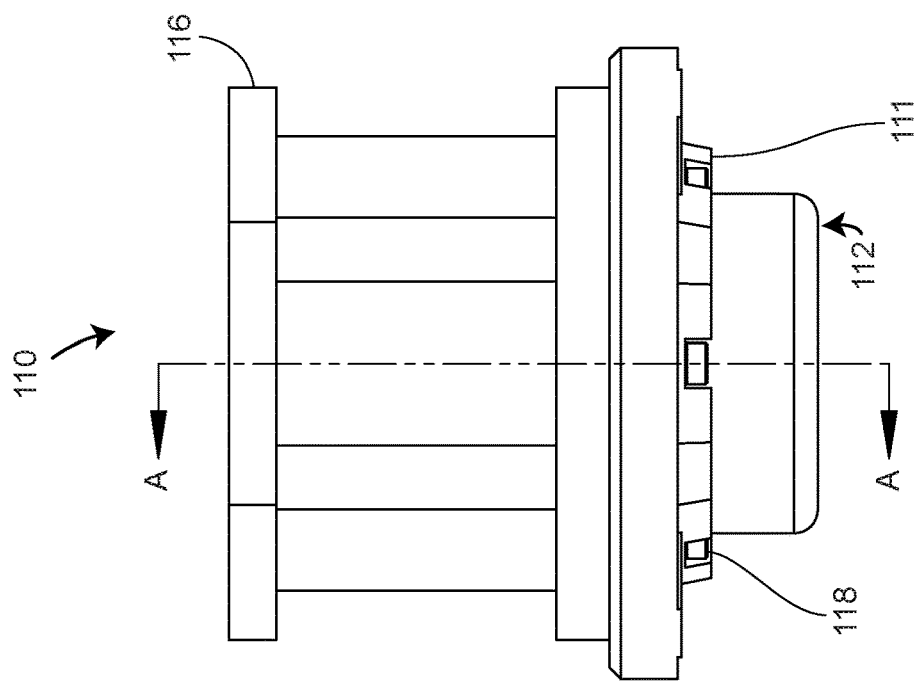
Figure 7J:
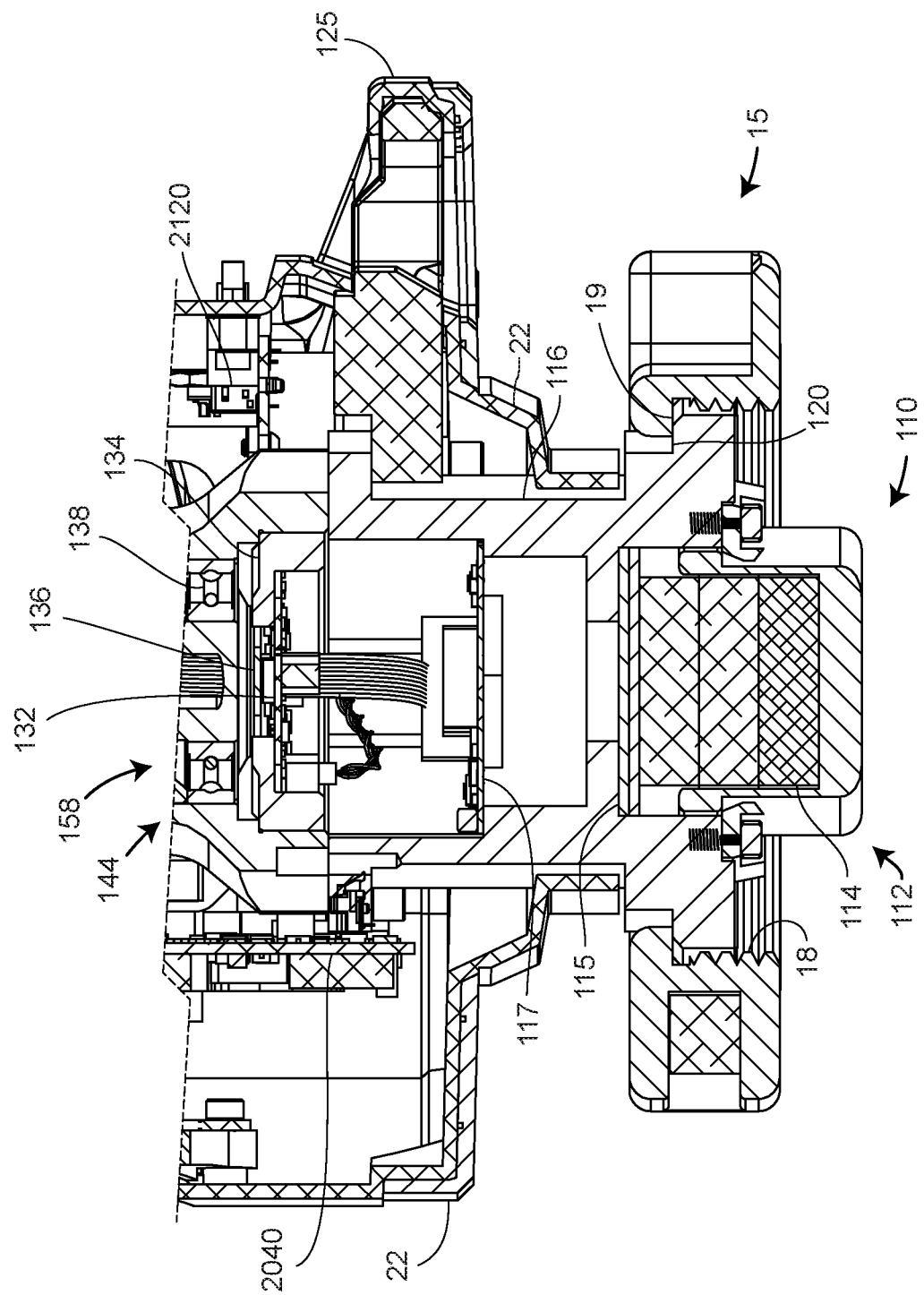
FIG. 7J is a cross-sectional view of a lower portion of the articulated-arm base and the mounting device according to an embodiment of the present invention.

Advantages provided by the shock-absorber bumper 110 may be understood by referring to FIG. 7J, which shows the shock-absorber bumper 110, the first-axis housing 144, the base cover 22, the handle 125, the base processor electronics 2040, the rear connector interface 2120, and the tilt board 117. Also shown in FIG. 7J and FIG. 7A are the mounting device 15, which includes screw threads 18, a mounting device lip 19, a first wing 16, and a second wing 17. The mounting device 15 is described in U.S. Pat. No. 8,028,432, the contents of which are incorporated by reference herein.

In an embodiment, an externally threaded mounting ring (not shown) is attached to a mounting surface such as an instrument stand, tripod, or table. In an embodiment, internal screw threads 18 of the mounting device 15 engage the external screw threads of the mounting ring. As the screw threads are tightened, a mounting device lip 19 is drawn into firm contact with a base-nut retainer shelf 120 of the mounting device 15. In this way, the AACMM 10 is locked firmly in place. Advantageously, the screw threads on the mounting device may be temporarily loosened to allow the base 20 of the AACMM 10 to be turned to different direction before being retightened.

Initially, when the base 20 of the AACMM 10 is being positioned by the user on the mounting ring, the bottom of the AACMM 10 may not be centered on the mounting ring. As a result, when the AACMM 10 is centered on the ring, the AACMM 10 may drop suddenly, shocking the mechanical elements within the AACMM 10. The shock-absorber bumper 10 reduces or minimizes the risk of damage to the AACMM 10 by catching the mounting surface with the bottom of the bell 112 and slowing the descent of the AACMM 10 as the damper 114 compresses. In other embodiments, the mounting device 15 is attached to threads not included on a mounting ring. In still other embodiments, the AACMM 10 is attached to a mounting without use of the mounting device 15. In this embodiment, the shock-absorber bumper may provide protection against rapid falls of and shocks to the AACMM 10.

A portable articulated arm coordinate measuring machine (AACMM), comprising: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device; a shock-absorber assembly coupled to a lower portion of the AACMM, the shock-absorber assembly operable to reduce mechanical shock to the AACMM when the AACMM is brought into contact with a support element; and a processor operable to determine three-dimensional (3D) coordinates of a point measured by the measurement device based at least in part on the provided data corresponding to the position of the measurement device.

In an embodiment, the shock-absorber assembly includes a retractable surface that, when brought into contact with the support element, retracts toward an interior of the shock-absorber assembly through compression of a damper material.

Figure 10:
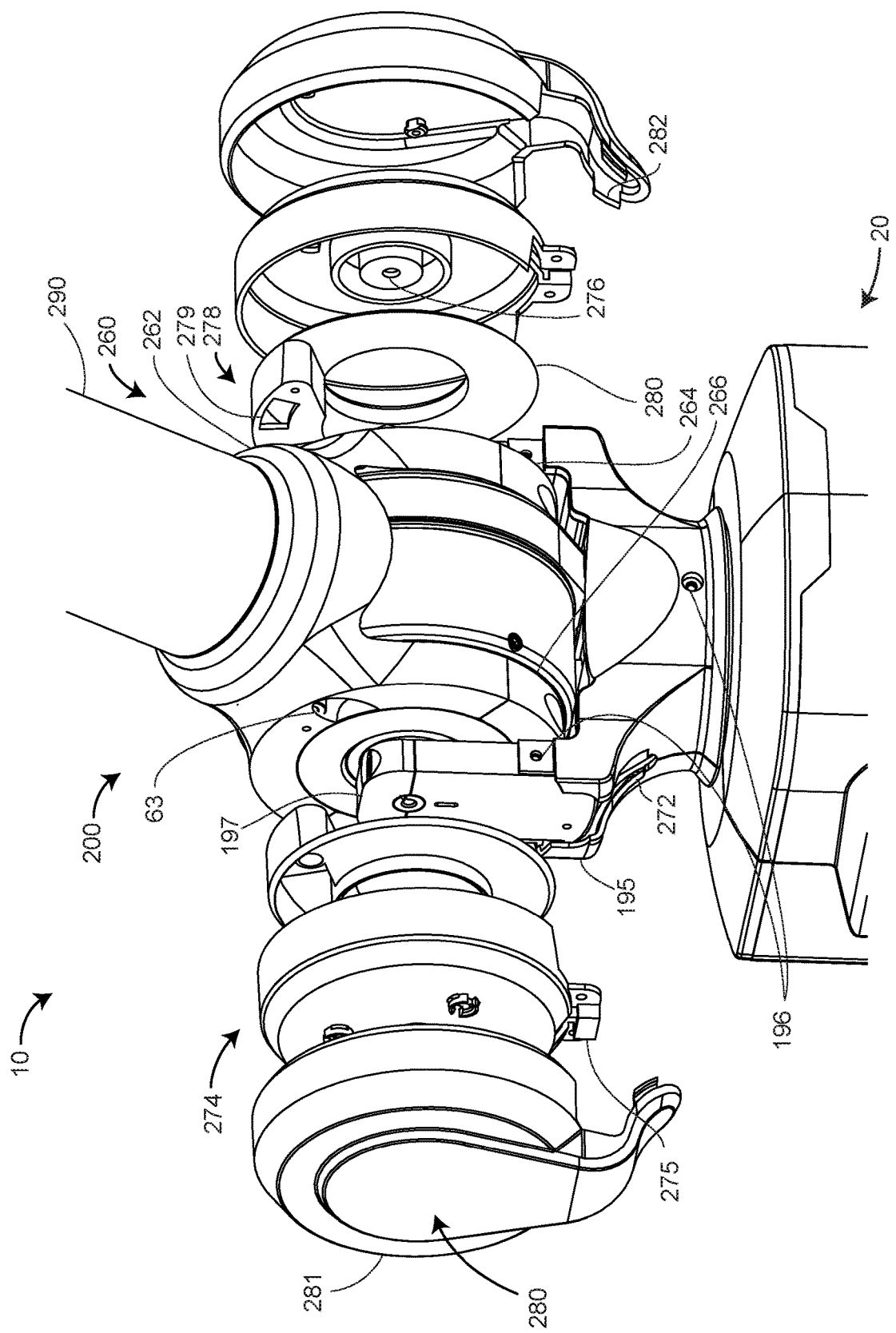
FIG. 10 is an exploded view of a lower portion of the AACMM according to an embodiment of the present invention.
Figure 11:
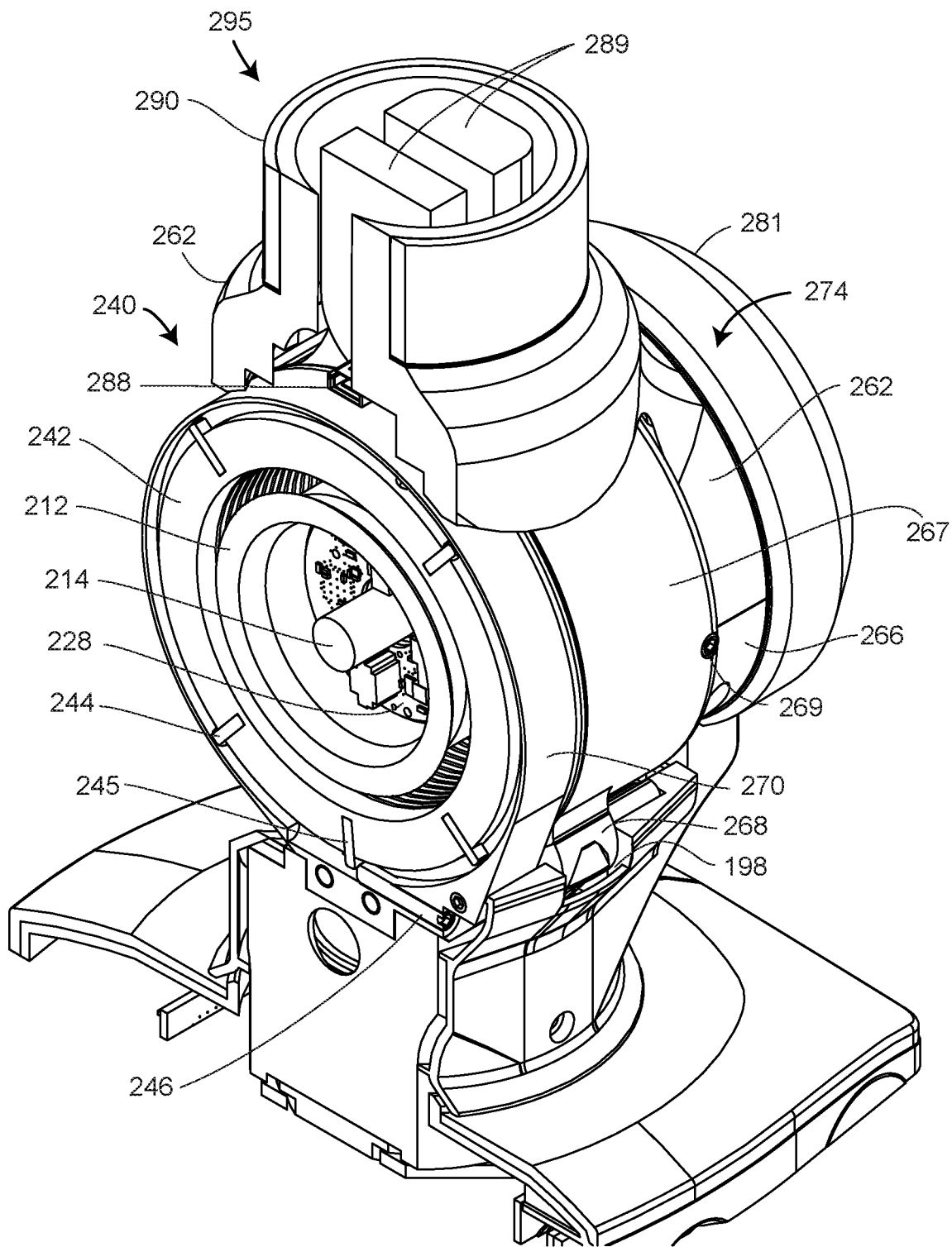
FIG. 11 is a partial isometric view of a second-axis/counterbalance assembly and surrounding components according to an embodiment of the present invention.
Figure 12:
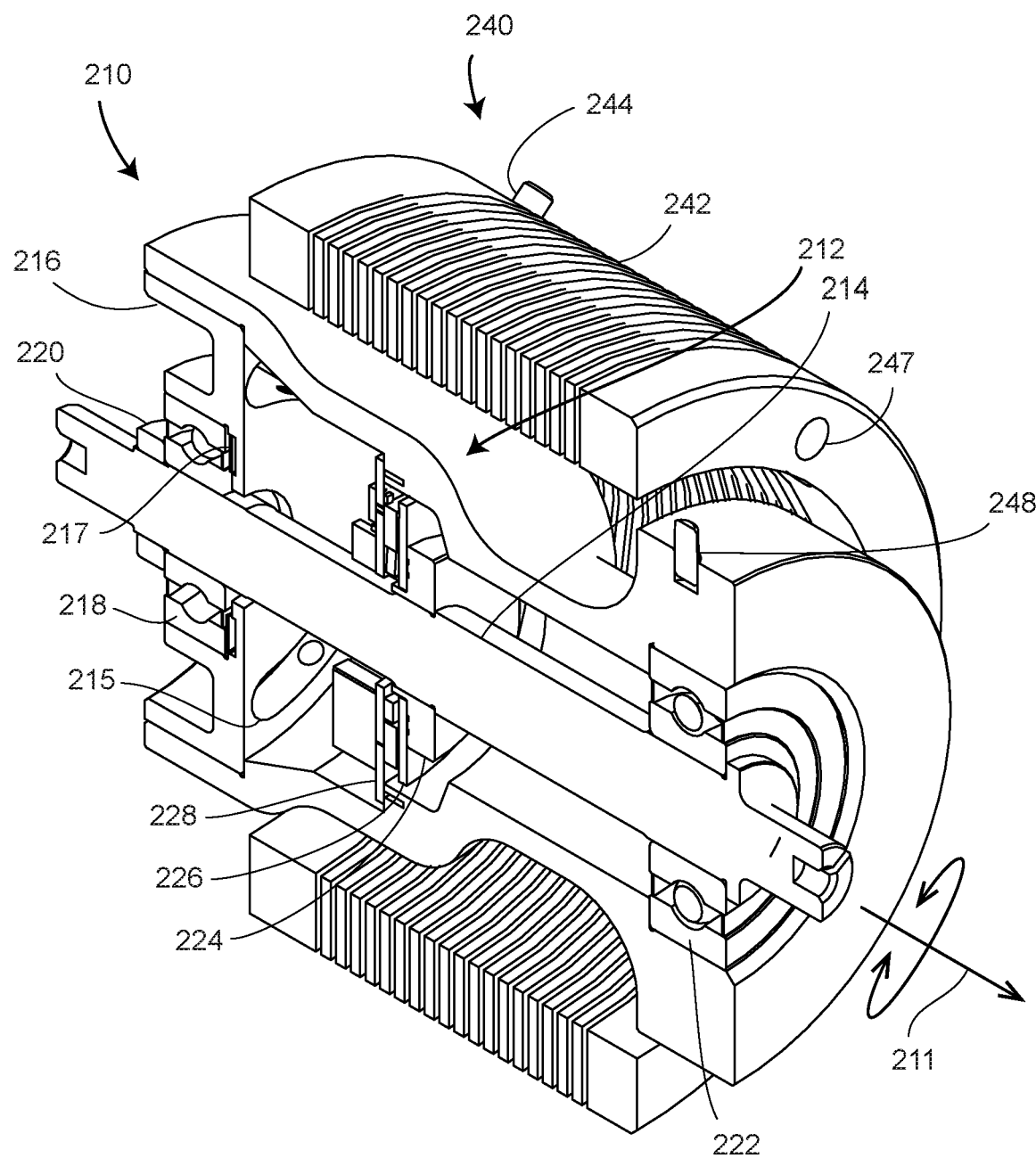
FIG. 12 is a partial section view of a second axis cartridge and counterbalance ring according to an embodiment of the present invention.
Figure 13:
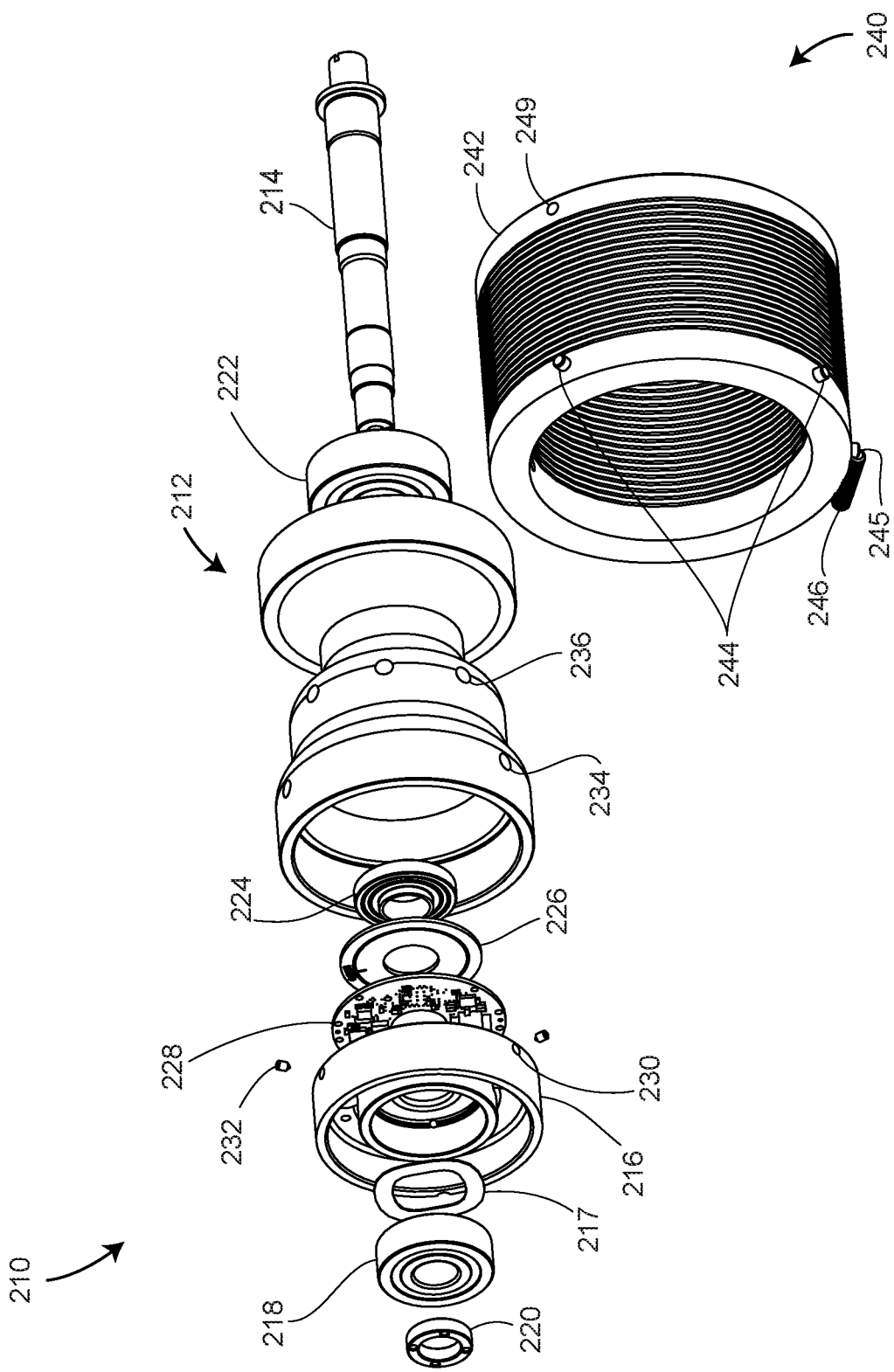
FIG. 13 is an exploded view of the second-axis cartridge and counterbalance ring according to an embodiment of the present invention.
Figure 16C:
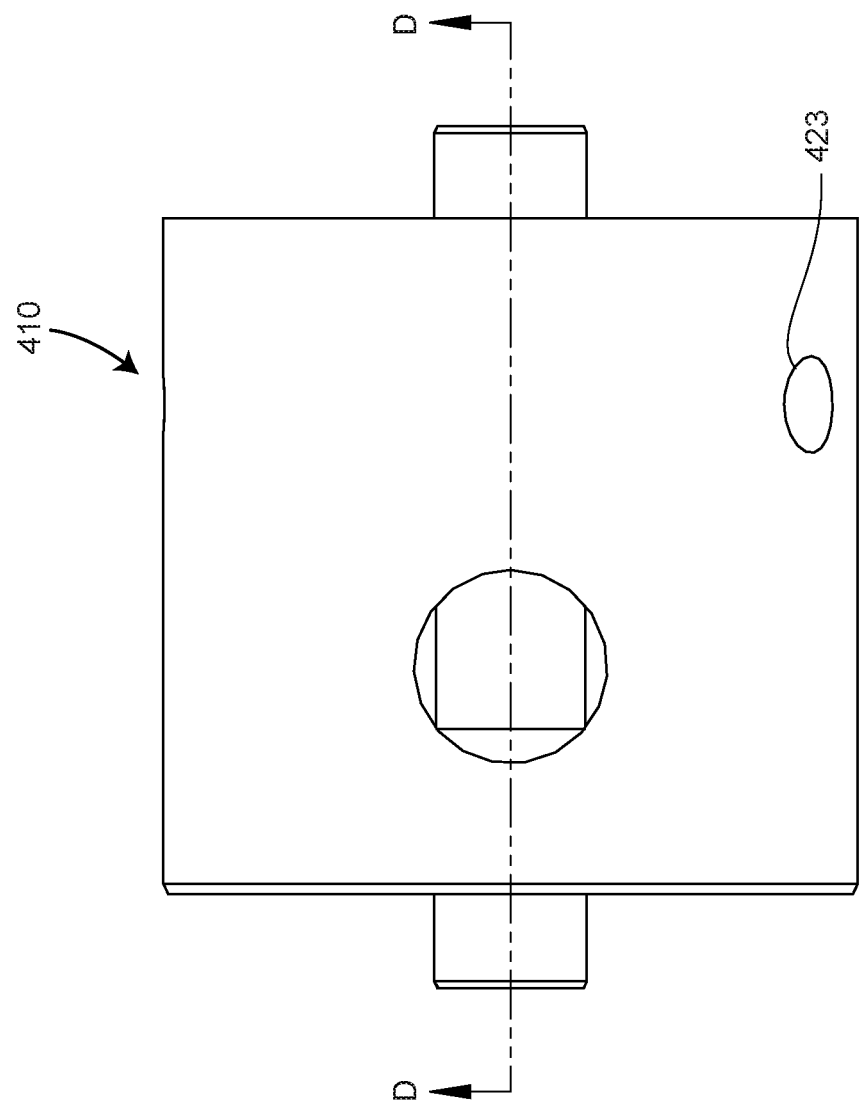
Figure 16D:
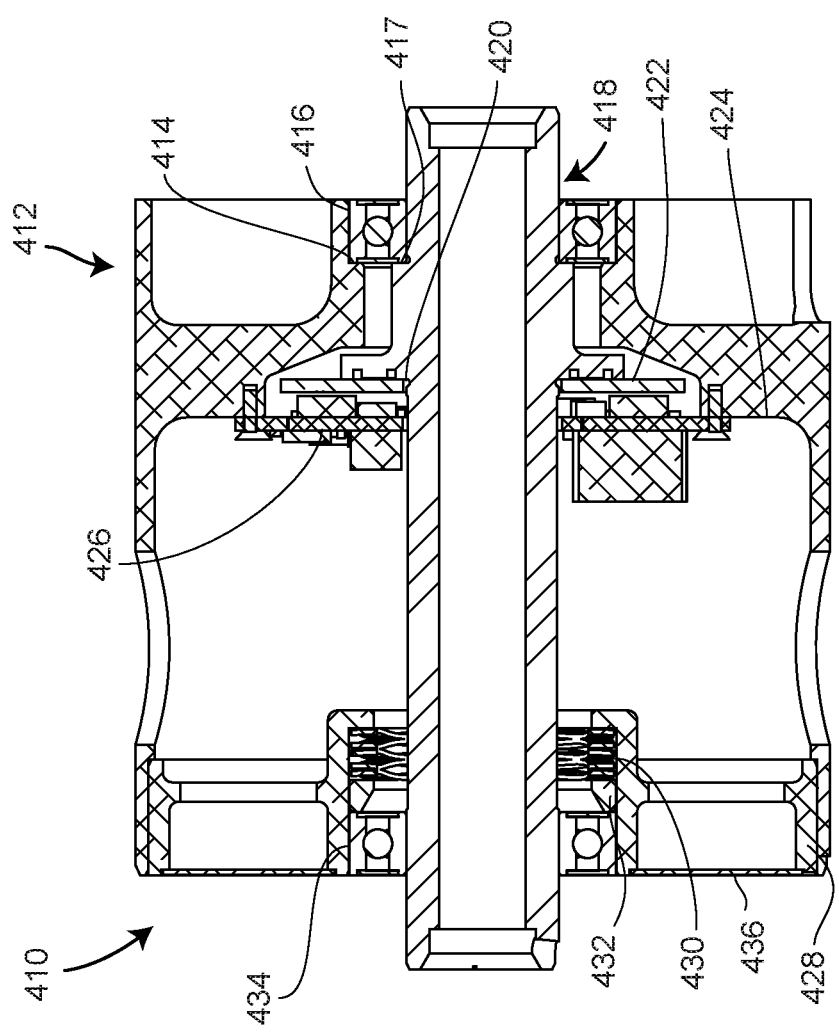

FIGS. 6A, 6B, 10, 11 show some external elements of the second-axis assembly 200, including first-segment yoke 260, second-axis cap 280, cable cover 274, and cable-track 278. The first-segment yoke 260 includes first-segment yoke beam 262, first-segment-yoke right bow 264, and first-segment-yoke left bow 266. FIGS. 12, 13 show some internal elements of the second-axis assembly 200, including the second-axis cartridge 210 and the counterbalance ring 240. In an embodiment, the second-axis assembly 200 provides a hinge-type rotation about a second axis 211. In an embodiment, the second-axis assembly 200 also includes the counterbalance ring 240 that provides a torque that lightens the downward force on arm segments held by an operator, thereby making it easier for an operator to support and maneuver the AACMM 10 in making measurements.

In an embodiment, the second-axis cartridge 210 includes a second-axis shaft 214, a left second-axis bearing 222, a second-axis housing 212, a second-axis disk mount 224, an encoder disk 226, an encoder board with read heads 228, a cartridge inner plate 216, a wave washer 217, a right second-axis bearing 218, and a lock nut 220. In an embodiment, the left second-axis bearing 222 is press fit onto both the second-axis shaft 214 and the second-axis housing 212. In an embodiment, the cartridge inner plate 216 is press fit to the second axis housing, and the inner race of the right second-axis bearing 218 is press fit onto the second-axis shaft 214. The wave washer 217 applies force to the outer race of the right second-axis bearing 218 but not to the inner race. The inner race of the right second-axis bearing is held in place with the lock nut 220. In an embodiment, the force applied by the wave washer 217 pushes the outer race of the right second-axis bearing 218 against a ball in the bearing 218, with a corresponding and oppositely directed force between applied to the ball by the inner race. The distance between the inner race of the bearing 218 and the inner race of the bearing 222 is set so that upon tightening the lock nut 220 into position, the inner race of bearing 222 pulls inward on the shaft, with an oppositely directed force applied to the ball by the outer race. The result of the application of these forces is a preloading similar to preloading of the bearings in the first-axis cartridge 130. Bearing lock set screws 232 are passed through outer access holes 234 and inner access holes 230, where the inner access holes 230 penetrate both cylindrical portions of the cartridge inner plate 216, enabling the bearing lock set screws 232 to hold rigidly fix the position of the outer race of the right second-axis bearing 218. Although the wave washer 217 applies a force to the outer race that establishes preload of the bearings in the second-axis cartridge 210, the wave washer 217 may be subject to vibration when the AACMM 10 is in use. Hence the bearing lock set screws provides a more stable locking into position of the outer race of the right second-axis bearing 218. In an embodiment, epoxy is further applied to the outer race to hold it in place.

In an embodiment, the second-axis disk mount 224 is press fit onto the second-axis shaft 214. The encoder disk 226 is glued and centered on the second axis 211 and allowed to cure. The encoder board with read heads 228 is centered on the encoder disk and affixed to the second-axis housing 212. In an embodiment, disk centering holes 236 in the second-axis housing 212 are used to assist in centering the encoder disk on the rotating shaft 214. A tool inserted through the disk centering holes 236 is used to move or nudge the encoder disk 226 in a direction to center it on the shaft. In an embodiment, the centering procedure is performed while slowly rotating the second-axis shaft 214 on a rotation fixture used in a manufacturing process. As the encoder disk 226 is slowly rotated, electrical signals generated by the rotation fixture indicate a direction in which the encoder disk 226 should be moved or nudged to center the encoder disk 226 on the second-axis shaft 214.

A wire-routing slot 215 (FIG. 12) is cut into the cartridge inner plate 216 to pass the busses 2182, 2184 through the second-axis cartridge 210. An anti-rotation pin 248 that is pressed into the second-axis housing 212 mates with first-segment yoke beam 262 shown in FIGS. 10, 11. The first-segment-yoke beam 262 attaches to the first-segment tube 290 of the first segment 295 as further shown in FIGS. 11, 14A, 14B, 14C, 14D, 14E. Hence the second-axis housing 212 rotates together with the first segment 295. The first-segment-yoke beam 262 further attaches to first-segment-yoke right bow 264 and first-segment-yoke left bow 266 as shown in FIG. 10. In an embodiment, a temperature sensor 288 is included adjacent to the first-segment yoke beam 262.

As shown in FIG. 12 and FIG. 13, the counterbalance ring 240 includes a torsion spring 242, spring retaining pins 244, threaded holes 247 to accept yoke locking screws, an anti-rotation threaded hole 249 to accept an anti-rotation set screw 249, and a tensioning set screw 246. Threaded holes 247 in the counterbalance ring 240 attach with yoke locking screws to holes 265 in first-segment yoke beam 262 shown in FIG. 14D. Likewise, the anti-rotation threaded hole 249 receives an anti-rotation set screw 269 to fix one side of the torsion spring 242 to a counterbalance ring cylinder 267 as shown in FIG. 11. Hence, the side of the torsion spring that includes the threaded hole 247 and the anti-rotation threaded hole 249 turns along with the first segment yoke beam and the first segment 295.

In contrast, the other side of the torsion spring is fixed to a spring tension plate 270 attached rigidly to the base 20, as shown in FIG. 11. A tensioning set screw 246 in FIGS. 11, 13 is brought into contact with a spring tension pin 245. A counterbalance ring bump 268 makes contact with a first-axis yoke bumper 198 when the first segment 295 is rotated as far as possible about the second axis 211 (FIG. 12) in one direction. At this position, the amount of force exerted by one side of the torsion spring 242 relative to the other side is determined by an adjustment of the tensioning set screw 246. As the first segment 295 is rotated to bring the counterbalance ring bump 258 farther from the first-axis yoke bumper 198, the amount of force exerted by the torsion spring 242 increases. The effect of the increase in the force as the first segment 295 is moved away from a vertical orientation is to apply an increasing force to the first segment 295, with the force directed opposite the direction of gravity. In this way, the arm segments are made to feel lighter and easier to handle to the user. Spring retaining pins 244 shown in FIGS. 11, 13 keep the torsion spring 242 centered within the spring tension plate 270.

As illustrated in FIG. 10 and FIG. 11, the second-axis shaft 214 is clamped between upper prongs of the first-axis yoke structure 194 and first-axis-yoke caps 197. Hence the second-axis shaft 214 is fixed in relation to the base 20. A first-axis yoke cover 195 is placed over a lower portion of the yoke structure 194 and locked into place with screws applied to first-axis-yoke-cover screw holes 196. Placed about each side of the first-axis yoke structure 194 (FIG. 7B) are a cable-track 278, a cable cover 274, and a second-axis cap 280. The second-axis cap 280 includes a cap body 281 and a cap snap connector 282, the cap snap connector 282 attaching to a cap snap receptacle 272 of the first-axis yoke cover 195. In an embodiment, the assembly includes two opposing second-axis caps 280, each having a cap snap connector 282 that couples with a respective cap snap receptacle 272. Wires routed from the base 20 pass through an opening in the cap snap receptacle 272 and through a cable-cover pass-through 275 of the cable cover 274. The wires are channeled by a cable-track plate 280 and through a cable-track window 279 of the cable track 279. The wires pass through a first-segment-yoke cable hole 263. The wires that pass through the first-segment-yoke cable hole 263 may pass directly into the first-segment tube 290 or through the wire-routing slot 215 to the encoder board connector 2174 (FIG. 3) before passing back through the wire-routing slot 215 into the first-segment tube, as shown in FIGS. 10, 14E. In an embodiment, wires of the first bus 2182 (FIG. 4A) pass through the first-segment yoke-cable hole 263 on one side of the first-segment-yoke beam 262 while the wires of the second bus 2184 pass through the first-segment yoke-cable hole 263 on the other side. In an embodiment, the cable-track 278 and the cable cover 274 are attached to the second-axis shaft 214 with a screw that passes through a cable-cover screw hole 276. In an embodiment, each second-axis cap 280 is snapped onto a corresponding cable cover 274.

FIGS. 14A, 14B, 14C, 14D, 14E illustrate the first-segment-yoke beam 262, the first segment 295, the third-axis assembly 300, and the fourth-axis assembly 400. The section view of FIG. 14E shows that the first-segment-yoke beam 262 attaches inside the first-segment tube 290. FIG. 14B shows a conductive grounding ring 292 that provides grounding between the first-segment-yoke beam 262 and the first segment tube 290, thereby improving electrical reliability and performance of the AACMM 10. Likewise, a conductive grounding ring 308 provides grounding between the cartridge adapter 302 and the first-segment tube 290. In an embodiment, the first-segment tube 290 is made of a carbon-fiber composite material.

The wires of the first bus 2182 and the second bus 2184 (FIG. 4A) are routed through the first-segment-yoke cable hole 263 as described herein above. The bus wires 2182, 2184 continue as cables 342 to pass through the third/fifth-axis slip ring 340, which is a part of the third/fifth cartridge 310. The term third/fifth-axis slip ring indicates that the same slip-ring assembly 340 is used in both the third-axis assembly 300 and in the fifth-axis assembly 500 (FIG. 1). The term third/fifth cartridge indicates that the same cartridge assembly 310 is used in both the third-axis assembly 300 and the fifth-axis assembly 500. The cartridge adapter 302 is a common component of the third-axis assembly 300 and the fourth-axis assembly 400 since these axis assemblies house the third/fifth-axis cartridge 310 and the fourth/sixth-axis cartridge 410, respectively. The third-axis assembly 300 provides rotation of the cartridge adapter 302 about a third axis 311 shown in FIG. 14D. The fourth-axis assembly 400 provides rotation of fourth/sixth-axis shaft 418 about a fourth axis 411 shown in FIG. 14C.

The third/fifth-axis cartridge 310 illustrated in FIGS. 14E, 15A, 15B, 15C, 15D includes an encoder board with read heads 326, an encoder disk 322, an upper bearing 320, a preload bearing spacer 318, a wave washer 316, a third/fifth-axis housing 312, a lower bearing 330, a third/fifth-axis shaft 332, and the third/fifth-axis slip ring 340 with cables 342. The third/fifth-axis shaft 332 rotates relative to the third/fifth-axis housing 312.

In an embodiment, the third/fifth-axis shaft 332 is press fit against an inner race of the upper bearing 320. The wave washer 316 is placed against a housing upper ledge 314. The preload bearing spacer 318 sits between the wave washer 316 and an outer race of the upper bearing 320. The spring action of the wave washer 316 acts to push the outer race of the upper bearing 320 against a ball in the upper bearing 320. In reaction, the inner race of the upper bearing 320 pushes oppositely against the ball in the upper bearing 320. The wave washer 316 also pushes downward on the housing lower ledge 314, thereby pushing the outer race of the lower bearing 330 against the ball in the lower bearing 330. In response, the inner bearing presses oppositely against a ball in the lower bearing 330. In this way, a preload is applied to the bearings 320, 330 in the third/fifth axis cartridge 310. In an embodiment, the encoder disk 322 is glued to the third/fifth-axis shaft 332, centered on the shaft 332, and cured in place. The encoder board with read heads 326 is pinned in place with the pin 324.

The fourth/sixth-axis cartridge 410 illustrated in FIGS. 16A, 16B, 16C, 16D includes a fourth/sixth-axis bearing 416 located the encoder side, a fourth/sixth-axis housing 412, a fourth/sixth-axis shaft 418, an encoder disk 422, an encoder board with read heads 426, a drum flexure 428, a wave washer 430, a preload bearing spacer 432, a fourth/sixth-axis bearing 434 located on the spring side, and a protective cover 436. The fourth/sixth-axis shaft 418 rotates relative to the fourth/sixth-axis housing 412. In an embodiment, the fourth/sixth-axis cartridge 410 does not include a slip ring but rather provides routing for the wires through as described herein below with respect to FIGS. 16E, 16F, 16G, 16H. In an embodiment a slip ring is not used on those second-axis assembly 200, the third-axis assembly 400, or the sixth-axis assembly 600 because the total amount of rotation is limited by the hinge movement of these assemblies.

In an embodiment, with the wave washer 430 and the preload bearing spacer 432 held in place by the drum flexure 428, the inner race of the fourth/sixth-axis bearing 434 is press fit to the fourth/sixth-axis shaft 418, while the inner race of the fourth/sixth-axis bearing 416 is press fit against the shaft 418 and benched against the shaft first ledge 417. The force applied by the wave washer 430 and preload bearing spacer 432 pushes the outer race of the bearing 434 against a ball in the bearing 434, and a counter force presses the inner race of the bearing 434 in an opposing direction against the ball in the bearing 434. At the same time, the forces on the bearing 434 pull the outer race of the bearing 416 against a housing first ledge 414. This combination of actions provides preloads for the bearings 416, 434. In an embodiment, the encoder disk 422 is glued to the housing second ledge 424, after which it is centered on the fourth/sixth-axis shaft 418 and cured in place. In an embodiment, the encoder board with read heads 426 is attached to the fourth/sixth-axis housing 412. In an embodiment, centering of the encoder disk 422 about the fourth/sixth-axis shaft 418 is facility by moving or nudging the encoder disk with a tool placed through one or more encoder-adjustment holes 423 in the fourth/sixth-axis housing 412.

FIGS. 16E, 16F show the AACMM 10 including the first segment 295, second segment 595, and cartridge adapter 302. The cartridge adapter 302 includes a top-bumper opening 1616 that accommodates a top bumper 1602 as shown in FIGS. 16G, 16H. The encoder board with read heads 326 (FIG. 15B) is visible through the top-bumper opening 1616. An encoder connector 1612 and a temperature-sensor connector 1614 are attached to the encoder board 326. A cable (not shown) attaches the temperature-sensor assembly 350 and temperature sensor connector 1610 to the temperature sensor connector 1614. The temperature-sensor assembly 2350 shown in FIG. 14B includes a temperature sensor 352, thermal putty 354, and screw 356. Readings from the temperature sensor are sent through the encoder board 326 (FIG. 15B) to the encoder connector 1612 where they are transferred to the first bus 2154 (FIG. 3). The cables 342 (FIG. 14B), which include the first bus 2154 and the second bus 2156, pass from the third/fifth-axis slip ring 340 (FIG. 14B) through a hole in the encoder board 326. The cable wires in the first bus 2154 attach to the encoder connector 1612, which in an embodiment is a T-connector, and continue on through the encoder-access hole 1606. The first housing hole 413 in the fourth/sixth-axis housing of FIG. 16B is aligned with the encoder-access hole 1606, thereby enabling the cable wires in the first bus 2154 to pass through the holes 1606 and 413 before attaching to a connector on the encoder board with read heads 426. The wires of the first bus 2154 pass back through the encoder-access hole 1606. The wires of the first bus 2154 and the second bus 2156 travel through the exit hole 1608, as may be seen from a different perspective in FIG. 16H.

FIGS. 16G, 16H show that the fifth-axis yoke/receptacle 502 and the first-axis-yoke cap 1628 clamp to the fourth/sixth-axis shaft 418 (FIG. 16B). Cable wires passing through the exit hole 1608 make one-and-a-half-turn cable loop 1618 traveling through a channel 1622 by passing through a channel loop hole 1624 before passing through a channel exit hole 1626 to enter the fifth-axis assembly 500. Side bumpers 1604 (FIG. 16F) are placed over some elements as shown in FIG. 16H.

Figure 17C:
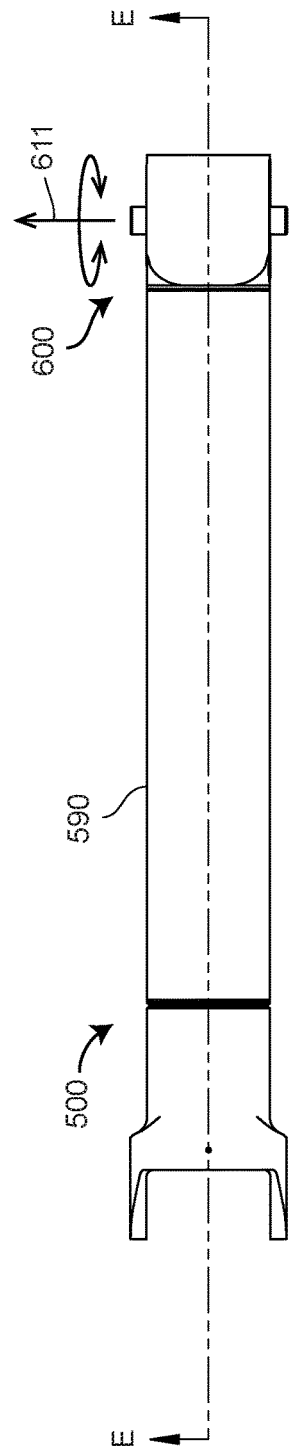
Figure 17D:
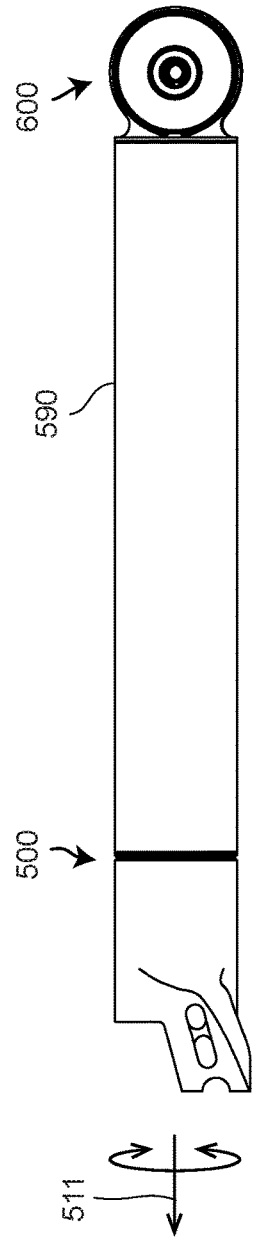
Figure 17E:
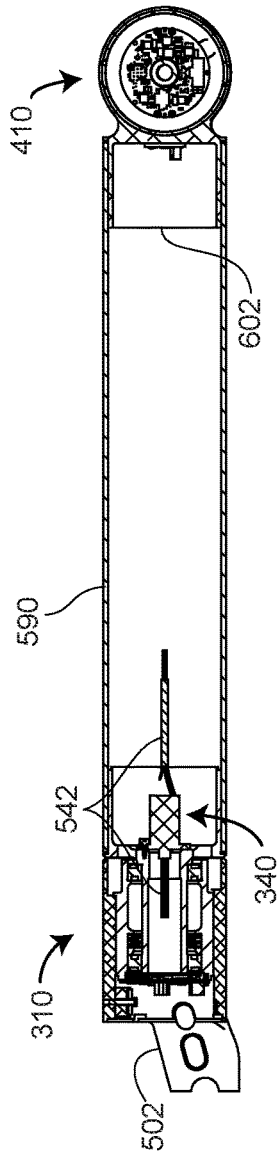

FIGS. 17A, 17B, 17C, 17D, 17E illustrate the fifth-axis assembly 500, the second segment 595, and the sixth-axis assembly 600. The fifth-axis assembly 500 includes a temperature-sensor assembly 550, a fifth-axis yoke/receptacle 502, a third/fifth-axis cartridge 310, and a conductive grounding ring 508. The second segment 595 includes a second-segment tube 590. The sixth-axis assembly includes a temperature-sensor assembly 650, a fourth/sixth-axis cartridge receptacle 606, and a cartridge adapter 602. As shown in FIGS. 17B, 17E, the third/fifth-axis cartridge 310 attaches to the inner portion of the second-segment tube 590, which in an embodiment is hollow. In an embodiment, another part of the third/fifth-axis cartridge 310 fits in the fifth-axis yoke/receptacle 502. In an embodiment, the temperature-sensor assembly 550 includes a temperature sensor 552, thermal putty 554, and a metal contact 556 that holds the temperature sensor 552 in place. In an embodiment, the third/fifth-axis cartridge 310 includes the elements described in FIGS. 15A, 15B, 15C, 15D, including the third/fifth-axis slip ring 340 and corresponding cables 542. The conductive grounding ring 508 provides electrical continuity between the cartridge 310 and the second-segment tube 590, which in an embodiment is made of carbon-fiber composite.

As shown in FIGS. 17B, 17E, the fourth/sixth-axis cartridge 410 fits inside the sixth-axis cartridge receptacle 606, which in turn attaches to the inside of the second-segment tube 590. In an embodiment, the temperature-sensor assembly 650 includes a temperature sensor 652 and thermal putty 654. In an embodiment, the fourth/sixth-axis cartridge 410 includes the elements described in FIGS. 16A, 16B, 16C, 16D. The conductive grounding ring 592 provides electrical continuity between the cartridge 310 and the second-segment tube 590. In an embodiment illustrated in FIG. 17D, the fifth-axis assembly 500 provides for swivel rotation about a fifth-axis 511. As illustrated in FIG. 17C, the sixth-axis assembly 600 provides for a hinge rotation of the fourth/sixth-axis shaft 418 (FIG. 16B) in the sixth-axis assembly 600 about the sixth-axis 611.

Figure 18A:
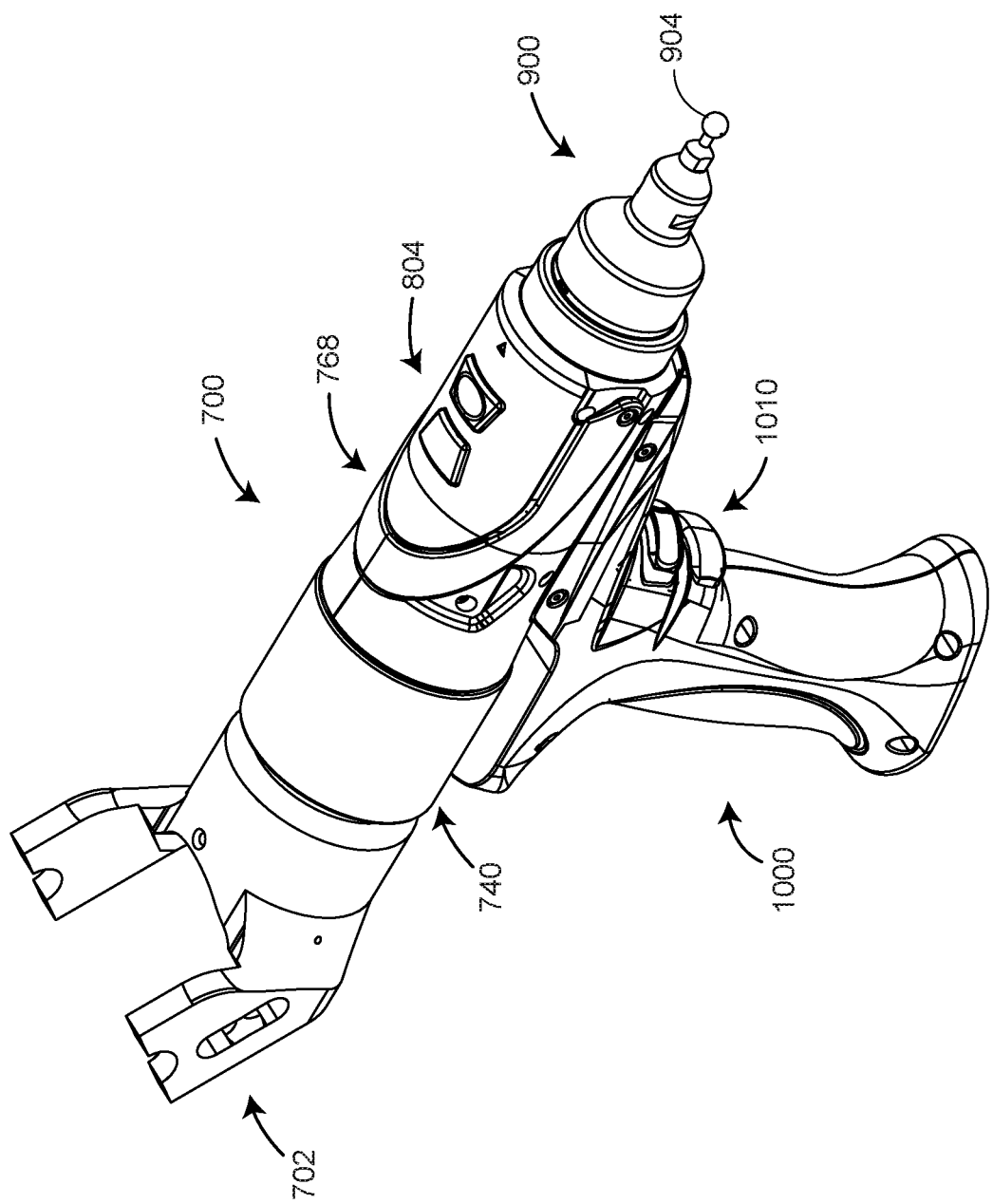
FIG. 18A is an isometric view of a seventh-axis assembly including a removable handle according to an embodiment of the present invention.

In an embodiment, the AACMM 10 includes seven rotation axes, as illustrated beginning with FIG. 18A. In another embodiment, the AACMM 10 includes six rotation axes, as illustrated beginning with FIG. 25A. In an embodiment illustrated in FIGS. 18A, 18B, 19A, 19B, 19C, 19D, 19E, 19F, 19G, 19H, 20A, the seventh-axis assembly includes a seventh-axis housing/yoke 702, a shaft 750, a seventh-axis slip ring 710, a probe latch 768, upper end-effector buttons 804, a seventh-axis circuit board 820, and a carrier 770. In an embodiment, the seventh-axis housing/yoke 702 attaches at one end to the fourth/sixth-axis shaft 418 (FIG. 16B) of the six-axis assembly 600. In this attachment, the seventh-axis housing/yoke 702 serves a yoke function. The seventh-axis housing/yoke 702 couples to outer races of a rear bearing 732 and to the outer races of a front bearing 736. The shaft 750 couples to inner races of the rear bearing 732 and the front bearing 736. In an embodiment, the shaft 750 rotates about a seventh axis 711 relative to the housing/yoke 702. In an embodiment, a wave washer 734 applies force to the outer race of the rear bearing 732. The inner race of the rear bearing 732 is press fit onto the shaft 750. This results in preload being applied to both the rear bearing 732 and the front bearing 736.

In an embodiment, the encoder disk 724 is glued to the shaft 750, centered, and allowed to cure. An encoder board with read heads 722 is attached to a read-head adapter 720, which in turn is attached to the housing/yoke 702. A seventh-axis slip ring 710 includes a slip-ring housing 712, a slip-ring shaft 714, a slip-ring flange 716, a front slip-ring cable 718, a rear slip-ring cable 717, bus connectors 719 attached to the rear slip-ring cable 717, and bus connectors 839 attached to the front slip-ring cable 718. In an embodiment, the slip-ring flange 716 is attached to an adapter plate 704 that is coupled to the yoke/housing 702. The slip-ring shaft 714 rotates independently of the slip-ring housing 712 and turns in response to force applied by wires that twist as the shaft rotates about the seventh axis 711. The seventh-axis slip ring 710 maintains electrical continuity among corresponding wires in the front slip-ring cable 718 and the rear slip-ring cable 717 even as the slip-ring shaft 714 rotates relative to the slip-ring housing 712. In an embodiment, each of the rear slip-ring cable 717 and the front slip-ring cable 718 include wires of the first bus 2182 and the second bus 2184. A T-connector 2152 associated with a T-cable 2154 of the first bus 2182 attaches to a board connector 2174 of the encoder board with read heads 722.

The nut assembly 740 surrounds the housing/yoke 702 and the shaft 750 at a central portion of the seventh-axis assembly 700. As shown in FIGS. 23A, 23B, 23C, 23D, the nut assembly 740 includes a clutch nut 741, a clutch flexure 744, a nut cover 747 and snap rings 749. In an embodiment, the clutch flexure 744 attaches to the clutch nut 741 in two parts, with each part having flexure ridges 745 that fit into clutch nut grooves 743. As shown in FIG. 23C, a rear portion of the clutch nut 741 fits into the nut cover 747 and is locked into place with the two snap rings 749. A front portion of the clutch nut 741 includes a clutch nut flange 742 having an inner clutch-nut threaded region 739. As is shown in FIG. 19F, the clutch-nut threaded region 739 screws onto a threaded region 751 of the shaft 750. The clutch nut flange 742 is coupled to a push shoe 802 shown in FIGS. 18B, 19F. The purpose of the push shoe 802 is to either engage or release the removable seventh-axis cover 800, the handle 1000 (FIG. 18A), the LLP 1100 (FIG. 24A), or any other accessory attached to the seventh-axis assembly 700 in place of the seventh-axis cover 800. The nut assembly 740 provides a way of engaging or releasing the push shoe 802 while applying a consistent level of force to internal elements within the seventh-axis assembly 700. The result of this consistent level of force by the nut assembly 700 is to enable tactile probes and accessory measuring devices to be attached to the seventh-axis assembly 700 with a greater degree of consistency than would otherwise occur. In an embodiment, the nut assembly 740 reduces or eliminates the need to perform a compensation (also referred to as a calibration) on the tactile probe or other measuring device. The behavior of the nut assembly 740 is discussed further herein below after tactile probes and other measuring devices have been discussed.

Figure 18B:
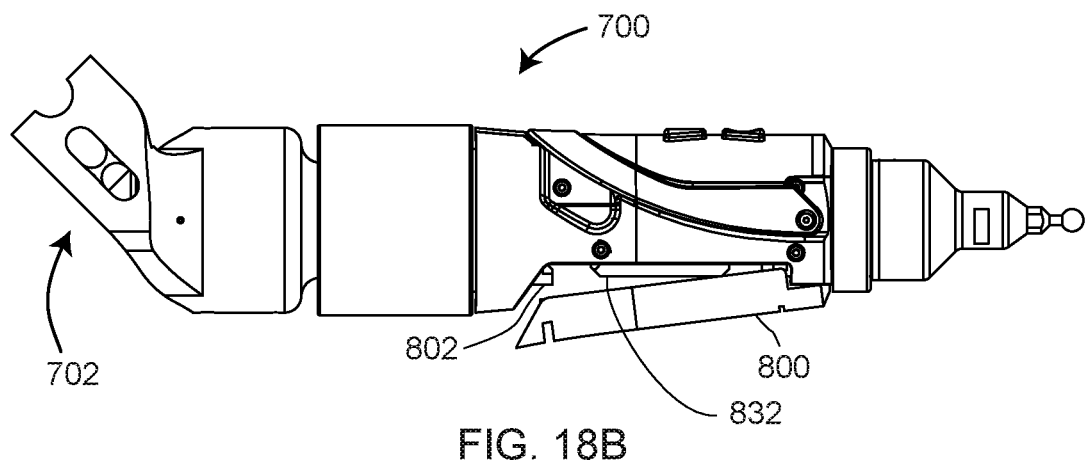
FIG. 18B is a side view of a seventh-axis assembly including a removable seventh-axis cover according to an embodiment of the present invention.
Figure 19H:
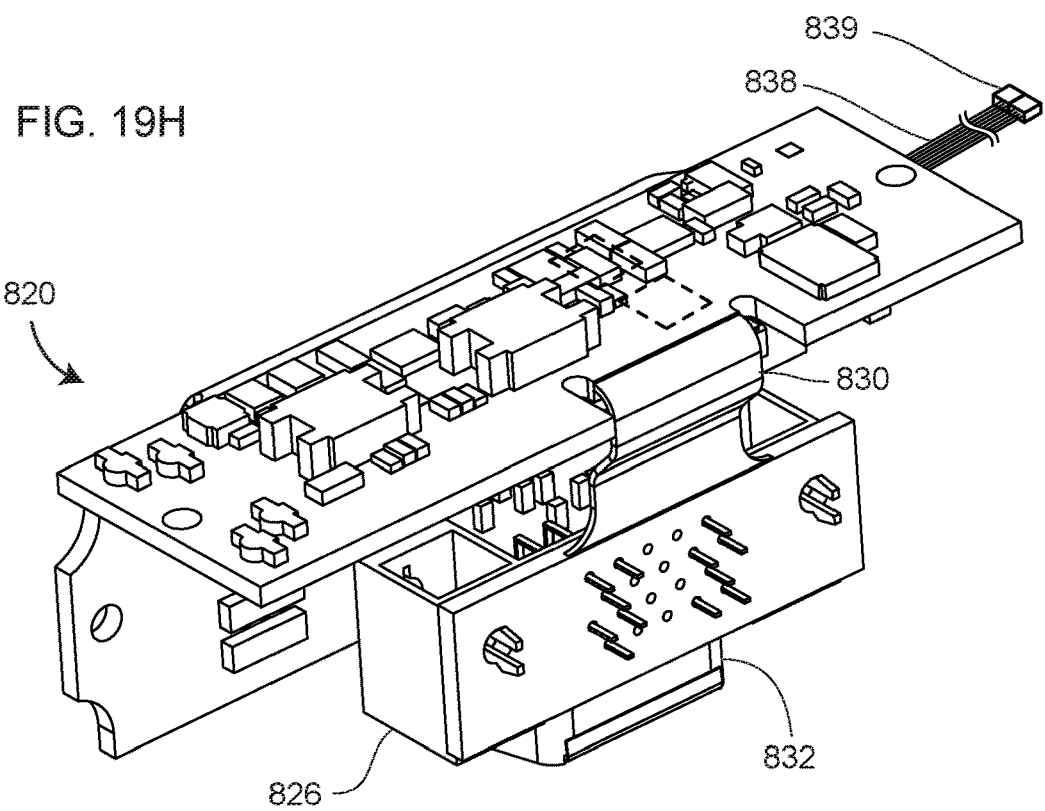

A seventh-axis circuit board 820 is shown in FIGS. 19G, 19H. In an embodiment, the seventh-axis circuit board 820 includes a left circuit board 824, an upper circuit board 822, and a right circuit board 826. In an embodiment, these three circuit boards are electrically and mechanically connected by a first flex connector 828 and a second flex connector 830. In an embodiment illustrated in FIG. 20A, the seventh-axis circuit board 820 wraps around a shaft circuit-board support 752. In an embodiment, the seventh-axis circuit board 820 further includes an arm-to-handle connector 832, which may be seen in FIGS. 18B, 19H. When a handle 1000 (FIG. 18A) or an LLP 1100 (FIG. 24A) is attached to the seventh-axis assembly 700, the arm-to-handle connector 832 makes electrical connection with the handle-to-arm connector 1022 (FIG. 24A) of the handle 1000 or the LLP 1100. In an embodiment, an arm-end processor 2220 (FIGS. 5, 19G) is included on the seventh-axis circuit board 820. Also included on the seventh-axis circuit board 820 are mechanical actuators 834 that respond to actuation or presses by an operator of upper end-effector buttons 804 shown in FIGS. 19B, 19D, 19E, 19F. The hard-probe assembly 900 is one type of tactile probe. Other types of tactile probes are discussed herein below.

FIG. 19A shows a hard-probe assembly 900 coupled to the seventh-axis assembly 700. FIG. 19B shows the hard-probe assembly 900 released from the seventh-axis assembly 700. In an embodiment, the release is obtained by moving a probe latch 768 to release a pull stud 938 of the hard-probe assembly 900. The hard-probe assembly 900 includes a probe tip 904 that an operator holds in contact with an object to be measured. When a designated upper end-effector button 804 is pressed, the encoders in the seven-axis assemblies 100, 200, 300, 400, 500, 600, 700 send synchronized encoder readings to the base processor electronics 2040, the encoder readings being synchronized to the capture signal generated by the trigger and capture circuit 2058 of the base processor electronics 2040. These encoder readings are combined with other recorded characteristics of the AACMM 10 to calculate 3D coordinates corresponding to a center of the probe tip 904. By measuring a number of points on the surface of an object with the probe tip 904, and by knowing the radius of the probe tip, the 3D coordinates of the object surface can be determined.

Figure 20A:
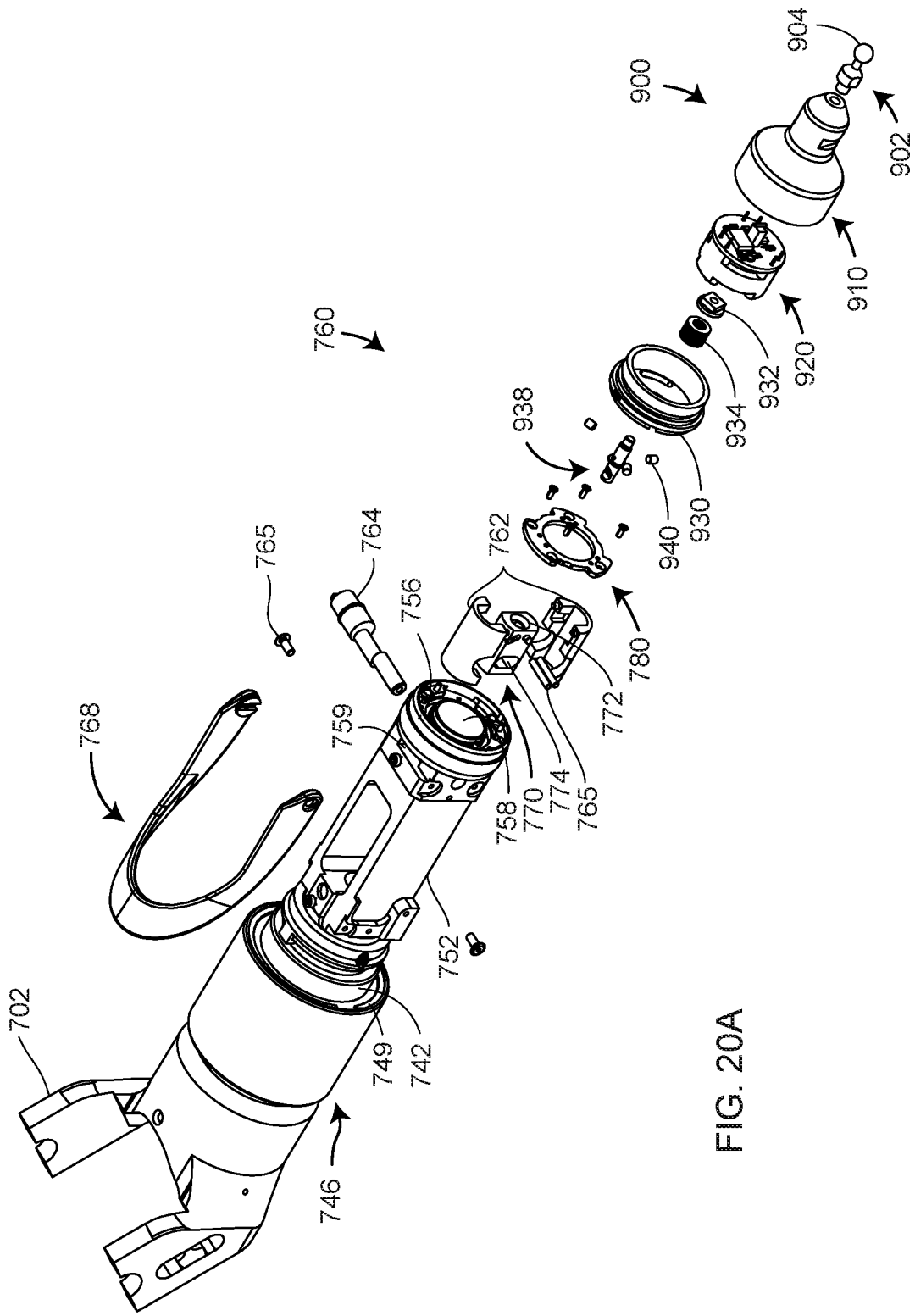
FIG. 20A is an exploded view of a seventh-axis assembly according to an embodiment of the present invention.
Figure 21A:
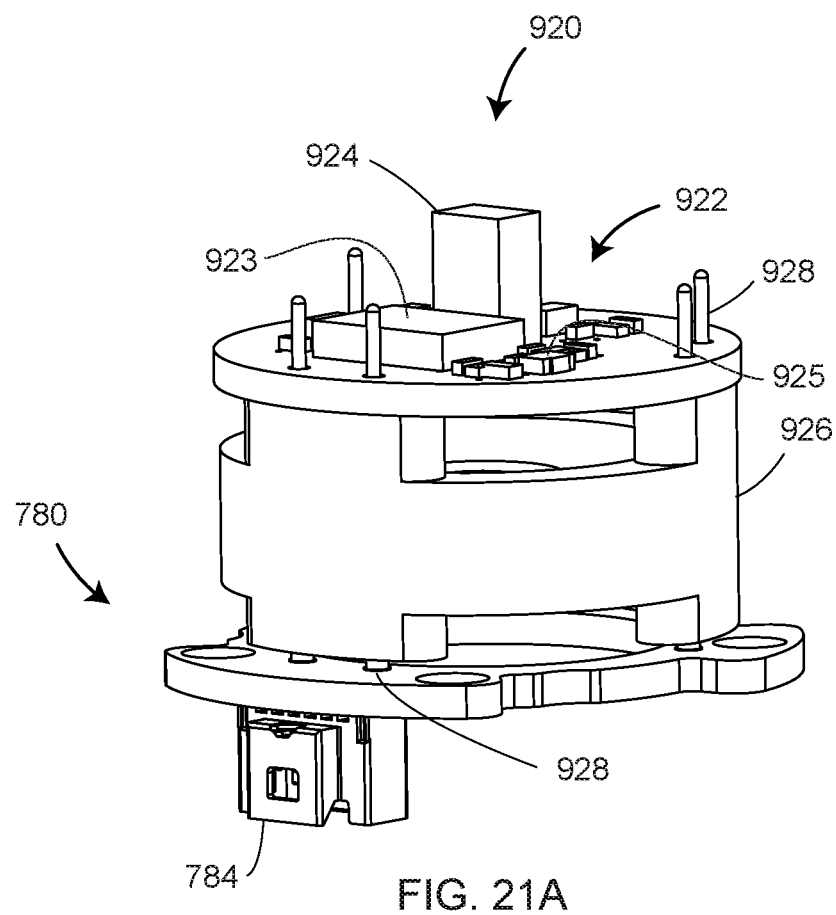
FIG. 21A is an isometric view of a probe electrical interface and a probe interface board according to an embodiment of the present invention.
Figure 21B:
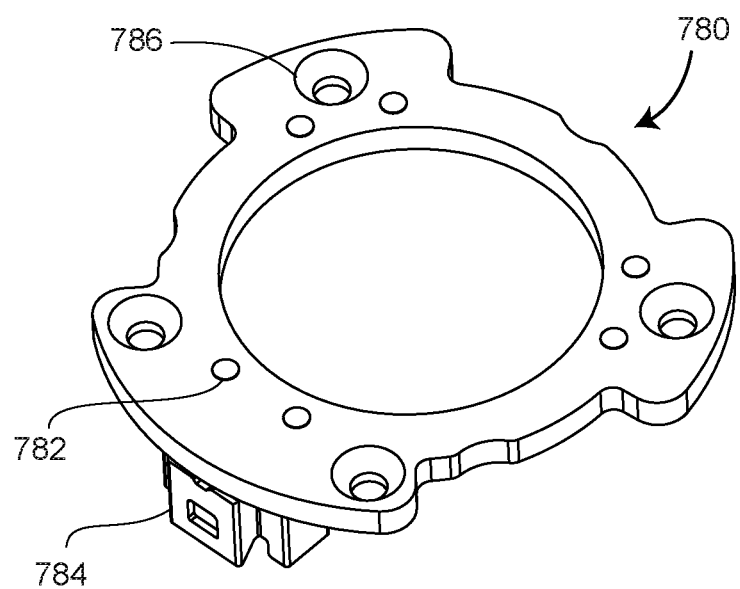
FIG. 21B is an isometric view of a probe interface board according to an embodiment of the present invention.
Figure 22E:
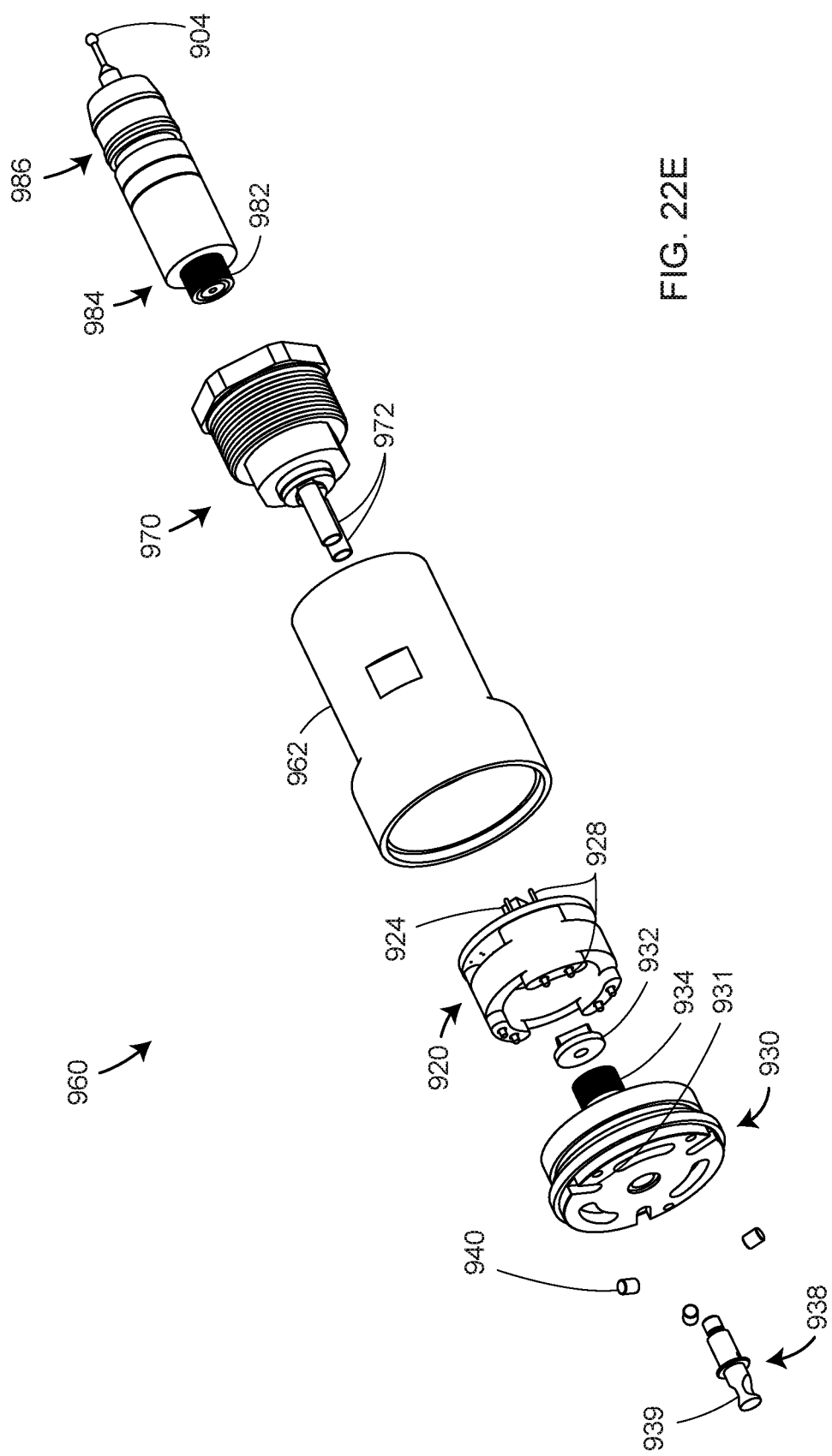

FIG. 19F shows a section view of the probe latch 768, which includes a magnet 1226, also shown in FIG. 19D. The magnet 1226 is attracted to the magnet 1227 embedded in the cover 801. The magnets 1226, 1227 hold the probe latch 768 against the cover 801 unless pulled away from the cover 801 by an operator. Ends of the probe latch 768 are attached to a camshaft 764 (FIG. 20A) by camshaft fasteners 765. The camshaft 766 passes through a camshaft hole 774 of the carrier 770 as illustrated in FIGS. 19F, 20A. The carrier 770 is surrounded by two guides 762 that slide, together with the carrier 770, into a guide cavity 758 shown in FIGS. 19C, 20A, 25A. Outside the guide cavity 758, there are three pairs of kinematic balls 756 and three alignment pins 757. The three pairs of kinematic balls 756 are brought into contact with three kinematic cylinders 940. The resulting contact between the kinematic cylinders 940 and the kinematic balls 756 ensures that the hard probe 900 may be removed and repositioned repeatably. The three kinematic cylinders 940 fit into kinematic cylinder sockets 931 as shown in FIG. 22E. The three alignment pins 757 are positioned to ensure that each of the kinematic cylinders 940 is matched to the corresponding pair of kinematic balls 756. The alignment pins 757 fit loosely into alignment holes 941 (FIG. 22C) without touching the sides of the alignment holes 941. A probe interface board 780 shown in FIGS. 20A, 21B is attached by screw holes 786 to the front of the seventh-axis assembly 700. The probe interface board 780 includes electrical contact pads 782 that make electrical contact with spring loaded pins 928 in the probe electrical interface 920 shown in FIG. 21A. Electrical signals are routed through the probe interface board 780 to a connector adapter 784 shown in FIGS. 19F, 21B. A space for the connector adapter 784 is provided in the connector cutout 759 of FIG. 20A.

Figure 20B:
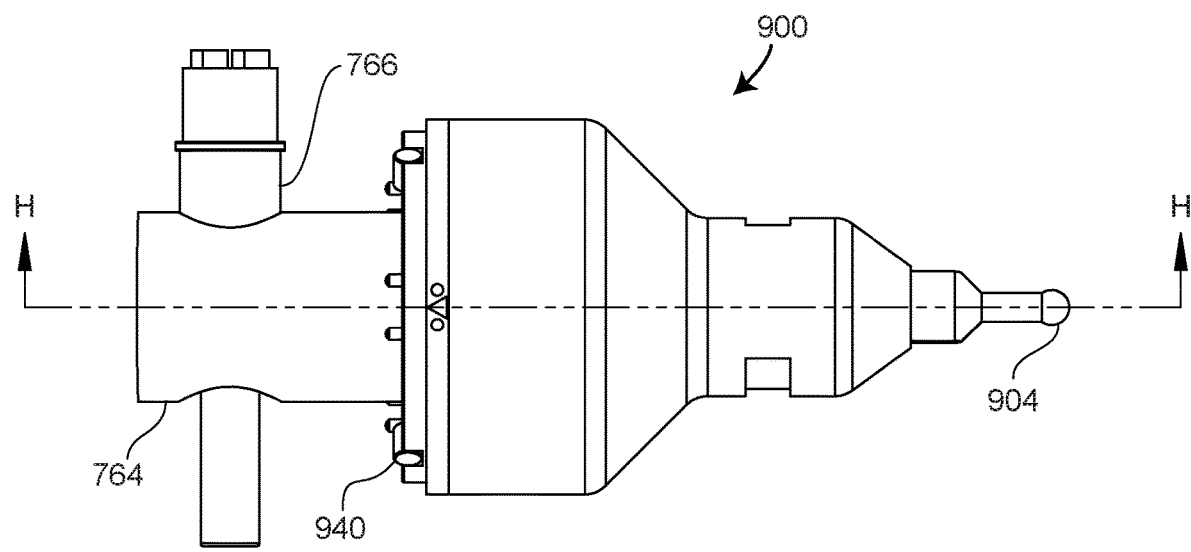
FIGS. 20B, 20C are top and section views, respectively, of a tactile probe assembly and coupling elements in an open position according to an embodiment of the present invention.
Figure 20C:
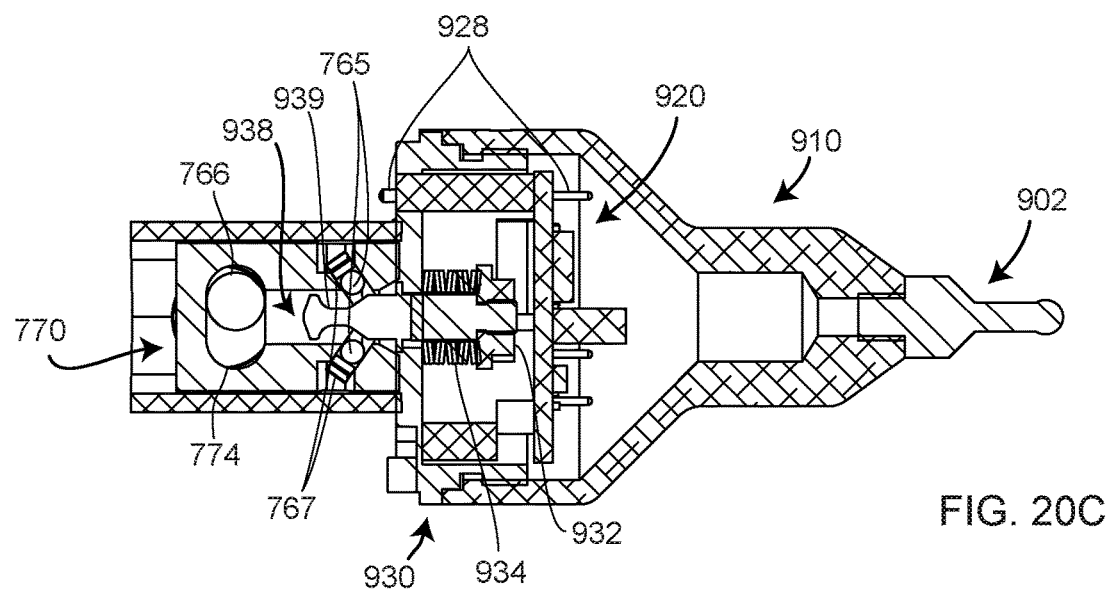
Figure 20D:
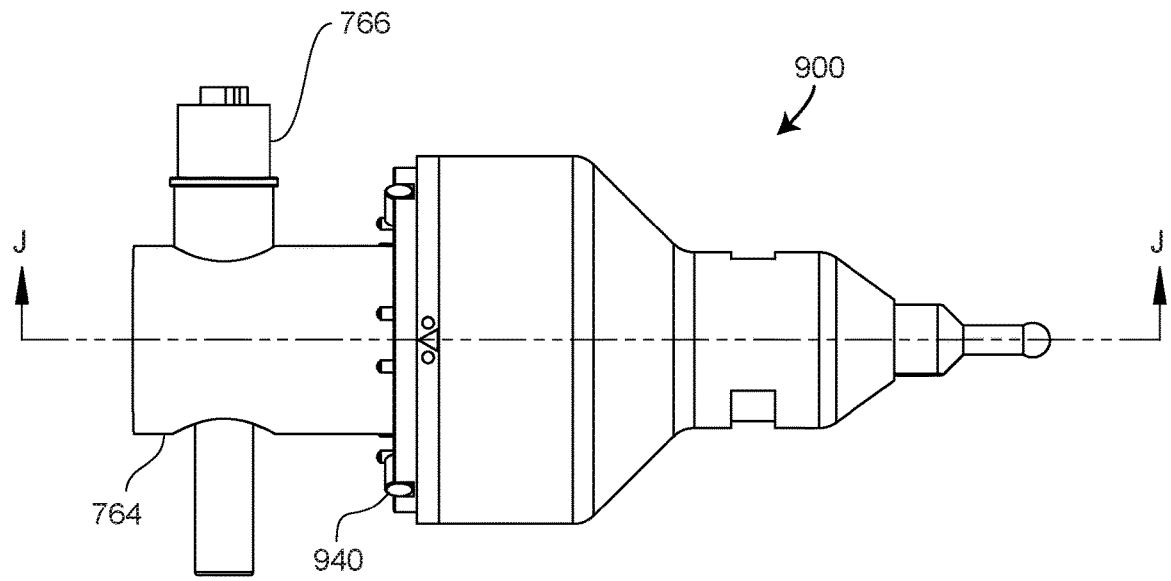
FIGS. 20D, 20E are top and section views, respectively, of a tactile probe assembly and coupling elements in an closed position according to an embodiment of the present invention.
Figure 20E:
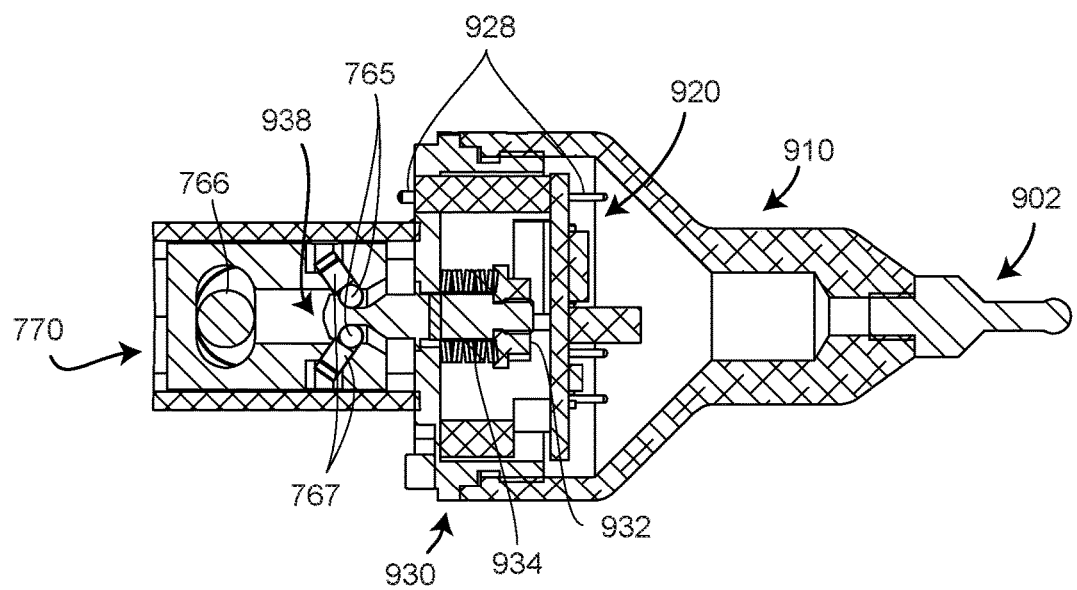

In the carrier 770, an adapter hole 772 is sized to accept the pull stud 938. When the probe latch 768 is lifted away from the cover 801, the pull stud 938 is released, enabling the hard-probe assembly 900 to be freely moved away from the seventh-axis assembly 700. When the probe latch 768 is moved to contact the cover 801, the pull stud 938 is held firmly in place within the adapter hole 772. The open (released) and locked cases are illustrated in FIGS. 20B, 20C, 20D, 20E. FIGS. 20B, 20C illustrate a position of the components in which the hard-probe assembly 900 is not locked in place against the seventh-axis assembly 700. In this position, the camshaft 766 moves the carrier 770 toward the front of the seventh-axis assembly 700. This causes leaf springs 767 to collapse, removing force from preload pins 765. In this state, the pull stud 938 is not constrained. FIGS. 20D, 20E illustrate a position of the components in which the hard-probe assembly 900 is locked in place with the hard-probe assembly 900 held firmly against the seventh-axis assembly 700. In this position, the camshaft 766 moves the carrier 770 away from the front of the seventh-axis assembly 700. This causes the leaf springs 767 to expand, pressing the preload pins 765 into a pull stud notch 939 of the pull stud 938.

The removable seventh-axis cover 800 is held in place when the push shoe 802 and the clutch nut 741 are screwed forward on the threaded region 751 of the shaft 750. At a predetermined position of the clutch nut 741 and push shoe 802, the force applied to the cantilevered lip 746 by the nut cover teeth 748 exceeds the amount of force needed to skip over or move past the lips 746, which terminates tightening of the clutch nut on the threaded shaft. At this point, a clicking sound is heard as the nut cover 747 is turned, but no additional tightening is obtained. Loosening of the removable seventh-axis cover 800 happens when the push shoe 802 is retracted. This loosening is possible by reversing the direction of rotation of the nut cover. The cantilevered lips 746 engage the nut cover 747 in the reverse direction, which firmly engages undersides of the cantilevered lips 746 and permits loosening of the removable seventh-axis cover 800.

Figure 20F:
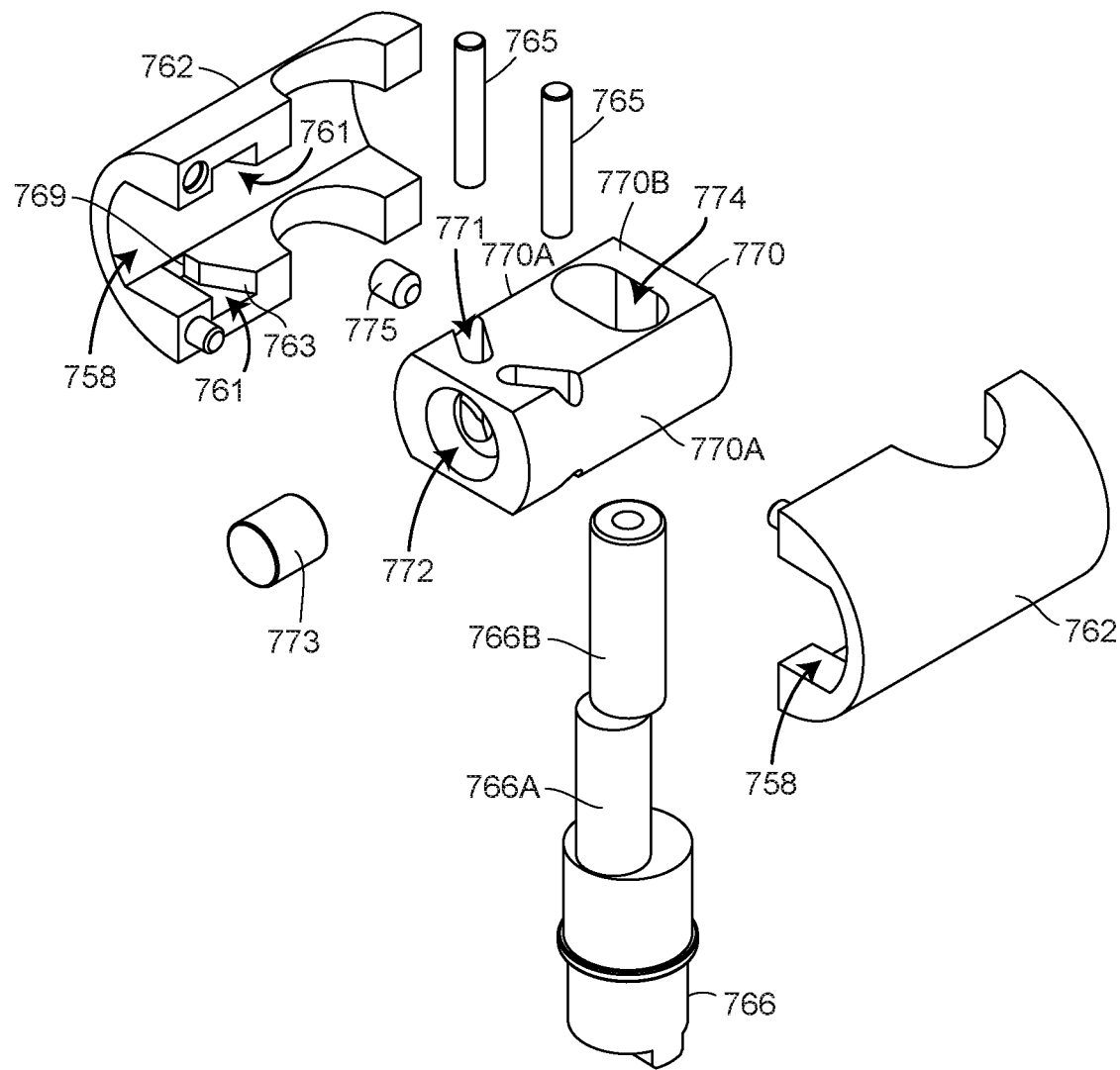
FIGS. 20F, 20G, 20H are various views of a tactile probe assembly and coupling elements according to another embodiment of the present invention.
Figure 20G:
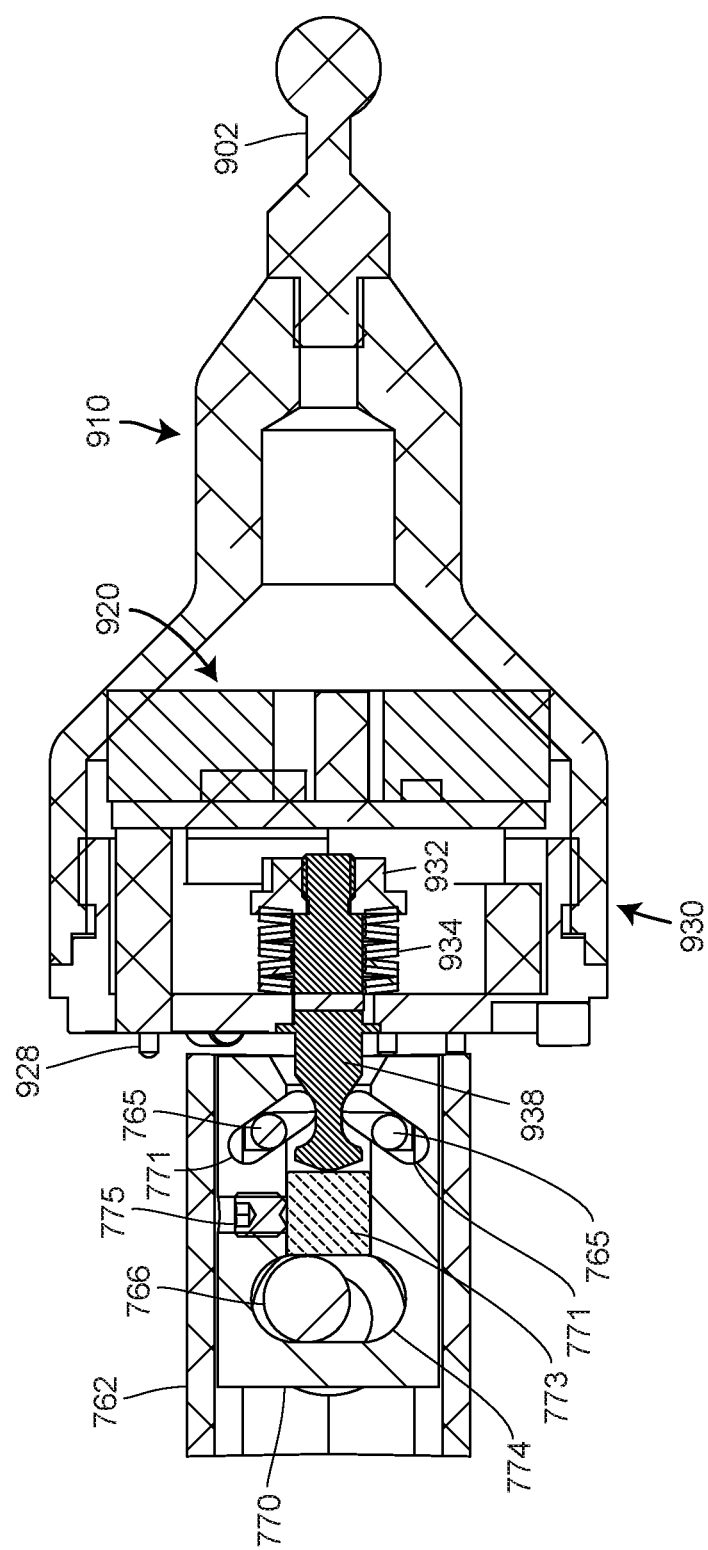
Figure 20H:
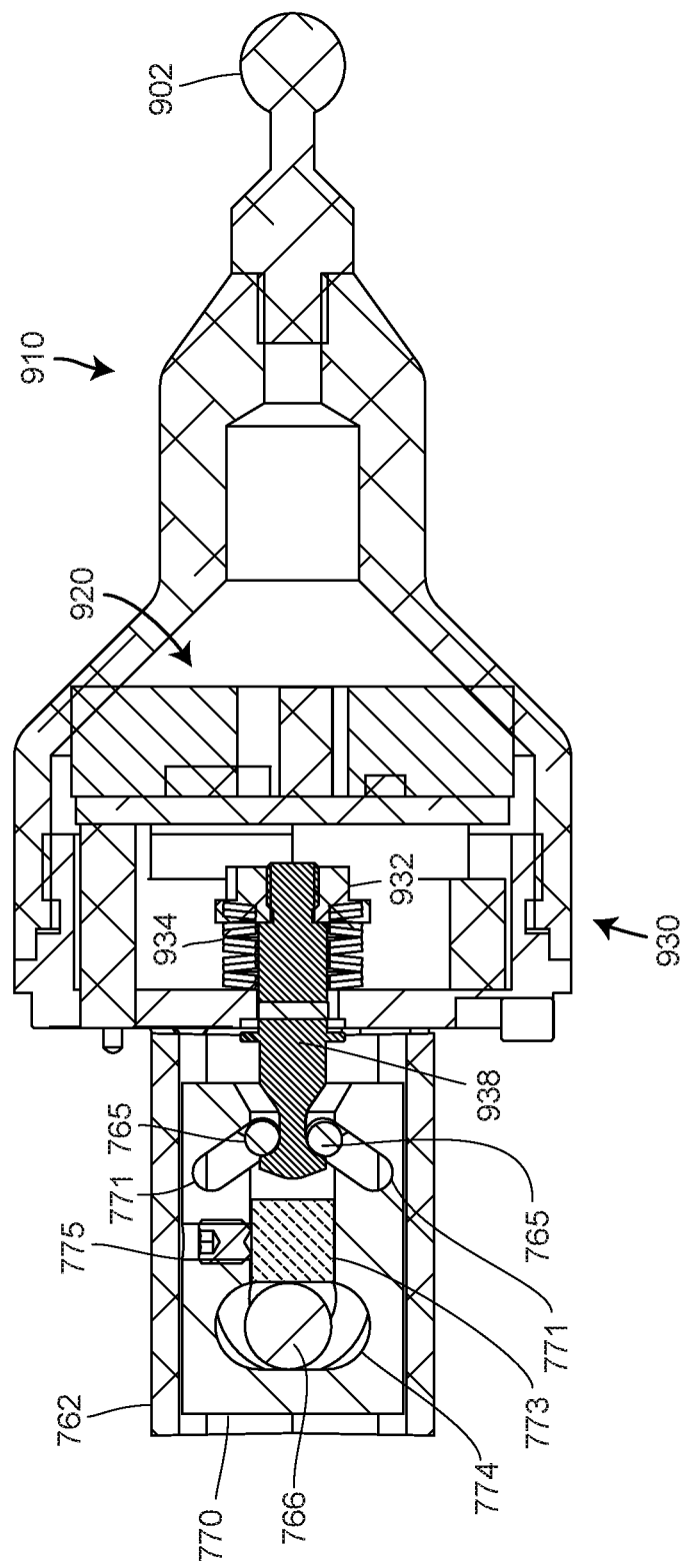

Referring now to FIGS. 20F, 20G, 20H, another embodiment is shown of an assembly for retaining the probe assembly 900 to the carrier 770. The guides 762 are coupled together to define a cavity 758. The cavity 758 is sized and shaped to receive the carrier member 770. In the illustrated embodiment, the carrier member 770 has a pair of opposing cylindrical surfaces 770A and a pair of opposing planar surfaces 770B. As discussed herein with reference to FIGS. 20A-20E, the carrier member 770 includes a slot or elongated hole 774 that receives cam lobes 766A, 766B. The carrier member 770 also includes a pair of opposing slots 771 that extend through the carrier member 770 and are sized to receive the preload pins 765. The preload pins 765 move within slots 761 of guides 762 that have an angled surface 763 and notch 769.

The carrier 770 further includes an adapter hole 772 having a pull stud notch 939 extending therefrom. The adapter hole 772 is sized to accept the pull stud 938. The adapter hole 772 is further sized to receive a magnet member 773. In an embodiment, the magnet member 773 is retained in the adapter hole 772 by a set screw 775. As discussed in more detail herein, the magnet member 773 holds the pull stud 938 (and thus the probe assembly 900) in place when the preload pins 765 are in an unlocked position.

As discussed herein with reference to FIGS. 20A-20E, when the probe latch 768 is moved from the unlocked to the locked position, the cam shaft 766 moves the carrier 770 within the cavity 758. As a result, the preload pins 765 move from an unlocked position (FIG. 20G) to a locked position (FIG. 20H). It should be appreciated that when in the locked position, the preload pins 765 engage the pull stud 938 to retain the probe assembly 900. Unlike the embodiment of FIGS. 20A-20E, there are no leaf springs to bias the preload pins 765. In this embodiment, when the probe latch 768 is in the unlocked position, the carrier member 770 is positioned to place the magnet member 773 in a position to magnetically engage the pull stud 938 with sufficient force to retain the probe assembly 900 (FIG. 20G). As the probe latch 768 is moved to the locked position, the carrier member 770 moves in a direction away from the probe assembly 900, causing the preload pins 765 to engage the pull stud 938.

It should be appreciated that the engagement of the pull stud 938 by the magnet member 773 allows the probe assembly 900 to be removably coupled to the carrier 770. It further provides advantages in allowing the probe assembly 900 to be retained until the probe latch 768 is engaged, thus preventing or reducing the risk of the probe assembly accidentally falling out or off of the carrier 770.

FIG. 18B illustrates the method in which the removable seventh-axis cover 800 is attached to the seventh-axis assembly 700. The push shoe 802 is drawn backward by rotating the nut assembly 740 to pull the clutch nut 741 backward. This enables the removable seventh-axis cover 800 to be pushed into place, after which the push shoe 802 is pushed forward by rotating the nut assembly 740 in a direction that moves the clutch nut 741 forward.

Figure 18C:
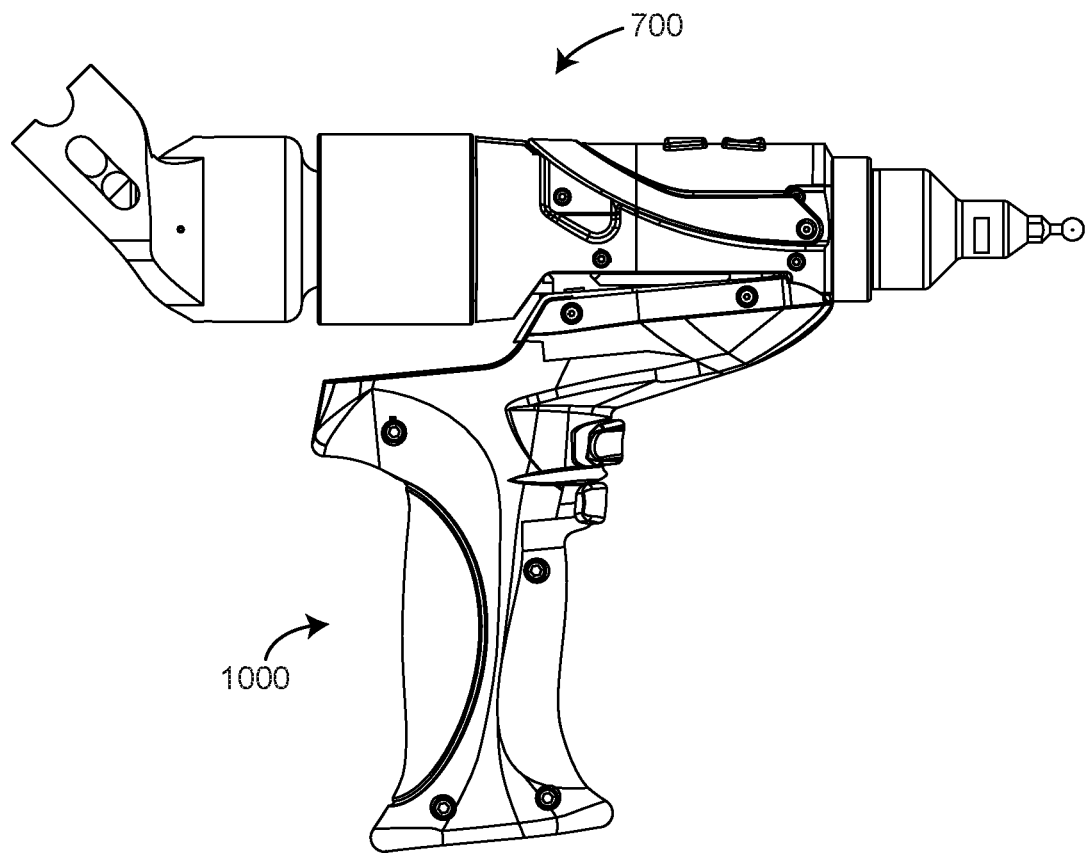
FIG. 18C is a side view of a seventh-axis assembly showing a removable handle being attached according to an embodiment of the present invention.
Figure 18D:
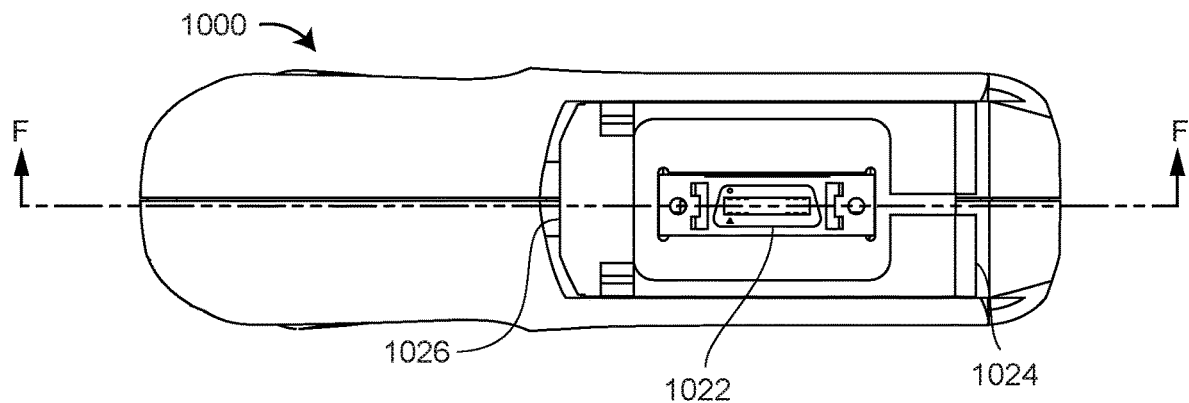
FIGS. 18D, 18E are a top view and a section view, respectively, of a removable handle according to an embodiment of the present invention.
Figure 18E:
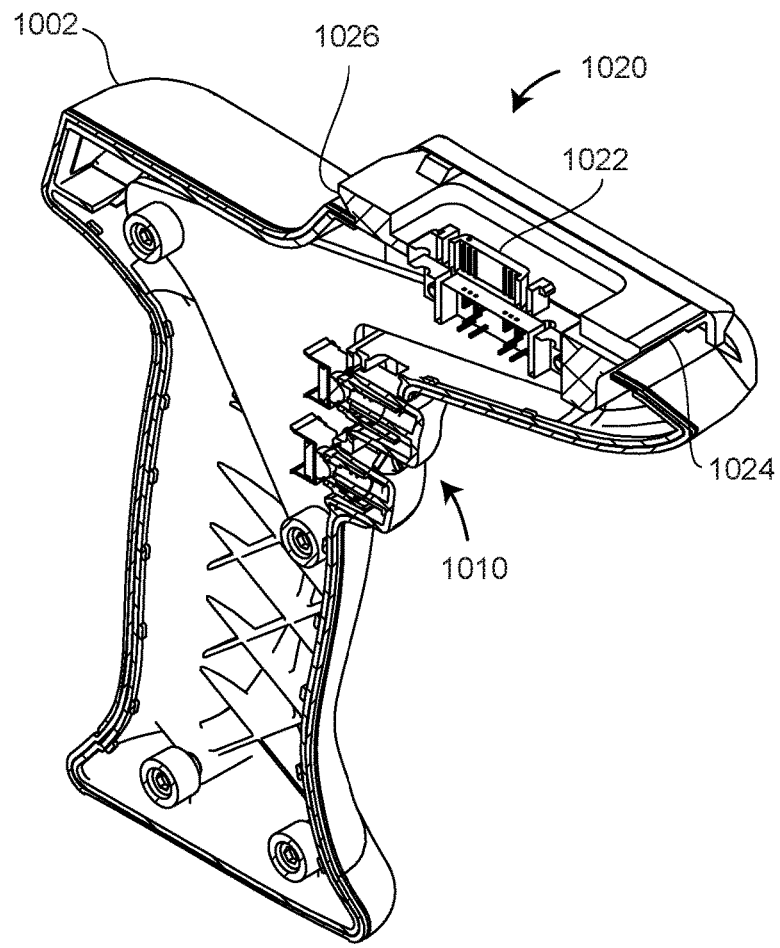

FIG. 18C illustrates the way in which the handle 1000 is attached to the seventh-axis assembly 700. After the removable seventh-axis cover 800 has been removed from the seventh-axis assembly 700, a forward grip-edge 1024 (FIG. 18D) of the handle 1000 is aligned to grip the seventh-axis assembly 700. The push shoe 802 is drawn backward by rotating the nut assembly 740 which results in the clutch nut 741 being pulled backward. The handle 1000 and handle-to-arm connector 1022 of the handle 1000 (FIGS. 18D, 18E) are pushed against the seventh-axis assembly 700 to interlock the handle-to-arm connector 1022 with the arm-to-handle connector 832 (FIG. 18B). The push shoe 802 is pushed forward by rotating the nut assembly 740 in a direction that moves the clutch nut 741 forward. As used herein, the forward direction is in a direction toward the probe tip 904. The push shoe 802 contacts the rear grip-edge 1026 (FIG. 18E), locking the handle 1000 in place. In an embodiment illustrated in FIG. 18E, wires from the handle buttons 1010 that are coupled to a handle frame 1002 send electrical signals through the handle-to-arm connector 1022 to the arm-to-handle connector 832 to the seven-axis arm-end electronics 2210 shown in FIG. 5.

FIGS. 24A, 24B illustrate elements of the LLP 1100. In an embodiment, the LLP 1100 includes an interface 1020 that provides mechanical and electrical connection to the seventh-axis assembly 700. In an embodiment, the interface 1020 includes the forward grip-edge 1024, the rear grip-edge 1026, and the handle-to-arm connector 1022. To attach the LLP 1100 to the seventh-axis assembly 700, the seventh-axis cover 800 is first removed. The forward grip-edge 1024 of the LLP 1100 is aligned to grip the seventh-axis assembly 700 in a similar manner to that described with respect to FIG. 18C. The push shoe 802 is drawn backward (e.g. away from the probe tip 904 when it is installed) by rotating the nut assembly 740 to pull the clutch nut 741 backward. The LLP 1100 and handle-to-arm connector 1022 of the LLP 1100 are pushed against the seventh-axis assembly 700 to interlock the handle-to-arm connector 1022 with the arm-to-handle connector 832. The push shoe 802 is pushed forward by rotating the nut assembly 740 in a direction that moves the clutch nut 741 forward (e.g. toward the probe end tip 904 when it is installed). The push shoe 802 contacts the rear grip-edge 1026, locking the LLP 1100 in place.

In an embodiment, a portable articulated arm coordinate measuring machine (AACMM) for measuring the coordinates of an object in space includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device; a probe end disposed between the measurement device and the first end, the probe end having a first portion, a nut assembly, and a first connector, the first portion having a first threaded region, the nut assembly having a clutch nut, a nut cover, and an intermediate structure, the clutch nut having a clutch-nut threaded region disposed to engage the first threaded region, the clutch nut being moveable between a first position and a second position, the clutch nut disposed to engage with and rotate with the intermediate structure, the intermediate structure configured to engage with and rotate with the nut cover except when a torque applied by the nut cover to the intermediate structure in a first direction of rotation exceeds a torque threshold value; and an element disposed to couple to the probe end when the clutch nut is in the second position, the element having a second connector arranged to engage the first connector when the nut assembly couples the element to the probe end.

In an embodiment, the probe end of the AACMM is a seventh-axis assembly operable to rotate about a seventh axis of rotation of the AACMM and to determine an angle of rotation about the seventh axis of rotation. In an embodiment, the said element of the AACMM is selected from the group consisting of a removable cover, a handle, and a dimensional measurement accessory. In an embodiment, the said dimensional measurement accessory is a triangulation scanner. In an embodiment, the said element of the AACMM is rotationally coupled about an axis to the first end; and the element is disposed to rotate about the axis.

In an embodiment, the said first connector includes a first electrical connector portion; and the said second connector includes a second electrical connector portion. In an embodiment, the said intermediate structure comprises a clutch flexure. In an embodiment, the said clutch flexure further includes a cantilevered lip operable to set the torque threshold value.

In an embodiment, the said first portion is selected from the group consisting of a shaft of the probe end and a housing of the probe end, the shaft being operable to rotate within the housing. In an embodiment, the said measurement device comprises a tactile probe assembly. In an embodiment, the said element of the AACMM is also the measurement device.

In an embodiment illustrated in FIG. 24B, wires from the handle buttons 1010 send electrical signals through the handle-to-arm connector 1022 to the arm-to-handle connector 832 to the seven-axis arm-end electronics 2210 shown in FIG. 5. In an embodiment, the high-speed signals obtained from a camera 1120 of the LLP 1100 pass through the handle-to-arm connector 1022 and the arm-to-handle connector 832 to pass by gigabit Ethernet (FIG. 5) to bus connectors 719 (FIGS. 5, 19F). In an embodiment, the LLP 1100 includes a projector 1110 and a camera 1120 separated by a baseline distance and operable to perform a triangulation measurement to determine 3D coordinates of points illuminated by a line of laser light or a pattern of light, which might be laser light or another type of light. In an embodiment, the LLP 1100 further includes a marker light source 1125 that projects a beam of light that intersects a projected line of light in a spot, thereby indicating to a user a recommended position for locating an object to be measured. In an embodiment, the LLP 1100 includes a color camera 1121 that further enhances measured 3D coordinates with color. The camera 1120 and projector 1110 are included in a camera-projector portion 1106 that further includes an outer shell 1108. In an embodiment, the LLP 1100 is mounted on a handle 1104 that includes an enclosure 1102. In an embodiment, the elements of the LLP 1100, including the camera 1120 and the projector 1110 are supported by electronics, including a controller 1040. In an embodiment, some electronics that support processing of collected LLP data is included in the handle 1104.

Elements of the hard-probe assembly 900 shown in FIGS. 20A, 20B, 20C, 20D, 20E, 21A, 21B include a probe stylus assembly 902, a probe body 910, a probe electrical interface 920, a lock nut 932, a spring stack 934, a probe cap 930, a pull stud 938, and kinematic cylinders 940. In an embodiment, the probe stylus assembly 902 is threaded to screw into the probe body 910. In an embodiment, the probe stylus assembly 902 includes a spherical probe tip 904. In an embodiment, the probe body 910 includes a hollow portion sized to accept the probe electrical interface 920. In an embodiment, the probe electrical interface 920 includes a probe electrical interface circuit board 922, a probe interface body 926, and spring-loaded pins 928 that pass through the probe interface body 926. In an embodiment, the probe electrical interface board 922 includes a processor 923, a memory 925, and a touch-probe connector adapter 924. In an embodiment, the hard-probe assembly 900 further includes a lock nut 932, a spring stack 934, a probe cap 930, a pull stud 938 and kinematic cylinders 940. The lock nut 932 and spring stack 934 hold the pull stud 938 against the probe cap 930. The kinematic cylinders 940 are affixed to the probe cap 930.

The hard-probe assembly 900 discussed above is an example of a tactile probe, so named because a tactile probe includes an element (such as the probe tip 904) that makes physical contact with an object under test. Besides the hard-probe assembly 900, another type of tactile probe is a touch-trigger probe assembly 960 illustrated in FIGS. 22A, 22B, 22C, 22D, 22E. Unlike the hard-probe assembly 900 that returns electrical signals from encoders in each of the axis assemblies 100, 200, 300, 400, 500, 600, 700 in synchrony with the capture signal produced by the base processor electronics 2040, the touch-trigger probe assembly 960 generates a trigger signal in response to the probe tip 904 lightly touching an object under test. The trigger signal is sent from the touch-trigger probe assembly 960 to each of the encoders, which respond by immediately measuring an angle. Afterwards, the encoders return the measured values over the first bus 2182 (FIG. 2). Touch-trigger probes are popular to use on Cartesian coordinate measuring machines (CMMs), which often include a probe stylus that is relatively long and thin. Such a stylus is susceptible to bending when pressed against an object, which may result in a relatively large error in measured 3D values. By generating a trigger signal when the probe tip first lightly touches the object, the bending of the stylus is minimized. In most cases, the stylus on a tactile probe of an AACMM 10 is relatively short and thick, resulting in relatively small bending errors. However, in some cases, bending of a stylus is an important consideration when making AACMM measurements. In these cases, the touch-trigger probe assembly 960 is advantageously used.

In an embodiment, a touch-trigger probe assembly 960 includes a touch-trigger probe module 986, a touch-trigger probe body 984, a touch-trigger probe adapter 970, a probe body 962, a probe electrical interface 920, a lock nut 932, a spring stack 934, a probe cap 930, and a pull stud 938. In an embodiment, the touch-trigger probe module 986 includes a probe tip 904. Touch-trigger probe modules are commercially available from many manufacturers. In an embodiment, the touch-trigger probe body 984 is selected to have a desired length. The touch-trigger probe body 984 includes a screw connector mount 982 that screws into the touch-trigger probe adapter 970. The touch-trigger probe adapter 970 sends electrical signals, including trigger signals, down interface wires 972 to a touch-probe connector adapter 924, which is part of a probe electrical interface 920. The touch-trigger probe adapter 970 and the probe electrical interface 920 fit in a probe body 962. The remaining elements of the touch-trigger probe assembly 960 are the same as for the hard-probe assembly 900 and were described herein above with respect to FIGS. 20A, 20B, 20C, 20D, 20E, 21A, 21B.

In an embodiment, a short jumper cable is run from a tactile probe transfer connector 836 (FIG. 19G) from the connector adapter 784 in the connector cutout 757 (FIGS. 20A, 21B). This jumper cable transfers trigger signals from touch-trigger probes. It also transfers signals indicating that particular button has been pressed. The tactile probe transfer connector 836 and the arm-to-handle connector 832 send signals to cable transfer connectors 837 on the bottom of the upper circuit board 822. End cable wires 838 attach on one end to the cable transfer connectors 837 and on the other end to bus connectors 839. As shown in FIG. 19F, the bus connectors 839 attach to on matching bus connectors 839 that lead through front slip-ring cable 718, seventh-axis slip ring 710, and rear slip-ring cable 717 to bus connectors 719. In an embodiment, the electrical links between the bus connectors 719, the arm-to-handle connector 832 and electronics in the electronics 2210 are as shown in FIG. 5.

In an embodiment, an AACMM 10 is a six-axis AACMM that includes a first-axis assembly 100, a second-axis assembly 200, a third-axis assembly 300, a fourth-axis assembly 400, a fifth-axis assembly 500, and a sixth-axis assembly 600, but not a seventh-axis assembly 700. A six-axis AACMM is advantageous whenever the main use of the AACMM is to measure with a tactile probe. Usually a seven-axis AACMM is selected when an LLP 1100 will be used in addition to a tactile probe. For a six-axis AACMM, the seventh-axis assembly 700 is replaced with end-effector assembly 1200. As illustrated in FIGS. 25A, 25B, 25C, exterior elements of the end-effector assembly 1200 include an end-effector yoke 1210, a probe latch 768, upper end-effector buttons 1241, lower end-effector buttons 1251, an upper light diffuser 1222, and a lower light diffuser 1232. Elements of the end-effector assembly 1200 also found on the seventh-axis assembly 700 include the probe interface board 780, electrical contact pads 782, screws 787, adapter hole 772, guides 762, and kinematic balls 756.

Figure 25D:
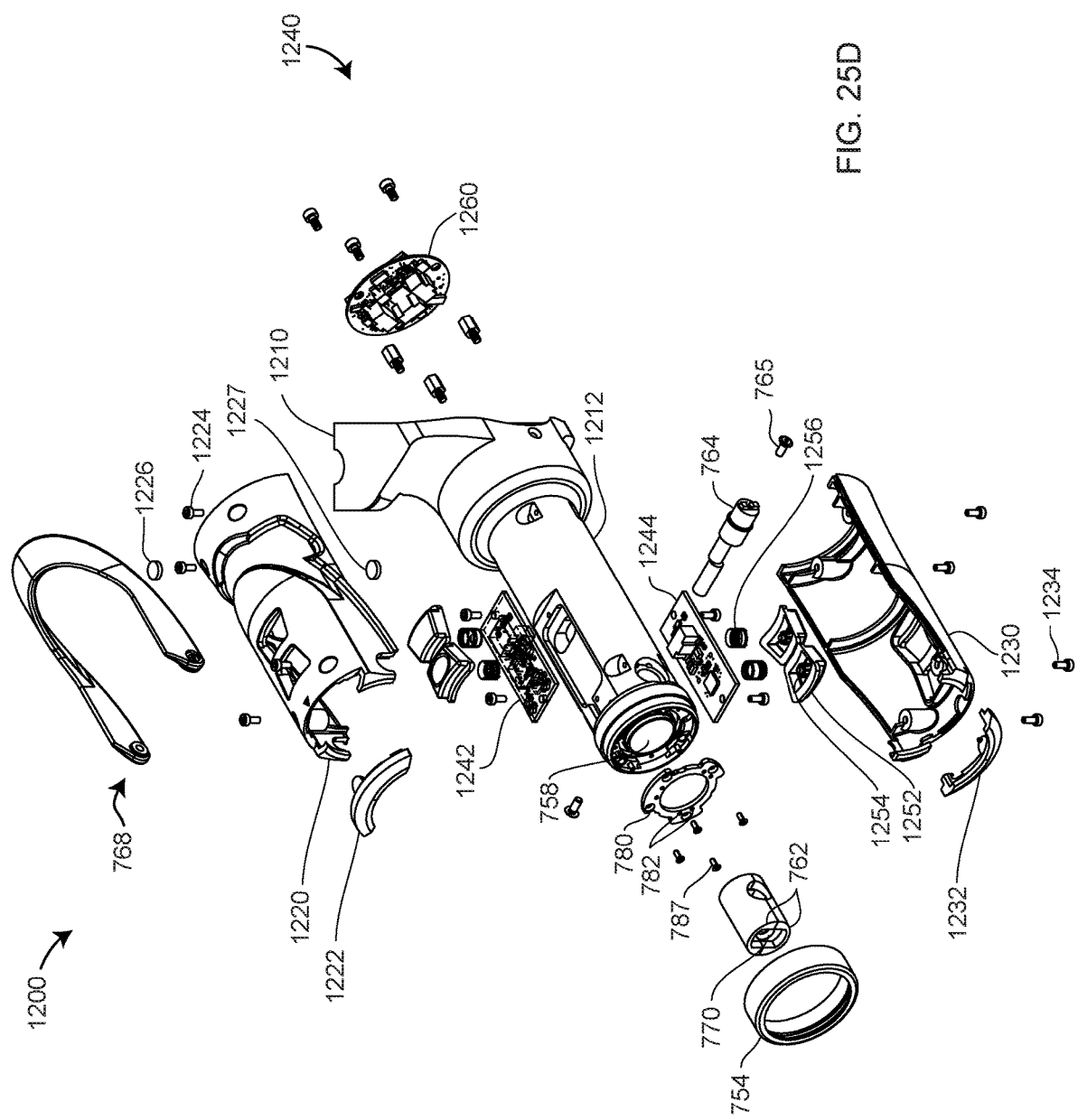
Figure 28C:
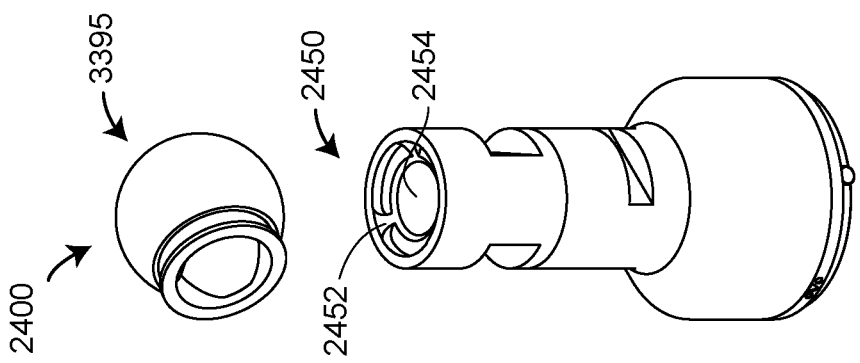
FIGS. 28A, 28B, 28C are isometric, front, and exploded views, respectively, of a spherically mounted retroreflector (SMR) probe according to an embodiment of the present invention.
Figure 28B:
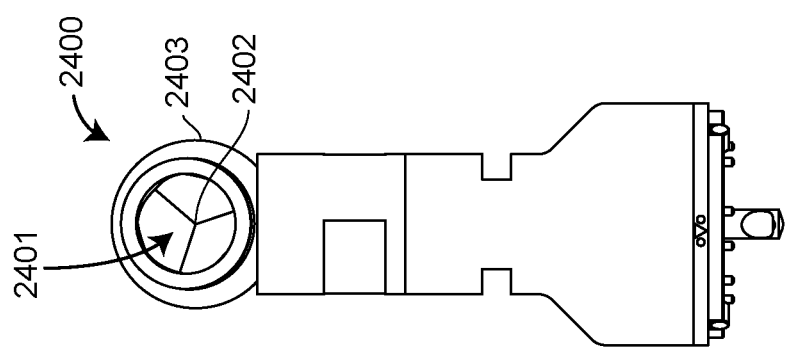
Figure 28A:
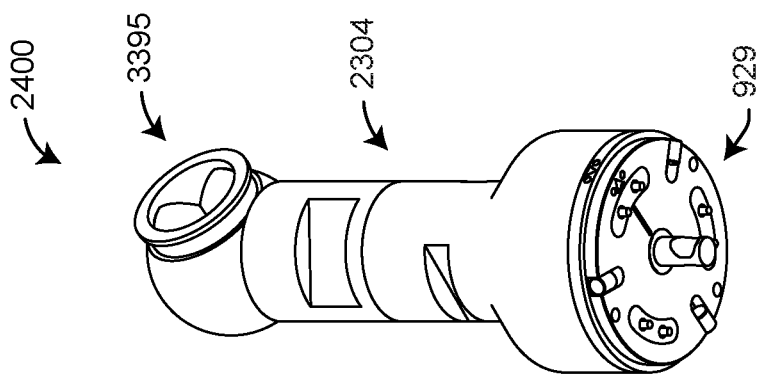

Elements of the end-effector assembly 1200 are illustrated in an exploded view in FIG. 25D. The end-effector assembly 1200 includes an end-effector yoke 1210 and an end-effector frame 1212. The end-effector assembly 1200 further includes those elements used to clamp and release tactile probes, including a guide cavity 758, a carrier 770, guides 762, a probe latch 768, a first latch magnet 1226, a second latch magnet 1227, a camshaft 764, camshaft fasteners 765, a probe interface board 780, and screws 787. These components function in the same way as described herein above with respect to the seventh-axis assembly 700. An upper button board 1242 and a lower button board 1244 are attached to the end-effector frame 1212. In an embodiment, button springs 1256, molded-button fingers 1254, and molded-button shells 1252 are attached to the upper button board 1242 and the lower button board 1244. An upper end-effector cover 1220 is attached to the end-effector frame 1212 with upper cover screws 1224. A lower end-effector cover 1230 is attached to the end-effector frame 1212 with lower cover screws 1234. In an embodiment, an upper light diffuser 1222 is attached to the upper end-effector cover 1220, and a lower light diffuser 1232 is attached to the lower end-effector cover 1230. A cover ring 754 provides a finish cover at the front of the end-effector assembly 1200. A six-axis arm-end board 1260 includes a three-axis accelerometer, which provides information on shocks experienced by the end-effector assembly 1200. In an embodiment, this information on shocks is used by service personnel to assist in diagnosing problems experienced by the AACMM 10.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an acceleration monitoring circuit coupled to the first end, the acceleration monitoring circuit included a first accelerometer; an electronic circuit that receives the position signal from the at least one position transducer and provides data corresponding to a position of the measurement device; a processor operable to determine three-dimensional (3D) coordinates of a point measured by the measurement device based at least in part on the provided data corresponding to the position of the measurement device, the processor further operable to determine a maximum level of acceleration of the first end.

In an embodiment, the acceleration monitoring circuit in the AACMM further includes a second accelerometer operable to respond to a different maximum acceleration than the first accelerometer.

FIGS. 26A, 26B, 26C illustrate a reflector probe 2300 that includes a probe tip 904, a probe body 2304, and a retroreflector 2309. In an embodiment, the reflector probe 2300 further includes the probe adapter 929, pull stud 938, spring-loaded pins 928, and alignment holes 941 found on the hard-probe assembly 900 and the touch-trigger probe assembly 960. FIGS. 27A, 27B, 27C illustrate a double-reflector probe 2350 having a probe tip 904, a first retroreflector 2354 mounted to a top portion 2305 of a probe body and a second retroreflector 2356 mounted to a side portion 2306 of a probe body. In an embodiment, the retroreflectors 2309, 2354, and 2356 are cube-corner retroreflectors having three mirror faces that are mutually perpendicular.

FIGS. 28A, 28B, 28C, 29A, 29B are isometric, front, isometric exploded, front, and section views, respectively, of a spherically mounted retroreflector (SMR) probe 2400, which includes a probe adapter 929, probe body 2304, pull stud 938, and SMR 3395. In an embodiment, the probe body 2304 includes a probe base 2307, a probe extension 2308, a magnet 2454, and a kinematic nest 2450, which further includes three contact points 2452. In an embodiment, the SMR 3395 includes a partial sphere 2403 into which is embedded a cube-corner retroreflector 2401. In an embodiment, the cube-corner retroreflector includes three mutually perpendicular reflectors (mirrors) having a vertex 2402 (common point of intersection) located at the spherical center of the partial sphere 2403. In an embodiment, the SMR 3395 further includes an SMR collar 2305.

Figure 30E:
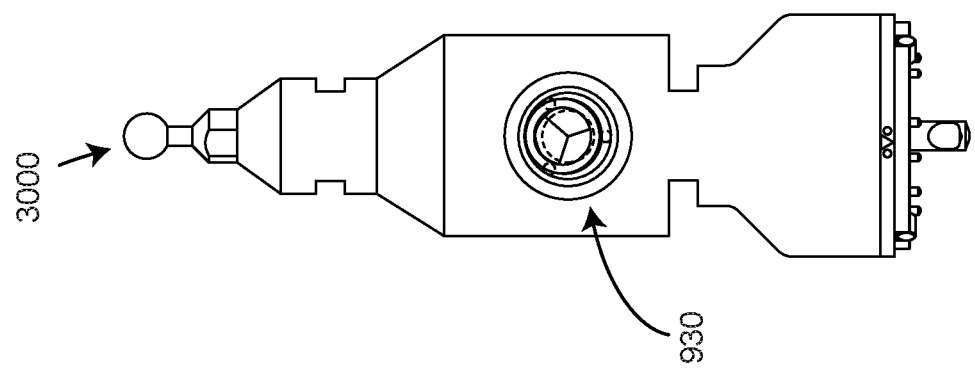
FIGS. 30A, 30B, 30C, 30D, 30E are front view of tactile reflector probe assembly, SMR, retainer ring, tactile probe assembly with SMR, and tactile probe assembly with SMR and retainer ring, respectively, according to an embodiment of the present invention.
Figure 30D:
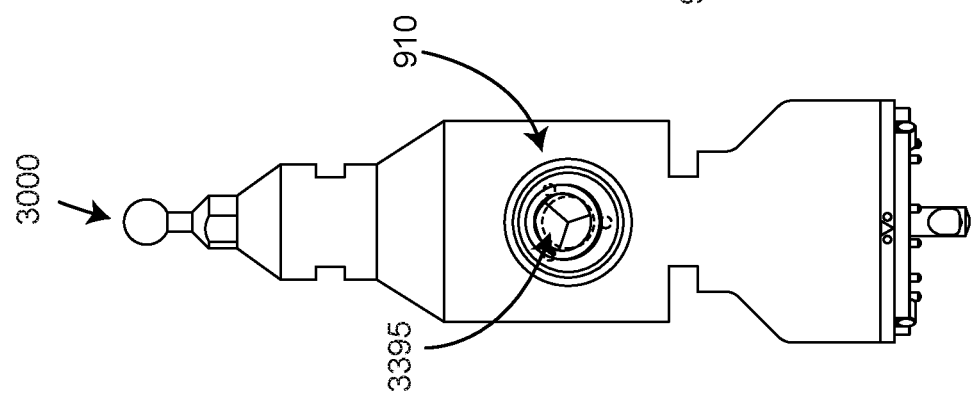
Figure 30C:
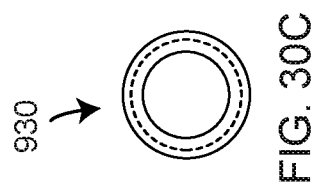
Figure 30A:
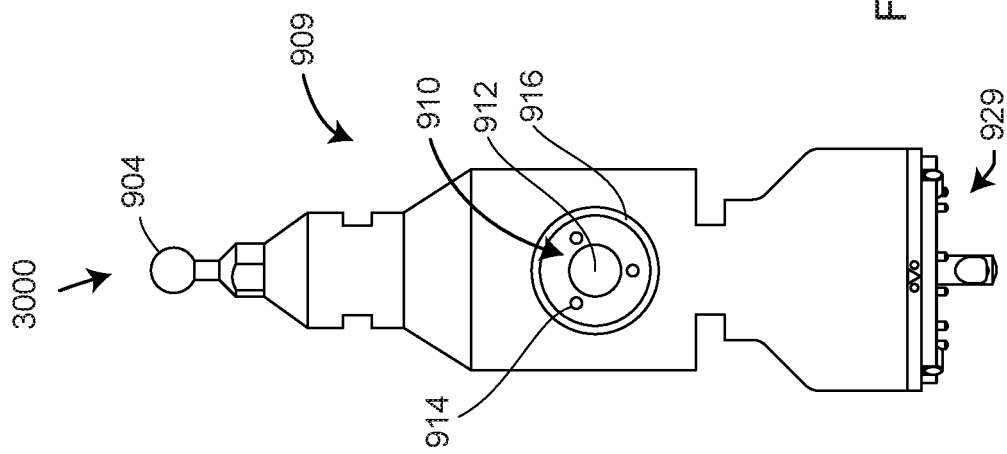
Figure 30B:
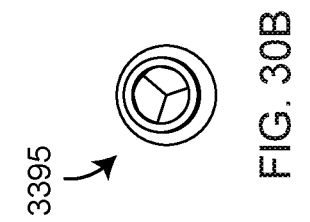

FIG. 30A is a front view of a tactile reflector probe assembly 3000, which includes a body 909 coupled to a probe adapter 929, a kinematic seat 910, and a probe tip 904. In an embodiment, the kinematic seat 910 includes three kinematic contacts 914 and a magnet 912 that hold the partial sphere 2403 of the SMR 3395 (FIG. 29B, 30B) in contact with the kinematic contacts 914. The SMR 3395 may further be protected from falling out of the kinematic seat by a retainer ring 930 (FIG. 30C) that screws into threads 916 of the kinematic seat 910. The SMR 3395 may be removed for use outside the tactile reflector probe assembly 3000 and repeatably and reliably placed back onto the kinematic contacts 914. FIG. 30D shows the SMR 3395 placed on the kinematic seat 910 and held in place by the magnet 912. FIG. 30E shows the retainer ring 930 attached to the kinematic seat over the SMR 3395.

Retroreflectors coupled to an AACMM 10 may be measured by a 3D coordinate measuring device such as a laser tracker 3300 shown in FIG. 33. In an embodiment, the laser tracker 3300 sends a beam of light 3390 out of the tracker exit aperture 3374 toward a retroreflector 3395, which in an embodiment is a retroreflector SMR 3395 as shown in FIG. 33. In another embodiment, the laser tracker 3300 sends a beam of light 3390 to a retroreflector coupled to the AACMM 10. Examples of retroreflectors coupled to the AACMM 10 include the retroreflector 2309 in the reflector probe 2300 and the retroreflectors 2354, 2356 in the double-reflector probe 2350. It should be appreciated that the term laser tracker as used herein refers to any 3D measuring device that emits a beam of light and measures 3D coordinates in response. The beam of light may be any type of light, not only laser light but also light from a light emitting diode, a superluminescent diode, or any type of incoherent, coherent, or partially coherent light source. The SMR returns light 3392 in a direction opposite that of the outgoing light 3390. A first portion of the light 3392 returning to the tracker 3300 and passing through the exit aperture 3374 travels to an absolute distance meter that determines the distance from the laser tracker 3300 to the SMR 3395. A second portion of the returning light 3392 travels to a position detector that records a position of the returning light 3392 inside the tracker 3300. A control system within the tracker uses the position information from the position detector to steer the outgoing light 3390 to the center of the SMR 3395. As the SMR 3395 is moved, the outgoing light 3390 tracks the SMR 3395 by keeping the outgoing light 3390 centered on the SMR 3395. Because the surface of the SMR partial sphere 2403 is always a constant distance from the center of the SMR 3395 and vertex 2402 of the cube-corner retroreflector 2401, the surface of the object being measured may be determined by measuring the 3D coordinates of the SMR 3395 as the SMR is moved across the surface of the object.

In an embodiment, it may be desired to measure a hidden point on an object, the hidden point being a point for which the outgoing beam of light 3390 is blocked from reaching the SMR 3395 positioned at the hidden point. In another embodiment, it may be desired to measure a relatively small feature for which the diameter of the SMR 3300 is too large to provide a desired fine resolution. In either of these situations, when it is desired to measure a hidden point or to measure with a resolution finer than possible with an SMR 3395, the AACMM 10 may advantageously be used in combination with the laser tracker 3300. To measure 3D coordinates using a combination of the laser tracker 3300 and the AACMM 10, the 3D measurements made by the laser tracker 3300 and the AACMM 10 need to be obtained in a common frame of reference, such as the frame of reference of the laser tracker 3300.

Figure 34A:
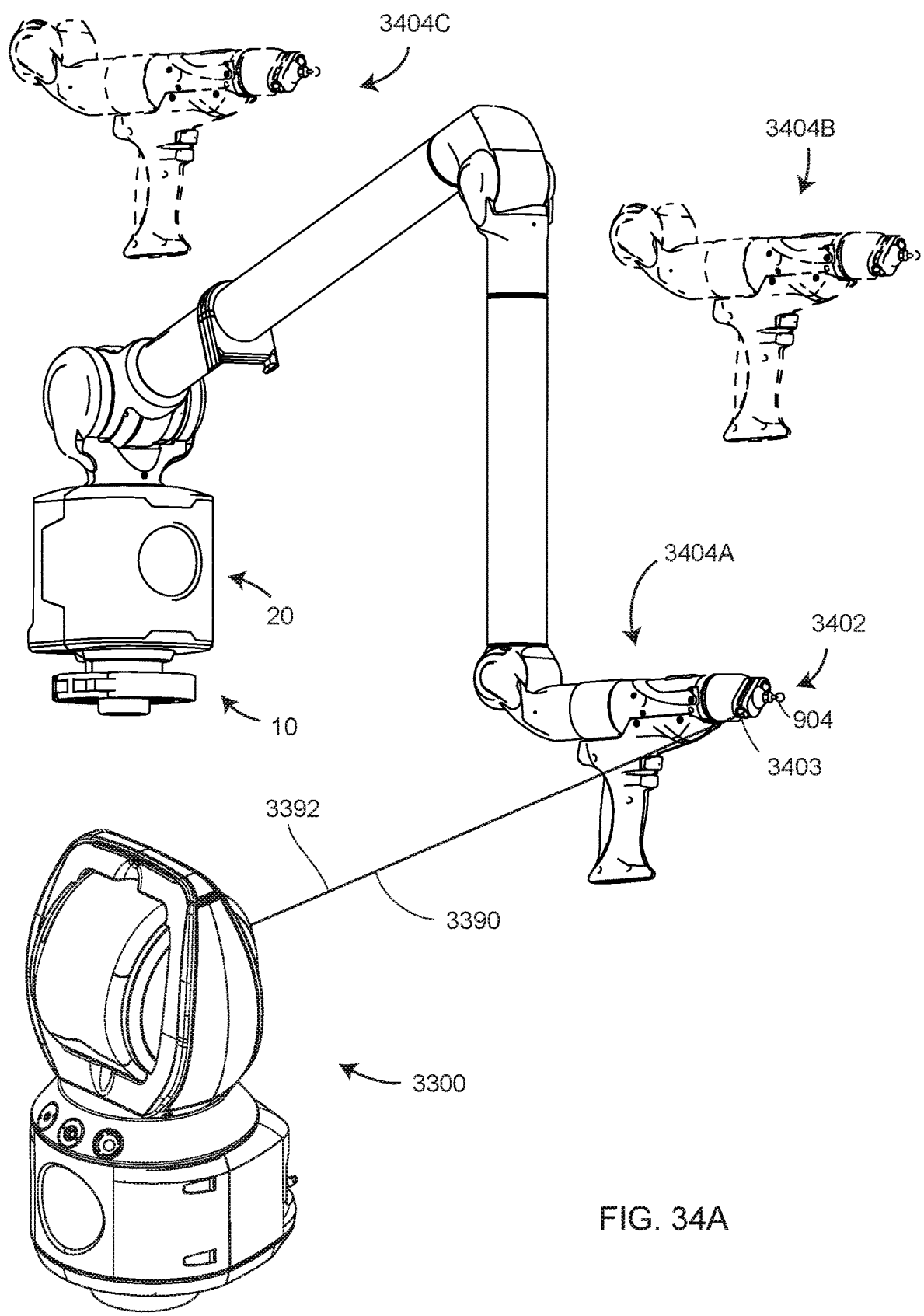
FIG. 34A is an isometric representation of steps taken in placing a laser tracker and an AACMM having a probe that includes a retroreflector in a common frame of reference according to an embodiment of the present invention.

FIG. 34A illustrates a method for obtaining information needed to convert 3D measurements made by the laser tracker 3300 and the AACMM 10 into a common frame of reference. In an embodiment, the laser tracker 3300 and the AACMM 10 each determine the 3D coordinates of a retroreflector 3403 of a cooperative probe 3402 in each of at least three positions: a first position 3404A; a second position 3404B; and a third position 3404C. The laser tracker 3300 directly determines the 3D coordinates of the retroreflector 3403 by measuring a distance and two angles from the tracker to the retroreflector, as described herein above. The AACMM 10 determines the 3D coordinates of the retroreflector 3403 based at least in part on the angles measured by each of the angular encoders and by kinematic parameters that give the geometrical relationships among the elements of the AACMM 10. Such geometrical relationships include lengths of arm components such as the length of the first segment 295, zero angles for the encoders, and position of the retroreflector on the last axis of the AACMM 10. In an embodiment, the measurement procedure carried out in accordance with FIG. 34A is used to obtain a transformation matrix that converts 3D points of the probe tip 904 into the frame of reference of the laser tracker 3300 or into another frame of reference common to the laser tracker 3300 and the AACMM 10.

Figure 34B:
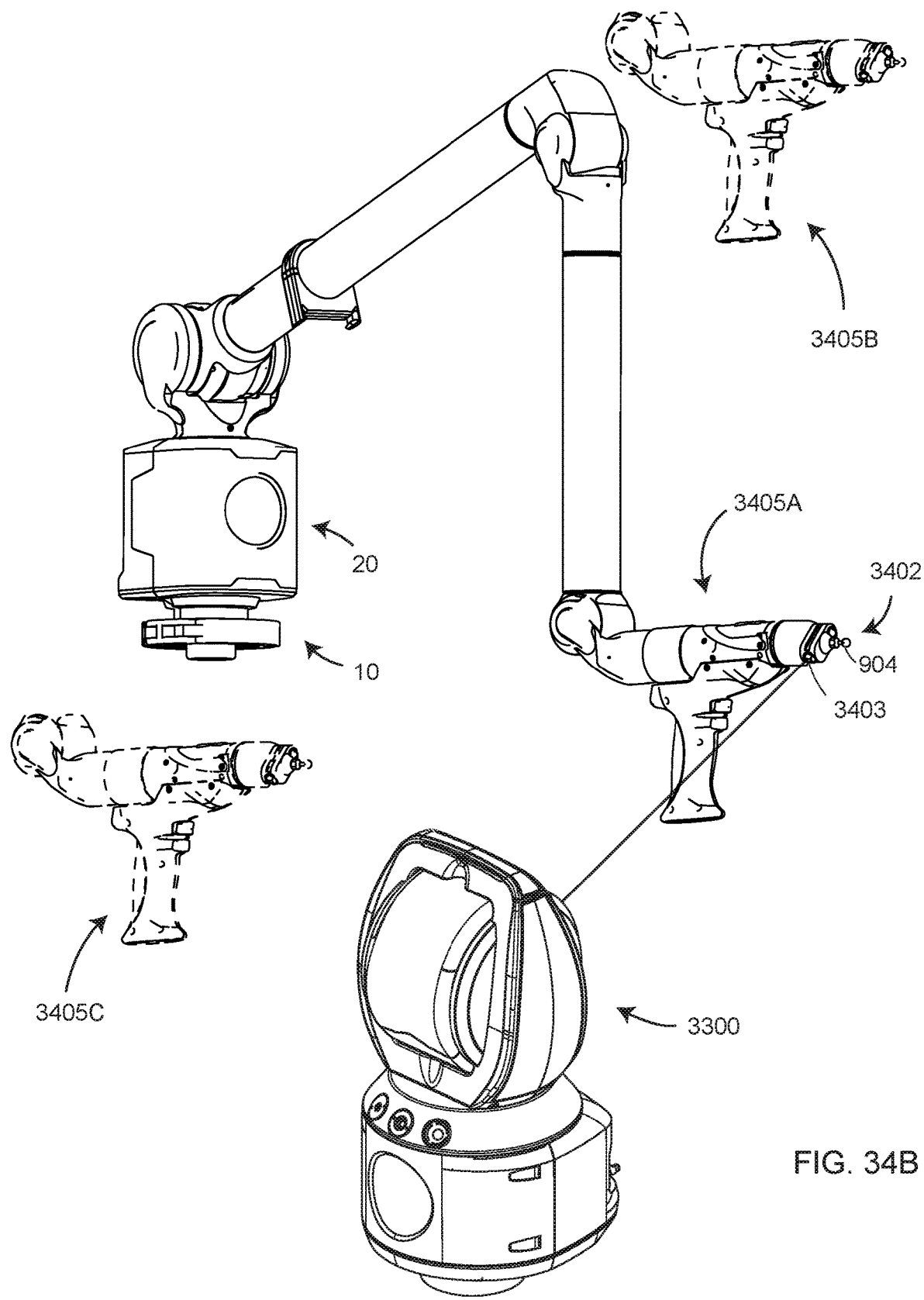
FIG. 34B is an isometric representation of additional steps following the steps of FIG. 34A for placing the AACMM into a common frame of reference in a second location according to an embodiment of the present invention.
Figure 34C:
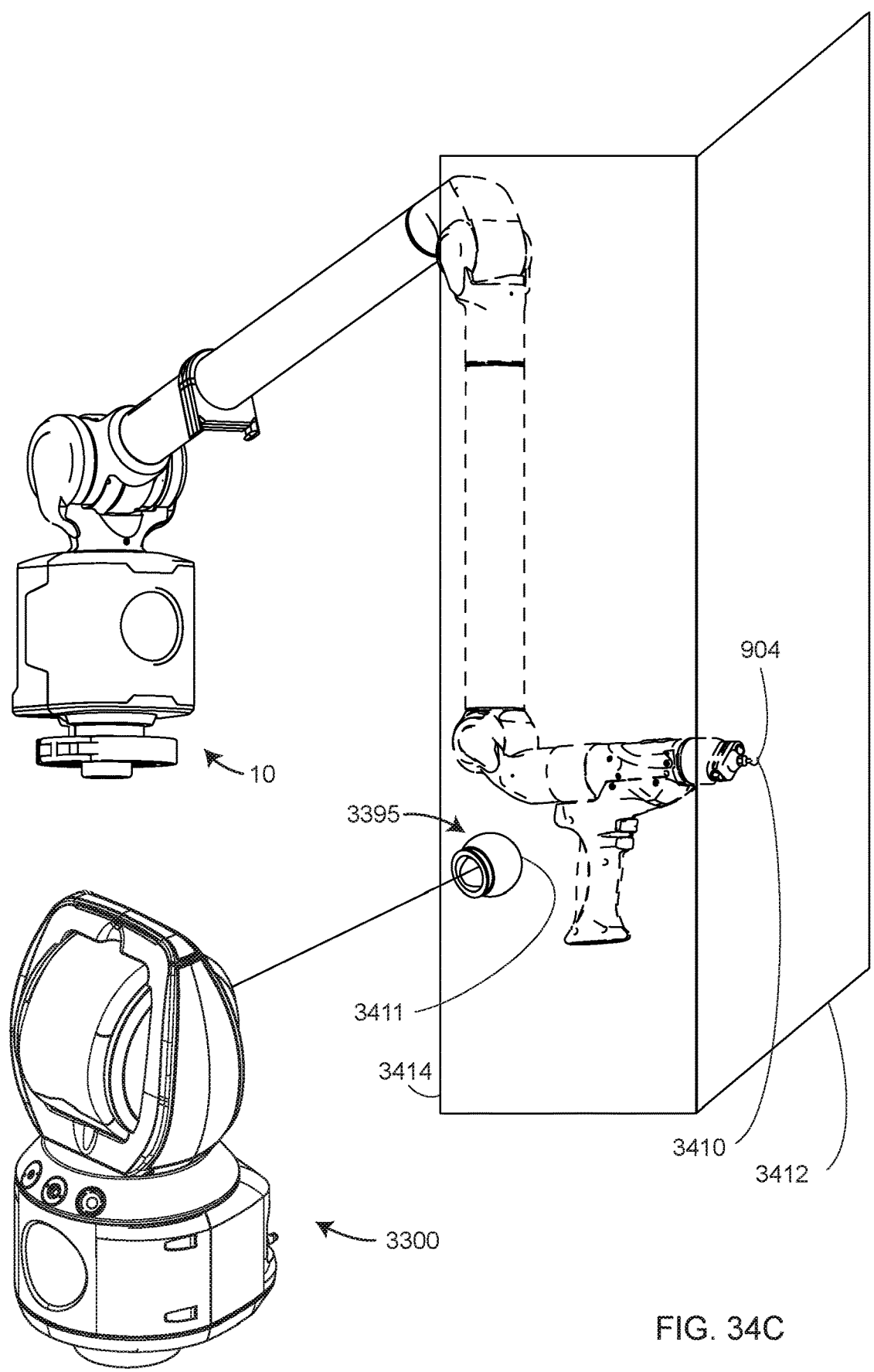
FIG. 34C is an isometric representation of an AACMM measuring hidden points inaccessible to measurement by a tracker SMR according to an embodiment of the present invention.

An advantage of this approach is that it provides the ability to determine 3D coordinates of features hidden from the laser tracker 3300, as illustrated in FIG. 34C. The tracker 3300 is able to measure points 3411 on one side of a wall 3414 with an SMR 3395, but the wall 3414 obscures points on a panel 3412 from the tracker's view. By performing the procedure illustrated in FIG. 34A and described herein above, 3D measurement taken by the AACMM 10 may be brought into the frame of reference of the laser tracker 3300 using the transformation matrix. This enables the AACMM 10 to measure a hidden point 3410 with the probe tip 904, which is otherwise inaccessible to the laser tracker 3300.

Figure 34D:
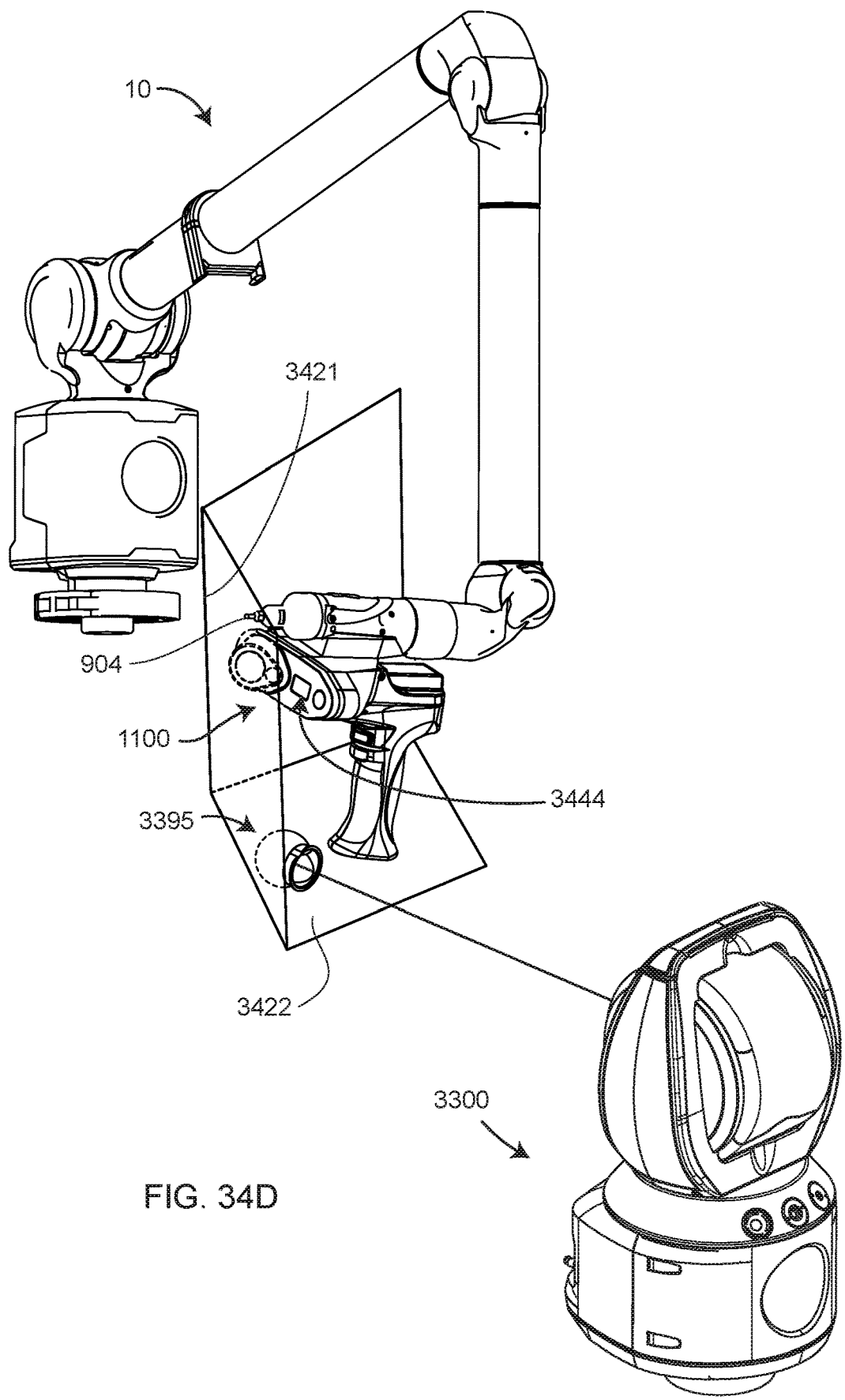
FIG. 34D is an isometric representation of a probe tip and a laser line probe coupled to an AACMM being used to measure 3D coordinates to a resolution beyond that possible with a tracker SMR according to an embodiment.

Another advantage of this approach is the ability to measure features having details too fine or small to measure with an SMR 3395. An example of an object having relatively fine features is shown in FIG. 34D. The fine details 3421 in the edges and corners may be measured with a probe tip 904 which has a relatively small diameter compared to the SMR 3395, or the fine details 3421 can be measured by a laser line probe 1100. Further, the SMR may bused to measure surfaces 3422. The method described in reference to FIG. 34A may bring the measurements of the AACMM 10 into the frame of reference of the laser tracker 3300.

Figure 34E:
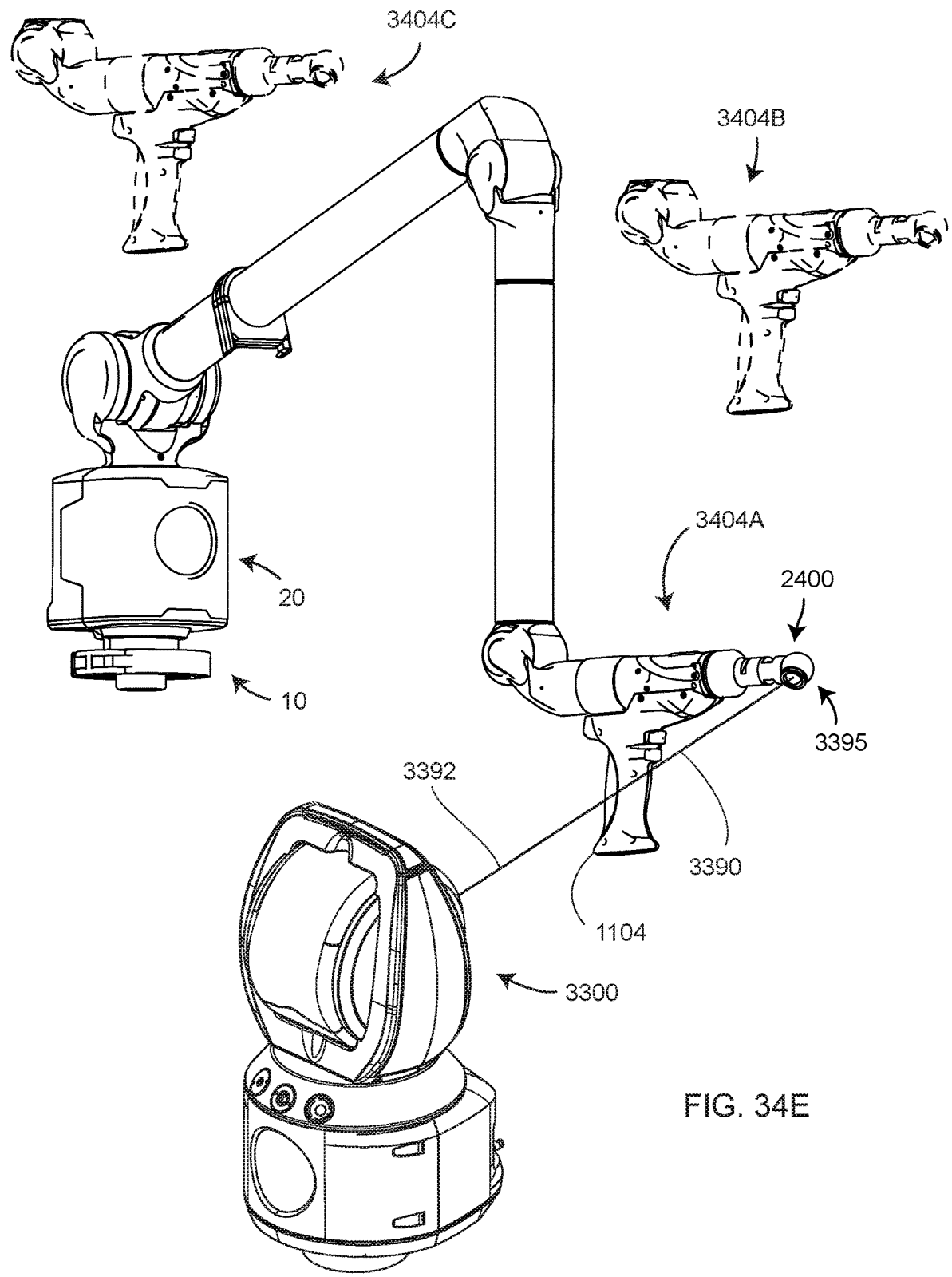
FIG. 34E is an isometric representation of steps taken in placing a laser tracker and an AACMM having a SMR probe in a common frame of reference according to an embodiment of the present invention.

In some embodiments, an operator may want to keep the SMR 3395 near the articulated arm while making measurements. As shown in FIG. 34E, a way to establish a common frame of reference between a laser tracker 3300 and an AACMM 10 is to use an SMR probe 2400 to hold an SMR when performing the measurements of the SMR 3395 by the laser tracker in at least three positions, including the first position 3404A, the second position 3404B, and 3404C, as described herein above with respect to FIG. 34A. In this case, the SMR probe 2400 may later be removed and replaced with a different probe such as the hard probe assembly 900 to obtain measurements with a probe tip 904. In another embodiment, the SMR probe 2400 is left in position and the handle 1104 replaced with a laser line probe 1100. In another embodiment, the SMR probe 2400 is replaced with the tactile reflector probe assembly 3000. With this approach, the SMR 3395 is kept with the probe assembly 3300 but the probe tip 904 is remains a part of the assembly that is available for making 3D measurements.

In an embodiment, a reflector probe such as the reflector probe 2300, the double-reflector probe 2350, the SMR probe 2400 (FIGS. 28A, 28B, 28C, 29A, 29B), or the tactile reflector probe assembly 3300 (FIGS. 30A, 30B, 30C, 30D, 30E) is used in combination with a laser tracker 3300 or other 3D measuring device to make measurements over a relatively large area that extends beyond the reach of an AACMM 10 fixed in a single location. In an embodiment, the AACMM base 20 is moved to a second pose to enable the AACMM 10 to measure hidden points and fine features over a large region. The procedure for moving the points measured by the AACMM 10 at the second pose of the base 20 is illustrated in FIG. 34B and is the same as the procedure in FIG. 34A except that the base of the AACMM 10 is now located in a second pose.

To determine compensation parameters to locate a probe tip 904 in relation to other elements of an AACMM 10, a compensation procedure is performed in which the probe tip is placed in contact with a kinematic seat 3102 (FIG. 31A) and rotated within the kinematic seat 3102 over a variety of probe rotation directions 3106 about corresponding probe rotation axes 3104. In an embodiment, the probe 2351, which represents any type of probe such as those described herein above, is attached to a seventh-axis assembly as illustrated in FIGS. 31A, 31B. In another embodiment, the probe 2351 is attached to an end-effector assembly 1200 as illustrated in FIGS. 31C, 31D. In an embodiment, the method of rotating the probe tip 904 in the kinematic seat 3102 is further extended by measuring a position of the retroreflector 3403 with the laser tracker 3300. The retroreflector 3403 represents any retroreflector integrated into a probe assembly, for example, the retroreflector 2304, 2354, 2356, or 3395. In an embodiment, the measured 3D coordinates of the retroreflector 3403 by the laser tracker 3300 over the range of probe rotation directions 3106 are used to determine the position of the retroreflector 3403 in relation to the probe tip 904. In an embodiment, this same approach is used with the seventh-axis assembly 700 of FIG. 31A and the end-effector assembly 1200 of FIG. 31C.

Figure 32B:
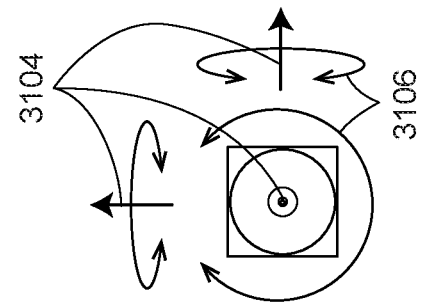
FIGS. 32A, 32B are SMR probe on seventh-axis assembly and ball artifact, respectively, according to an embodiment of the present invention.
Figure 32D:
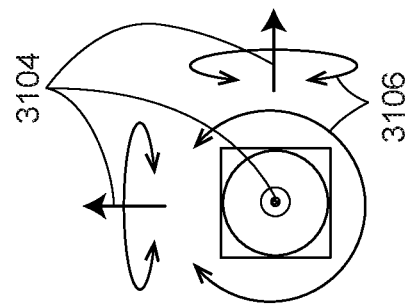
FIGS. 32C, 32D are SMR probe on end-effector assembly and ball artifact, respectively, according to an embodiment of the present invention.
Figure 32A:
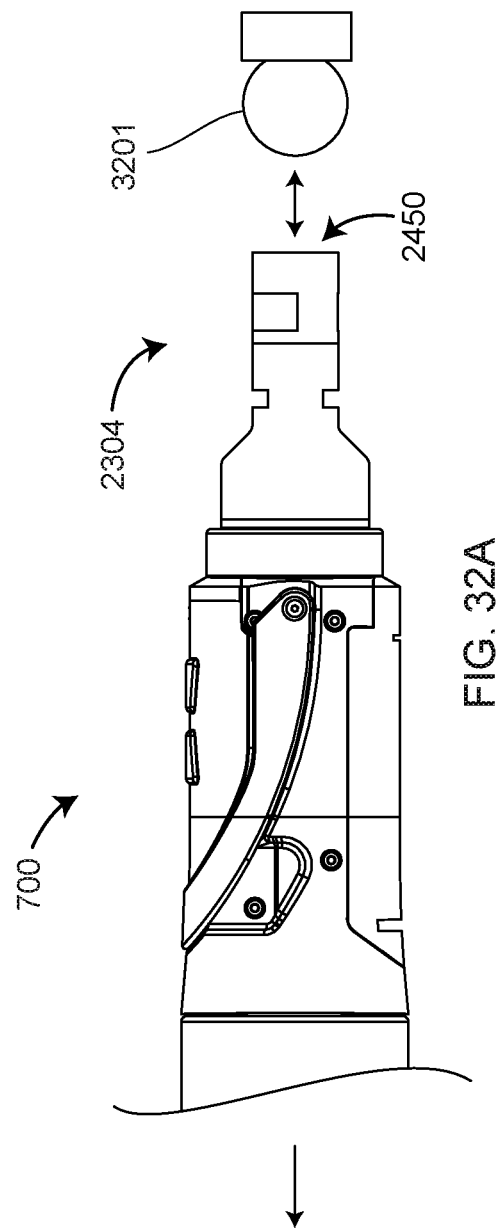
Figure 32C:
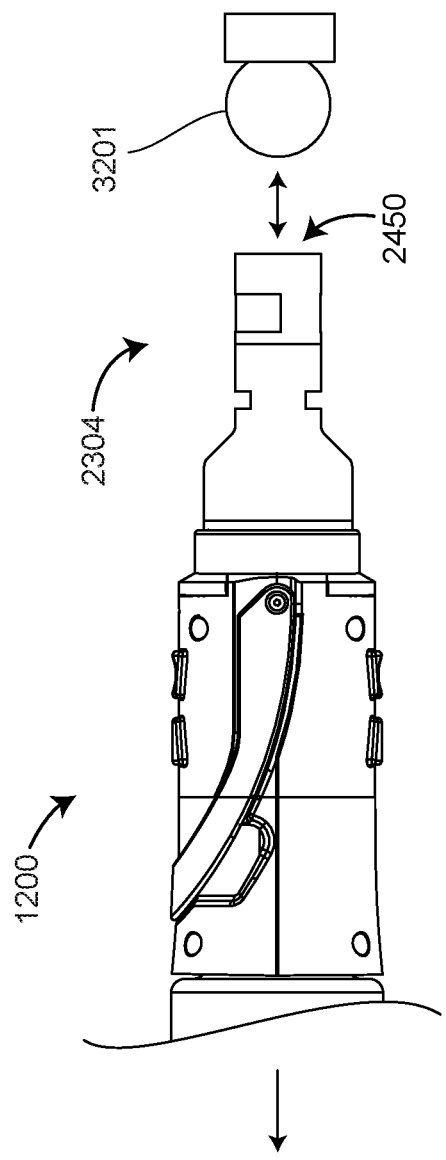

Another method for compensating a probe body 2304 attached to a seventh-axis assembly 700 is illustrated in FIGS. 32A, 32B. Another method for compensating the probe body 2304 attached to an end-effector assembly 1200 is illustrated in FIGS. 32C, 32D. In each case, the kinematic nest 2450 of the probe body 2304 is brought in contact with a reference sphere 3201. The probe body is rotated to a variety of probe rotation directions 3106 about the probe rotation axes 3104. The measured values are used to determine the compensation parameters of an SMR 2295 attached to the kinematic nest 2450 of the probe body 2304.

Figure 34F:
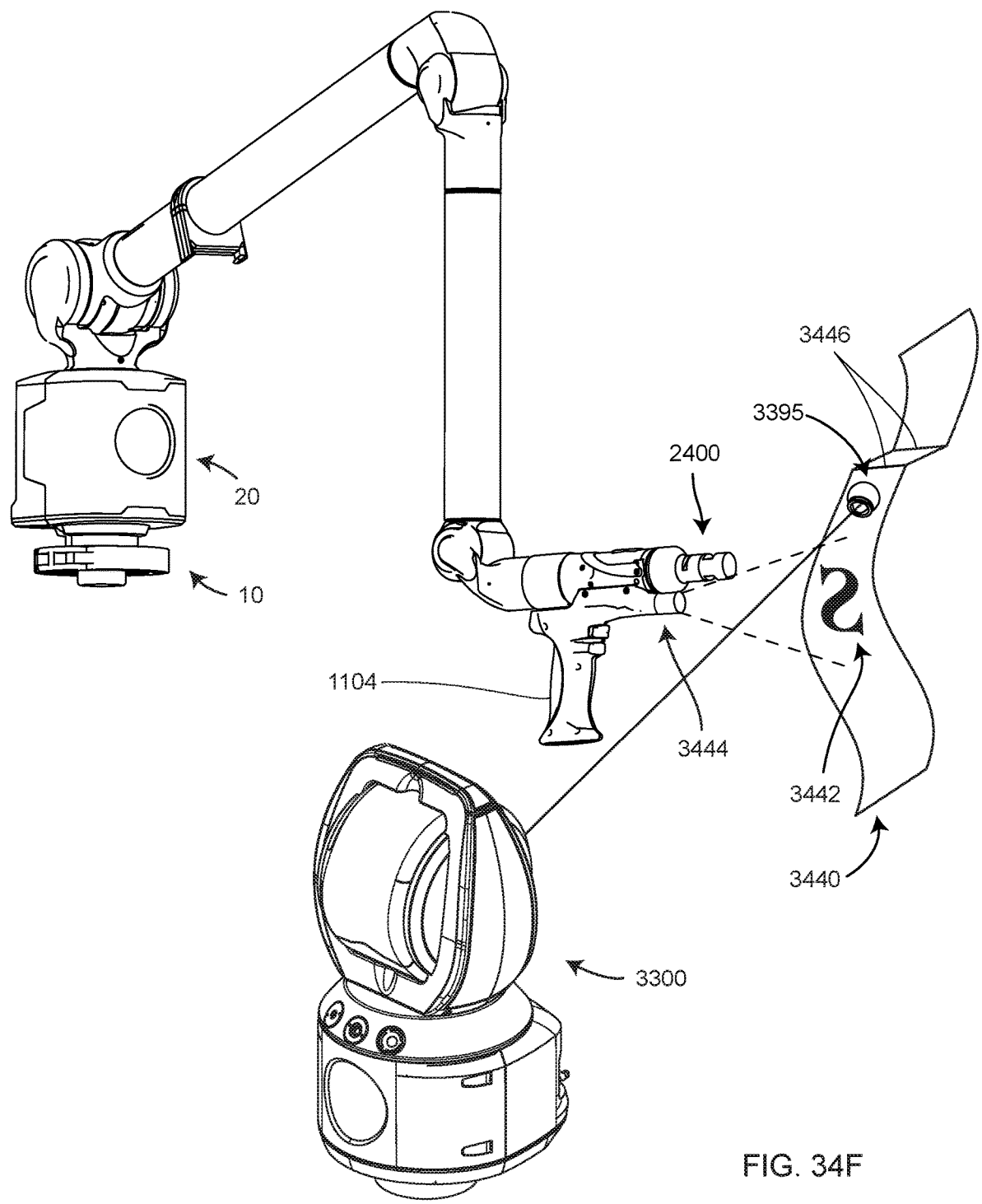
FIG. 34F is an isometric representation of an augmented reality (AR) camera obtaining visual elements that are fused to 3D coordinates measured by a laser tracker or probes of an AACMM according to an embodiment of the present invention.

FIG. 34F illustrates an embodiment in which a laser tracker 3300 and an AACMM 10 cooperate to measure 3D coordinates of an object 3440. In an embodiment, the procedure of FIG. 34E is followed to get the laser tracker 3300 and the AACMM 10 in the same frame of reference. In an embodiment, the AACMM 10 further includes a camera, here referred to as an augmented reality (AR) camera 3444 because of its function, which is to partly to capture visual elements 3442 such as color, pattern, texture, and text. In an embodiment, the AR camera 3444 is a color camera that includes a lens and a photosensitive array. In an embodiment, the AR camera 3444 may be directly integrated into an LLP 1100, as shown in FIG. 34D.

In an embodiment, the visual image data obtained by the AR camera 3444 is merged to 3D coordinates obtained by the laser tracker 3300 or the AACMM 10 and defined in a common frame of reference. The pose of the AR camera 3444 is known and hence can be superimposed upon 3D coordinates measured by the SMR 3395 and the laser tracker 3300 or upon 3D coordinates measured by the AACMM 10. In FIG. 34F, the probe is an SMR probe 2400, which another type of probe such as one of the probes 2300, 2350, or 3000 could be used, thereby enabling the tactile probe 904 of the probe to be used. In an embodiment, an LLP 1100 is used to measure 3D coordinate. In all of these cases, the 3D coordinates measured by the probe 904 or by the SMR 3395 can be merged with the color images acquired by an AR camera 3444. This embodiment provides advantages in that the addition of the AR camera 3444 to the AACMM 10 allows for a more complete visual representation of an object 3440 than would otherwise be the case. The fused 2D and 3D image may be referred to as a colorized 3D image.

In some cases, features 3446 measured by the SMR 3395, probe tip 904, or LLP 1100 may be directly observed in an image of the AR camera 3444 and used as natural feature registration elements, and used in the merging of the 2D image of the AR camera with the measured 3D points on the object 3400. Furthermore, a processor may be used to identify cardinal points from the 2D images, and these may be further tied to the measured 3D coordinates. The term cardinal point is typically used to refer to points that are identified in images and that can be used to connect or register the images together. There is a well-developed collection of techniques that may be used to determine cardinal points, generally using methods referred to as image processing or feature detection. A commonly used by general category for finding cardinal points is referred to as interest point detection, with the points detected referred to as interest points. According to the usual definition, an interest point has a mathematically well-founded definition, a well-defined position in space, an image structure around the interest point that is rich in local information content, and a variation in illumination level that is relatively stable over time. A particular example of an interest point is a corner point, which might be a point corresponding to an intersection of three planes, for example. Another example of signal processing that may be used is scale invariant feature transform (SIFT), which is a method well known in the art and described in U.S. Pat. No. 6,711,293 to Lowe. Other common feature detection methods for finding cardinal points include edge detection, blob detection, and ridge detection.

In an embodiment, additional graphical elements may be affixed to the merged 2D/3D colorized images. Such graphical elements may be elements of CAD models, text, drawings, or any other type of graphical attachment.

In an embodiment, a probe includes: an adapter operable to couple with an articulated arm coordinate measuring machine (AACMM), the AACMM including a base, a manually positionable arm portion having an opposed first end and second end, the arm portion being rotationally coupled to the base, the arm portion including a plurality of connected arm segments, each arm segment including at least one position transducer for producing a position signal, and an electronic circuit that receives the position signal from the at least one position transducer and provides data corresponding to a position of the probe; a probe body coupled to the adapter; a probe electrical interface disposed within the probe body; a probe stylus assembly having a probe tip, the probe stylus being coupled to the probe body opposite the adapter; and a first retroreflector coupled to the probe body.

In an embodiment, said first retroreflector in the probe is coupled to a top portion of the probe body. In an embodiment, said first retroreflector in the probe is coupled to a side portion of the probe body. In an embodiment, the probe further includes a second retroreflector coupled to the probe body. In an embodiment said first retroreflector of the probe is coupled to a top portion of the probe body and said second retroreflector is coupled to a side portion of the probe body. In an embodiment, wherein said probe electrical interface of the probe includes a first memory that stores numerical compensation parameters for the probe when attached to the AACMM.

In an embodiment, a probe includes: an adapter operable to couple with an articulated arm coordinate measuring machine (AACMM), the AACMM including a base, a manually positionable arm portion having an opposed first end and second end, the arm portion being rotationally coupled to the base, the arm portion including a plurality of connected arm segments, each arm segment including at least one position transducer for producing a position signal, and an electronic circuit that receives the position signal from the at least one position transducer and provides data corresponding to a position of the probe; a probe body coupled to the adapter; a probe electrical interface disposed within the probe body; and a first spherically mounted retroreflector (SMR) removably coupled to the probe body having a partial spherical portion, the first SMR having a cube-corner retroreflector having a vertex centered in the partial spherical portion.

In an embodiment, the probe further includes a kinematic nest coupled to the probe body and operable to repeatably center the first SMR on the kinematic nest; and a magnet coupled to the kinematic nest and operable to hold the first SMR to the kinematic nest.

In an embodiment, said probe further includes a probe stylus assembly having a probe tip. In an embodiment, the probe further includes a constraining element operable to selectively engage the SMR, wherein the SMR is coupled to the probe body when the constraining element is engaged. In an embodiment, said kinematic nest and said magnet are at least partially recessed in a recess of the probe body. In an embodiment, said constraining element is a threaded ring having screw threads sized to engage screw threads in the recess, the threaded ring sized to prevent the SMR from being removed from the recess when the threaded ring engages the screw threads in the recess. In an embodiment, said probe electrical interface includes a first memory that stores numerical compensation parameters specific to the removable SMR when attached to the probe.

In an embodiment, a method for measuring three-dimensional (3D) coordinates includes: providing a tracker operable to direct a first beam of light onto a retroreflector and to determine 3D coordinates of the retroreflector based at least in part a portion of the first beam of light reflected by the retroreflector and received by the tracker; providing an articulated arm coordinate measuring machine (AACMM) that includes a base, a manually positionable arm portion having an opposed first end and second end, the arm portion being rotationally coupled to the base, the arm portion including a plurality of connected arm segments, each arm segment including at least one position transducer for producing a position signal, a measurement device coupled to the first end, and an electronic circuit that receives the position signal from each of the at least one position transducers and provides data corresponding to a position of the measurement device, the AACMM further including a nest that supports a first spherically mounted retroreflector (SMR), the first SMR including a cube-corner retroreflector having a vertex centered in a partial sphere; providing a processor; in a first instance: placing the first SMR in the nest and measuring with the tracker first 3D reference coordinates of the first SMR when the arm portion is moved to place the first SMR in at least three positions; detaching the first SMR from nest and measuring with the tracker a first 3D coordinates of the first SMR when the first SMR is brought into contact with a first point; measuring with the measurement device of the AACMM second 3D coordinates of a second point; transforming with the processor the measured first 3D coordinates and the measured second 3D coordinates into the tracker frame of reference based at least in part on the measured first 3D reference coordinates; in a second instance: moving the AACMM to a position different than the position in the first instance; placing the first SMR in the nest and measuring with the tracker a second 3D reference coordinates of the first SMR when the arm portion is moved to place the first SMR in at least three positions; detaching the first SMR from the nest and measuring with the tracker a third 3D coordinates of the first SMR when the first SMR is brought into contact with a third point; measuring with the measurement device of the AACMM fourth 3D coordinates of a fourth point; transforming with the processor the measured third 3D coordinates and the measured fourth 3D coordinates into the tracker frame of reference based at least in part on the measured second 3D reference coordinates; and storing in the tracker frame of reference the first 3D coordinates, the second 3D coordinate, the third 3D coordinates, and the fourth 3D coordinates.

In an embodiment, wherein said measurement device is a tactile probe. In an embodiment, said tactile probe is used to measure a point outside a line-of-sight of a laser beam from the tracker to the vertex of the first SMR. In an embodiment, said tactile probe is used to measure a point inaccessible to contact by the first SMR. In an embodiment, numerical compensation parameters of said tactile probe are stored in memory within a probe electrical interface coupled to the tactile probe.

In an embodiment, said measurement device is a triangulation scanner. In an embodiment, said triangulation scanner is a laser line probe. In an embodiment, said triangulation scanner measures, in the first instance, a first collection of points and, in the second instance, a second collection of points, each of the first collection and the second collection including at least three points. In an embodiment, said first SMR is mounted on a first probe assembly and said tactile probe is mounted on a second probe assembly, the first probe assembly and the second probe assembly being exchangeable on the first end.

In an embodiment, first numerical compensation parameters of the first probe assembly are stored in a first memory within a first probe electrical interface coupled to the first probe assembly; and second numerical compensation parameters of the second probe assembly are stored in a second memory within a second probe electrical interface coupled to the second probe assembly. In an embodiment, said first SMR is mounted on the nest of a probe assembly that includes both the nest and a tactile probe. In an embodiment, first numerical compensation parameters of the tactile probe and second numerical compensation parameters of the first SMR sitting on the nest are stored in a memory within a probe electrical interface coupled to the probe assembly. In an embodiment, said first SMR is removably mounted on a connected arm segment between the base and the first end.

In an embodiment, a method for obtaining colorized three-dimensional (3D) images includes: providing an articulated arm coordinate measuring machine (AACMM) that includes a base, a manually positionable arm portion having an opposed first end and second end, the arm portion being rotationally coupled to the base, the arm portion including a plurality of connected arm segments, each arm segment including at least one position transducer for producing a position signal, a measurement device coupled to the first end, a color camera coupled to the first end, a retroreflector coupled to the first end, and an electronic circuit that receives the position signal from the at least one position transducer and provides data corresponding to a position of the measurement device, the color camera, and the retroreflector, the AACMM further coupled to a retroreflector and a color camera; providing a tracker operable to direct a first beam of light onto the retroreflector and to determine 3D coordinates of the retroreflector based at least in part a portion of the first beam of light reflected by the retroreflector and received by the tracker; providing one or more processors; in a first instance: measuring with the tracker first 3D reference coordinates of the retroreflector when the arm portion is moved to place the retroreflector in at least three positions; determining with the processor a first pose of the AACMM within a tracker frame of reference based at least in part on the measured first 3D reference coordinates; capturing with the color camera a first two-dimensional (2D) color image; determining with the processor a first colorized 3D image in a tracker frame of reference based at least in part on the first pose of the AACMM and on the first color image; and storing the first colorized 3D image.

In an embodiment, said method further includes: providing a 3D digital representation of an object; and superimposing with the processor the first colorized 3D image onto the 3D representation to obtain a first colorized 3D representation. In an embodiment, the method further includes: measuring 3D coordinates of a first point on the object with the AACMM or with the tracker; placing the 3D representation within the tracker frame of reference based at least in part on the measured 3D coordinates; and superimposing with the processor the measured 3D coordinates of the first point onto the first colorized 3D representation.

In an embodiment, the method further includes: matching a first feature of the first colorized 3D representation to corresponding first features of the 3D representation of the object; and placing the 3D representation within the tracker frame of reference based at least in part on the corresponding matched first features. In an embodiment, the method further includes: with the AACMM in the first pose, capturing with the color camera a second 2D color image; and determining with the processor a second colorized 3D image in the tracker frame of reference further based on the second 2D color image. In an embodiment, the method further includes: determining with the processor a first composite colorized 3D image by combining the first colorized 3D image and the second colorized 3D image.

In an embodiment, the method further includes: with the AACMM having the first pose in the tracker frame of reference, measuring with the measuring device a first probed 3D coordinate; and, with the processor, combining the first composite 3D color image with the first probed 3D coordinate in the tracker frame of reference. In an embodiment, the method further includes: measuring 3D coordinates of a first feature on an object with the AACMM or with the tracker; determining with the processor the 3D coordinates of the first feature in the tracker frame of reference; matching the measured first feature to a first element of the first colorized 3D image; and placing the first colorized 3D image in the tracker frame of reference based at least in part on the 3D coordinates of the first feature in the tracker frame of reference and on the matching of the measured first feature to the first element of the first colorized 3D image.

In an embodiment, the measurement device in the method is a triangulation scanner having a pattern projector and a triangulation camera separated by a baseline distance, the triangulation scanner being operable to determine 3D coordinates based at least in part on a pattern projected by the pattern projector and a corresponding image obtained by the triangulation camera. In an embodiment, the triangulation scanner in the method further includes the color camera.

Figure 36:
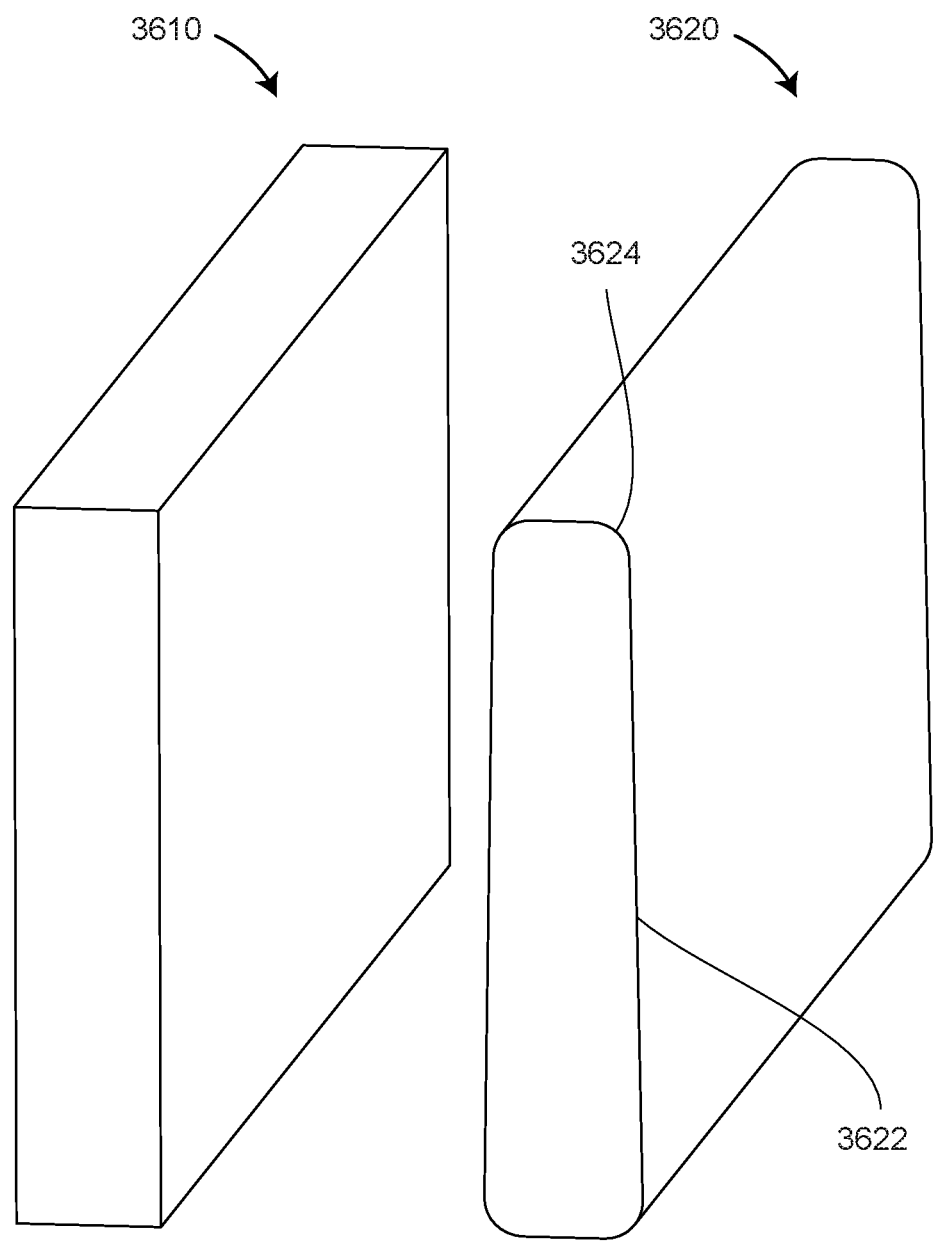
FIG. 36 is a cross sectional comparison of a standard machined torsion spring and a wire-wound torsion spring according to an embodiment of the present invention.

An effect seen in machined torsion springs is that twisting of the torsion spring to create tension in the spring is accompanied by an outward force of the spring on the elements constraining it. Another effect seen in machined torsion springs is that they tend to expand asymmetrically as they are twisted—for example, by expanding a greater amount at the bottom of the torsion spring than at the top of the torsion spring. The result of these two effects—an overall expansion along the length of the torsion spring, as well as an asymmetrical expansion—is a tendency to apply unwanted forces on elements of the second-axis assembly during rotation of the first segment 295. A way to minimize these effects is to create the torsion spring by flattening wire and then winding the flattened wire into a spring shape. The resulting spring is referred to as a wire wound torsion spring. As a result of this process, a wire wound torsion spring 3620 has a tapering cross section 3622 and rounded edges 3624, as shown in FIG. 36. A machined torsion spring has a rectangular cross section 3610 with parallel sides and sharp edges. Hence a torsion spring having tapering sides and rounded edges can be expected to exhibit less unwanted forces when twisted to create spring tension.

Figure 35:
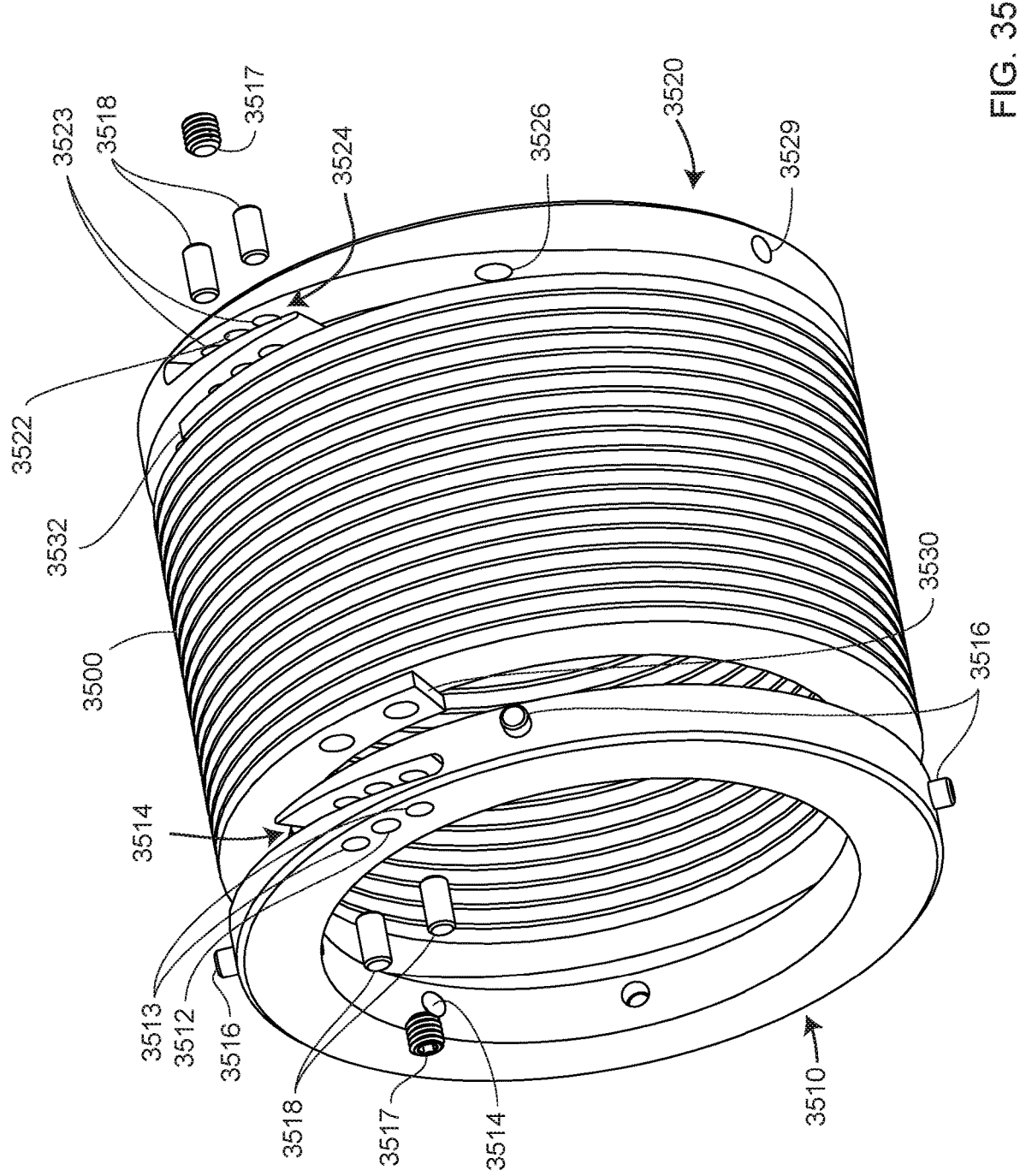
FIG. 35 is an exploded view of elements in a counterbalance spring assembly according to an embodiment of the present invention.

FIG. 35 is an exploded isometric view of a wire-wound torsion spring 3500 used in combination with a pinned adapter 3510 and a threaded adapter 3520. In an embodiment, the wire-wound torsion spring 3500 has a fixed end 3530 that is fixed relative to the base 20 of the AACMM 10. The wire-wound torsion spring 3500 also has a moveable end 3532 that moves along with the first segment 295. The fixed end of the spring 3530 is attached to the pinned adapter 3510 using a set screw 3517 and two dowel pins 3518. The moveable end of the spring 3532 is attached to the threaded adapter 3520 using a set screw 3517 and two dowel pins 3518.

Figure 37B:
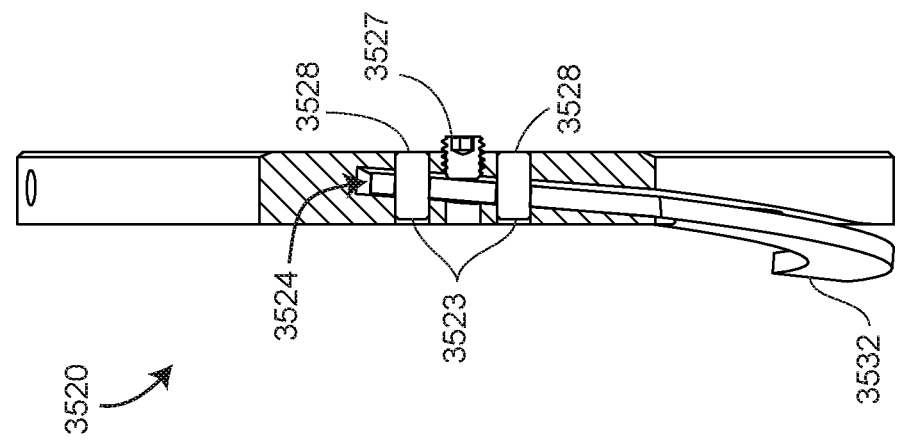
FIGS. 37A, 37B are front and cross-sectional views, respectively, of a threaded adapter in contact with one end of a wire-wound torsion spring according to an embodiment of the present invention.
Figure 37A:
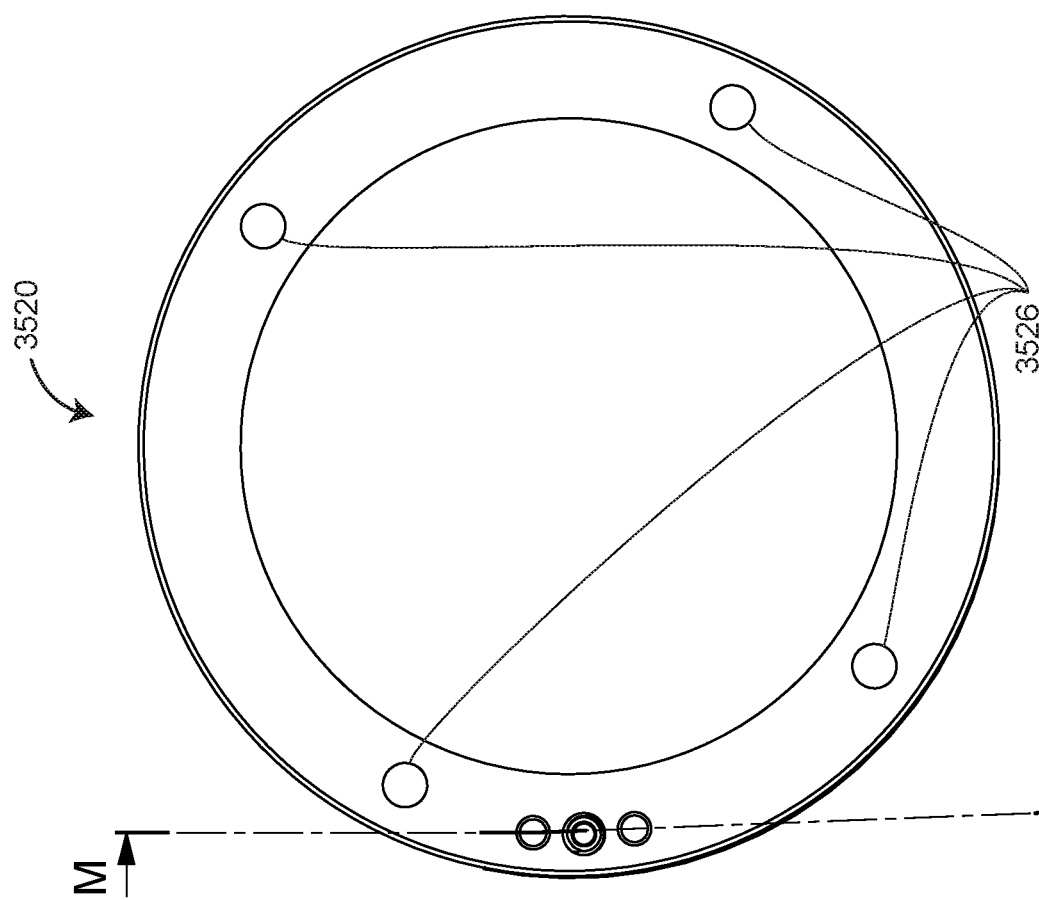

FIG. 37A shows a side view of the threaded adapter 3520, and FIG. 37B shows a cross-sectional view through the smooth holes 3523 and the threaded hole 3522 of the threaded adapter 3520. The cross-sectional view of FIG. 37B shows how the dowel pins 3528 and set screw hold the moveable end of the spring 3532 firmly in place. As can be seen in FIG. 35, the fixed end of the spring 3530 is positioned in the adapter gap 3514 when pinned in place. The moveable end of the spring 3532 is positioned in the adapter gap 3524 when pinned in place.

Figure 38:
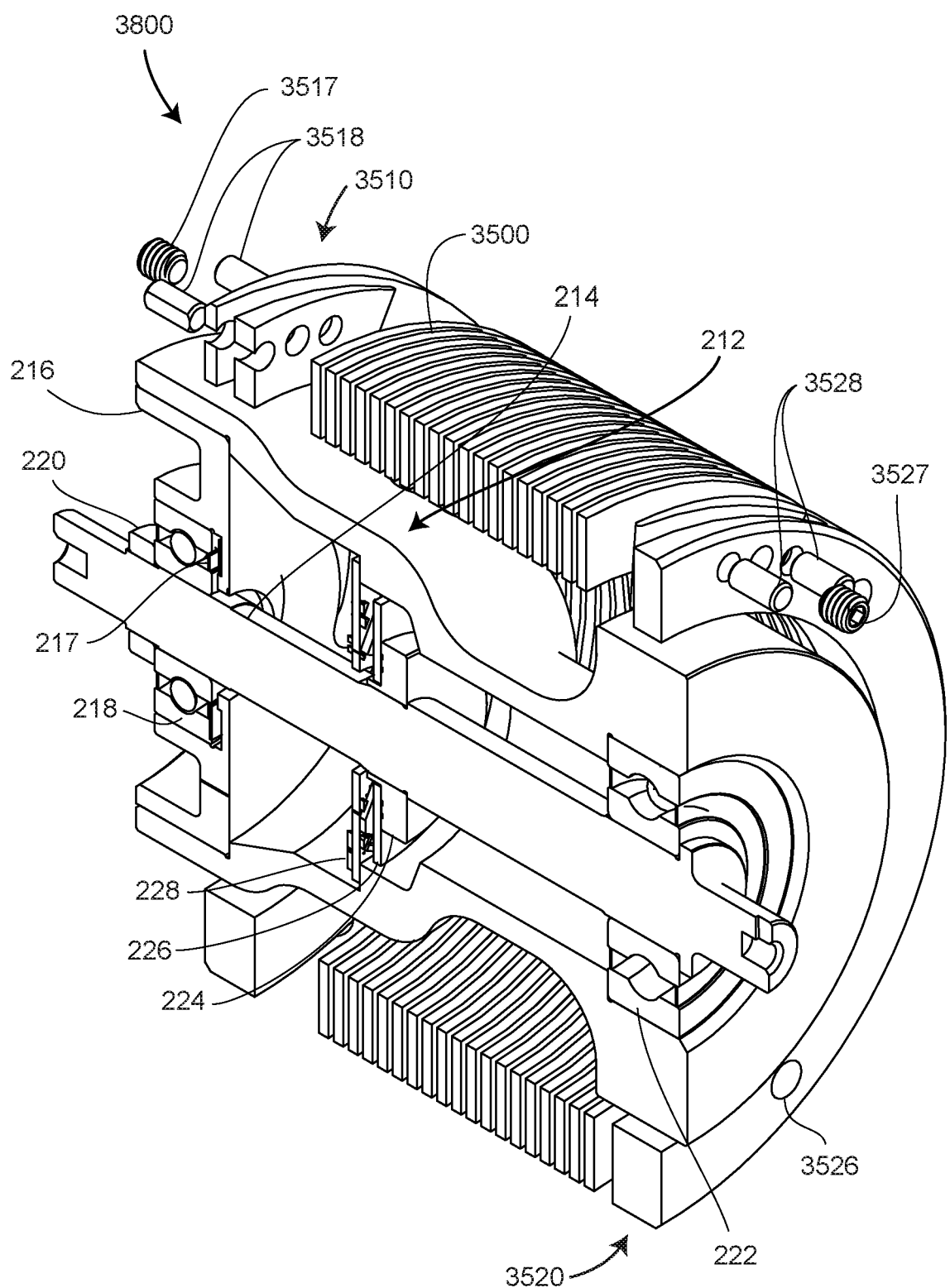
FIG. 38 is a cross sectional isometric view of elements in a second-axis cartridge according to an embodiment of the present invention.

FIG. 38 shows an exploded cross-sectional view of elements within the second-axis cartridge 3800. As in embodiments discussed herein above, the cartridge elements include a second-axis shaft 214 supported for rotation by a left second-axis bearing 222 and a right second-axis bearing 218. The left second-axis bearing 222 is coupled directly to the second-axis housing 212. The right second-axis bearing 218 is coupled to a cartridge inner plate 216 which is coupled directly to the second-axis housing 212. As explained herein above, a wave washer 217 applies force to the outer race of the right second-axis bearing 218 but not to the inner race. A lock nut 220 holds the inner race of the right second-axis bearing 218 in place. An encoder disk 226 is attached to a second-axis disk mount 224 and rotates with the second-axis shaft 214. An encoder board with read heads 228 is attached to the second-axis housing 212, which does not rotate with the second-axis shaft 214. In an embodiment, the threaded adapter 3520 includes four threaded holes 3526. These threaded holes 3526 serve the same function as the threaded holes 247 in FIG. 12 by receiving yoke locking screws that attach the threaded adapter 3520 to the first segment yoke beam 262 and the first-segment-yoke left bow 266.

Figure 39:
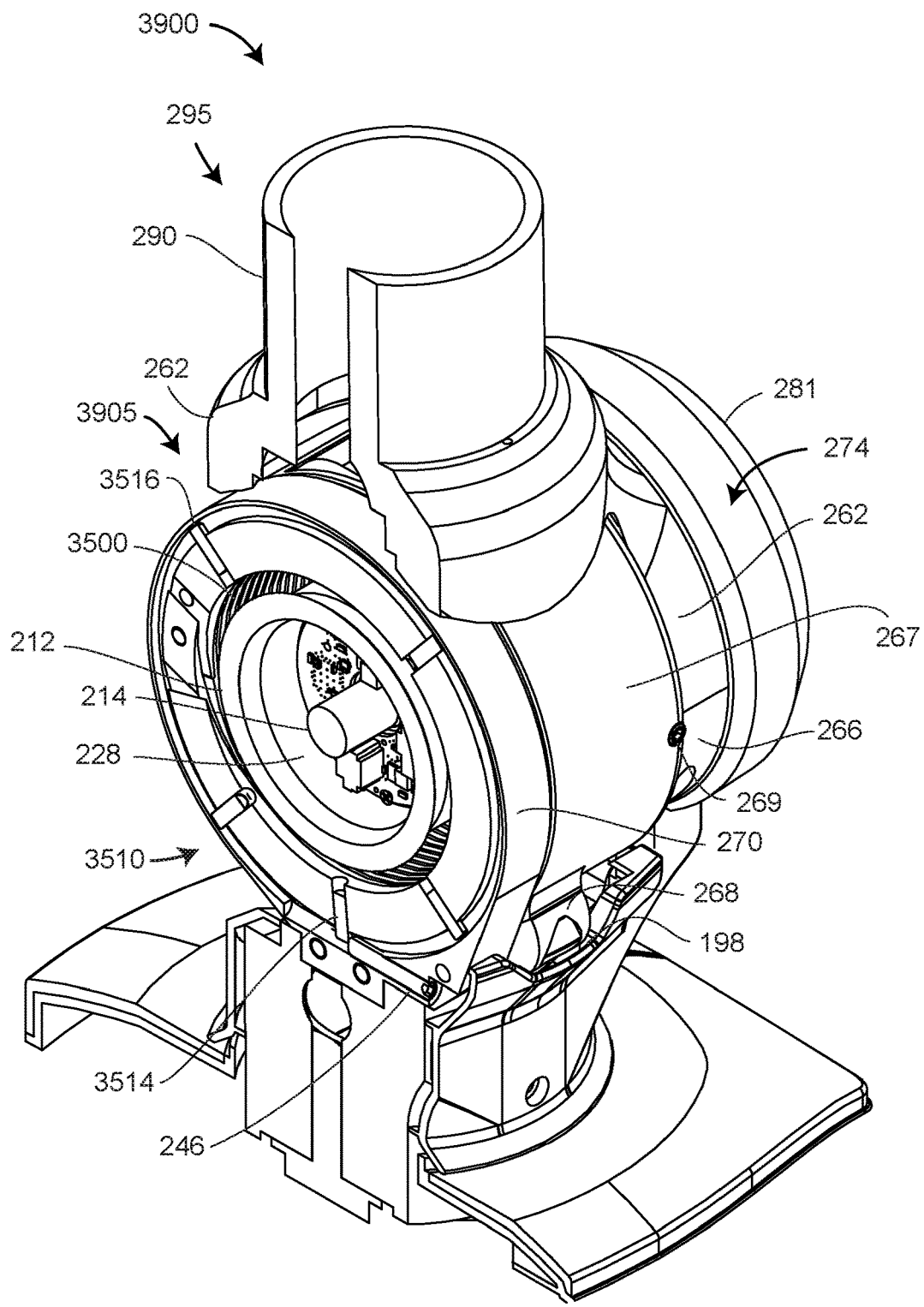
FIG. 39 is a cross sectional isometric view of a second axis assembly according to an embodiment of the present invention.

FIG. 39 is a cross-sectional isometric view of the second axis assembly 3900 with the cross section taken through the pinned adapter 3510. In an embodiment, a number of spring retaining pins 3516 are embedded in the pinned adapter 3510, as shown in FIGS. 35, 39. The spring retaining pins 3516 keep the pinned adapter 3510 centered in the spring tension plate 270. In addition, a spring tension pin 3514 embedded in the pinned adapter 3510 is positioned by a tensioning set screw 246 to set the tension in the wire wound torsion spring 3500. The tension is generally set to reduce the apparent weight of the arm in use. The wire wound torsion spring 3500 and other components located in the central portion of the second-axis assembly 3900 are referred to collectively as the counterbalance ring 3516. An anti-rotation set screw 269 fixes one side of the wire wound torsion spring 3500 to a counterbalance ring cylinder 267. Movement of the first segment 295 is limited in rotation in one direction by the counterbalance ring bump 268 and first-axis yoke bumper 198. A cable cover 274 and cap body 281 are panels that surround mechanical components and wires of the assembly.

A first-axis assembly, when combined with a second-axis assembly, may be referred to as a rotation assembly. An example of such a rotation assembly is the first-axis assembly 100 and the second-axis assembly 200 in FIG. 6A. Other first- and second-axis assemblies are associated with the components in FIGS. 35, 36, 37A, 37B, 38, 39, 40, 41, 42A, 42B, 43A, 43B, 44, 45A, 45B. Each rotation assembly includes a first axis of rotation and a second axis of rotation substantially perpendicular to the first axis of rotation. For example, the first axis of rotation may be the vertical axis of rotation of the first-axis assembly 200 in FIG. 6A, which is the first axis 131 shown in FIG. 8C. The corresponding second axis of rotation is the horizontal axis of rotation of the second-axis assembly 200, which is the axis 211 shown in FIG. 12.

A biasing member is the assembly that operably couples the rotation assembly to the end of the AACMM that holds the measurement device and that applies a force to the end of the arm opposite the base 20, with the force applied about the second axis of rotation, which as described herein above may be a horizontal axis 211. For the type of counterbalance mechanisms illustrated in FIGS. 35, 36, 37A, 37B, 38, 39, the biasing member includes elements within the counterbalance ring 3905 (FIG. 39). Such components include the wire wound torsion spring 3500, pinned adapter 3510, and threaded adapter 3520. The counterbalance mechanism is referred to as a biasing member because it adjusts the amount of torque applied to the arm segments to lighten the downward force felt by the operator when holding the arm segments during a measurement.

In an embodiment, the biasing member is adjusted by an adjuster having a threaded portion that engages at least on projection of a first adapter, which may in an embodiment be the pinned adapter 3520. The adjuster may be the tensioning set screw 246 in FIG. 39, for example. The force applied by the biasing member is responsive to the movement of the adjuster.

In another embodiment, the pinned adaptor 3510 is replaced by a similar adapter that is welded to the fixed end of the spring 3530 rather than attached to the fixed end of the spring 3530 with dowel pins 3518 and set screw 3517. In this same embodiment, the threaded adaptor 3520 is replaced by a similar adapter that is welded to the moveable end of the spring 3532 rather than attached to the moveable end of the spring 3532 with dowel pins 3518 and set screw 3517. In other embodiments, other methods are used to attach adapters to the fixed end of the spring 3530 and the moveable end of the spring 3532.

In another embodiment, the wire wound torsion spring 3500 is replaced with a torsion spring made of composite material such as carbon-fiber composite material. A potential advantage of a torsion spring made of composite material is that the composite material can be designed to have properties considered ideal for the application as a counterbalance mechanism in the AACMM 10.

Figure 40:
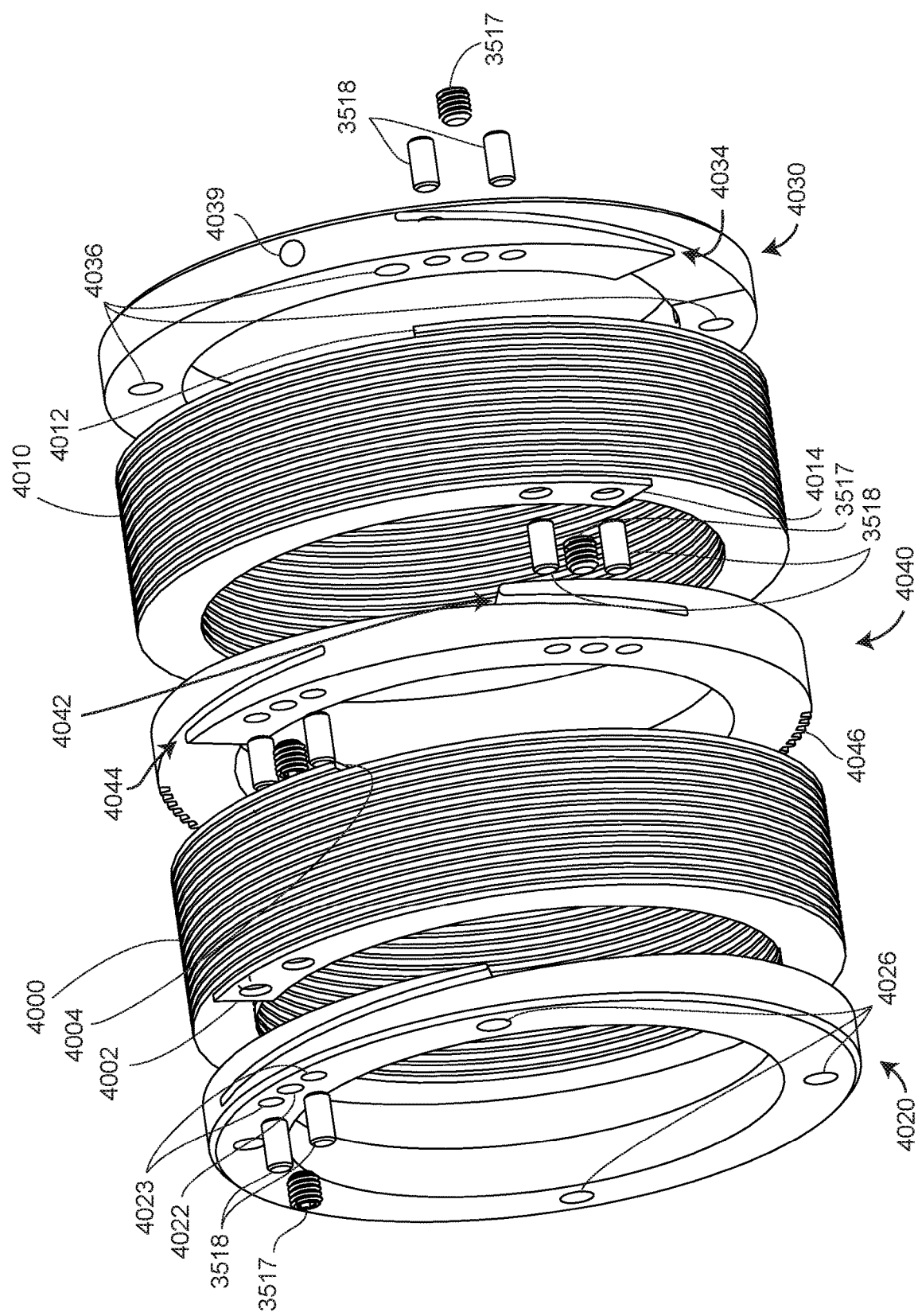
FIG. 40 is an exploded view of elements in a counterbalance spring assembly according to an embodiment of the present invention.

A problem that may be encountered with torsion springs that are fixed to the base 20 on one end and rotatable on the other end is that there may be a tendency for the first arm segment 295 to bend to one side as the arm segment 295 is rotated downward. A way to eliminate this tendency is to fix the torsion spring assembly in the center to allow springs to move on either side of the center. FIG. 40 is an exploded isometric view of spring center rack adapter 404 coupled to a first wire wound torsion spring 4000 on one side and a second wire wound torsion spring 4010 on the other side. In an embodiment, the second wire wound torsion spring 4010 is wound in the opposite direction of the first wire wound torsion spring 4000. In an embodiment, a threaded adapter 4020 is coupled to first wire wound torsion spring 4000 with dowel pins 3518 and a set screw 3517. A threaded adapter 4030 is coupled to second wire wound torsion spring 4010 with dowel pins 3518 and a set screw. In an embodiment, one side of the spring center rack adapter 4040 is coupled to the first torsion spring 4000 and the other side is coupled to the second torsion spring 4010. In an embodiment, the coupling is achieved with dowel pins and set screws. Each of the threaded adapters 4020, 4030 includes threaded holes 4026 to accept threaded adapter attachment screws 4116. These screws 4116 attach the first-segment yoke beam 4112 and the first segment yoke bows 4120 to the threaded adapters 4020, 4030, as shown in FIG. 41.

Figure 41:
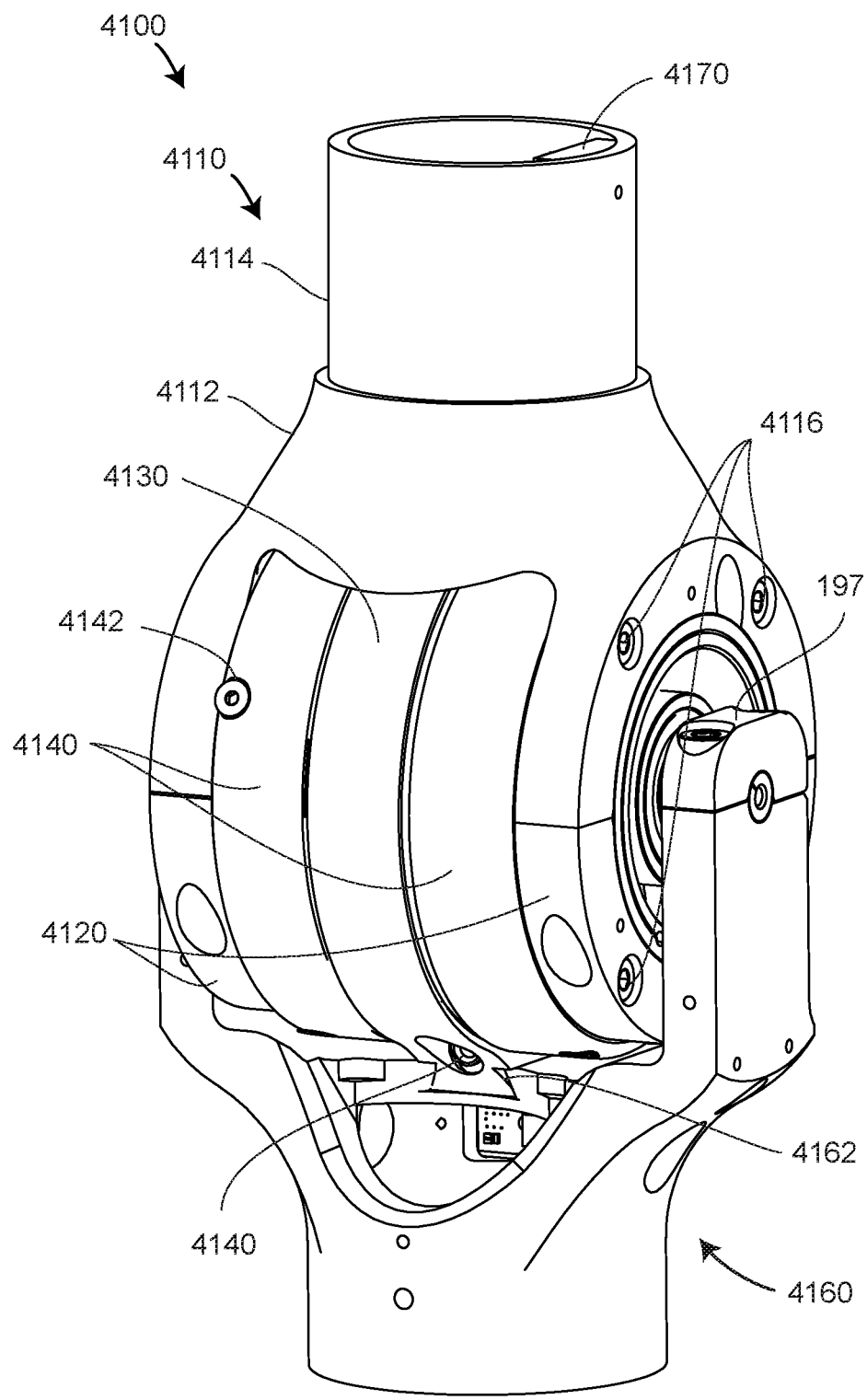
FIG. 41 is an isometric view of a second-axis assembly according to an embodiment of the present invention.

In an embodiment illustrated in FIG. 41, a spring cover 4140 is locked to a first-axis yoke dovetail 4162 of the first-axis yoke structure 4160. In an embodiment, the spring adjustment screw 4140 is an Acme screw that engages with Acme gear teeth 4046. Turning of the spring adjustment screw causes the tension of the torsion springs 4000, 4010 to increase or decrease, thereby controlling the amount of resistance applied by the spring to the arm segments to counterbalance the weight of the arm segments. A spring cover 4140 is placed on either side of the spring tension plate 4130. Spring cover attachment screws 4142 are used to attach the spring covers 4140 to the threaded adapters 4020, 4030. FIG. 40 shows a the anti-rotation threaded hole 4039 that receives one of the spring cover attachment screws 4142.

Figure 42B:
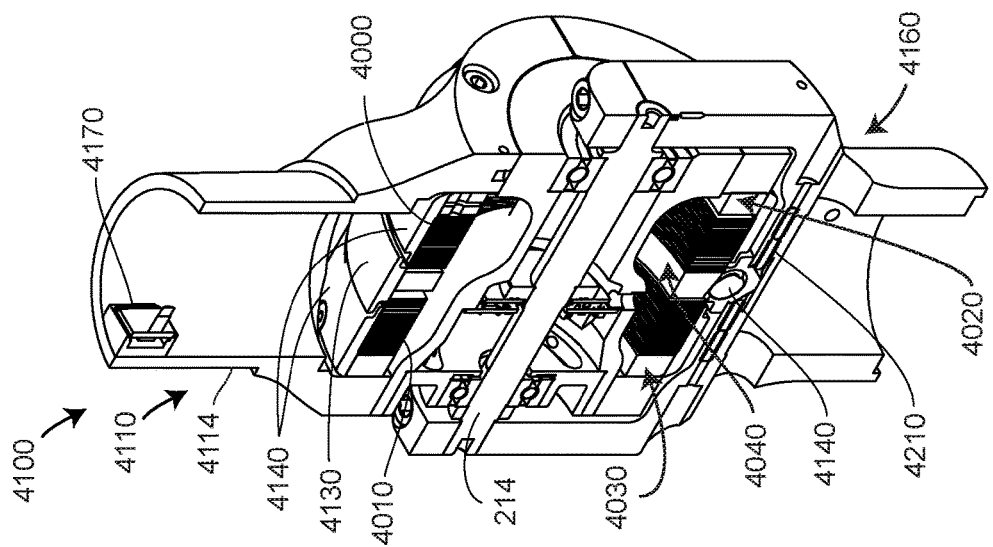
FIGS. 42A, 42B are side and cross sectional views of a second-axis assembly according to an embodiment of the present invention.
Figure 42A:
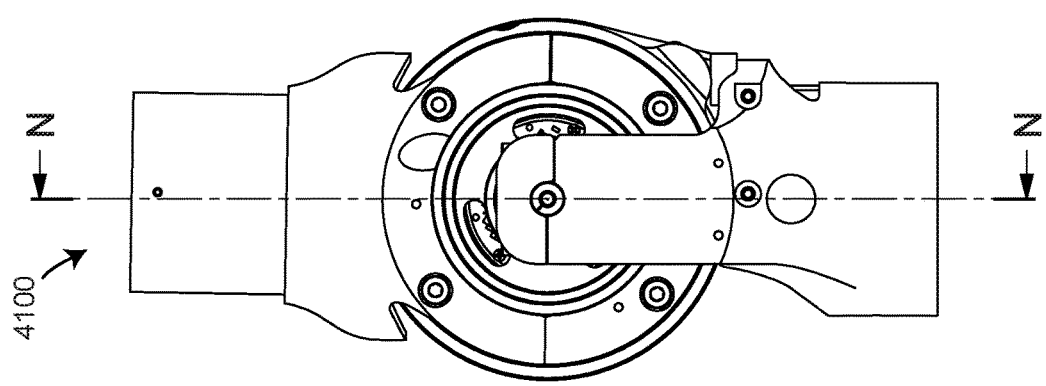

FIG. 42A shows a side view of second-axis assembly 4100. A cross section N-N drawn through the center of the side view is shown in FIG. 42B. Shown in the section view are the spring center rack adapter 4040, the wire wound torsion springs 4000, 4010, the threaded adapters 4020, 4030, the spring adjustment screw 4140, the second-axis shaft 214, the spring covers 4140, and the spring tension plate 4130. The spring adjustment screw 4140 is held in place by spring tension plate locking set screws 4210. The upper part of the second-axis assembly 4100 includes the first segment yoke 4110, including the tube adapter 4114 and the temperature sensor 4170. The lower part of the second-axis assembly 4100 includes the first-axis yoke structure 4160.

Figure 43B:
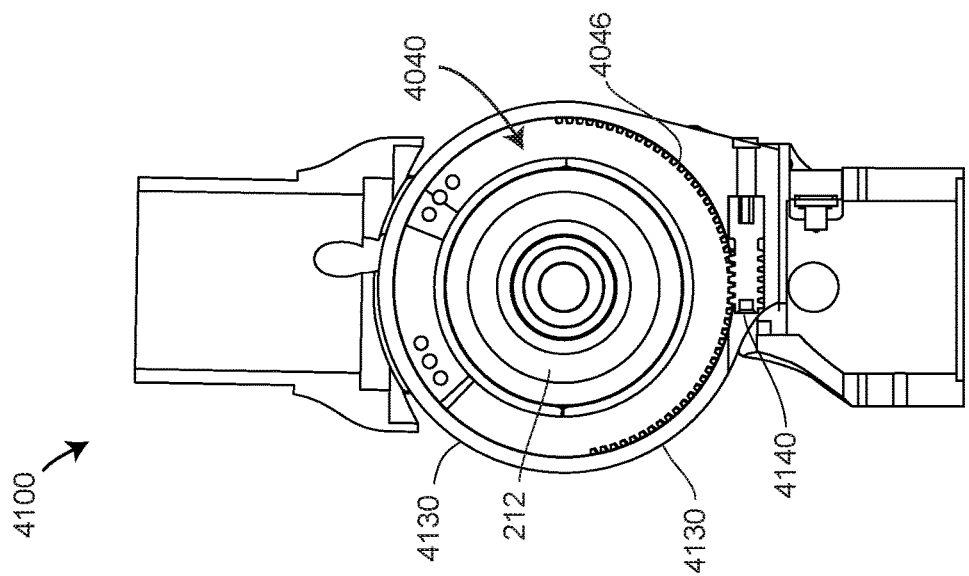
FIGS. 43A, 43B are front and cross sectional views of a second-axis assembly according to an embodiment of the present invention.
Figure 43A:
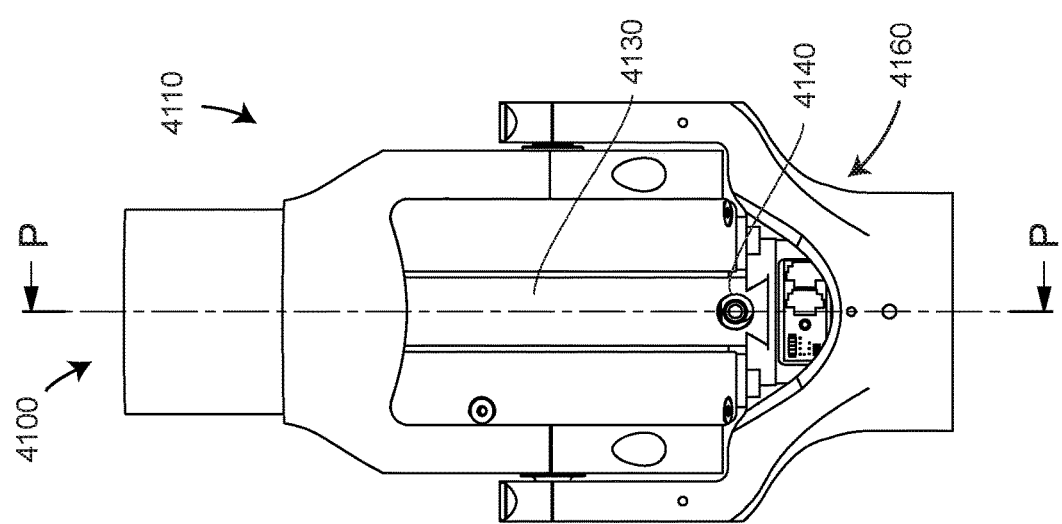

FIG. 43A shows a front view of second-axis assembly 4100. A cross section P-P drawn through the center of the front view is shown in FIG. 43B. Shown in the FIGS. 43A, 43B are the first-axis yoke structure 4160, the first segment yoke 4110, the spring tension plate 4130, and the spring adjustment screw 4140. Also shown are the second-axis housing 212, the spring tension plate 4130, the spring center rack adapter 4040, the Acme gear teeth 4046, and the spring adjustment screw 4140.

In another embodiment, the spring center rack adapter is replaced by a similar adapter that is welded to the fixed ends of the spring 4004, 4014. In this same embodiment, the threaded adaptor 4020 is replaced by a similar adapter that is welded to the moveable end of the spring 4002. The threaded adapter 4030 is replaced by a similar adapter that is welded to the moveable end of the spring 4012. In other embodiments, other methods are used to attach adapters to the fixed and movable ends of the torsion springs 4000, 4010.

In another embodiment, the wire wound torsion springs 4000, 4010 are replaced by torsion springs that are machined rather than wire wound. In another embodiment, the wire wound torsion springs 4000, 4010 are replaced with torsion springs made of composite material such as carbon-fiber composite material. A potential advantage of torsion springs made of composite material is that the composite material can be designed to have properties considered ideal for the application as a counterbalance mechanism in the AACMM 10.

Figure 44:
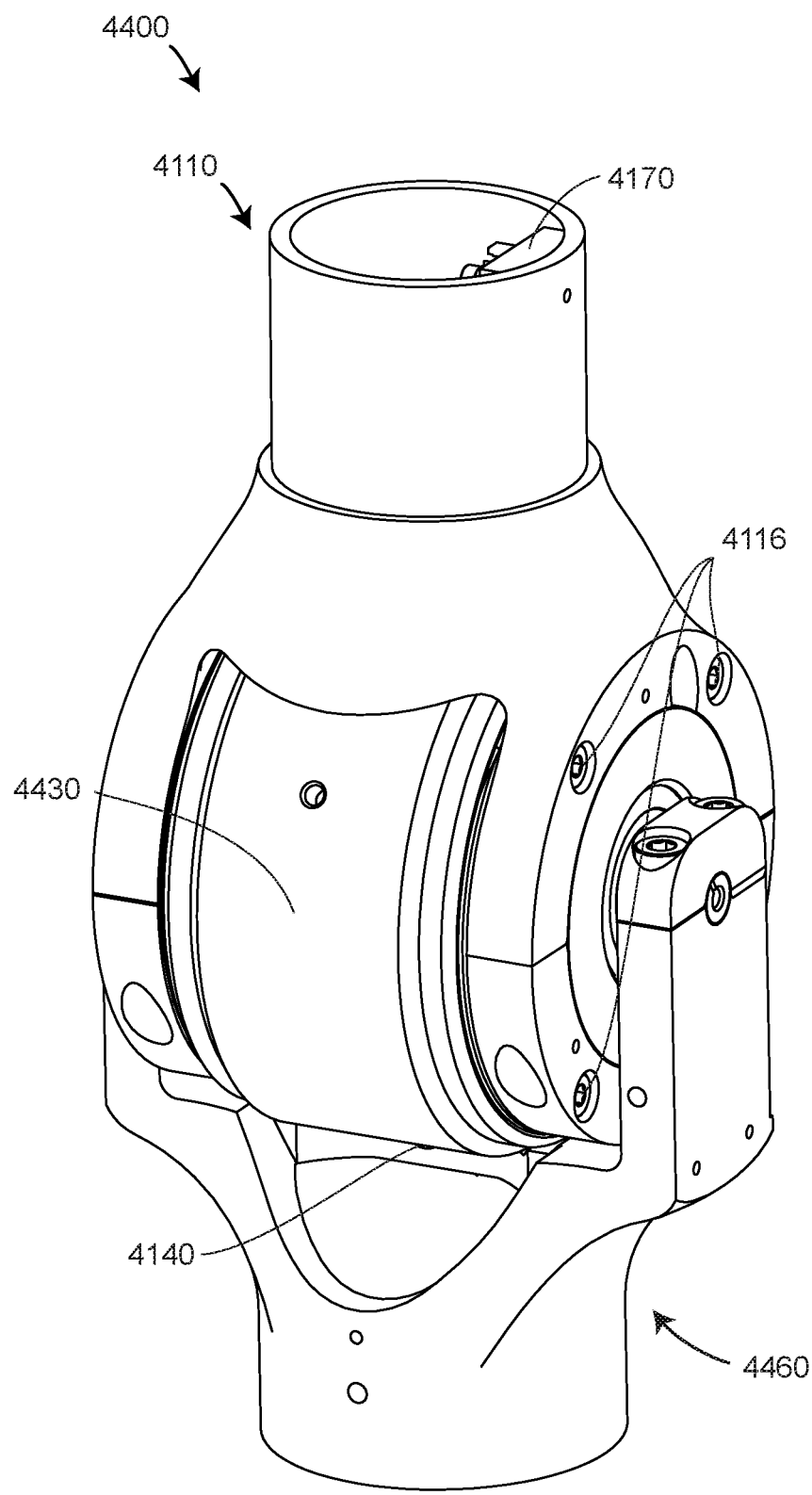
FIG. 44 is an isometric view of a second-axis assembly according to an embodiment of the present invention.
Figure 45B:
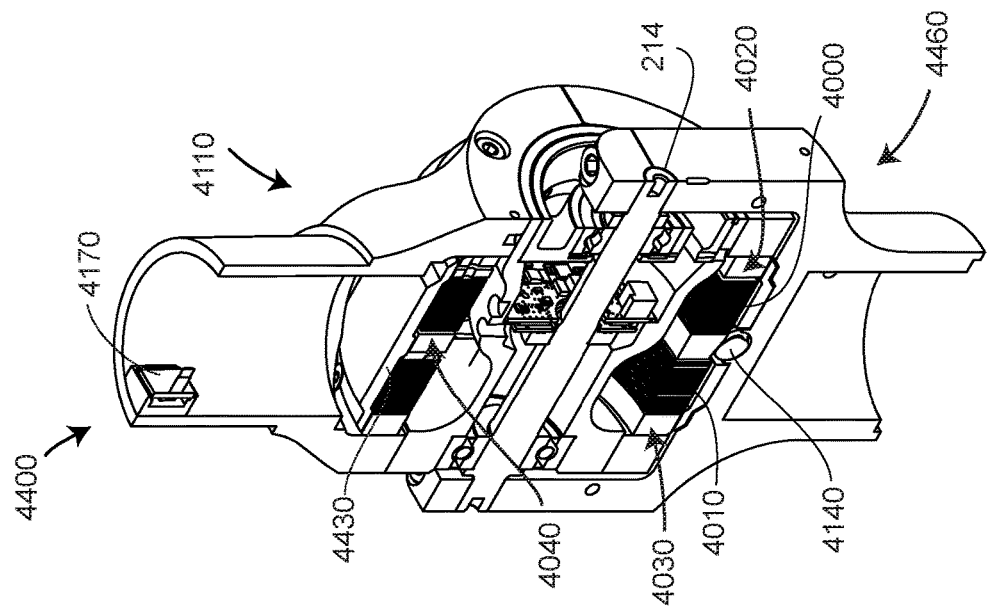
FIGS. 45A, 45B are side and cross sectional views of a second-axis assembly according to an embodiment of the present invention.
Figure 45A:
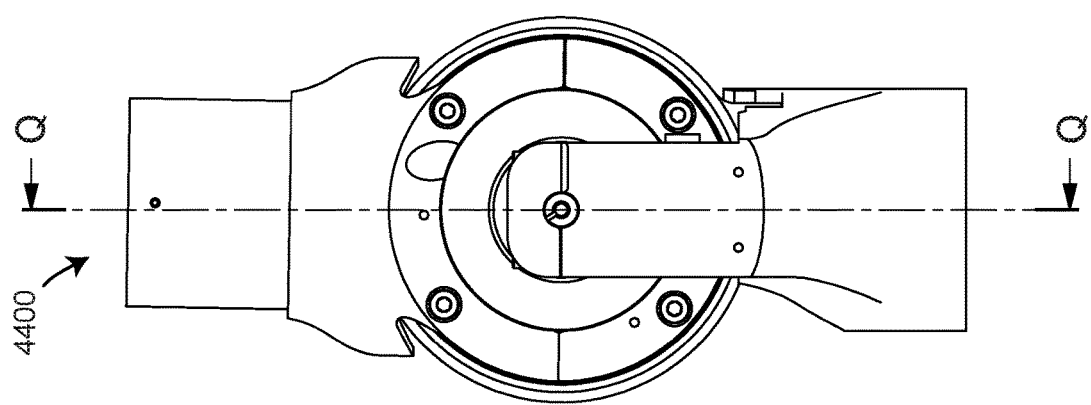

FIGS. 44, 45A, 45B show another embodiment of a second-axis assembly that includes a spring center rack adapter 4040 attached on one side to the threaded adapter 4020 and on the other side to a threaded adapter 4030. A spring adjustment screw turns teeth on the spring center rack adapter 4040 to set the tension in the springs 4020, 4030. In an embodiment, the first-axis yoke structure 4460 does not include a first-axis yoke dovetail. In an embodiment, a single spring tension plate 4430 replaces the spring tension plate 4130 and two spring covers 4140.

The counterbalance assembly, also referred to as the counterbalance ring, is the assembly that operably couples the rotation assembly to the end of the AACMM that holds the measurement device. For the type of counterbalance mechanisms illustrated in FIGS. 40, 41, 42A, 42B, 43A, 43B, 44, 45A, 45B, the counterbalance assembly may be said to include a first biasing element and a second biasing element. In an embodiment, the first biasing element is the wire wound torsion spring 4000 and the second biasing element is the wire wound torsion spring 4010. These torsion springs are referred to as biasing elements because they adjust the amount of torque applied to the arm segments to lighten the downward force felt by the operator when holding the arm segments during a measurement. The types of counterbalance mechanism described in FIGS. 40, 41, 42A, 42B, 43A, 43B, 44, 45A, 45B also include an adjustment mechanism placed between the first biasing element and the second biasing element. In an embodiment, the adjustment mechanism includes a spring center rack adapter 4040 and a spring adjustment screw 4140. The adjustment mechanism adjusts a force applied by the first biasing element and the second biasing element to the second end about the second axis of rotation. In the embodiment illustrated in FIG. 41, the force is transferred from the first and second biasing elements to the first segment yoke beam. This force is transferred to the first-segment tube 295 and through the remaining arm components to provide some level of force at the end of the arm opposite the base 20. The applied force results in different applied torques at different locations on the AACMM arm components.

In embodiments described above, the adjustment mechanism includes an adjuster and an adapter. An example of an adjuster is the spring adjustment screw 4140 in FIGS. 43A, 43B. An example of an adapter is the spring center rack adapter 4040. The adapter 4040 has at least one projection that is engaged by a threaded portion of the adapter. The at least one projection may be one of the gear teeth, which might be Acme gear teeth 4046, for example. The threaded portion of the adjuster engages the at least one projection and may be used to move the at least one projection between a first position and a second position.

The amount of force, or torque, applied by the counterbalance ring to the arm segments depends on the position of the arm segments and, in particular, on the angle of tilt of the first segment 295, which in some embodiments is attached to a first-segment tube adapter 4114. In most cases, if the tube is in an upright position or in a position limited by contact between the first-axis yoke bumper 198 and the counterbalance ring bump 268, the force applied by the torsion springs is minimized. The force, or torque, then increases as the first segment 295 is lowered. As the first segment 295 is lowered, the weight of the first-segment tube 290 increases, as does the weight of other arm components closer to the end of the arm farthest from the base 20. The increased force applied by the springs to the first-segment tube 290 as the first-segment tube 290 is lowered acts to counteract the weight of the tubes, which also increase as the first-segment tube 290 is lowered. Hence the torque applied by the springs to the arm segments depends on the degree to which the first-segment tube is lowered.

In an embodiment, an apparatus comprises: a base; a manually positionable arm portion having an opposed first end and second end, the arm portion being rotationally coupled to the base, the arm portion including a plurality of connected arm segments, each arm segment including at least one position transducer for producing a position signal; an electronic circuit that receives the position signal from the at least one position transducer and provides data corresponding to a position of the first measurement device; a rotation assembly coupling the second end to the base, the rotation assembly having a first axis of rotation and a second axis of rotation substantially perpendicular to the first axis of rotation; and a counterbalance assembly operably coupled between the rotation assembly and the second end, the counterbalance assembly including an adjustment mechanism between a first biasing element and a second biasing element, the adjustment mechanism operable to set a force applied by the first biasing element and the second biasing element to the second end about the second axis of rotation.

In an embodiment, the apparatus further comprises a measurement device coupled to the first end. In an embodiment, in the apparatus, the first biasing element is a first torsion spring and the second biasing element is a second torsion spring. In an embodiment, in the apparatus, the adjustment mechanism includes an adjuster and an adapter, the adapter having at least one projection moveable between a first position and a second position, the adjuster having a threaded portion arranged to engage the at least one projection.

In an embodiment, in the apparatus, the threaded portion is engaged to the at least one projection to move the at least one projection between the first position and the second position. In an embodiment, in the apparatus, the at least one projection includes a plurality of gear teeth. In an embodiment, in the apparatus, the torsion spring applies a first torque on the arm portion when the plurality of gear teeth are in a first position and a second torque on the arm portion when the plurality of gear teeth are in a second position.

In an embodiment, in the apparatus, the first torsion spring is selected from the group consisting of: a wire wound torsion spring, a machined torsion spring, a torsion spring fabricated of composite material. In an embodiment, in the apparatus, the first torsion spring has tapering sides. In an embodiment, in the apparatus, the first torsion spring and the second torsion spring are attached on each of their ends to adapter plates.

In an embodiment, in the apparatus, the first torsion spring and the second torsion spring are attached to the adapter plates by a method selected from the group consisting of: welding the ends to the adapter plates and pinning the ends to the adapter plates. In an embodiment, in the apparatus, the adjustment mechanism is operably coupled to the base.

In an embodiment, an apparatus comprises: an apparatus comprises: a base; a manually positionable arm portion having an opposed first end and second end, the arm portion being rotationally coupled to the base, the arm portion including a plurality of connected arm segments, each arm segment including at least one position transducer for producing a position signal; an electronic circuit that receives the position signal from the at least one position transducer and provides data corresponding to a position of the first measurement device; a rotation assembly coupling the second end to the base, the rotation assembly having a first axis of rotation and a second axis of rotation substantially perpendicular to the first axis of rotation; and a biasing member operably coupled between the rotation assembly and the second end to apply a force to the second end about the second axis of rotation, the biasing member including a torsion spring that, when viewed in cross section, has tapering sides.

In an embodiment, the apparatus further comprises a measurement device coupled to the first end. In an embodiment, in the apparatus, the torsion spring is a wire wound torsion spring. In an embodiment, in the apparatus, the biasing member further comprises a first adapter and a second adapter, the first adapter coupled to a first end of the torsion spring, the second adapter coupled to a second end of the torsion spring.

In an embodiment, the apparatus comprises an adjuster, the adjuster further having a threaded portion, the threaded portion being arranged to engage at least one projection on the first adapter, the force applied by the biasing member to the arm portion being responsive to movement of the adjuster.

In an embodiment, in the apparatus, the torsion spring is attached to the first adapter and the second adapter by a method selected from the group consisting of: welding the torsion spring to the first adapter and the second adapter and pinning the torsion spring to the first adapter plate and the second adapter plate.

As explained herein above in reference to FIGS. 9A, 9B, a brush assembly 152 is included to dissipate static electricity that otherwise could damage electrical components in the AACMM 10, especially the encoder electronics such as the electronics on the read-head plate 134. Similar brush assemblies are also included on the third-axis cartridge 310 and the fifth-axis cartridge 310 shown in FIG. 17B, although the brush assembly is not explicitly shown in FIG. 17B. A similar brush assembly is also included in the seventh-axis assembly 700 shown in FIGS. 19A, 19B.

A side effect of placing a carbon brush 153 in contact with a rotating shaft such as the first-axis shaft 158 is that friction between the carbon brush 153 and the first-axis shaft 158 causes a torque to develop between the shaft and corresponding housing. The torque causes a twisting in the elements of the arm, especially the first-segment tube 290 and the second-segment tube 590. The twisting of the tubes is not detected by the angular encoders within the cartridges and hence results in a slight error in calculated 3D coordinates measured by a measurement probe such as the probe tip 902 or the LLP 1100. The increase in torque generated by the carbon brush 153 as the shaft is rotated relative to the housing can be determined by measuring the running torque with a torque meter. In an experiment, the increase in running torque caused by the carbon brushes was found to be between 1 and 3 inch-ounces. Although the increase in torque caused by the carbon brushes is relative small, a smaller running torque would be better.

Figure 46:
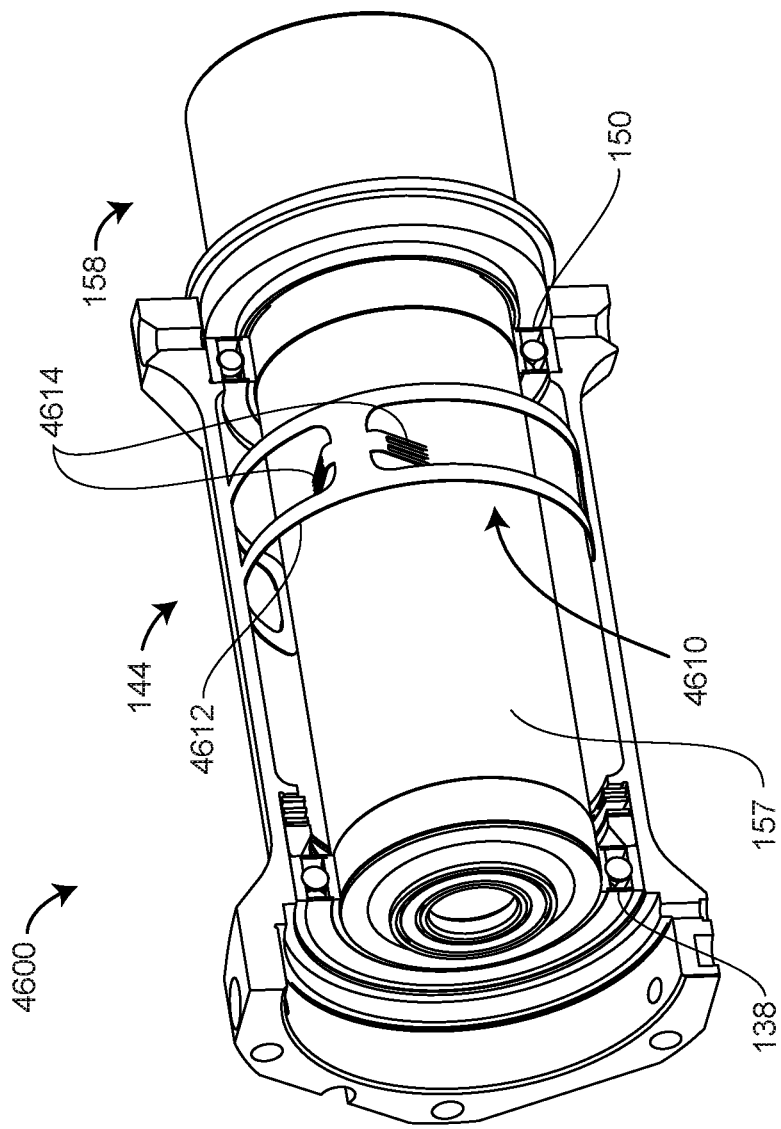
FIG. 46 is a cross-sectional view of a continuity flexure in a cartridge according to an embodiment of the present invention.

FIG. 46 is an isometric sectional view of a first-axis cartridge 4600 having a first-axis housing 144, a first-axis shaft 158, a lower bearing 138, an upper bearing 150, and a contact flexure 4612. The contact flexure includes a housing contact portion 4612 and shaft contact fingers 4614. The housing contact portion 4612 is placed in contact with the inner surface of the first-axis housing 144, while the shaft contact fingers 4614 are placed in contact with a surface of the shaft 157. In an embodiment, the contact flexure 4612 is formed by photochemically etching a thin piece of metal such as CDA 510 phosphor bronze alloy. A jig is then used to bend the metal into the desired flexure shape. In other embodiments, other types of metals such as spring steel with electroless nickel or tungsten, are used. Similar contact flexures are created for every cartridge that rotates to an unlimited degree, namely, the first-axis cartridge 4600, the third-axis cartridge 310, the fifth-axis cartridge 310, and the seventh-axis assembly 700. An experiment found that the addition of contact flexures such as 4612 resulted in an increase in running torque of between 0.25 and 0.3 inch-ounces. This approach reduced torque compared to a brush assembly 152 by a factor of between 4 and 12. The electrical resistance between the first-axis housing 144 and the rotating first-axis shaft 158 was found to be less than one Ohm, which is considered an acceptable level of resistance. Hence contact flexures such as 4612 provide an advantage in reducing running torque while maintaining relatively low electrical resistance between housings and shafts.

In an embodiment, an apparatus comprises an electrically conductive flexure placed between a first portion and a second portion of an articulated arm coordinate measuring machine (AACMM), the first portion operable to rotate relative to the second portion, the flexure positioned so as to create an electrically conductive path between the first portion and the second portion.

In a further embodiment, in the apparatus the first portion and the second portion are separated by a pair of bearings. In a further embodiment, in the apparatus the first portion is a shaft and the second portion is a housing. In a further embodiment, in the apparatus the flexure includes a first flexure element operable to make electrical contact with the first portion and a second flexure element operable to make electrical contact with the second portion, the electrical contact being maintain as the first portion rotates relative to the second portion.

In a further embodiment, in the apparatus the first flexure element includes fingers that press inward against the first portion and the second flexure element presses outward against the second portion. In a further embodiment, in the apparatus the flexure is formed from a single piece of metal. In a further embodiment, in the apparatus the flexure is formed using photochemical etching.

In a further embodiment, the apparatus further comprises a cartridge, the cartridge including the first portion, the second portion, a pair of bearings, and the flexure, the pair of bearings operable to cause the first portion to rotate relative to the second portion about a first axis, the first axis connecting centers of the pair of bearings.

In an embodiment, a method comprises providing an articulated arm coordinate measuring machine (AACMM), the AACMM including a first portion, a second portion, and an electrically conductive flexure; and rotating the first portion relative to the second portion along an axis common to the first portion and the second portion, the flexure providing both an electrical and a mechanical contact between the first portion and the second portion during the rotation.

In another embodiment, in the method, the flexure is formed from a flat piece of metal having a first element and a second element. In another embodiment, the method further comprises making electrical contact during the relative rotation by keeping the first element in electrical contact with the first portion and the second element in electrical contact with the second element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A portable articulated arm coordinate measuring machine (AACMM) for measuring the coordinates of an object in space, comprising:
    a base;
    a manually positionable arm portion having an opposed first end and second end, the arm portion being rotationally coupled to the base, the arm portion including a plurality of connected arm segments, each arm segment including at least one position transducer for producing a position signal;
    a first measurement probe coupled to the first end, the first measurement probe having a first extension element;
    an electronic circuit that receives the position signal from the at least one position transducer and provides data corresponding to a position of the first measurement probe;
    a probe end disposed between the first measurement probe and the first end, the probe end having a clamping mechanism operable to clamp the first extension element onto the probe end at a fixed position; and
    a probe latch that when closed clamps the first measurement probe into place and when opened releases the first measurement probe from the probe end.

2. The AACMM of claim 1, wherein the probe latch, when closed, is held in place by an extension magnet.

3. The AACMM of claim 1, wherein the extension element includes a pull stud having a pull-stud notch.

4. The AACMM of claim 3, wherein a pin in the probe end engages the pull-stud notch to clamp the first measurement probe in place.

5. The AACMM of claim 1, wherein the first measurement probe includes first kinematic mechanical elements and the probe end includes second kinematic mechanical elements, the first kinematic mechanical elements being brought into contact with the second kinematic mechanical elements when the first measurement probe is clamped to the probe end, the contact among the first kinematic elements and the second kinematic elements repeatably positioning the first measurement probe to the probe end.

6. The AACMM of claim 5, wherein the first kinematic elements and the second kinematic elements comprise cylinders and balls.

7. The AACMM of claim 5, wherein the first measurement probe further includes first spring loaded pins and the probe end further includes electrical pads, the first spring loaded pins arranged to make electrical contact with the electrical pads when the first measurement probe is clamped to the probe end.

8. The AACMM of claim 5, wherein the first measurement probe is a tactile measurement probe operable to measure three-dimensional (3D) coordinates in response to contacting a probe tip of the tactile measurement probe with points on the object.

9. The AACMM of claim 8, wherein the first measurement probe further comprises a first probe electrical interface, the first probe electrical interface having a first memory into which are stored first numerical compensation parameters for the first measurement probe.

10. The AACMM of claim 9, wherein the first measurement probe retains its accuracy after being detached and reattached, the stored first numerical compensation parameters being used both before detachment and after reattachment.

11. The AACMM of claim 9, further comprising a second measurement probe having a second extension element, second kinematic mechanical elements, and second spring loaded pins, the second measurement probe having a second probe electrical interface having a second memory into which is stored second numerical compensation parameters specific to the second measurement probe.

12. The AACMM of claim 1 wherein the probe end further includes an engagement magnet positioned to engage the first extension element when the first measurement probe is adjacent the first end.

13. The AACMM of claim 12 wherein:
the latch mechanism includes a carrier with an opening on an end, the engagement magnet being disposed in the opening; and
the first extension element engages the engagement magnet when the first extension element is disposed in the opening.

\* \* \* \* \*